US009487705B2

(12) United States Patent
Kawamura et al.

(10) Patent No.: US 9,487,705 B2
(45) Date of Patent: Nov. 8, 2016

(54) LIQUID CRYSTAL COMPOSITION AND LIQUID CRYSTAL DISPLAY DEVICE USING THE SAME

(71) Applicant: DIC CORPORATION, Tokyo (JP)

(72) Inventors: Joji Kawamura, Saitama (JP); Makoto Negishi, Saitama (JP); Yoshinori Iwashita, Saitama (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/374,865

(22) PCT Filed: Mar. 25, 2013

(86) PCT No.: PCT/JP2013/058498
§ 371 (c)(1),
(2) Date: Jul. 25, 2014

(87) PCT Pub. No.: WO2014/155473
PCT Pub. Date: Oct. 2, 2014

(65) Prior Publication Data

US 2015/0159089 A1 Jun. 11, 2015

(51) Int. Cl.

| | |
|---|---|
| ***C09K 19/12*** | (2006.01) |
| ***C09K 19/20*** | (2006.01) |
| ***C09K 19/54*** | (2006.01) |
| ***C09K 19/44*** | (2006.01) |
| ***C09K 19/42*** | (2006.01) |
| *C09K 19/30* | (2006.01) |
| *C09K 19/04* | (2006.01) |
| *G02F 1/1333* | (2006.01) |

(52) U.S. Cl.
CPC ............... *C09K 19/44* (2013.01); *C09K 19/12* (2013.01); *C09K 19/20* (2013.01); *C09K 19/3003* (2013.01); *C09K 19/3066* (2013.01); *C09K 19/42* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3016* (2013.01); *C09K 2019/3025* (2013.01); *G02F 1/133377* (2013.01); *Y10T 428/10* (2015.01)

(58) Field of Classification Search
CPC .............. C09K 2019/0466; C09K 2019/3004; C09K 2019/3006; C09K 2019/3009; C09K 2019/301; C09K 2019/3016; C09K 2019/3017; C09K 2019/3019; C09K 2019/122; C09K 2019/123; C09K 2019/124; C09K 19/12; C09K 19/20; C09K 19/44
See application file for complete search history.

(56) References Cited

U.S. PATENT DOCUMENTS

| | | | | |
|---|---|---|---|---|
| 2006/0278850 | A1* | 12/2006 | Czanta et al. | 252/299.61 |
| 2008/0029736 | A1 | 2/2008 | Saito | |
| 2008/0029737 | A1 | 2/2008 | Saito | |
| 2008/0246001 | A1 | 10/2008 | Hiroaki | |
| 2009/0194739 | A1 | 8/2009 | Wittek et al. | |
| 2010/0051865 | A1 | 3/2010 | Yoshino et al. | |
| 2010/0060843 | A1 | 3/2010 | Saito et al. | |
| 2010/0272927 | A1 | 10/2010 | Hiraoka et al. | |
| 2010/0294992 | A1 | 11/2010 | Fujita et al. | |
| 2010/0302498 | A1 | 12/2010 | Saito | |
| 2011/0051023 | A1 | 3/2011 | Fujita et al. | |
| 2011/0149227 | A1 | 6/2011 | Saito et al. | |
| 2011/0260104 | A1 | 10/2011 | Maeda et al. | |
| 2011/0315925 | A1 | 12/2011 | Hiraoka et al. | |
| 2012/0217438 | A1 | 8/2012 | Hattori et al. | |
| 2012/0229751 | A1 | 9/2012 | Yanai et al. | |
| 2012/0241671 | A1 | 9/2012 | Hattori et al. | |
| 2012/0256124 | A1* | 10/2012 | Ohgiri et al. | 252/299.61 |

(Continued)

FOREIGN PATENT DOCUMENTS

| | | |
|---|---|---|
| CN | 101508896 A | 8/2009 |
| JP | 2008-37918 A | 2/2008 |

(Continued)

OTHER PUBLICATIONS

International Search Report dated Jun. 11, 2013 issued in corresponding application No. PCT/JP2013/058498.

*Primary Examiner* — Shean C Wu
(74) *Attorney, Agent, or Firm* — Westerman, Hattori, Daniels & Adrian, LLP

(57) ABSTRACT

It is an object of the present invention to provide a liquid crystal composition having a positive Δ∈, the liquid crystal composition also having a liquid crystal phase in a wide temperature range, a good resistance to resolution at low temperature, an excellent adaptability to an ODF process, a high specific resistance and voltage holding ratio, and stability to heat and light. In order to achieve this object, a liquid crystal composition containing compounds represented by Formulae (i) and (ii) is provided.

[Chem. 1]

(i)

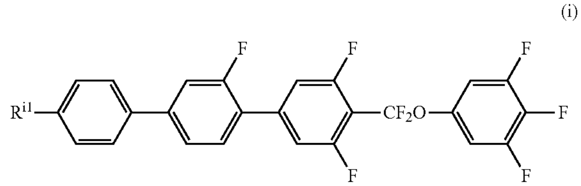

(ii)

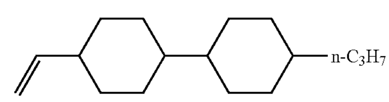

(where $R^{i1}$ represents an alkyl group having 1 to 5 carbon atoms or an alkenyl group having 2 to 5 carbon atoms).

10 Claims, 1 Drawing Sheet

(56) References Cited

U.S. PATENT DOCUMENTS

| | | | |
|---|---|---|---|
| 2013/0278851 | A1 | 10/2013 | Maeda et al. |
| 2014/0034877 | A1 | 2/2014 | Fujita et al. |

FOREIGN PATENT DOCUMENTS

| | | | |
|---|---|---|---|
| JP | 2008-38018 | A | 2/2008 |
| JP | 2008-255201 | A | 10/2008 |
| JP | 2010-53211 | A | 3/2010 |
| JP | 2010-254871 | A | 11/2010 |
| JP | 2010-270178 | A | 12/2010 |
| JP | 2010-275390 | A | 12/2010 |
| JP | 2011-52120 | A | 3/2011 |
| JP | 2011-231197 | A | 11/2011 |
| KR | 10-2012-0115472 | A | 10/2012 |
| WO | 2008/102641 | A1 | 8/2008 |
| WO | 2010/024142 | A1 | 3/2010 |
| WO | 2010/106910 | A1 | 9/2010 |
| WO | 2011/036985 | A1 | 3/2011 |
| WO | 2011/062049 | A1 | 5/2011 |
| WO | 2011/065299 | A1 | 6/2011 |
| WO | 2012/081516 | A1 | 6/2012 |
| WO | 2012/141052 | A1 | 10/2012 |

* cited by examiner

LIQUID CRYSTAL COMPOSITION AND LIQUID CRYSTAL DISPLAY DEVICE USING THE SAME

TECHNICAL FIELD

The present invention relates to a nematic liquid crystal composition which is useful as a material for a liquid crystal display and which has a positive dielectric anisotropy (Δ∈), and the present invention also relates to a liquid crystal display device using such a nematic liquid crystal composition.

BACKGROUND ART

Liquid crystal display devices have been applied to, for example, watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and VA (vertical alignment) and IPS (in-plane switching) types involving use of a TFT (thin film transistor). Liquid crystal compositions used in such liquid crystal display devices need to satisfy the following requirements: being stable to external elements such as moisture, air, heat, and light; having a liquid crystal phase in a wide temperature range mainly including room temperature as much as possible; having a low viscosity; and enabling a low driving voltage. In addition, liquid crystal compositions are composed of several to tens of compounds to adjust, for example, the dielectric anisotropy (Δ∈) and/or refractive index anisotropy (Δn) to be optimum to individual display devices.

A liquid crystal composition having a negative Δ∈ is used in vertical alignment (VA)-type displays, and a liquid crystal composition having a positive Δ∈ is used in horizontal alignment-type displays such as a TN type, an STN type, and an IPS (in-plane switching) type. Another type of driving has been reported, in which molecules of a liquid crystal composition having a positive Δ∈ are vertically aligned in a state in which voltage is not applied, and then a horizontal electric field is applied for performing display. A demand for a liquid crystal composition having a positive Δ∈ has therefore further increased. In all types of driving, however, there have been demands for low driving voltage, a quick response, and a broad range of operation temperature. In other words, a liquid crystal composition having a positive ΔΔ with a large absolute value, a low viscosity (η), and a high nematic phase-isotropic liquid phase transition temperature (Tni) has been demanded. In order to control Δn×d that is a product of Δn and a cell gap (d) to be a predetermined value, the Δn of a liquid crystal composition needs to be adjusted to be in a proper range on the basis of the cell gap. In addition, a quick response is important in liquid crystal display devices applied to television sets or other apparatuses, which generates a need for a liquid crystal composition having a small rotational viscosity (γ1).

Liquid crystal compositions which enable a quick response have been disclosed; for example, such liquid crystal compositions contain a combination of liquid crystal compounds having a positive Δ∈ and represented by Formulae (A-1) to (A-3) and a liquid crystal compound having a neutral Δ∈ and represented by Formula (B). In these liquid crystal compositions, the liquid crystal compound having a positive Δ∈ has a —$CF_2O$— moiety, and the liquid crystal compound having a neutral Δ∈ has an alkenyl group, which is widely known in the field of liquid crystal compositions (see Patent Literatures 1 to 4).

[Chem. 1]

(A-1)

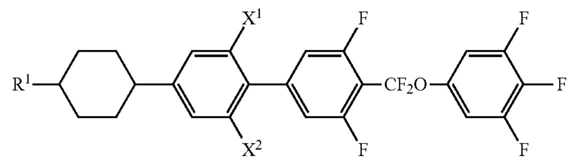

(A-2)

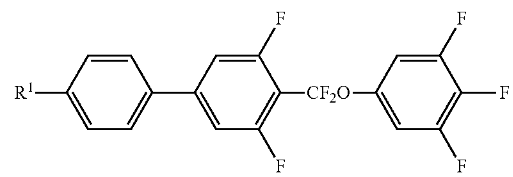

(A-3)

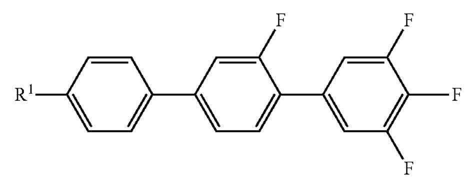

(B)

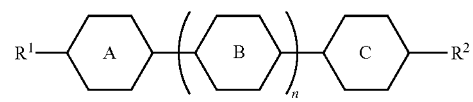

As liquid crystal display devices have come to be used in a broad range of applications, usage and manufacturing thereof have been greatly changed. In order to adapt to such changes, optimization of characteristics other than known basic physical properties has been needed. In particular, a VA type and an IPS type have become popular as liquid crystal display devices utilizing a liquid crystal composition, and this type of display devices even having a very large size (e.g., 50 inches or lager) have been practically used. An increase in the size of substrates has changed a technique for putting a liquid crystal composition between substrates, and a one-drop-fill (ODF) technique has become mainstream in place of a typically employed vacuum injection technique. Dropping of a liquid crystal composition onto a substrate, however, generates droplet stains with the result that display quality is degraded, which has been problematic.

Furthermore, in a process for manufacturing a liquid crystal display device by an ODF technique, a liquid crystal composition needs to be dropped in an amount optimum for the size of the liquid crystal display device. In the case where the amount of a liquid crystal composition to be dropped largely varies from the optimum level, a predetermined balance between a refractive index and a driving electric field in a liquid crystal display device is disrupted, which causes defective display, such as unevenness and defective contrast. In particular, the optimum amount of a liquid crystal composition to be dropped is small in small-size liquid crystal display devices widely used in smartphones which have become popular in recent years, and thus it is difficult even to control a variation from the optimum amount to be in a certain range. Hence, in order to maintain a high production yield of liquid crystal display devices, for instance, a liquid crystal composition needs to be less affected by impact and a rapid pressure change generated on dropping of the liquid crystal composition in a dropping apparatus and to continuously and stably dropped for a long time.

In terms of these circumstances, a liquid crystal composition which is used in active-matrix liquid crystal display devices driven by, for example, a TFT device needs to be developed for satisfying the following requirements in view of a manufacturing process of liquid crystal display devices: enabling the quick response needed for liquid crystal display devices and having a high specific resistance, high voltage holding ratio, and improved stability to external elements such as light and heat.

CITATION LIST

Patent Literature

PTL 1: Japanese Unexamined Patent Application Publication No. 2008-037918

PTL 2: Japanese Unexamined Patent Application Publication No. 2008-038018

PTL 3: Japanese Unexamined Patent Application Publication No. 2010-275390

PTL 4: Japanese Unexamined Patent Application Publication No. 2011-052120

SUMMARY OF INVENTION

Technical Problem

It is an object of the present invention to provide a liquid crystal composition having a positive Δ∈, the liquid crystal composition also having a liquid crystal phase in a wide temperature range, a low viscosity, a good resistance to resolution at low temperature, a high specific resistance, a high voltage holding ratio, and stability to heat and light. It is another object of the present invention to enable high-yield production of a liquid crystal display device in which use of this liquid crystal composition gives excellent display quality with a reduction in defective display brought about by screen burn-in and droplet stains. It is another object of the present invention to provide a liquid crystal display device using such a liquid crystal composition.

Solution to Problem

The present invention includes the following aspects.

(1) A liquid crystal composition containing at least one compound represented by Formula (i) and a compound represented by General Formula (ii)

[Chem. 2]

(i)

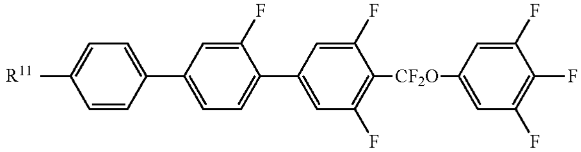

(ii)

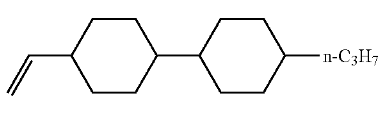

(where $R^{i1}$ represents an alkyl group having 1 to 5 carbon atoms or an alkenyl group having 2 to 5 carbon atoms).

(2) The liquid crystal composition according to the aspect (1), further containing at least one compound represented by General Formula (L)

[Chem. 3]

$$R^{L1}—B^{L1}-L^{L1}-B^{L2}(-L^{L2}-B^{L3})_{OL}R^{L2} \quad (L)$$

(where $R^{L1}$ and $R^{L2}$ each independently represent an alkyl group having 1 to 8 carbon atoms, and one —$CH_2$— moiety or at least two —$CH_2$— moieties not adjoining each other in the alkyl group are each independently optionally substituted with —CH═CH—, —C≡C—, —O—, —CO—, —COO—, or —OCO—;

OL represents 0, 1, 2, or 3;

$B^{L1}$, $B^{L2}$ and $B^{L3}$ each independently represent a group selected from the group consisting of (a) a 1,4-cyclohexylene group (of which one —$CH_2$— moiety or at least two —$CH_2$— moieties not adjoining each other are optionally substituted with —O—) and (b) a 1,4-phenylene group (of which one —CH═ moiety or at least two —CH═ moieties not adjoining each other are optionally substituted with —N═), and the groups (a) and (b) are each independently optionally substituted with a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF—, or —C≡C—;

in the case where OL is 2 or 3 and where $L^{L2}$ is multiple, the $L^{L2}$ moieties are the same as or different from each other; in the case where OL is 2 or 3 and where $B^{L3}$ is multiple, the $B^{L3}$ moieties are the same as or different from each other; and the compound represented by General Formula (L) excludes the compound represented by Formula (ii).

(3) The liquid crystal composition according to any one of the aspects (1) and (2), further containing at least one compound represented by General Formula (M)

[Chem. 4]

(M)

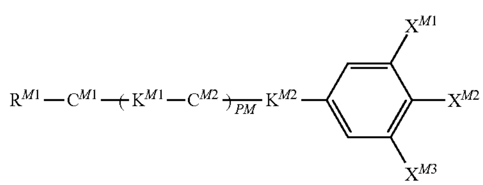

(where $R^{M1}$ represents an alkyl group having 1 to 8 carbon atoms, and one —$CH_2$— moiety or at least two —$CH_2$— moieties not adjoining each other in the alkyl group are each independently optionally substituted with —CH═CH—, —C≡C—, —O—, —CO—, —COO—, or —OCO—;

PM represents 0, 1, 2, 3, or 4;

$C^{M1}$ and $C^{M2}$ each independently represent a group selected from the group consisting of (d) a 1,4-cyclohexylene group (of which one —$CH_2$— moiety or at least two —$CH_2$— moieties not adjoining each other are optionally substituted with —O— or —S—) and (e) a 1,4-phenylene group (of which one —CH═ moiety or at least two —CH═ moieties not adjoining each other are optionally substituted with —N═), and the groups (d) and (e) are each independently optionally substituted with a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

in the case where PM is 2, 3, or 4 and where $K^{M1}$ is multiple, the $K^{M1}$ moieties are the same as or different from each other; in the case where PM is 2, 3, or 4 and where $C^{M2}$ is multiple, the $C^{M2}$ moieties are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by General Formula (i).

(4) The liquid crystal composition according to the aspect (3), wherein a compound represented by General Formula (X-2-1) is used as the compound represented by General Formula (M)

[Chem. 5]

(X-2-1)

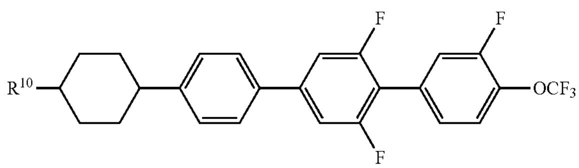

(where $R^{10}$ represents an alkyl group having 1 to 5 carbon atoms, an alkenyl group having 2 to 5 carbon atoms, or an alkoxy group having 1 to 4 carbon atoms).

(5) The liquid crystal composition according to the aspect (2), wherein a compound selected from the group consisting of compounds represented by General Formula (I-4) is used as the compound represented by General Formula (L)

[Chem. 6]

(I-4)

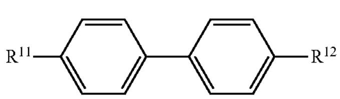

(where $R^{11}$ and $R^{12}$ each independently represent an alkyl group having 1 to 5 carbon atoms, an alkenyl group having 2 to 5 carbon atoms, or an alkoxy group having 1 to 4 carbon atoms).

(6) The liquid crystal composition according to the aspect (2), wherein a compound represented by General Formula (IV) is used as the compound represented by General Formula (L)

[Chem. 7]

(IV)

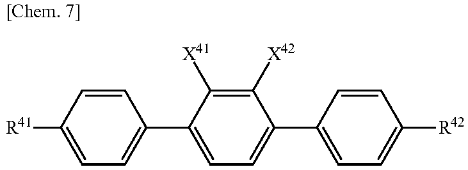

(where $R^{41}$ and $R^{42}$ each independently represent an alkyl group having 1 to 5 carbon atoms or an alkenyl group having 2 to 5 carbon atoms, and $X^{41}$ and $X^{42}$ each independently represent a hydrogen atom or a fluorine atom).

(7) The liquid crystal composition according to the aspect (3), wherein a compound represented by General Formula (IX-2-2) is used as the compound represented by General Formula (M)

[Chem. 8]

(IX-2-2)

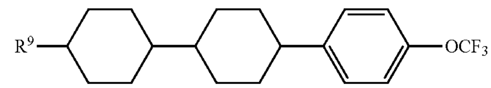

(where $R^9$ represents an alkyl group having 1 to 5 carbon atoms or an alkenyl group having 2 to 5 carbon atoms).

(8) The liquid crystal composition according to the aspect (2), wherein a compound selected from the group consisting of compounds represented by General Formula (I-7) is used as the compound represented by General Formula (L)

[Chem. 9]

(I-7)

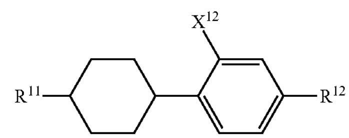

(where $R^{11}$ and $R^{12}$ each independently represent an alkyl group having 1 to 5 carbon atoms, an alkenyl group having 2 to 5 carbon atoms, or an alkoxy group having 1 to 4 carbon atoms; and $X^{12}$ represents a fluorine atom or a chlorine atom).

(9) The liquid crystal composition according to the aspect (2), wherein a compound selected from the group consisting of compounds represented by General Formula (II-1) is used as the compound represented by General Formula (L)

[Chem. 10]

(II-1)

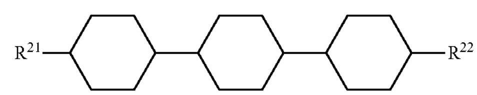

(where $R^{21}$ and $R^{22}$ each independently represent an alkenyl group having 2 to 5 carbon atoms, an alkyl group having 1 to 5 carbon atoms, or an alkoxy group having 1 to 4 carbon atoms).

(10) The liquid crystal composition according to the aspect (3), wherein a compound represented by General Formula (IX-1) is used as the compound represented by General Formula (M)

[Chem. 11]

(IX-1)

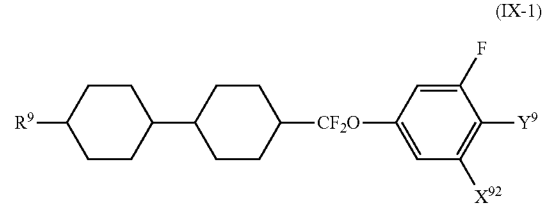

(where $R^9$ represents an alkyl group having 1 to 5 carbon atoms or an alkenyl group having 2 to 5 carbon atoms; $X^{92}$ represents a hydrogen atom or a fluorine atom; and $Y^9$ represents a fluorine atom or —$OCF_3$).

(11) The liquid crystal composition according to the aspect (3), wherein a compound represented by General Formula (XIV-2-2) is used as the compound represented by General Formula (M)

[Chem. 12]

(XIV-2-2)

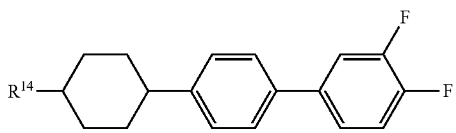

(where $R^{14}$ represents an alkyl group having 2 to 7 carbon atoms).

(12) The liquid crystal composition according to the aspect (3), wherein a compound represented by General Formula (X-4) is used as the compound represented by General Formula (M)

[Chem. 13]

(X-4)

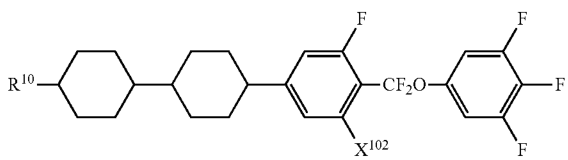

(where $X^{102}$ represents a fluorine atom or a hydrogen atom; and $R^{100}$ represents an alkyl group having 1 to 5 carbon atoms, an alkenyl group having 2 to 5 carbon atoms, or an alkoxy group having 1 to 4 carbon atoms).

(13) The liquid crystal composition according to the aspect (3), wherein a compound represented by General Formula (X-1-3) is used as the compound represented by General Formula (M)

[Chem. 14]

(X-1-3)

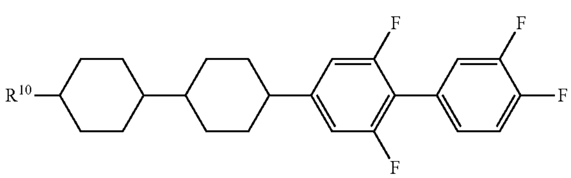

(where $R^{10}$ represents an alkyl group having 1 to 5 carbon atoms, an alkenyl group having 2 to 5 carbon atoms, or an alkoxy group having 1 to 4 carbon atoms).

(14) The liquid crystal composition according to the aspect (4), wherein a compound represented by Formula (39.2) is used as the compound represented by General Formula (X-2-1).

[Chem. 15]

(39.2)

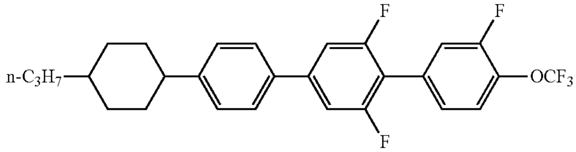

(15) The liquid crystal composition according to the aspect (5), wherein a compound represented by Formula (5.2) is used as the compound represented by General Formula (I-4).

[Chem. 16]

(5.2)

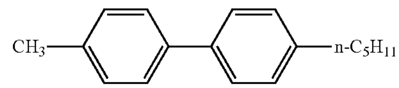

(16) The liquid crystal composition according to the aspect (6), wherein a compound represented by Formula (18.3) is used as the compound represented by General Formula (IV).

[Chem. 17]

(18.3)

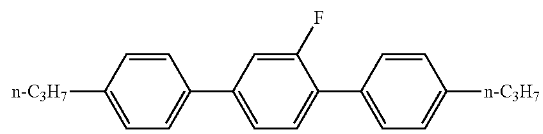

(17) The liquid crystal composition according to the aspect (7), wherein a compound represented by Formula (31.4) is used as the compound represented by General Formula (IX-2-2).

[Chem. 18]

(31.4)

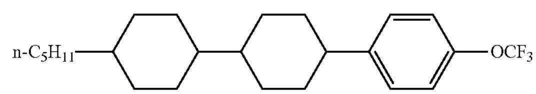

(18) The liquid crystal composition according to the aspect (8), wherein a compound represented by Formula (8.1) is used as the compound represented by General Formula (I-7).

[Chem. 19]

(8.1)

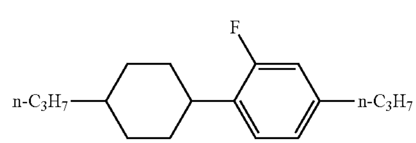

(19) The liquid crystal composition according to the aspect (9), wherein a compound represented by Formula (10.1) is used as the compound represented by General Formula (II-1).

[Chem. 20]

(10.1)

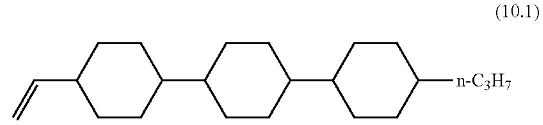

(20) The liquid crystal composition according to the aspect (10), wherein a compound represented by Formula (28.5) is used as the compound represented by General Formula (IX-1).

[Chem. 21]

(28.5)

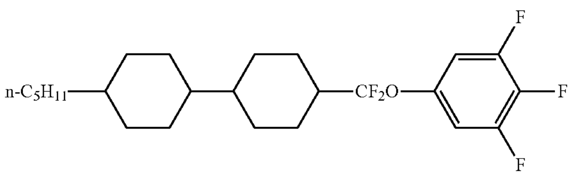

(21) The liquid crystal composition according to the aspect (11), wherein a compound represented by Formula (54.1) and/or a compound represented by Formula (54.4) are used as the compound represented by General Formula (XIV-2-2).

[Chem. 22]

(54.1)

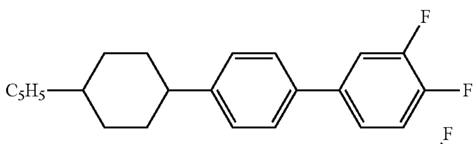

(54.4)

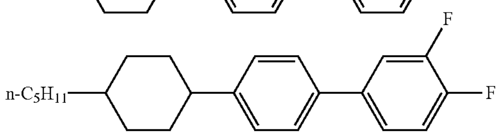

(22) The liquid crystal composition according to the aspect (12), wherein a compound represented by Formula (42.3) is used as the compound represented by General Formula (X-4).

[Chem. 23]

(42.3)

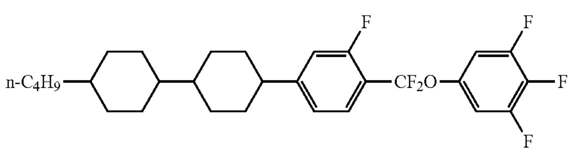

(23) The liquid crystal composition according to the aspect (13), wherein a compound represented by Formula (38.2) is used as the compound represented by General Formula (X-1-3).

[Chem. 24]

(38.2)

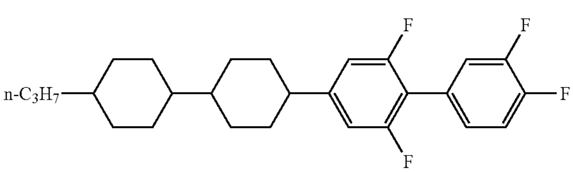

(24) The liquid crystal composition according to the aspect (2), wherein a compound represented by General Formula (I-1-1) is used as the compound represented by General Formula (L)

[Chem. 25]

(I-1-1)

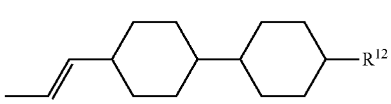

(where $R^{12}$ represents an alkyl group having 1 to 5 carbon atoms, an alkenyl group having 2 to 5 carbon atoms, or an alkoxy group having 1 to 4 carbon atoms), and the amount of the compound represented by General Formula (I-1-1) is at least 14%.

(25) The liquid crystal composition according to the aspect (2), wherein a compound represented by General Formula (II-2) is used as the compound represented by General Formula (L)

[Chem. 26]

(II-2)

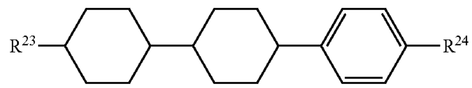

(where $R^{23}$ represents an alkenyl group having 2 to 5 carbon atoms, and $R^{24}$ represents an alkyl group having 1 to 5 carbon atoms or an alkoxy group having 1 to 4 carbon atoms).

(26) The liquid crystal composition according to the aspect (25), wherein a compound represented by Formula (11.2) is used as the compound represented by General Formula (II-2)

[Chem. 27]

(11.2)

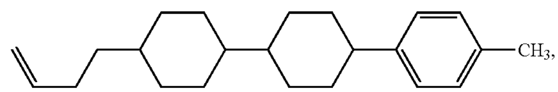

and the amount of the compound represented by Formula (11.2) is at least 9%.

(27) The liquid crystal composition according to the aspect (10), wherein a compound represented by Formula (28.3) is used as the compound represented by General Formula (IX-1)

[Chem. 28]

(28.3)

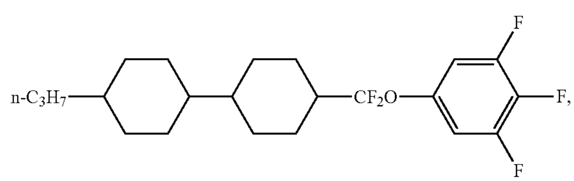

and the amount of the compound represented by Formula (28.3) is at least 15%.

(28) The liquid crystal composition according to the aspect (3), wherein a compound represented by General Formula (VIII-1) is used as the compound represented by General Formula (M)

[Chem. 29]

(VIII-1)

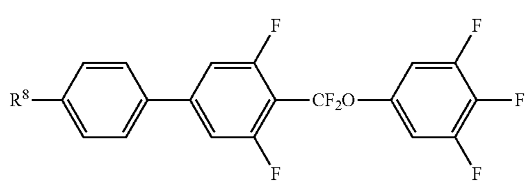

(where $R^8$ represents an alkyl group having 1 to 5 carbon atoms, an alkenyl group having 2 to 5 carbon atoms, or an alkoxy group having 1 to 4 carbon atoms).

(29) The liquid crystal composition according to the aspect (28), wherein a compound represented by Formula (26.1) is used as the compound represented by General Formula (M)

[Chem. 30]

(26.1)

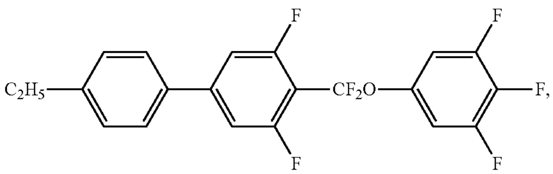

and the amount of the compound represented by Formula (26.1) is at least 3%.

(30) The liquid crystal composition according to the aspect (6), wherein a compound represented by Formula (18.4) and/or a compound represented by Formula (18.5) are used as the compound represented by General Formula (IV)

[Chem. 31]

(18.4)

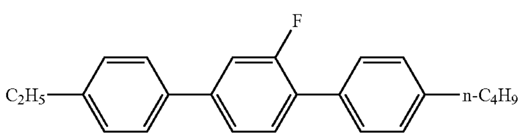

(18.5)

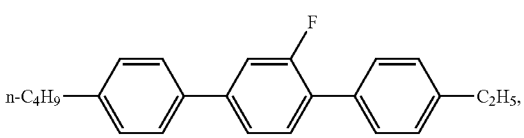

and the amount of the compound represented by Formula (18.4) and/or the compound represented by Formula (18.5) is at least 7%.

(31) The liquid crystal composition according to the aspect (2), wherein a compound selected from the group consisting of compounds represented by General Formula (III) is used as the compound represented by General Formula (L)

[Chem. 32]

(III)

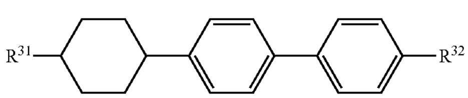

(where $R^{31}$ and $R^{32}$ each independently represent an alkenyl group having 2 to 5 carbon atoms, an alkyl group having 1 to 5 carbon atoms, or an alkoxy group having 1 to 4 carbon atoms), and the amount of the selected compound is at least 6%.

(32) The liquid crystal composition according to the aspect (6), wherein a compound represented by Formula (19.1) and/or a compound represented by Formula (19.2) are used as the compound represented by General Formula (IV)

[Chem. 33]

(19.1)

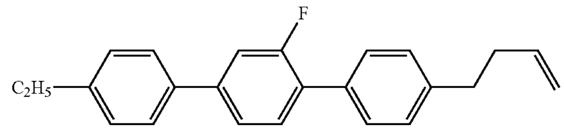

(19.2)

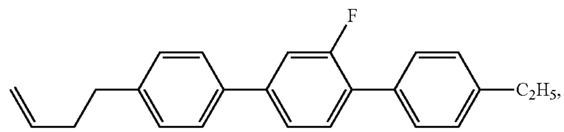

and the amount of the compound represented by Formula (19.1) and/or the compound represented by Formula (19.2) is 0.5% or more and less than 5%.

(33) The liquid crystal composition according to the aspect (11), wherein a compound represented by Formula (54.2) is used as the compound represented by General Formula (XIV-2-2)

[Chem. 34]

(54.2)

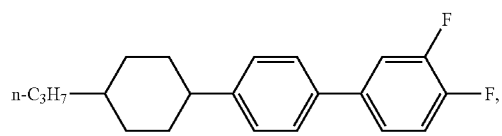

and the amount of the compound represented by Formula (54.2) is at least 5%.

(34) The liquid crystal composition according to the aspect (6), wherein a compound represented by Formula (19.3) and/or a compound represented by Formula (19.4) are used as the compound represented by General Formula (IV)

[Chem. 35]

(19.3)

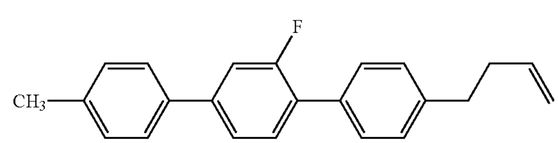

(19.4)

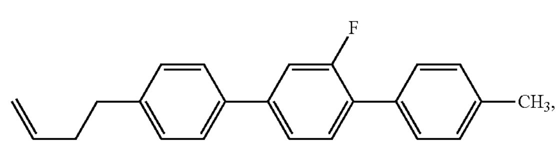

and the amount of the compound represented by Formula (19.3) and/or the compound represented by Formula (19.4) is at least 6%.

(35) The liquid crystal composition according to the aspect (6), wherein a compound represented by Formula (19.31) and/or a compound represented by Formula (19.32) are used as the compound represented by General Formula (IV)

[Chem. 36]

(19.31)

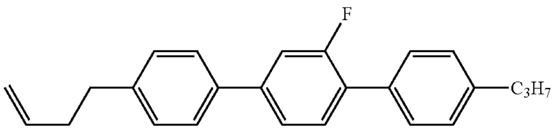

(19.32)

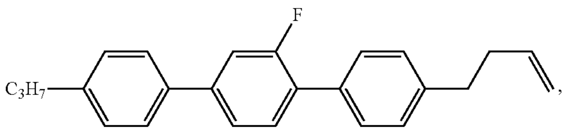

and the amount of the compound represented by Formula (19.31) and/or the compound represented by Formula (19.32) is 0.5% or more and less than 5%.

(36) The liquid crystal composition according to the aspect (3), wherein a compound represented by Formula (41.2) is used as the compound represented by General Formula (M)

[Chem. 37]

(41.2)

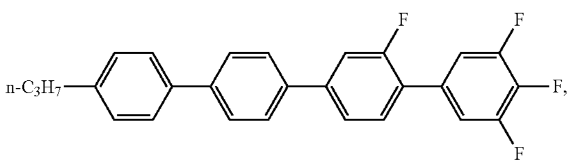

and the amount of the compound represented by Formula (41.2) is 0.5% or more and less than 2%.

(37) An active-matrix liquid crystal display device using the liquid crystal composition according to any one of the aspects (1) to (36).

(38) The active-matrix liquid crystal display device according to the aspect (37), wherein the active-matrix liquid crystal display device is operated in an IPS mode.

(39) The active-matrix liquid crystal display device according to the aspect (37), wherein the active-matrix liquid crystal display device is operated in an FFS mode.

(40) The active-matrix liquid crystal display device according to the aspect (37), wherein the active-matrix liquid crystal display device is operated in a VA-IPS mode.

(41) The active-matrix liquid crystal display device according to the aspect (37), wherein the active-matrix liquid crystal display device is operated in an OCB mode.

(42) The active-matrix liquid crystal display device according to the aspect (37), wherein the active-matrix liquid crystal display device is operated in an ECB mode.

(43) A liquid crystal display including the active-matrix liquid crystal display device according to any one of the aspects (37) to (42).

Advantageous Effects of Invention

The composition having a positive dielectric anisotropy according to the present invention has a significantly improved resistance to resolution at low temperature while the low viscosity, high specific resistance, and high voltage holding ratio thereof are maintained; in addition, the composition can be stably and continuously dropped for a long time in a process for manufacturing a liquid crystal display device by an ODF technique. Hence, the composition of the present invention enables high-yield production of liquid crystal display devices having an excellent display quality with a reduction in defective display resulting from the production process thereof and is therefore highly practical (adaptable) for application to products involving liquid crystal; liquid crystal display devices using this composition, such as an IPS (in-plane switching) type and an FFS (fringe-field switching) type, can quickly respond.

DESCRIPTION OF EMBODIMENTS

Figure 1:
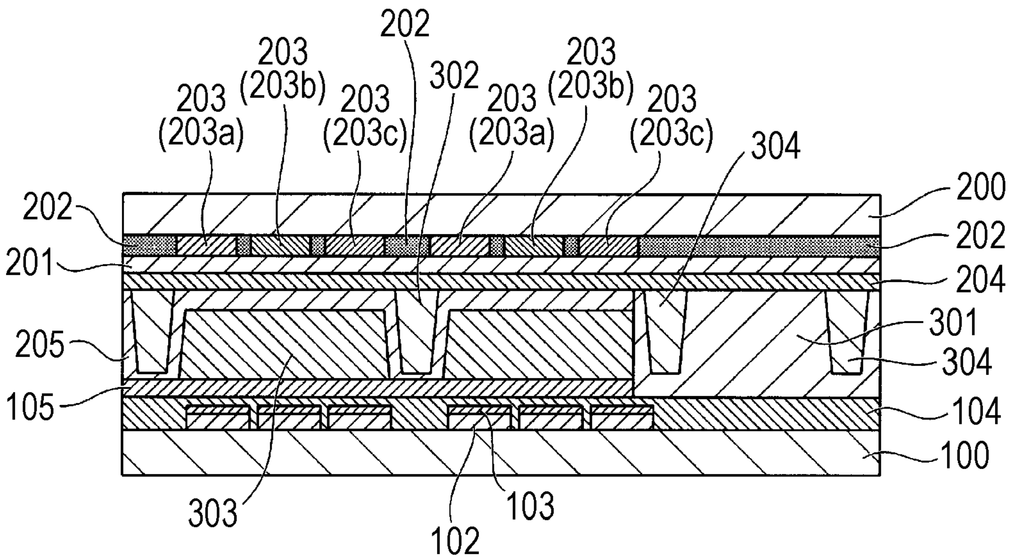
FIG. 1 is a cross-sectional view illustrating a liquid crystal display device according to an embodiment of the present invention; a substrate including members 100 to 105 is referred to as "backplane", and a substrate including members 200 to 205 is referred to as "frontplane".

The liquid crystal composition of the present invention contains at least one compound represented by General Formula (i) and a compound represented by Formula (ii). Such a liquid crystal composition will now be described; the term "%" herein refers to "mass %" unless otherwise specified.

[Chem. 38]

(i)

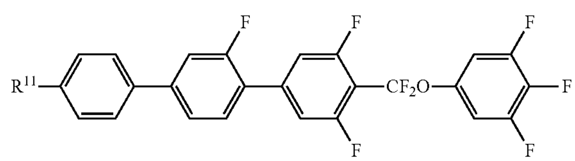

(ii)

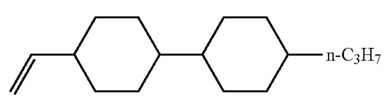

(where $R^{i1}$ represents an alkyl group having 1 to 5 carbon atoms or an alkenyl group having 2 to 5 carbon atoms.)

<Compound Represented by General Formula (1)>

The liquid crystal composition of the present invention contains at least one compound represented by General Formula (i).

[Chem. 39]

(i)

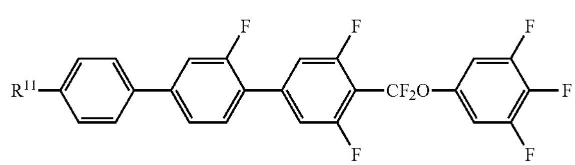

In General Formula (i), $R^{i1}$ represents an alkyl group having 1 to 5 carbon atoms or an alkenyl group having 2 to 5 carbon atoms.

The amount of the compound represented by General Formula (i) is preferably in the range of 1 mass % to 30 mass %, more preferably 2 mass % to 25 mass %, and further preferably 2 mass % to 22 mass % relative to the total mass of the liquid crystal composition of the present invention in view of resistance to resolution at low temperature, transition temperature, electric reliability, and another property. In particular, the amount of the compound represented by General Formula (i) is preferably in the range of 2 to 20 mass %, also preferably 2 to 12 mass %, also preferably 2 to 8 mass %, also preferably 2 to 5 mass %, also preferably 2 to 4 mass %, also preferably 4 to 22 mass %, also preferably 5 to 22 mass %, also preferably 10 to 22 mass %, also preferably 14 to 22 mass %, also preferably 20 to 22 mass %, also preferably 4 to 5 mass %, also preferably 5 to 8 mass %, also preferably 10 to 12 mass %, and also preferably 14 to 20 mass % relative to the total mass of the liquid crystal composition of the present invention.

Specifically, the compound represented by General Formula (i), which is used in the liquid crystal composition of the present invention, is preferably at least one compound selected from the group consisting of compounds represented by Formulae (45.1) to (45.4), more preferably at least one compound selected from the group consisting of the compounds represented by Formulae (45.2) to (45.4), and further preferably the compound represented by Formula (45.2).

[Chem. 40]

(45.1)

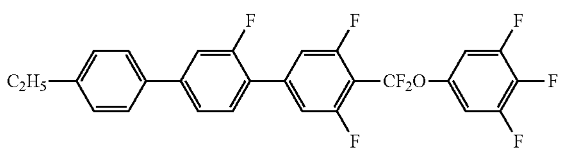

(45.2)

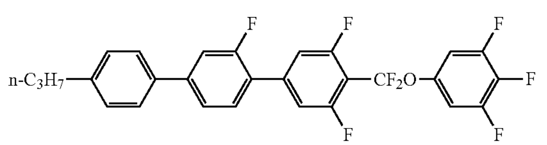

(45.3)

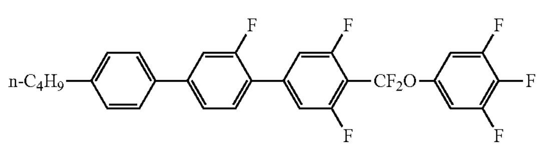

(45.4)

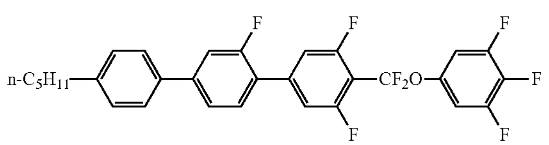

In the liquid crystal composition of the present invention, the amount of the compound represented by Formula (45.2) is preferably in the range of 1 mass % to 25 mass %, more preferably 2 mass % to 20 mass %, further preferably 2 mass % to 15 mass %, and especially preferably 2 mass % to 11 mass % relative to the total mass of the liquid crystal composition of the present invention in view of resistance to resolution at low temperature, transition temperature, electric reliability, and another property. Examples of the especially preferred range are as follows: from 2 mass % to 10 mass %, from 2 mass % to 6 mass %, from 2 mass % to 5 mass %, from 2 mass % to 4 mass %, from 3 mass % to 11 mass %, from 4 mass % to 11 mass %, and from 4 mass % to 5 mass %.

In the liquid crystal composition of the present invention, the amount of the compound represented by Formula (45.3) is preferably in the range of 1 mass % to 20 mass %, more preferably 1 mass % to 15 mass %, further preferably 1 mass % to 10 mass %, and especially preferably 2 mass % to 9 mass % relative to the total mass of the liquid crystal composition of the present invention in view of resistance to resolution at low temperature, transition temperature, electric reliability, and another property. Examples of the especially preferred range are as follows: from 4 mass % to 9 mass %, from 5 mass % to 9 mass %, from 2 mass % to 8 mass %, from 2 mass % to 7 mass %, from 2 mass % to 4 mass %, from 4 mass % to 8 mass %, and from 5 mass % to 7 mass %.

In the liquid crystal composition of the present invention, the amount of the compound represented by Formula (45.4) is preferably in the range of 1 mass % to 20 mass %, more preferably 1 mass % to 15 mass %, further preferably 1 mass % to 10 mass %, and especially preferably 2 mass % to 10 mass % relative to the total mass of the liquid crystal composition of the present invention in view of resistance to resolution at low temperature, transition temperature, electric reliability, and another property. Examples of the especially preferred range are as follows: from 4 mass % to 10 mass %, from 5 mass % to 10 mass %, from 2 mass % to 7 mass %, from 2 mass % to 6 mass %, and from 5 mass % to 7 mass %.

Any compound can be used in combination with the compound represented by General Formula (i); a proper combination of compounds for an embodiment is determined in view of resistance to resolution at low temperature, transition temperature, electric reliability, birefringence, and another property. The compound represented by General Formula (i) can be used in combination with, for example, one compound in an embodiment of the present invention, two compounds in another embodiment, and three or more compounds in another embodiment.

For example, in the case where the liquid crystal composition of the present invention contains one compound represented by General Formula (i), the liquid crystal composition preferably further contains any of the following compounds.

[Chem. 41]

(X-2-1)

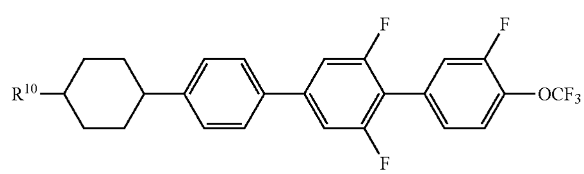

(where $R^{10}$ represents an alkyl group having 1 to 5 carbon atoms, an alkenyl group having 2 to 5 carbon atoms, or an alkoxy group having 1 to 4 carbon atoms.)

The amount of a compound represented by General Formula (X-2-1) is preferably in the range of 1 to 10% relative to the total mass of the liquid crystal composition of the present invention.

Among the compounds represented by General Formula (X-2-1), a compound represented by Formula (39.2) is preferably employed.

[Chem. 42]

(39.2)

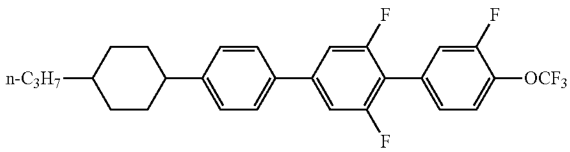

The amount of the compound represented by Formula (39.2) is preferably in the range of 1 to 10%, more preferably 1 to 8%, further preferably 3 to 7%, and further preferably 5 to 7%.

[Chem. 43]

(I-4)

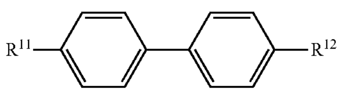

(where $R^{11}$ and $R^{12}$ each independently represent an alkyl group having 1 to 5 carbon atoms, an alkenyl group having 2 to 5 carbon atoms, or an alkoxy group having 1 to 4 carbon atoms.)

The amount of a compound represented by General Formula (I-4) is preferably in the range of 1 to 21% relative to the total mass of the liquid crystal composition of the present invention.

Among the compounds represented by General Formula (I-4), a compound represented by Formula (5.2) is preferably employed.

[Chem. 44]

(5.2)

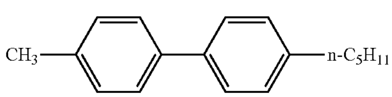

The amount of the compound represented by Formula (5.2) is preferably in the range of 5 to 20%, more preferably 10 to 15%, and further preferably 11 to 13%.

[Chem. 45]

(IV)

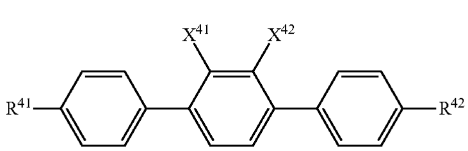

(where $R^{41}$ and $R^{42}$ each independently represent an alkyl group having 1 to 5 carbon atoms or an alkenyl group having 2 to 5 carbon atoms, and $X^{41}$ and $X^{42}$ each independently represent a hydrogen atom or a fluorine atom.)

The amount of a compound represented by General Formula (IV) is preferably in the range of 1 to 16% relative to the total mass of the liquid crystal composition of the present invention.

Among the compounds represented by General Formula (IV), a compound selected from compounds represented by Formulae (18.3) to (18.5), (19.1) to (19.4), and (19.31) and (19.32) is preferably employed.

[Chem. 46]

(18.3)

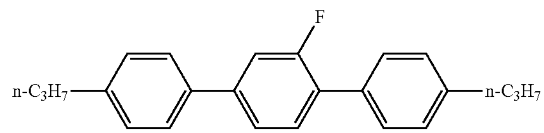

(18.4)

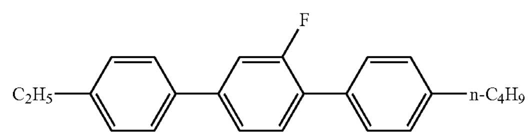

(18.5)

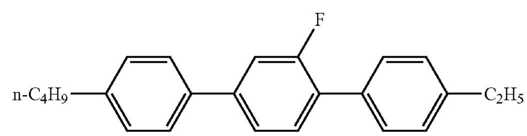

(19.1)

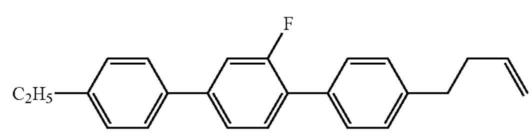

(19.2)

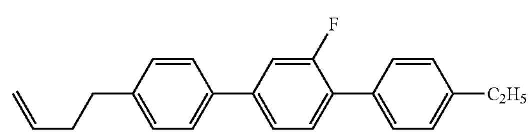

(19.3)

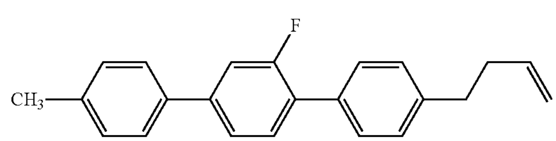

(19.4)

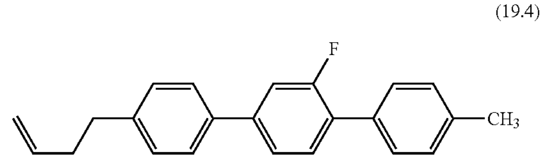

[Chem. 47]

(19.31)

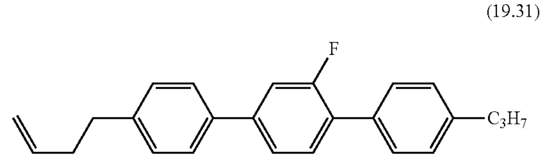

-continued (19.32)

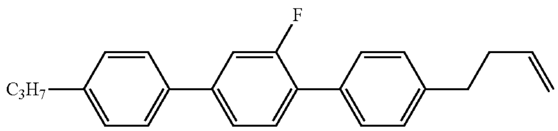

The amount of the compound represented by Formula (19.32) or (19.31) is preferably in the range of 1 to 5%, and more preferably 1 to 3%.

The amount of the compound represented by Formula (18.4) or (18.5) is preferably in the range of 7 to 15%, and more preferably 9 to 11%.

The amount of the compound represented by Formula (18.3) is preferably in the range of 1 to 15%, more preferably 1 to 10%, further preferably 5 to 10%, and especially preferably 6 to 9%.

[Chem. 48]

(IX-2-2)

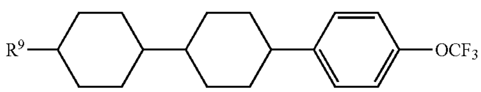

(where $R^9$ represents an alkyl group having 1 to 5 carbon atoms or an alkenyl group having 2 to 5 carbon atoms.)

The amount of a compound represented by General Formula (IX-2-2) is preferably in the range of 1 to 12% relative to the total mass of the liquid crystal composition of the present invention.

Among the compounds represented by General Formula (IX-2-2), a compound represented by Formula (31.4) is preferably employed.

[Chem. 49]

(31.4)

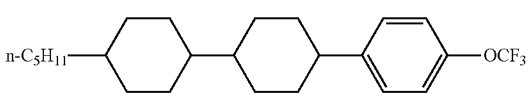

The amount of the compound represented by Formula (31.4) is preferably in the range of 1 to 7%, and more preferably 2 to 5% relative to the total mass of the liquid crystal composition of the present invention.

[Chem. 50]

(I-7)

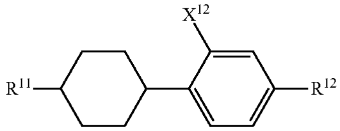

(where $R^{11}$ and $R^{12}$ each independently represent an alkyl group having 1 to 5 carbon atoms, an alkenyl group having 2 to 5 carbon atoms, or an alkoxy group having 1 to 4 carbon atoms; and $X'^2$ represents a fluorine atom or a chlorine atom.)

The amount of a compound represented by General Formula (I-7) is preferably in the range of 1 to 7%, and more preferably 1 to 4% relative to the total mass of the liquid crystal composition of the present invention.

Among the compounds represented by General Formula (I-7), a compound represented by Formula (8.1) is preferably employed.

[Chem. 51]

(8.1)

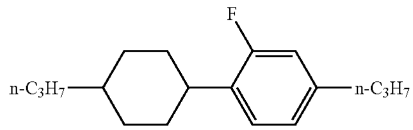

[Chem. 52]

(II-1)

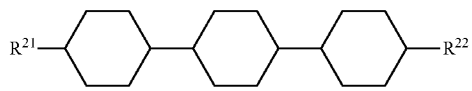

(where $R^{21}$ and $R^{22}$ independently represent an alkenyl group having 2 to 5 carbon atoms, an alkyl group having 1 to 5 carbon atoms, or an alkoxy group having 1 to 4 carbon atoms.)

The amount of a compound represented by General Formula (II-1) is preferably in the range of 1 to 16%, and more preferably 3 to 10% relative to the total mass of the liquid crystal composition of the present invention.

Among the compounds represented by General Formula (II-1), a compound represented by Formula (10.1) is preferably employed.

[Chem. 53]

(10.1)

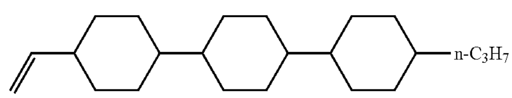

The amount of the compound represented by Formula (10.1) is preferably in the range of 1 to 15%, more preferably 5 to 15%, further preferably 5 to 10%, and especially preferably 7 to 9%.

[Chem. 54]

(IX-1)

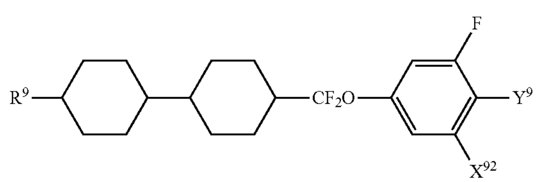

(where $R^9$ represents an alkyl group having 1 to 5 carbon atoms or an alkenyl group having 2 to 5 carbon atoms; $X^{92}$ represents a hydrogen atom or a fluorine atom; and $Y^9$ represents a fluorine atom or —$OCF_3$.)

The amount of a compound represented by General Formula (IX-1) is preferably in the range of 1 to 21% relative to the total mass of the liquid crystal composition of the present invention.

Among the compounds represented by General Formula (IX-1), a compound represented by Formula (28.3) or (28.5) is preferably employed.

[Chem. 55]

(28.3)

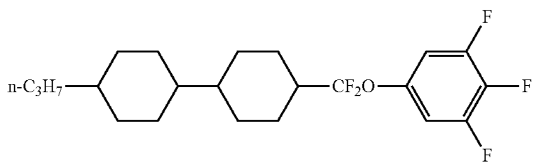

(28.5)

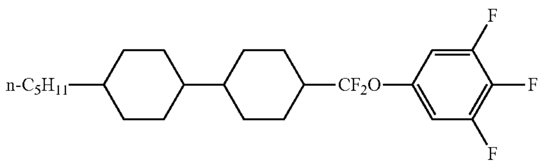

The amount of the compound represented by Formula (28.3) is preferably in the range of 1 to 20%, more preferably 8 to 20%, further preferably 15 to 20%, and especially preferably 17 to 20%.

The amount of the compound represented by Formula (28.5) is preferably in the range of 1 to 20%, more preferably 1 to 15%, further preferably 1 to 10%, and especially preferably 2 to 5%.

[Chem. 56]

(XIV-2-2)

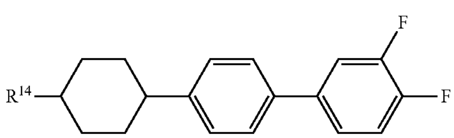

(where $R^{14}$ represents an alkyl group having 2 to 7 carbon atoms.)

The amount of a compound represented by General Formula (XIV-2-2) is preferably in the range of 1 to 20%, and more preferably 2 to 17%.

Among the compounds represented by General Formula (XIV-2-2), a compound represented by Formula (54.1), (54.2), or (54.4) is preferably employed.

[Chem. 57]

(54.1)

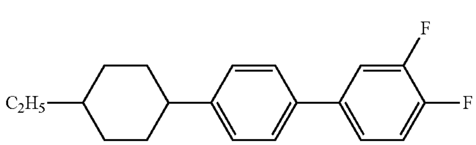

(54.2)

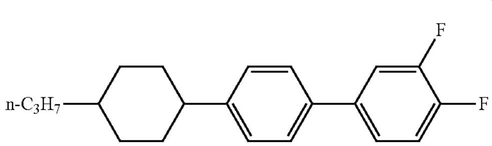

-continued (54.4)

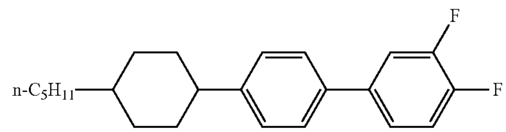

The amount of the compound represented by Formula (54.1) is preferably from 1 to 15%, more preferably 1 to 10%, further preferably 1 to 5%, and especially preferably 1 to 3%.

The amount of the compound represented by Formula (54.2) is preferably from 5 to 20%, and more preferably 5 to 16%.

The amount of the compound represented by Formula (54.4) is preferably from 1 to 15%, more preferably 1 to 10%, and especially preferably 3 to 8%.

[Chem. 58]

(X-4)

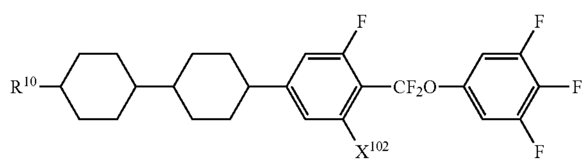

(where $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.)

The amount of a compound represented by General Formula (X-4) is preferably in the range of 1 to 10%, and more preferably 2 to 5%.

Among the compounds represented by General Formula (X-4), a compound represented by Formula (42.3) is preferably employed.

[Chem. 59]

(42.3)

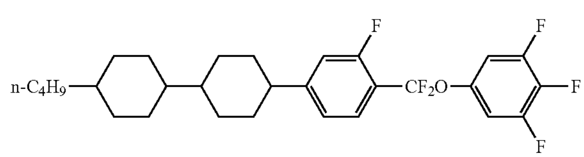

The amount of the compound represented by Formula (42.3) is preferably in the range of 1 to 10%, more preferably 1 to 5%, and further preferably 2 to 4%.

[Chem. 60]

(X-1-3)

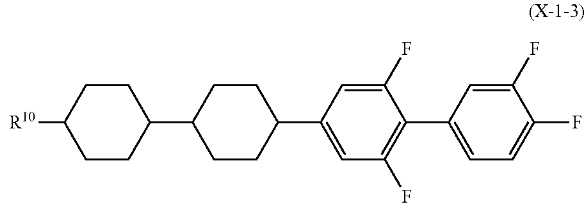

(where $R^{10}$ represents an alkyl group having 1 to 5 carbon atoms, an alkenyl group having 2 to 5 carbon atoms, or an alkoxy group having 1 to 4 carbon atoms.)

The amount of a compound represented by General Formula (X-1-3) is preferably in the range of 1 to 10%, more preferably 1 to 7%, and further preferably 3 to 7%.

Among the compounds represented by General Formula (X-1-3), a compound represented by Formula (38.2) is preferably employed.

[Chem. 61]

(38.2)

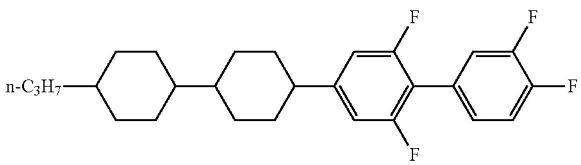

The amount of the compound represented by Formula (38.2) is preferably in the range of 1 to 10%, more preferably 1 to 7%, and further preferably 3 to 7%.

[Chem. 62]

(I-1-1)

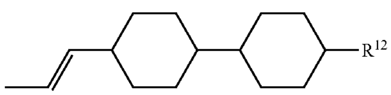

(where $R^{12}$ represents an alkyl group having 1 to 5 carbon atoms, an alkenyl group having 2 to 5 carbon atoms, or an alkoxy group having 1 to 4 carbon atoms.)

The amount of a compound represented by General Formula (I-1-1) is preferably not less than 14%, more preferably from 14 to 25%, and further preferably from 14 to 18%.

Among the compounds represented by General Formula (I-1-1), a compound represented by Formula (1.3) is preferably employed.

[Chem. 63]

(1.3)

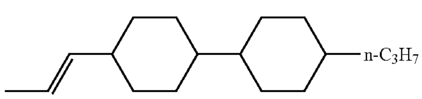

The amount of the compound represented by Formula (1.3) is preferably not less than 14%, more preferably from 14 to 25%, and further preferably from 14 to 18%.

In the case where the liquid crystal composition of the present invention contains one compound represented by General Formula (i), the liquid crystal composition preferably further contains any of the following compounds.

[Chem. 64]

(11.2)

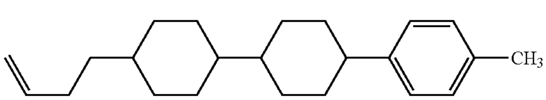

-continued (III)

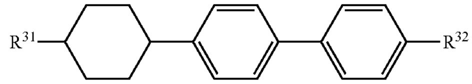

(26.1)

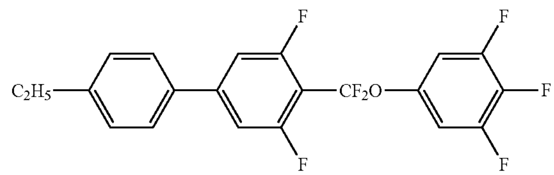

($R^{31}$ and $R^{32}$ each independently represent an alkenyl group having 2 to 5 carbon atoms, an alkyl group having 1 to 5 carbon atoms, or an alkoxy group having 1 to 4 carbon atoms.)

The amount of the compound represented by Formula (11.2) is preferably in the range of 5 to 20%, more preferably 6 to 20%, further preferably 8 to 20%, further preferably 9 to 20%, and even further preferably 10 to 18%.

The amount of the compound represented by General Formula (III) is preferably in the range of 5 to 15%, more preferably 6 to 15%, further preferably 7 to 15%, and even further preferably 9 to 15%.

The amount of the compound represented by Formula (26.1) is preferably in the range of 1 to 20%, more preferably 2 to 15%, further preferably 3 to 15%, further preferably 4 to 10%, and even further preferably 5 to 10%.

The total amount of one compound represented by General Formula (i) and the compound represented by Formula (ii) is preferably in the range of 25 to 60%, and more preferably 30 to 55%.

The total amount of one compound represented by General Formula (i), the compound represented by Formula (ii), two compounds represented by General Formula (XIV-2-2), one compound represented by General Formula (IV-1), and one compound represented by General formula (III) is preferably in the range of 50 to 80%, more preferably 60 to 80%, further preferably 70 to 80%, and especially preferably 75 to 79%.

The total amount of one compound represented by General Formula (i), the compound represented by Formula (ii), one compound represented by General Formula (X-4), one compound represented by General Formula (X-2-1), one compound represented by General Formula (IV-1), and one compound represented by General Formula (III) is preferably in the range of 50 to 80%, more preferably 60 to 80%, further preferably 70 to 80%, and especially preferably 73 to 77%.

The total amount of one compound represented by General Formula (1), the compound represented by Formula (ii), and the compound represented by Formula (11.2) is preferably in the range of 20 to 60%, more preferably 30 to 60%, further preferably 40 to 50%, and especially preferably 43 to 47%.

The total amount of one compound represented by General Formula (i), the compound represented by Formula (ii), the compound represented by Formula (39.2), the compound represented by Formula (26.1), the compound represented by Formula (18.4), the compound represented by Formula (10.1), the compound represented by Formula (5.2), and the compound represented by Formula (1.3) is preferably in the range of 70 to 100%, more preferably 80 to 100%, further preferably 85 to 95%, and especially preferably 90 to 95%.

The total amount of one compound represented by General Formula (1), the compound represented by Formula (ii), the compound represented by Formula (39.2), the compound represented by Formula (26.1), the compound represented by Formula (18.4), the compound represented by Formula (5.2), and the compound represented by Formula (1.3) is preferably in the range of 60 to 90%, more preferably 70 to 90%, further preferably 80 to 90%, and especially preferably 82 to 86%.

The total amount of one compound represented by General Formula (i), the compound represented by Formula (ii), the compound represented by Formula (39.2), the compound represented by Formula (38.2), and the compound represented by Formula (1.3) is preferably in the range of 50 to 90%, more preferably 60 to 80%, further preferably 70 to 80%, and especially preferably 70 to 75%.

The total amount of one compound represented by General Formula (1), the compound represented by Formula (ii), two compounds represented by General Formula (XIV-2-2), the compound represented by Formula (41.2), and the compound represented by Formula (28.5) is preferably in the range of 30 to 70%, more preferably 40 to 60%, further preferably 45 to 55%, and especially preferably 49 to 52%.

The total amount of one compound represented by General Formula (1), the compound represented by Formula (ii), and the compound represented by Formula (19.31) and/or the compound represented by Formula (19.32) is preferably in the range of 35 to 75%, more preferably 45 to 65%, further preferably 50 to 60%, and especially preferably 55 to 60%.

In the case where the liquid crystal composition of the present invention contains two compounds represented by General Formula (i), the liquid crystal composition preferably further contains at least one compound selected from the following compounds.

[Chem. 65]

(19.3)

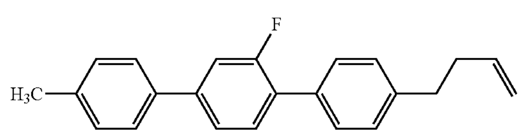

(19.4)

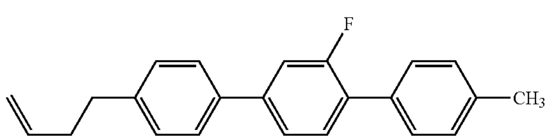

(1.3)

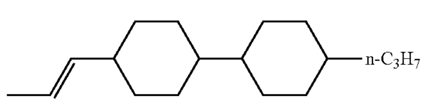

(11.2)

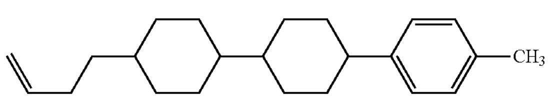

(44.2)

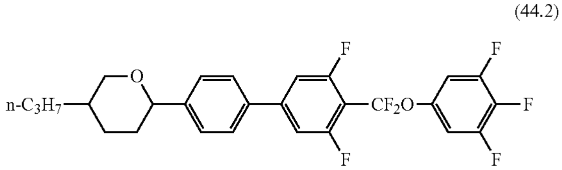

-continued (44.1)

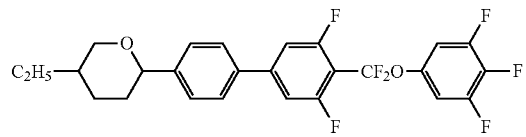

(13.4)

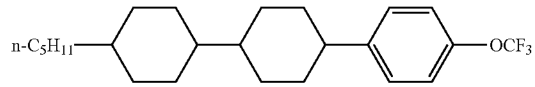

(19.2)

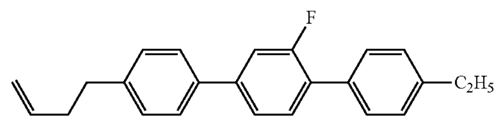

(19.1)

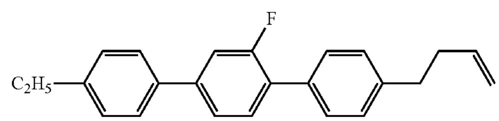

(19.3)

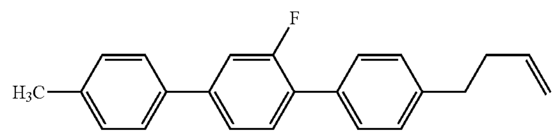

(19.4)

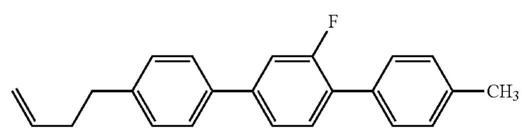

In the case where the liquid crystal composition of the present invention contains two compounds represented by General Formula (i) and the compound represented by Formula (44.2), the amount of the compound represented by Formula (44.2) is preferably in the range of 1 to 15%, more preferably 3 to 10%, and further preferably 4 to 8%.

In the case where the liquid crystal composition of the present invention contains two compounds represented by General Formula (i) and the compound represented by Formula (44.1), the amount of the compound represented by Formula (44.1) is preferably in the range of 1 to 15%, more preferably 2 to 10%, and further preferably 3 to 7%.

In the case where the liquid crystal composition of the present invention contains two compounds represented by General Formula (i), it is also preferred that the compounds represented by Formulae (44.1) and (44.2) be used in combination; the total amount thereof is preferably in the range of 5 to 15%, and more preferably 7 to 12%.

The amount of the compound represented by Formula (19.1) or (19.2) is preferably in the range of 0.5 to 10%, more preferably 0.5% to 5%, and further preferably 0.5 to 2%.

In the case where the liquid crystal composition of the present invention contains two compounds represented by General Formula (i) and the compound represented by Formula (19.3) and/or the compound represented by Formula (19.4), the amount of the compound represented by Formula (19.3) and/or the compound represented by Formula (19.4) is preferably in the range of 1 to 20%, more preferably 5% to 15%, and further preferably 10 to 15%.

In the case where the liquid crystal composition of the present invention contains two compounds represented by General Formula (i) and the compound represented by Formula (31.4), the amount of the compound represented by Formula (31.4) is preferably in the range of 1 to 15%, more preferably 1 to 10%, and further preferably 1 to 4%.

In the case where the liquid crystal composition of the present invention contains two compounds represented by General Formula (i) as well as the compound represented by General Formula (ii), the amount of the compounds represented by General Formula (i) is preferably in the range of 5 mass % to 60 mass %, also preferably 5 mass % to 50 mass %, also preferably 5 mass % to 40 mass %, also preferably 5 mass % to 30 mass %, also preferably 5 mass % to 20 mass %, and also preferably 5 mass % to 15 mass % relative to the total amount (100 mass %) of the liquid crystal composition of the present invention.

The amount of the compound represented by Formula (ii) is preferably from 25 to 50%, more preferably 29 to 45%, and further preferably 32 to 40%.

In the case where the liquid crystal composition of the present invention contains two compounds represented by General Formula (i) and the compound represented by Formula (1.3), the amount of the compound represented by Formula (1.3) is preferably in the range of 1 mass % to 25 mass %, also preferably 1 mass % to 23 mass %, also preferably 2 mass % to 20 mass %, also preferably 2 mass % to 20 mass %, also preferably 5 mass % to 20 mass %, also preferably 10 mass % to 20 mass %, also preferably 11 mass % to 18 mass %, and also preferably 13 mass % to 17 mass % relative to the total amount (100 mass %) of the liquid crystal composition of the present invention.

[Chem. 66]

(1.3)

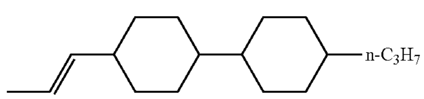

In the case where the liquid crystal composition of the present invention contains two compounds represented by General Formula (i) and the compound represented by Formula (11.2), the amount of the compound represented by Formula (11.2) is preferably in the range of 1 mass % to 25 mass %, also preferably 1 mass % to 23 mass %, also preferably 2 mass % to 20 mass %, also preferably 5 mass % to 18 mass %, also preferably 6 mass % to 17 mass %, and also preferably 10 mass % to 17 mass % relative to the total amount (100 mass %) of the liquid crystal composition of the present invention.

[Chem. 67]

(11.2)

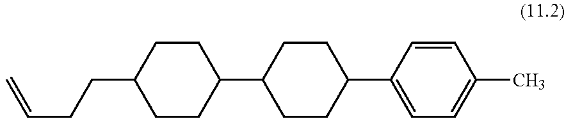

It is preferred that the compound represented by Formula (11.2) be used in combination with the compound represented by Formula (1.3); the total amount thereof is preferably in the range of 10 to 35%, and more preferably 13 to 32%.

The total amount of two compounds represented by General Formula (i) and the compound represented by Formula (ii) is preferably from 27 to 50%, more preferably 40 to 50%, and further preferably 42 to 49%.

The total amount of two compounds represented by General Formula (i), the compound represented by Formula (ii), and the compounds represented by Formulae (44.2), (11.2), and (1.3) is preferably in the range of 50 to 85%, more preferably 60 to 80%, further preferably 70 to 80%, and especially preferably 70 to 75%.

The total amount of two compounds represented by General Formula (1), the compound represented by Formula (ii), two compounds represented by General Formula (X-6), one compound represented by General Formula (IV-2), the compound represented by Formula (11.2), and the compound represented by Formula (1.3) is preferably in the range of 70 to 100%, more preferably 80 to 100%, further preferably 85 to 95%, and especially preferably 88 to 92%.

The total amount of two compounds represented by General Formula (i), the compound represented by Formula (ii), two compounds represented by General Formula (X-6), one compound represented by General Formula (IV-2), and one compound represented by General Formula (IX-2-2) is preferably in the range of 40 to 80%, more preferably 50 to 70%, further preferably 60 to 70%, and especially preferably 62 to 66%.

In the case where the liquid crystal composition of the present invention contains three compounds represented by General Formula (i), the liquid crystal composition preferably further contains at least one compound selected from the following compounds.

[Chem. 68]

(31.2)

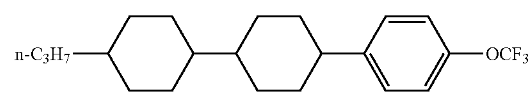

(31.4)

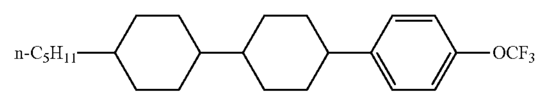

(44.1)

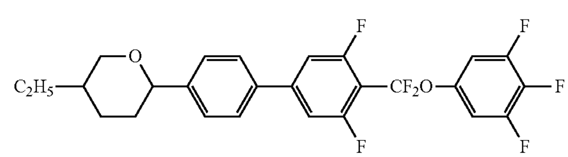

(44.2)

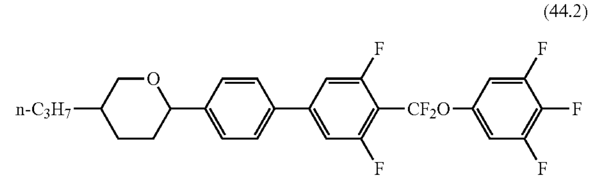

(11.1)

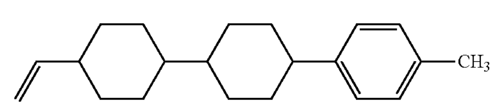

(11.2)

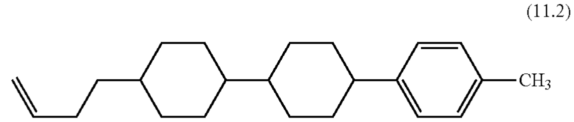

-continued (8.1)

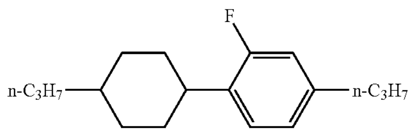

In the case where the liquid crystal composition of the present invention contains three compounds represented by General Formula (i) and the compound represented by Formula (31.2), the amount of the compound represented by Formula (31.2) is preferably from 1 to 10%, and more preferably 5 to 10%.

In the case where the liquid crystal composition of the present invention contains three compounds represented by General Formula (i) and the compound represented by Formula (31.4), the amount of the compound represented by Formula (31.4) is preferably from 1 to 10%, and more preferably 1 to 5%.

In the case where the liquid crystal composition of the present invention contains three compounds represented by General Formula (i) and the compound represented by Formula (44.1), the amount of the compound represented by Formula (44.1) is preferably in the range of 1 to 10%, and more preferably 3 to 8%.

In the case where the liquid crystal composition of the present invention contains three compounds represented by General Formula (i) and the compound represented by Formula (44.2), the amount of the compound represented by Formula (44.2) is preferably in the range of 1 to 10%, and more preferably 5 to 10%.

In the case where the liquid crystal composition of the present invention contains three compounds represented by General Formula (i) and the compound represented by Formula (11.1), the amount of the compound represented by Formula (11.1) is preferably from 1 to 10%, and more preferably 5 to 10%.

In the case where the liquid crystal composition of the present invention contains three compounds represented by General Formula (i) and the compound represented by Formula (11.2), the amount of the compound represented by Formula (11.2) is preferably from 5 to 20%, and more preferably 8 to 16%.

In the case where the liquid crystal composition of the present invention contains three compounds represented by General Formula (i) and the compound represented by Formula (8.1), the amount of the compound represented by Formula (8.1) is preferably in the range of 0.5 to 5%, and more preferably 0.5 to 2%.

In the case where the liquid crystal composition of the present invention contains three compounds represented by General Formula (i) as well as the compound represented by Formula (ii), the amount of the compound represented by Formula (ii) is preferably in the range of 5 mass % to 60 mass %, more preferably 10 mass % to 57 mass %, further preferably 13 mass % to 55 mass %, further preferably 15 mass % to 50 mass %, further preferably 18 mass % to 48 mass %, further preferably 20 mass % to 45 mass %, further preferably 25 mass % to 45 mass %, further preferably 28 to 40%, and especially preferably 30 mass % to 40 mass % relative to the total amount (100 mass %) of the liquid crystal composition of the present invention.

The total amount of the compounds represented by General Formula (i) is preferably from 10 to 25%, and more preferably 13 to 22%.

In the case where the liquid crystal composition of the present invention contains three compounds represented by General Formula (i) and the compound represented by Formula (26.2), the amount of the compound represented by Formula (26.2) is preferably in the range of 1 to 14 mass %, more preferably 1 to 10%, and further preferably 2 to 8% relative to the total amount (100 mass %) of the liquid crystal composition of the present invention.

[Chem. 69]

(26.2)

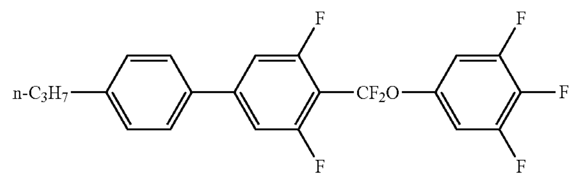

In the case where the liquid crystal composition of the present invention contains three compounds represented by General Formula (i) and the compound represented by Formula (1.3), the amount of the compound represented by Formula (1.3) is preferably in the range of 1 mass % to 25 mass %, also preferably 2 mass % to 23 mass %, also preferably 2 mass % to 20 mass %, also preferably 5 mass % to 18 mass %, also preferably 6 mass % to 17 mass %, also preferably 11 mass % to 17 mass %, also preferably 12 mass % to 17 mass %, also preferably 13 mass % to 17 mass %, and also preferably 14 mass % to 17 mass % relative to the total amount (100 mass %) of the liquid crystal composition of the present invention.

[Chem. 70]

(1.3)

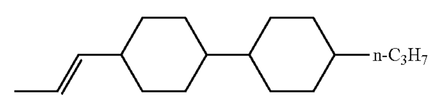

In the case where the liquid crystal composition of the present invention contains three compounds represented by General Formula (i) and the compound represented by Formula (28.3), the amount of the compound represented by Formula (28.3) is preferably in the range of 1 mass % to 25 mass %, also preferably 2 mass % to 23 mass %, also preferably 5 mass % to 23 mass %, also preferably 8 mass % to 23 mass %, also preferably 10 mass % to 20 mass %, also preferably 15 mass % to 18 mass %, and also preferably 17 mass % to 18 mass % relative to the total amount (100 mass %) of the liquid crystal composition of the present invention.

[Chem. 71]

(28.3)

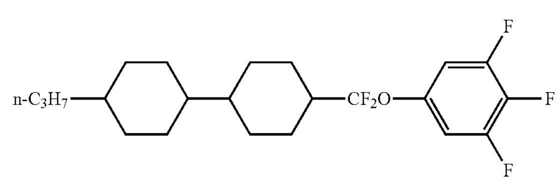

<Compound Represented by General Formula (ii)>

The liquid crystal composition of the present invention contains the compound represented by General Formula (ii).

[Chem. 72]

(ii)

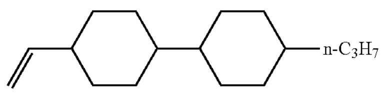

In the liquid crystal composition, the amount of the compound represented by Formula (ii) is preferably not less than 3 mass %, also preferably not less than 10 mass %, also preferably not less than 12 mass %, also preferably not less than 15 mass %, also preferably not less than 20 mass %, also preferably not less than 22 mass %, also preferably not less than 23 mass %, also preferably not less than 24 mass %, also preferably not less than 30 mass %, and also preferably not less than 37 mass % relative to the total mass of the liquid crystal composition of the present invention in terms of a response speed and electric and optical reliabilities. The amount of the compound represented by Formula (ii) in the liquid crystal composition is also preferably not more than 60 mass %, also preferably not more than 50 mass %, also preferably not more than 46 mass %, also preferably not more than 45 mass %, also preferably not more than 44 mass %, also preferably not more than 42 mass %, also preferably not more than 40 mass %, also preferably not more than 38 mass %, also preferably not more than 36 mass %, also preferably not more than 32 mass %, also preferably not more than 26 mass %, and also preferably not more than 17 mass % relative to the total mass of the liquid crystal composition of the present invention. In particular, the amount of the compound represented by Formula (ii) in the liquid crystal composition is preferably in the range of 1 to 60 mass %, also preferably 1 to 50 mass %, also preferably 10 to 50 mass %, also preferably 10 to 45 mass %, also preferably 10 to 26 mass %, also preferably 12 to 17 mass %, also preferably 3 to 15 mass %, also preferably 5 to 12 mass %, also preferably 15 to 38 mass %, also preferably 15 to 32 mass %, also preferably 20 to 45 mass %, also preferably 20 to 42 mass %, also preferably 22 to 44 mass %, also preferably 24 to 40 mass %, also preferably 23 to 36 mass %, also preferably 29 to 42 mass %, also preferably 30 to 50 mass %, also preferably 35 to 50 mass %, also preferably 37 to 46 mass %, and also preferably 30 to 38 mass % relative to the total mass of the liquid crystal composition of the present invention.

The total amount of three compounds represented by Formula (i) and the compound represented by Formula (ii) is preferably in the range of 10 to 60%, more preferably, 12 to 60%, further preferably 17 to 60%, further preferably 24 to 60%, further preferably 25 to 60%, further preferably 26 to 60%, further preferably 30 to 60%, further preferably 31 to 60%, further preferably 40 to 60%, further preferably 41 to 60%, and especially preferably 48 to 58% relative to the total mass of the liquid crystal composition.

The total amount of three compounds represented by Formula (i), the compound represented by Formula (ii), the compound represented by Formula (26.2), the compound represented by Formula (1.3), one compound represented by General Formula (II-2), and the compound represented by Formula (28.3) is preferably in the range of 58 to 100%, more preferably 80 to 100%, further preferably 90 to 100%, further preferably 95 to 100%, further preferably 98 to 100%, and especially preferably 100% relative to the total mass of the liquid crystal composition.

The total amount of three compounds represented by Formula (i), the compound represented by Formula (ii), the compound represented by Formula (26.2), the compound represented by Formula (1.3), one compound represented by General Formula (II-2), and the compound represented by Formula (8.1) is preferably from 70 to 90%, more preferably 75 to 85%, further preferably 78 to 85%, and especially preferably 80 to 84% relative to the total mass of the liquid crystal composition.

The total amount of three compounds represented by Formula (i), the compound represented by Formula (ii), the compound represented by Formula (26.2), the compound represented by Formula (1.3), and one compound represented by General Formula (II-2) is preferably in the range of 48 to 100%, more preferably 75 to 100%, further preferably 80 to 95%, still further preferably 85 to 95%, and especially preferably 88 to 92% relative to the total mass of the liquid crystal composition.

The total amount of three compounds represented by Formula (i), the compound represented by Formula (ii), the compound represented by Formula (26.2), the compound represented by Formula (1.3), one compound represented by General Formula (II-2), two compounds represented by General Formula (X-6), and two compounds represented by General Formula (IX-2-2) is preferably in the range of 75 to 100%, more preferably 80 to 95%, further preferably 85 to 95%, and especially preferably 90 to 94% relative to the total mass of the liquid crystal composition.

The liquid crystal composition of the present invention can further contain at least one of compounds represented by General Formula (L).

[Chem. 73]

$$R^{L1}—B^{L1}\text{-}L^{L1}\text{-}B^{L2}\text{-}(L^{L2}\text{-}B^{L3})_{OL}R^{L2} \quad (L)$$

In General Formula (L), $R^{L1}$ and $R^{L2}$ each independently represent an alkyl group having 1 to 8 carbon atoms, and one moiety or at least two —$CH_2$— moieties not adjoining each other in the alkyl group are each independently optionally substituted with —CH=CH—, —C≡C—, —O—, —CO—, —COO—, or —OCO—;

OL represents 0, 1, 2, or 3;

$B^{L1}$, $B^{L2}$ and $B^{L3}$ each independently represent a group selected from the group consisting of (a) a 1,4-cyclohexylene group (of which one —$CH_2$— moiety or at least two —$CH_2$— moieties not adjoining each other are optionally substituted with —O—) and (b) a 1,4-phenylene group (of which one —CH= moiety or at least two —CH= moieties not adjoining each other are optionally substituted with —N=), and at least one hydrogen atom in each of the groups (a) and (b) is independently optionally substituted with a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—;

in the case where OL is 2 or 3 and where $L^{L2}$ is multiple, the $L^{L2}$ moieties are the same as or different from each other;

in the case where OL is 2 or 3 and where $B^{L3}$ is multiple, the $B^{L3}$ moieties are the same as or different from each other; and the compound represented by General Formula (L) excludes the compound represented by Formula (ii).

Such compounds can be used in any combination; a combination of the compounds is properly determined on the basis of predetermined properties such as resistance to resolution at low temperature, transition temperature, electric reliability, and birefringence (refractive index anisotropy). In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven of the compounds are used. In another embodiment of the present invention, eight of the compounds are used. In another embodiment of the present invention, nine of the compounds are used. In another embodiment of the present invention, ten or more of the compounds are used.

In the liquid crystal composition of the present invention, the amount of the compound represented by General Formula (L) needs to be appropriately adjusted on the basis of desired properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of such a compound is in the range of 1 to 95 mass % in an embodiment of the present invention; in another embodiment of the present invention, the amount is from 10 to 95 mass %; in another embodiment of the present invention, the amount is from 20 to 95 mass %; in another embodiment of the present invention, the amount is from 30 to 95 mass %; in another embodiment of the present invention, the amount is from 40 to 95 mass %; in another embodiment of the present invention, the amount is from 50 to 95 mass %; in another embodiment of the present invention, the amount is from 55 to 95 mass %; in another embodiment of the present invention, the amount is from 60 to 95 mass %; in another embodiment of the present invention, the amount is from 65 to 95 mass %; in another embodiment of the present invention, the amount is from 70 to 95 mass %; in another embodiment of the present invention, the amount is from 75 to 95 mass %; and in another embodiment of the present invention, the amount is from 80 to 95 mass %.

Furthermore, relative to the total mass of the liquid crystal composition of the present invention, for instance, the amount of such a compound is in the range of 1 to 95 mass % in an embodiment of the present invention; in another embodiment of the present invention, the amount is from 1 to 85 mass %; in another embodiment of the present invention, the amount is from 1 to 75 mass %; in another embodiment of the present invention, the amount is from 1 to 65 mass %; in another embodiment of the present invention, the amount is from 1 to 55 mass %; in another embodiment of the present invention, the amount is from 1 to 45 mass %; in another embodiment of the present invention, the amount is from 1 to 35 mass %; and in another embodiment of the present invention, the amount is from 1 to 25 mass %.

In the case where the viscosity of the liquid crystal composition of the present invention needs to be kept at a low level for allowing the liquid crystal composition to contribute to a high response speed, it is preferred that the lower limit of the above-mentioned range be high and that the upper limit thereof be high. In the case where the Tni of the liquid crystal composition of the present invention needs to be kept at a high level to allow the liquid crystal composition to have a high temperature stability, it is preferred that the lower limit of the above-mentioned range be high and that the upper limit thereof be high. In order to increase dielectric anisotropy for keeping driving voltage at a low level, it is preferred that the lower limit of the above-mentioned range be low and that the upper limit thereof be low.

In the case where the ring structures bonded to $R^{L1}$ and $R^{L2}$ are phenyl groups (aromatics), $R^{L1}$ and $R^{L2}$ are each preferably a linear alkyl group having 1 to 5 carbon atoms, a linear alkoxy group having 1 to 4 (or more) carbon atoms, or an alkenyl group having 4 or 5 carbon atoms; in the case where the ring structures bonded to $R^{L1}$ and $R^{L2}$ are saturated rings such as cyclohexane, pyran, and dioxane, $R^{L1}$ and $R^{L2}$ are each preferably a linear alkyl group having 1 to 5 carbon atoms, a linear alkoxy group having 1 to 4 (or more) carbon atoms, or a linear alkenyl group having 2 to 5 carbon atoms.

In the case where the liquid crystal composition needs to be chemically stable, it is preferred that the molecules of the compound represented by General Formula (L) be free from a chlorine atom.

The compound represented by General Formula (L) is, for example, preferably a compound selected from the group consisting of compounds represented by General Formula (I).

[Chem. 74]

$$R^{11}\text{-}A^{11}\text{-}A^{12}\text{-}R^{12} \qquad \text{(I)}$$

In General Formula (I), $R^{11}$ and $R^{12}$ each independently represent an alkyl group having 1 to 5 carbon atoms, an alkoxy group having 1 to 4 carbon atoms, or an alkenyl group having 2 to 5 carbon atoms; $A^{11}$ and $A^{12}$ each independently represent a 1,4-cyclohexylene group, a 1,4-phenylene group, a 2-fluoro-1,4-phenylene group, or a 3-fluoro-1,4-phenylene group; and the compound represented by General Formula (I) excludes the compound represented by Formula (ii).

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

In the liquid crystal composition of the present invention, the amount of the compound represented by General Formula (I) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound represented by General Formula (I) is in the range of 3 to 75 mass % in an embodiment of the present invention; in another embodiment of the present invention, the amount is from 15 to 75 mass %; in another embodiment of the present invention, the amount is from 18 to 75 mass %; in another embodiment of the present invention, the amount is from 20 to 75 mass %; in another embodiment of the present invention, the amount is from 29 to 75 mass %; in another embodiment of the present invention, the amount is from 35 to 75 mass %; in another embodiment of the present invention, the amount is from 42 to 75 mass %; in another embodiment of the present invention, the amount is from 47 to 75 mass %; in another embodiment of the present invention, the amount is from 53 to 75 mass %; in another embodiment of the present invention, the amount is from 56 to 75 mass %; in another embodiment of the present invention, the amount is from 60 to 75 mass %; and in another embodiment of the present invention, the amount is from 65 to 75 mass %.

Furthermore, relative to the total mass of the liquid crystal composition of the present invention, for instance, the amount of the compound represented by General Formula (I) is in the range of 3 to 65 mass % in an embodiment of the present invention; in another embodiment of the present invention, the amount is from 3 to 55 mass %; in another embodiment of the present invention, the amount is from 3 to 50 mass %; in another embodiment of the present invention, the amount is from 3 to 45 mass %; in another embodiment of the present invention, the amount is from 3 to 40 mass %; in another embodiment of the present invention, the amount is from 3 to 35 mass %; and in another embodiment of the present invention, the amount is from 3 to 30 mass %.

In the case where the viscosity of the liquid crystal composition of the present invention needs to be kept at a low level for allowing the liquid crystal composition to contribute to a high response speed, it is preferred that the lower limit of the above-mentioned range be high and that the upper limit thereof be high. In the case where the Tni of the liquid crystal composition of the present invention needs to be kept at a high level to allow the liquid crystal composition to have a high temperature stability, it is preferred that the lower limit of the above-mentioned range be moderate and that the upper limit thereof be moderate. In order to increase dielectric anisotropy for keeping driving voltage at a low level, it is preferred that the lower limit of the above-mentioned range be low and that the upper limit thereof be low.

In the case where the ring structures bonded to $R^{11}$ and $R^{12}$ are phenyl groups (aromatics), $R^{11}$ and $R^{12}$ are each preferably a linear alkyl group having 1 to 5 carbon atoms, a linear alkoxy group having 1 to 4 carbon atoms, or an alkenyl group having 4 or 5 carbon atoms; in the case where the ring structures bonded to $R^{1}$ and $R^{12}$ are saturated rings such as cyclohexane, pyran, and dioxane, $R^{11}$ and $R^{12}$ are each preferably a linear alkyl group having 1 to 5 carbon atoms, a linear alkoxy group having 1 to 4 carbon atoms, or a linear alkenyl group having 2 to 5 carbon atoms.

The compound represented by General Formula (I) is preferably at least one compound selected from the group consisting of compounds represented by General Formula (I-1).

[Chem. 75]

(I-1)

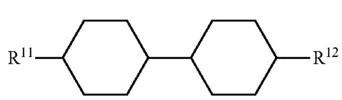

In General Formula (I-1), $R^{11}$ and $R^{12}$ each independently represent an alkyl group having 1 to 5 carbon atoms, an alkoxy group having 1 to 4 carbon atoms, or an alkenyl group having 2 to 5 carbon atoms; and the compound represented by General Formula (I-1) excludes the compound represented by Formula (ii).

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five or more of the compounds are used.

In the case where the liquid crystal composition of the present invention contains the compound represented by General Formula (I-1), the amount thereof needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound represented by General Formula (I-1) is in the range of 3 to 70 mass % in an embodiment of the present invention; in another embodiment of the present invention, the amount is from 15 to 70 mass %; in another embodiment of the present invention, the amount is from 18 to 70 mass %; in another embodiment of the present invention, the amount is from 25 to 70 mass %; in another embodiment of the present invention, the amount is from 29 to 70 mass %; in another embodiment of the present invention, the amount is from 31 to 70 mass %; in another embodiment of the present invention, the amount is from 35 to 70 mass %; in another embodiment of the present invention, the amount is from 43 to 70 mass %; in another embodiment of the present invention, the amount is from 47 to 70 mass %; in another embodiment of the present invention, the amount is from 50 to 70 mass %; in another embodiment of the present invention, the amount is from 53 to 70 mass %; and in another embodiment of the present invention, the amount is from 56 to 70 mass %.

Moreover, relative to the total mass of the liquid crystal composition of the present invention, for instance, the amount of the compound represented by General Formula (I-1) is in the range of 2 to 60 mass % in an embodiment of the present invention; in another embodiment of the present invention, the amount is from 2 to 50 mass %; in another embodiment of the present invention, the amount is from 2 to 45 mass %; in another embodiment of the present invention, the amount is from 2 to 40 mass %; in another embodiment of the present invention, the amount is from 2 to 35 mass %; in another embodiment of the present invention, the amount is from 2 to 30 mass %; and in another embodiment of the present invention, the amount is from 2 to 26 mass %.

In the case where the viscosity of the liquid crystal composition of the present invention needs to be kept at a low level for allowing the liquid crystal composition to contribute to a high response speed, it is preferred that the lower limit of the above-mentioned range be high and that the upper limit thereof be high. In the case where the Tni of the liquid crystal composition of the present invention needs to be kept at a high level to allow the liquid crystal composition to have a high temperature stability, it is preferred that the lower limit of the above-mentioned range be moderate and that the upper limit thereof be moderate. In order to increase dielectric anisotropy for keeping driving voltage at a low level, it is preferred that the lower limit of the above-mentioned range be low and that the upper limit thereof be low.

Alternatively or additionally, the compound represented by General Formula (I-1) is preferably at least one compound selected from the group consisting of compounds represented by General Formula (I-1-1).

[Chem. 76]

(I-1-1)

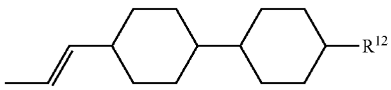

In General Formula (I-1-1), $R^{12}$ represents an alkyl group having 1 to 5 carbon atoms, an alkenyl group having 2 to 5 carbon atoms, or an alkoxy group having 1 to 4 carbon atoms.

In the liquid crystal composition of the present invention, the amount of the compound represented by General Formula (I-1-1) needs to be appropriately adjusted on the basis of desired properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (I-1-1) is in the range of 1 to 35 mass % in an embodiment of the present invention; in another embodiment of the present invention, the amount is from 2 to 30 mass %; in another embodiment of the present invention, the amount is from 4 to 30 mass %; in another embodiment of the present invention, the amount is from 6 to 30 mass %; in another embodiment of the present invention, the amount is from 8 to 30 mass %; in another embodiment of the present invention, the amount is from 9 to 30 mass %; and in another embodiment of the present invention, the amount is from 10 to 30 mass %.

Furthermore, relative to the total mass of the liquid crystal composition of the present invention, for example, the amount of the compound represented by General Formula (I-1-1) is in the range of 2 to 26 mass % in an embodiment of the present invention; in another embodiment of the present invention, the amount is from 2 to 22 mass %; in another embodiment of the present invention, the amount is from 2 to 17 mass %; in another embodiment of the present invention, the amount is from 2 to 16 mass %; in another embodiment of the present invention, the amount is from 2 to 14 mass %; in another embodiment of the present invention, the amount is from 2 to 13 mass %; in another embodiment of the present invention, the amount is from 2 to 12 mass %; and in another embodiment of the present invention, the amount is from 2 to 5 mass %.

The compound represented by General Formula (I-1-1) is preferably a compound selected from the group consisting of compounds represented by Formulae (1.1) to (1.3), more preferably the compound represented by Formula (1.2) or (1.3), and especially preferably the compound represented by Formula (1.3). In the case where the liquid crystal composition contains one compound represented by Formula (i), the amount of the compound represented by Formula (1.3) is preferably not less than 14 mass % relative to 100 mass % of the liquid crystal composition of the present invention. In the case where the liquid crystal composition contains two or three compounds represented by Formula (i), the amount of the compound represented by Formula (1.3) is preferably not less than 11 mass % relative to 100 mass % of the liquid crystal composition of the present invention.

[Chem. 77]

(1.1)

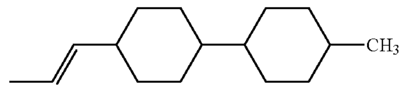

(1.2)

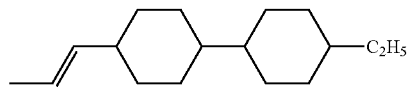

(1.3)

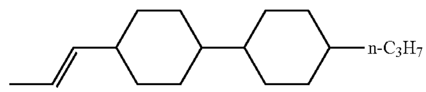

In the case where the compound represented by Formula (1.2) or (1.3) is used alone, the amount of the compound represented by Formula (1.2) is preferably large to improve a response speed, and the amount of the compound represented by Formula (1.3) is preferably within the following ranges to produce a liquid crystal composition which enables a quick response and which has high electric and optical reliabilities.

Relative to the total mass of the liquid crystal composition of the present invention, for example, the amount of the compound represented by Formula (1.3) is in the range of 1 to 25 mass % in an embodiment of the present invention; in another embodiment of the present invention, the amount is from 2 to 25 mass %; in another embodiment of the present invention, the amount is from 4 to 25 mass %; in another embodiment of the present invention, the amount is from 6 to 25 mass %; in another embodiment of the present invention, the amount is from 7 to 25 mass %; in another embodiment of the present invention, the amount is from 8 to 25 mass %; in another embodiment of the present invention, the amount is from 9 to 25 mass %; and in another embodiment of the present invention, the amount is from 10 to 25 mass %.

Moreover, relative to the total mass of the liquid crystal composition of the present invention, for example, the amount of the compound represented by Formula (1.3) is in the range of 2 to 22 mass % in an embodiment of the present invention; in another embodiment of the present invention, the amount is from 2 to 18 mass %; in another embodiment of the present invention, the amount is from 2 to 17 mass %; in another embodiment of the present invention, the amount is from 2 to 16 mass %; in another embodiment of the present invention, the amount is from 2 to 14 mass %; in another embodiment of the present invention, the amount is from 2 to 13 mass %; and in another embodiment of the present invention, the amount is from 2 to 5 mass %.

Alternatively or additionally, the compound represented by General Formula (I-1) is preferably at least one compound selected from the group consisting of compounds represented by General Formula (I-1-2) (the compound represented by Formula (ii) is excluded).

[Chem. 78]

(I-1-2)

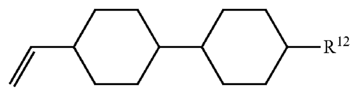

In General Formula (I-1-2), $R^{12}$ represents an alkyl group having 1 to 5 carbon atoms, an alkoxy group having 1 to 4 carbon atoms, or an alkenyl group having 2 to 5 carbon atoms.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-1-2) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (I-1-2) is in the range of 1 to 25 mass % in an embodiment of the present invention; in another embodiment of the present invention, the amount is from 2 to 25 mass %; in another embodiment of the present invention, the amount is from 4 to 25 mass %; in another embodiment of the present invention, the amount is from 6 to 25 mass %; in another embodiment of the present invention, the amount is from 7 to 25 mass %; in another embodiment of the present invention, the amount is from 8 to 25 mass %; in another embodiment of the present invention, the amount is from 9 to 25 mass %; and in another embodiment of the present invention, the amount is from 10 to 25 mass %.

Furthermore, relative to the total mass of the liquid crystal composition of the present invention, for example, the amount of the compound represented by General Formula (I-1-2) is in the range of 2 to 22 mass % in an embodiment of the present invention; in another embodiment of the present invention, the amount is from 2 to 18 mass %; in another embodiment of the present invention, the amount is from 2 to 17 mass %; in another embodiment of the present invention, the amount is from 2 to 16 mass %; in another embodiment of the present invention, the amount is from 2 to 14 mass %; and in another embodiment of the present invention, the amount is from 2 to 13 mass %.

The compound represented by General Formula (I-1-2) is preferably at least one compound selected from the group consisting of compounds represented by Formulae (2.1), (2.3), and (2.4); and more preferably the compound represented by Formula (2.3) and/or the compound represented by Formula (2.4). In order to improve resistance to resolution at low temperature, it is preferred that the amount of each of the compounds represented by Formulae (2.3) and (2.4) be less than 30 mass %.

[Chem. 79]

(2.1)

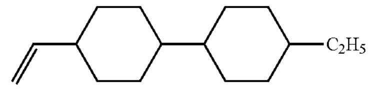

(2.3)

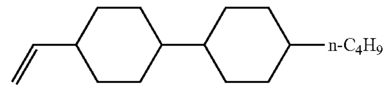

(2.4)

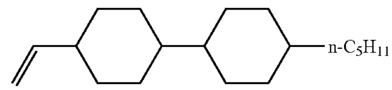

In the liquid crystal composition of the present invention, the amount of the compound represented by Formula (2.3) is preferably in the range of 1 mass % to 25 mass %, also preferably 5 mass % to 20 mass, also preferably 10 mass % to 15 mass %, and also preferably 6 mass % to 15 mass % relative to the total mass of the liquid crystal composition of the present invention.

In the liquid crystal composition of the present invention, the amount of the compound represented by Formula (2.4) is preferably in the range of 1 mass % to 25 mass %, more preferably 5 mass % to 20 mass, further preferably 10 mass % to 15 mass %, and further preferably 6 mass % to 15 mass % relative to the total mass of the liquid crystal composition of the present invention.

The liquid crystal composition of the present invention can further contain a compound represented by Formula (2.5), the compound having a structure similar to that of the compound represented by General Formula (I-1-2).

[Chem. 80]

(2.5)

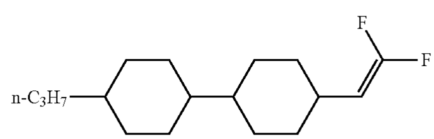

The amount of the compound represented by Formula (2.5) is preferably adjusted on the basis of desired properties such as resistance to resolution at low temperature, transition temperature, electric reliability, and birefringence; the amount is preferably in the range of 0 to 40 mass %, also preferably 10 to 40 mass %, and also preferably 15 to 35 mass % relative to the total mass of the liquid crystal composition of the present invention.

Alternatively or additionally, the compound represented by General Formula (I) is preferably at least one compound selected from the group consisting of compounds represented by General Formula (I-2).

[Chem. 81]

(I-2)

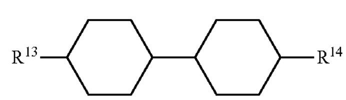

In General Formula (I-2), $R^{13}$ and $R^{14}$ each independently represent an alkyl group having 1 to 5 carbon atoms.

Such compounds can be used in any combination; a combination of the compounds is determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-2) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (I-2) is in the range of 1 to 30 mass % in an embodiment of the present invention; in another embodiment of the present invention, the amount is from 2 to 30 mass %; in another embodiment of the present invention, the amount is from 4 to 30 mass %; in another embodiment of the present invention, the amount is from 6 to 30 mass %; in another embodiment of the present invention, the amount is from 10 to 30 mass %; in another embodiment of the present invention, the amount is from 15 to 30 mass %; and in another embodiment of the present invention, the amount is from 20 to 30 mass %.

Furthermore, relative to the total mass of the liquid crystal composition of the present invention, for example, the amount of the compound represented by General Formula (I-2) is in the range of 1 to 25 mass % in an embodiment of the present invention; in another embodiment of the present invention, the amount is from 1 to 23 mass %; in another embodiment of the present invention, the amount is from 1 to 18 mass %; in another embodiment of the present invention, the amount is from 1 to 15 mass %; in another embodiment of the present invention, the amount is from 1 to 12 mass %; in another embodiment of the present invention, the amount is from 1 to 10 mass %; and in another embodiment of the present invention, the amount is from 1 to 5 mass %.

The compound represented by General Formula (I-2) is preferably at least one compound selected from the group consisting of compounds represented by Formulae (3.1) to (3.4), and more preferably the compound represented by Formula (3.1), the compound represented by Formula (3.3), and/or the compound represented by Formula (3.4). In particular, the compound represented by Formula (3.1) is especially preferably employed because it enhances the response speed of the liquid crystal composition of the present invention. If high Tni is valued rather than the response speed, it is preferred that the compound represented by Formula (3.3) and/or the compound represented by Formula (3.4) be employed. In order to improve resistance to resolution at low temperature, it is preferred that the amount of each of the compounds represented by Formulae (3.3) and (3.4) be less than 20 mass %.

[Chem. 82]

(3.1)

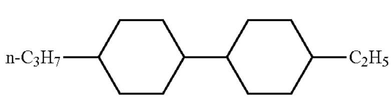

(3.2)

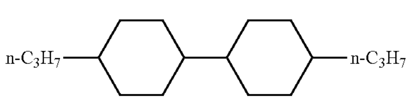

-continued (3.3)

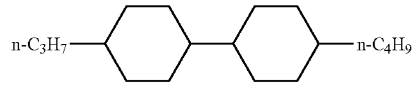

(3.4)

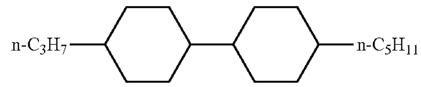

In the liquid crystal composition of the present invention, the amount of the compound represented by Formula (3.3) is preferably in the range of 2 mass % to 40 mass % relative to the total mass of the liquid crystal composition of the present invention. Examples of the more preferred amount thereof are as follows: from 3 mass % to 40 mass %, from 4 mass % to 40 mass %, from 10 mass % to 40 mass %, from 12 mass % to 40 mass %, from 14 mass % to 40 mass %, from 16 mass % to 40 mass %, from 20 mass % to 40 mass %, from 23 mass % to 40 mass %, from 26 mass % to 40 mass %, from 30 mass % to 40 mass %, from 34 mass % to 40 mass %, from 37 mass % to 40 mass %, from 3 mass % to 4 mass %, from 3 mass % to 10 mass %, from 3 mass % to 12 mass %, from 3 mass % to 14 mass %, from 3 mass % to 16 mass %, from 3 mass % to 20 mass %, from 3 mass % to 23 mass %, from 3 mass % to 26 mass %, from 3 mass % to 30 mass %, from 3 mass % to 34 mass %, and from 3 mass % to 37 mass %.

Alternatively or additionally, the compound represented by General Formula (I) is preferably at least one compound selected from the group consisting of compounds represented by General Formula (I-3).

[Chem. 83]

(I-3)

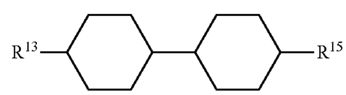

In General Formula (I-3), $R^{13}$ represents an alkyl group having 1 to 5 carbon atoms, and $R^{15}$ represents an alkoxy group having 1 to 4 carbon atoms.

Such compounds can be used in any combination; a combination of the compounds is determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-3) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (I-3) is in the range of 3 to 60 mass % in an embodiment of the present invention; in another embodiment of the present invention, the amount is from 4 to 60 mass %; in another embodiment of the present invention, the amount is from 15 to 60 mass %; in another embodiment of the present invention, the amount is from 25 to 60 mass %; in another embodiment of the present invention, the amount is from 30 to 60 mass %; in another embodiment of the present invention, the amount is from 35 to 60 mass %; in another embodiment of the present invention, the amount is from 38 to 60 mass %; in another embodiment of the present invention, the amount is from 40 to 60 mass %; in another embodiment of the present invention, the amount is from 42 to 60 mass %; in another embodiment of the present invention, the amount is from 45 to 60 mass %; in another embodiment of the present invention, the amount is from 47 to 60 mass %; and in another embodiment of the present invention, the amount is from 50 to 60 mass %.

Moreover, relative to the total mass of the liquid crystal composition of the present invention, for example, the amount of such a compound is in the range of 3 to 55 mass % in an embodiment of the present invention; in another embodiment of the present invention, the amount is from 3 to 45 mass %; in another embodiment of the present invention, the amount is from 3 to 40 mass %; in another embodiment of the present invention, the amount is from 3 to 30 mass %; in another embodiment of the present invention, the amount is from 3 to 20 mass %; in another embodiment of the present invention, the amount is from 3 to 15 mass %; and in another embodiment of the present invention, the amount is from 3 to 5 mass %.

In terms of resistance to resolution at low temperature, the amount is adjusted to be larger to produce a greater effect; in terms of response speed, the amount is adjusted to be smaller to produce a greater effect. In order to enhance resistance to droplet stains and screen burn-in, the range of the amount is preferably adjusted to be intermediate.

The compound represented by General Formula (I-3) is preferably at least one compound selected from the group consisting of compounds represented by Formulae (4.1) to (4.3), and more preferably the compound represented by Formula (4.3).

[Chem. 84]

(4.1)

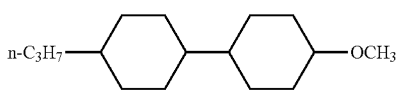

(4.2)

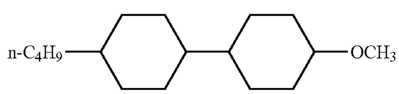

(4.3)

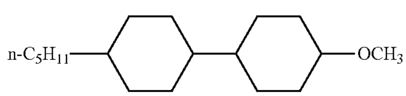

The amount of the compound represented by Formula (4.3) is preferably in the range of 2 mass % to 30 mass %, also preferably 4 mass % to 30 mass %, also preferably 6 mass % to 30 mass %, also preferably 8 mass % to 30 mass %, also preferably 10 mass % to 30 mass %, also preferably 12 mass % to 30 mass %, also preferably 14 mass % to 30 mass %, also preferably 16 mass % to 30 mass %, also preferably 18 mass % to 25 mass %, also preferably 20 mass % to 24 mass %, and especially preferably 22 mass % to 23 mass % relative to the total mass of the liquid crystal composition of the present invention.

Alternatively or additionally, the compound represented by General Formula (I) is preferably at least one compound selected from the group consisting of compounds represented by General Formula (I-4).

[Chem. 85]

(I-4)

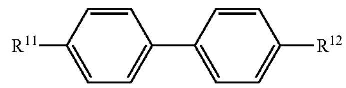

In General Formula (I-4), $R^{11}$ and $R^{12}$ each independently represent an alkyl group having 1 to 5 carbon atoms, an alkenyl group having 2 to 5 carbon atoms, or an alkoxy group having 1 to 4 carbon atoms.

Such compounds can be used in any combination; a combination of the compounds is determined on the basis of desired properties such as resistance to resolution at low temperature, transition temperature, electric reliability, and birefringence. In an embodiment of the present invention, for example, one of such compounds is used. In another embodiment of the present invention, two of the compounds are used.

In the liquid crystal composition of the present invention, the amount of the compound represented by General Formula (I-4) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (I-4) is in the range of 2 to 50 mass % in an embodiment of the present invention; in another embodiment of the present invention, the amount is from 5 to 50 mass %; in another embodiment of the present invention, the amount is from 6 to 50 mass %; in another embodiment of the present invention, the amount is from 8 to 50 mass %; in another embodiment of the present invention, the amount is from 10 to 50 mass %; in another embodiment of the present invention, the amount is from 12 to 50 mass %; in another embodiment of the present invention, the amount is from 15 to 50 mass %; in another embodiment of the present invention, the amount is from 20 to 50 mass %; in another embodiment of the present invention, the amount is from 25 to 50 mass %; in another embodiment of the present invention, the amount is from 30 to 50 mass %; in another embodiment of the present invention, the amount is from 35 to 50 mass %; and in another embodiment of the present invention, the amount is from 40 to 50 mass %.

Moreover, relative to the total mass of the liquid crystal composition of the present invention, for example, the amount of such a compound is in the range of 2 to 40 mass % in an embodiment of the present invention; in another embodiment of the present invention, the amount is from 2 to 35 mass %; in another embodiment of the present invention, the amount is from 2 to 30 mass %; in another embodiment of the present invention, the amount is from 2 to 20 mass %; in another embodiment of the present invention, the amount is from 2 to 15 mass %; and in another embodiment of the present invention, the amount is from 2 to 10 mass %.

In terms of an enhancement in birefringence, the amount is adjusted to be larger to produce a greater effect; in terms of high Tni, the amount is adjusted to be smaller to produce a greater effect. In order to enhance resistance to droplet stains and screen burn-in, the range of the amount is preferably adjusted to be intermediate.

The compound represented by General Formula (I-4) is preferably at least one compound selected from the group consisting of compounds represented by Formulae (5.1) to (5.4), and more preferably at least one compound selected from the group consisting of the compounds represented by Formulae (5.2) to (5.4).

[Chem. 86]

(5.1)

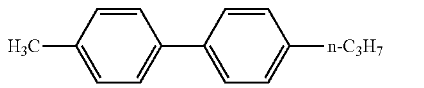

(5.2)

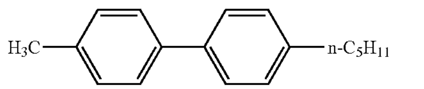

(5.3)

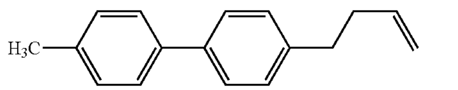

(5.4)

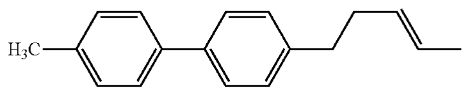

The amount of the compound represented by Formula (5.4) is preferably in the range of 2 mass % to 30 mass % relative to the total mass of the liquid crystal composition of the present invention. In particular, examples of the preferred amount are as follows: from 4 mass % to 30 mass %, from 6 mass % to 30 mass %, from 8 mass % to 30 mass %, from 10 mass % to 30 mass %, from 12 mass % to 30 mass %, from 14 mass % to 30 mass %, from 16 mass % to 30 mass %, from 18 mass % to 30 mass %, from 20 mass % to 30 mass %, from 22 mass % to 30 mass %, from 23 mass % to 30 mass %, from 24 mass % to 30 mass %, from 25 mass % to 30 mass %, from 4 mass % to 6 mass %, from 4 mass % to 8 mass %, from 4 mass % to 10 mass %, from 4 mass % to 12 mass %, from 4 mass % to 14 mass %, from 4 mass % to 16 mass %, from 4 mass % to 18 mass %, from 4 mass % to 20 mass %, from 4 mass % to 22 mass %, from 4 mass % to 23 mass %, from 4 mass % to 24 mass %, and from 4 mass % to 25 mass %.

The amount of the compound represented by Formula (5.2) is preferably in the range of 2 to 20%, more preferably 5 to 15%, and further preferably 10 to 15% relative to the total mass of the liquid crystal composition of the present invention. It is preferred that the compound represented by Formula (5.2) be used in combination with the compound represented by Formula (45.2).

Alternatively or additionally, the compound represented by General Formula (I) is preferably at least one compound selected from the group consisting of compounds represented by General Formula (I-5).

[Chem. 87]

(I-5)

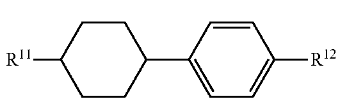

In General Formula (I-5), $R^{11}$ and $R^{12}$ each independently represent an alkyl group having 1 to 5 carbon atoms, an alkenyl group having 2 to 5 carbon atoms, or an alkoxy group having 1 to 4 carbon atoms.

Such compounds can be used in any combination; a combination of the compounds is determined on the basis of desired properties such as resistance to resolution at low temperature, transition temperature, electric reliability, and birefringence. In an embodiment of the present invention, for example, one of such compounds is used. In another embodiment of the present invention, two of the compounds are used.

In the liquid crystal composition of the present invention, the amount of the compound represented by General Formula (I-5) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of such a compound is in the range of 1 to 50 mass % in an embodiment of the present invention; in another embodiment of the present invention, the amount is from 5 to 50 mass %; in another embodiment of the present invention, the amount is from 8 to 50 mass %; in another embodiment of the present invention, the amount is from 11 to 50 mass %; in another embodiment of the present invention, the amount is from 13 to 50 mass %; in another embodiment of the present invention, the amount is from 15 to 50 mass %; in another embodiment of the present invention, the amount is from 17 to 50 mass %; in another embodiment of the present invention, the amount is from 20 to 50 mass %; in another embodiment of the present invention, the amount is from 25 to 50 mass %; in another embodiment of the present invention, the amount is from 30 to 50 mass %; in another embodiment of the present invention, the amount is from 35 to 50 mass %; and in another embodiment of the present invention, the amount is from 40 to 50 mass %.

Furthermore, relative to the total mass of the liquid crystal composition of the present invention, for example, the amount of the compound is in the range of 1 to 40 mass % in an embodiment of the present invention; in another embodiment of the present invention, the amount is from 1 to 35 mass %; in another embodiment of the present invention, the amount is from 1 to 30 mass %; in another embodiment of the present invention, the amount is from 1 to 20 mass %; in another embodiment of the present invention, the amount is from 1 to 15 mass %; in another embodiment of the present invention, the amount is from 1 to 10 mass %; and in another embodiment of the present invention, the amount is from 1 to 5 mass %.

In terms of resistance to resolution at low temperature, the amount is adjusted to be larger to produce a greater effect; in terms of response speed, the amount is adjusted to be smaller to produce a greater effect. In order to enhance resistance to droplet stains and screen burn-in, the range of the amount is preferably adjusted to be intermediate.

The compound represented by General Formula (I-5) is preferably at least one compound selected from the group consisting of compounds represented by Formulae (6.1) to (6.6); and more preferably the compound represented by Formula (6.3), the compound represented by Formula (6.4), and/or the compound represented by Formula (6.6).

[Chem. 88]

(6.1)

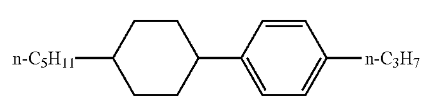

-continued (6.2)

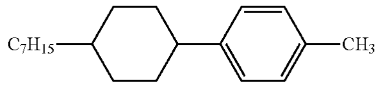

(6.3)

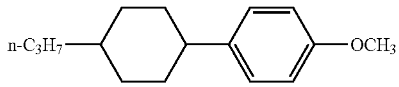

(6.4)

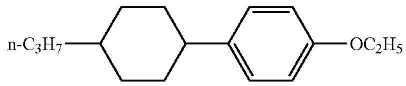

(6.5)

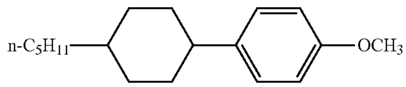

(6.6)

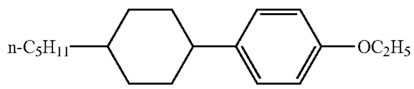

The amount of the compound represented by Formula (6.6) is, for instance, preferably in the range of 2 mass % to 30 mass %, also preferably 4 mass % to 30 mass %, also preferably 5 mass % to 30 mass %, also preferably 6 mass % to 30 mass %, also preferably 9 mass % to 30 mass %, also preferably 12 mass % to 30 mass %, also preferably 14 mass % to 30 mass %, also preferably 16 mass % to 30 mass %, also preferably 18 mass % to 25 mass %, also preferably 20 mass % to 24 mass %, and also preferably 22 mass % to 23 mass % relative to the total mass of the liquid crystal composition of the present invention.

The compound represented by General Formula (1-5), which can be further contained in the liquid crystal composition of the present invention, can be a compound represented by Formula (6.7) and/or a compound represented by Formula (6.8).

[Chem. 89]

(6.7)

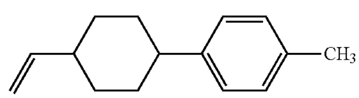

(6.8)

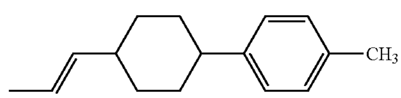

The amount of the compound represented by Formula (6.7) is preferably adjusted on the basis of desired properties such as resistance to resolution at low temperature, transition temperature, electric reliability, and birefringence; the amount of this compound is preferably not less than 2 mass %, also preferably not less than 3 mass %, also preferably not less than 5 mass %, also preferably not less than 7 mass %, and also preferably in the range of 4 mass % to 16 mass % relative to the total mass of the liquid crystal composition of the present invention.

Alternatively or additionally, the compound represented by General Formula (I) is preferably at least one compound selected from the group consisting of compounds represented by General Formula (I-6).

[Chem. 90]

(I-6)

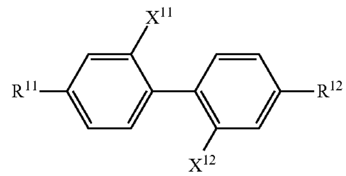

In Formula (I-6), $R^{11}$ and $R^{12}$ each independently represent an alkyl group having 1 to 5 carbon atoms, an alkenyl group having 2 to 5 carbon atoms, or an alkoxy group having 1 to 4 carbon atoms; $X^{11}$ and $X^{12}$ each independently represent a fluorine atom or a hydrogen atom; and any one of $X^{11}$ and $X^{12}$ is a fluorine atom.

The amount of the compound represented by General Formula (I-6) is preferably in the range of 2 mass % to 30 mass %, also preferably 4 mass % to 30 mass %, also preferably 5 mass % to 30 mass %, also preferably 6 mass % to 30 mass %, also preferably 9 mass % to 30 mass %, also preferably 12 mass % to 30 mass %, also preferably 14 mass % to 30 mass %, also preferably 16 mass % to 30 mass %, also preferably 18 mass % to 25 mass %, also preferably 20 mass % to 24 mass %, and also preferably 22 mass % to 23 mass % relative to the total mass of the liquid crystal composition of the present invention.

The compound represented by General Formula (I-6) is preferably a compound represented by Formula (7.1).

[Chem. 91]

(7.1)

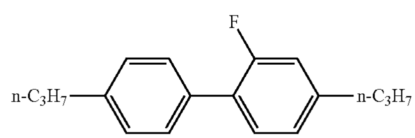

Alternatively or additionally, the compound represented by General Formula (I) is preferably a compound selected from the group consisting of compounds represented by General Formula (I-7).

[Chem. 92]

(I-7)

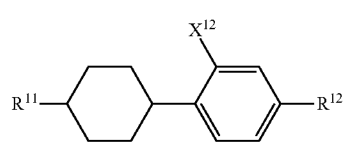

In General Formula (I-7), $R^{11}$ and $R^{12}$ each independently represent an alkyl group having 1 to 5 carbon atoms, an alkenyl group having 2 to 5 carbon atoms, or an alkoxy group having 1 to 4 carbon atoms; and $X^{12}$ represents a fluorine atom or a chlorine atom.

The amount of the compound represented by General Formula (I-7) is preferably in the range of 1 mass % to 20 mass %, also preferably 1 mass % to 15 mass %, also preferably 1 mass % to 10 mass %, and also preferably 1 mass % to 5 mass % relative to the total mass of the liquid crystal composition of the present invention.

The compound represented by General Formula (I-7) is preferably a compound represented by Formula (8.1).

The compound represented by Formula (8.1) is preferably used as the compound represented by General Formula (I-7).

[Chem. 93]

(8.1)

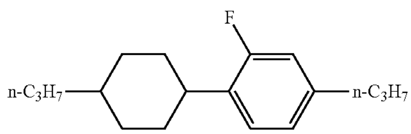

It is preferred that the compound represented by Formula (8.1) be used in combination with three compounds represented by General Formula (i).

Alternatively or additionally, the compound represented by General Formula (I) is preferably at least one compound selected from the group consisting of compounds represented by General Formula (I-8).

[Chem. 94]

(I-8)

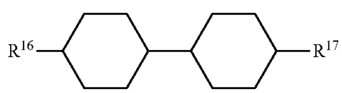

In General Formula (I-8), $R^{16}$ and $R^{17}$ each independently represent an alkenyl group having 2 to 5 carbon atoms.

Such compounds can be used in any combination; in view of desired properties such as resistance to resolution at low temperature, transition temperature, electric reliability, and birefringence, it is preferred that one to three of the compounds be used.

The amount of the compound represented by General Formula (I-8) is preferably from 1 to 30 mass %, also preferably 1 to 25 mass %, also preferably 1 to 20 mass %, also preferably 1 to 18 mass %, and also preferably 3 to 18 mass % relative to the total mass of the liquid crystal composition of the present invention in view of desired properties such as resistance to resolution at low temperature, transition temperature, electric reliability, birefringence, process adaptability, resistance to droplet stains and screen burn-in, and dielectric anisotropy.

The compound represented by General Formula (I-8) is preferably at least one compound selected from the group consisting of compounds represented by Formulae (9.1) to (9.10); and more preferably the compound represented by Formula (9.2), the compound represented by Formula (9.4), and/or the compound represented by Formula (9.7).

[Chem. 95]

(9.1)

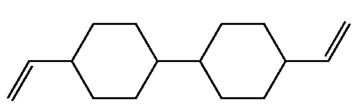

(9.2)

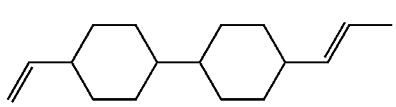

-continued (9.3)

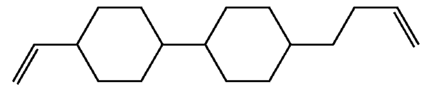

(9.4)

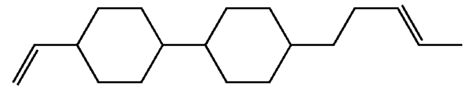

(9.5)

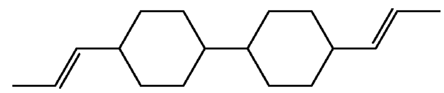

(9.6)

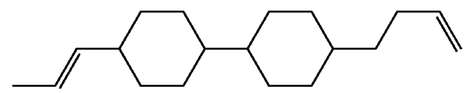

(9.7)

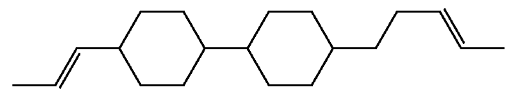

(9.8)

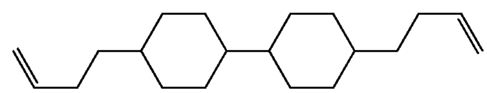

(9.9)

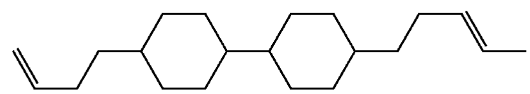

(9.10)

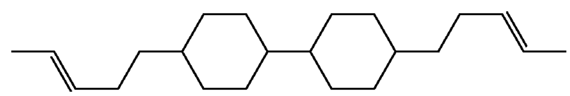

Alternatively or additionally, the compound represented by General Formula (L) is, for example, preferably at least one compound selected from compounds represented by General Formula (II).

[Chem. 96]

(II)

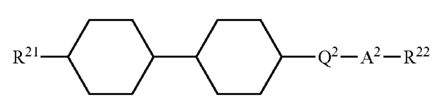

In General Formula (II), $R^{21}$ and $R^{22}$ each independently represent an alkenyl group having 2 to 5 carbon atoms, an alkyl group having 1 to 5 carbon atoms, or an alkoxy group having 1 to 4 carbon atoms; $A^2$ represents a 1,4-cyclohexylene group or a 1,4-phenylene group; and $Q^2$ represents a single bond, —COO—, —$CH_2$—$CH_2$—, or $CF_2O$—.

Such compounds can be used in any combination; a combination of the compounds is determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four or more of the compounds are used.

In the liquid crystal composition of the present invention, the amount of the compound represented by General Formula (II) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (II) is in the range of 3 to 50 mass % in an embodiment of the present invention; in another embodiment of the present invention, the amount is from 5 to 50 mass %; in another embodiment of the present invention, the amount is from 7 to 50 mass %; in another embodiment of the present invention, the amount is from 10 to 50 mass %; in another embodiment of the present invention, the amount is from 14 to 50 mass %; in another embodiment of the present invention, the amount is from 16 to 50 mass %; in another embodiment of the present invention, the amount is from 20 to 50 mass %; in another embodiment of the present invention, the amount is from 23 to 50 mass %; in another embodiment of the present invention, the amount is from 26 to 50 mass %; in another embodiment of the present invention, the amount is from 30 to 50 mass %; in another embodiment of the present invention, the amount is from 35 to 50 mass %; and in another embodiment of the present invention, the amount is from 40 to 50 mass %.

Furthermore, relative to the total mass of the liquid crystal composition of the present invention, for example, the amount of the compound represented by General Formula (II) is in the range of 3 to 40 mass % in an embodiment of the present invention; in another embodiment of the present invention, the amount is from 3 to 35 mass %; in another embodiment of the present invention, the amount is from 3 to 30 mass %; in another embodiment of the present invention, the amount is from 3 to 20 mass %; in another embodiment of the present invention, the amount is from 3 to 15 mass %; in another embodiment of the present invention, the amount is from 3 to 10 mass %; and in another embodiment of the present invention, the amount is from 3 to 5 mass %.

The compound represented by General Formula (II) is, for instance, preferably at least one compound selected from the group consisting of compounds represented by General Formula (II-1).

[Chem. 97]

(II-1)

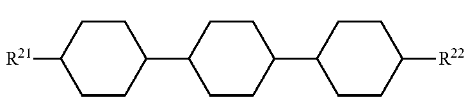

In General Formula (II-1), $R^{21}$ and $R^{22}$ each independently represent an alkenyl group having 2 to 5 carbon atoms, an alkyl group having 1 to 5 carbon atoms, or an alkoxy group having 1 to 4 carbon atoms.

The amount of the compound represented by General Formula (II-1) is preferably adjusted on the basis of desired properties such as resistance to resolution at low temperature, transition temperature, electric reliability, and birefringence; the amount is preferably in the range of 4 mass % to 24 mass %, more preferably 8 mass % to 18 mass %, and further preferably 12 mass % to 14 mass %.

The compound represented by General Formula (II-1) is, for example, preferably a compound represented by Formula (10.1) and/or a compound represented by Formula (10.2). It is preferred that the compound represented by Formula (10.1) be used in combination with the compound represented by Formula (45.2), and the amount thereof is preferably in the range of 1 to 10%, more preferably 5 to 10%, and further preferably 6 to 9%.

[Chem. 98]

(10.1)

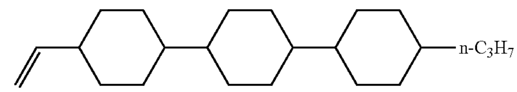

(10.2)

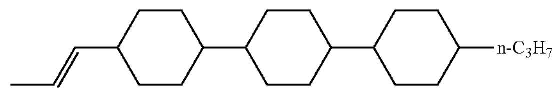

Alternatively or additionally, the compound represented by General Formula (II) is, for instance, preferably at least one compound selected from the group consisting of compounds represented by General Formula (II-2).

[Chem. 99]

(II-2)

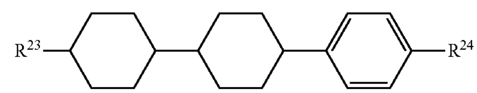

In General Formula (II-2), $R^{23}$ represents an alkenyl group having 2 to 5 carbon atoms, and $R^{24}$ represents an alkyl group having 1 to 5 carbon atoms or an alkoxy group having 1 to 4 carbon atoms.

Such compounds can be used in any combination; a combination of the compounds is determined on the basis of desired properties such as resistance to resolution at low temperature, transition temperature, electric reliability, and birefringence. In an embodiment of the present invention, for example, one of such compounds is used. In another embodiment of the present invention, two or more of the compounds are used.

In the liquid crystal composition of the present invention, the amount of the compound represented by General Formula (II-2) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for instance, the amount of the compound represented by General Formula (II-2) is in the range of 3 to 35 mass % in an embodiment of the present invention; in another embodiment of the present invention, the amount is from 4 to 35 mass %; in another embodiment of the present invention, the amount is from 5 to 35 mass; in another embodiment of the present invention, the amount is from 8 to 35 mass %; in another embodiment of the present invention, the amount is from 9 to 35 mass %; in another embodiment of the present invention, the amount is from 10 to 35 mass %; in another embodiment of the present invention, the amount is from 11 to 35 mass %; in another embodiment of the present invention, the amount is from 12 to 35 mass %; in another embodiment of the present invention, the amount is from 13 to 35 mass %; in another embodiment of the present invention, the amount is from 15 to 35 mass %; and in another embodiment of the present invention, the amount is from 20 to 35 mass %.

Furthermore, relative to the total mass of the liquid crystal composition of the present invention, for instance, the amount of the compound represented by General Formula (II-2) is in the range of 3 to 30 mass % in an embodiment of the present invention; in another embodiment of the present invention, the amount is from 3 to 26 mass %; in another embodiment of the present invention, the amount is from 3 to 20 mass %; in another embodiment of the present invention, the amount is from 3 to 16 mass %; in another embodiment of the present invention, the amount is from 3 to 15 mass %; in another embodiment of the present invention, the amount is from 3 to 14 mass %; in another embodiment of the present invention, the amount is from 3 to 13 mass %; in another embodiment of the present invention, the amount is from 3 to 12 mass %; in another embodiment of the present invention, the amount is from 3 to 10 mass %; in another embodiment of the present invention, the amount is from 3 to 9 mass %; and in another embodiment of the present invention, the amount is from 3 to 7 mass %.

The compound represented by General Formula (II-2) is, for example, preferably at least one compound selected from the group consisting of compounds represented by Formulae (11.1) to (11.3).

[Chem. 100]

(11.1)

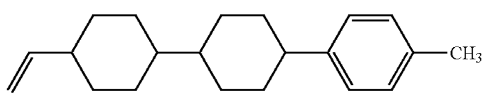

(11.2)

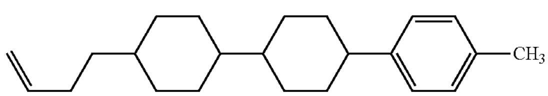

(11.3)

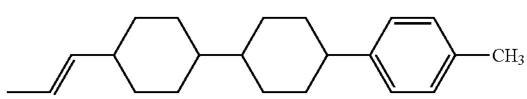

On the basis of desired properties such as resistance to resolution at low temperature, transition temperature, electric reliability, and birefringence, the compound represented by Formula (11.1) may be used, the compound represented by Formula (11.2) may be used, the compounds represented by Formulae (11.1) and (11.2) may be used in combination, and all of the compounds represented by Formulae (11.1) to (11.3) may be used in combination.

The amount of the compound represented by Formula (11.1) is preferably in the range of 1 to 30 mass %, also preferably 2 to 25 mass %, and also preferably 2 to 20 mass % relative to the total mass of the liquid crystal composition of the present invention. In particular, examples of the preferred amount are as follows: from 2 to 10 mass %, from 3 to 7 mass %, from 3 to 5 mass %, from 4 to 12 mass %, from 5 to 15 mass %, from 6 to 14 mass %, from 6 to 13 mass %, from 8 to 15 mass %, from 12 to 20 mass %, and from 13 to 16 mass %.

In the case where the liquid crystal composition contains three compounds represented by General Formula (i), the amount of the compound represented by Formula (11.1) is preferably in the range of 1 to 15%, more preferably 3 to 12%, and further preferably 5 to 10% relative to the total mass of the liquid crystal composition of the present invention.

The amount of the compound represented by Formula (11.2) is preferably in the range of 1 to 30 mass %, also preferably 1 to 25 mass %, also preferably 1 to 20 mass %, and also preferably 1 to 17 mass % relative to the total mass of the liquid crystal composition of the present invention. In particular, for example, the amount is preferably in the range of 1 to 11 mass %, more preferably 3 to 11 mass %, further preferably 5 to 11 mass %, further preferably 6 to 11 mass %, and further preferably 9 to 11 mass % in an embodiment; the amount is preferably in the range of 2 to 15 mass %, more preferably 2 to 9 mass %, and further preferably 4 to 5 mass % in another embodiment; and the amount is from 5 to 17 mass % in another embodiment.

In the case where the liquid crystal composition contains three compounds represented by General Formula (i), the amount of the compound represented by Formula (11.2) is preferably in the range of 1 to 20%, more preferably 5 to 20%, further preferably 9 to 20%, and especially preferably 9 to 15% relative to the total mass of the liquid crystal composition of the present invention.

In the case where the liquid crystal composition contains two compounds represented by General Formula (i), the amount of the compound represented by Formula (11.2) is preferably in the range of 6 to 20%, more preferably 10 to 20%, and further preferably 12 to 17% relative to the total mass of the liquid crystal composition of the present invention.

In the case where the liquid crystal composition contains one compound represented by General Formula (i), the amount of the compound represented by Formula (11.2) is preferably in the range of 9 to 20%, and more preferably 12 to 17% relative to the total mass of the liquid crystal composition of the present invention.

In the case where the compounds represented by Formulae (11.1) and (11.2) are used in combination, the total mass of these compounds is preferably in the range of 1 mass % to 45 mass %, also preferably 1 mass % to 40 mass %, also preferably 1 mass % to 35 mass %, also preferably 1 mass % to 30 mass %, also preferably 3 mass % to 30 mass %, also preferably 3 mass % to 26 mass %, also preferably 3 mass % to 20 mass %, also preferably 3 mass % to 16 mass %, also preferably 3 mass % to 15 mass %, also preferably 3 mass % to 14 mass %, also preferably 3 mass % to 13 mass %, also preferably 3 mass % to 12 mass %, also preferably 3 mass % to 10 mass %, also preferably 3 mass % to 9 mass %, also preferably 3 mass % to 7 mass %, also preferably 4 mass % to 30 mass %, also preferably 5 mass % to 30 mass %, also preferably 8 mass % to 30 mass %, also preferably 9 mass % to 30 mass %, also preferably 10 mass % to 30 mass %, also preferably 11 mass % to 30 mass %, also preferably 12 mass % to 30 mass %, also preferably 13 mass % to 30 mass %, and also preferably 15 mass % to 30 mass % relative to the total mass of the liquid crystal composition of the present invention. In particular, examples of the preferred amount are as follows: from 4 mass % to 12 mass %, from 5 mass % to 9 mass %, from 8 mass % to 13 mass %, from 9 mass % to 14 mass %, from 12 mass % to 16 mass %, from 11 mass % to 26 mass %, and from 11 mass % to 20 mass %.

Alternatively or additionally, the compound represented by General Formula (II) is, for example, preferably at least one compound selected from the group consisting of compounds represented by General Formula (II-3).

[Chem. 101]

(II-3)

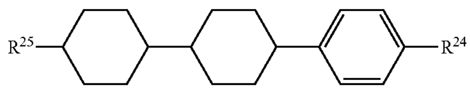

In General Formula (II-3), $R^{23}$ represents an alkyl group having 1 to 5 carbon atoms, and $R^{24}$ represents an alkyl group having 1 to 5 carbon atoms or an alkoxy group having 1 to 4 carbon atoms.

Such compounds can be used in any combination; in view of desired properties such as resistance to resolution at low temperature, transition temperature, electric reliability, and birefringence, it is preferred that one to three of the compounds be used.

The amount of the compound represented by General Formula (II-3) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

The preferred amount of the compound represented by General Formula (II-3) is, for instance, in the range of 2 to 45 mass % relative to the total mass of the liquid crystal composition of the present invention. In particular, examples of the preferred amount are as follows: from 5 to 45 mass %, from 8 to 45 mass %, from 11 to 45 mass %, from 14 to 45 mass %, from 17 to 45 mass %, from 20 to 45 mass %, from 23 to 45 mass %, from 26 to 45 mass %, from 29 to 45 mass %, from 2 to 45 mass %, from 2 to 40 mass %, from 2 to 35 mass %, from 2 to 30 mass %, from 2 to 25 mass %, from 2 to 20 mass %, from 2 to 15 mass %, and from 2 to 10 mass %.

The compound represented by General Formula (II-3) is, for example, preferably at least one compound selected from the group consisting of compounds represented by Formulae (12.1) to (12.3).

[Chem. 102]

(12.1)

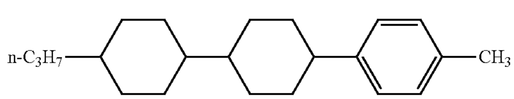

(12.2)

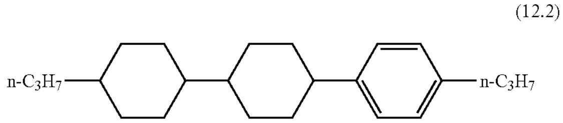

(12.3)

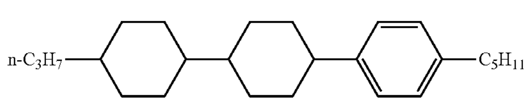

On the basis of desired properties such as resistance to resolution at low temperature, transition temperature, electric reliability, and birefringence, the compound represented by Formula (12.1) may be used, the compound represented by Formula (12.2) may be used, and the compounds represented by Formulae (12.1) and (12.2) may be used in combination.

The amount of the compound represented by Formula (12.1) is preferably in the range of 3 mass % to 40 mass %, also preferably 5 mass % to 40 mass %, also preferably 7 mass % to 40 mass %, also preferably 9 mass % to 40 mass %, also preferably 11 mass % to 40 mass %, also preferably 12 mass % to 40 mass %, also preferably 13 mass % to 40 mass %, also preferably 18 mass % to 30 mass %, and also preferably 21 mass % to 25 mass % relative to the total mass of the liquid crystal composition of the present invention.

The amount of the compound represented by Formula (12.2) is preferably in the range of 3 mass % to 40 mass %, also preferably 5 mass % to 40 mass %, also preferably 8 mass % to 40 mass %, also preferably 10 mass % to 40 mass %, also preferably 12 mass % to 40 mass %, also preferably 15 mass % to 40 mass %, also preferably 17 mass % to 30 mass %, and also preferably 19 mass % to 25 mass % relative to the total mass of the liquid crystal composition of the present invention.

In the case where the compounds represented by Formulae (12.1) and (12.2) are used in combination, the total mass of these compounds is preferably in the range of 15 mass % to 45 mass %, also preferably 19 mass % to 45 mass %, also preferably 24 mass % to 40 mass %, and also preferably 30 mass % to 35 mass % relative to the total mass of the liquid crystal composition of the present invention.

The amount of the compound represented by Formula (12.3) is preferably in the range of 0.05 mass % to 2 mass %, also preferably 0.1 mass % to 1 mass %, and also preferably 0.2 mass % to 0.5 mass % relative to the total mass of the liquid crystal composition of the present invention. The compound represented by Formula (12.3) may be an optically active compound.

The compound represented by General Formula (II-3) is, for example, preferably at least one compound selected from the group consisting of compounds represented by General Formula (II-3-1).

[Chem. 103]

(II-3-1)

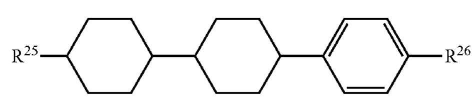

In General Formula (II-3-1), $R^{25}$ represents an alkyl group having 1 to 5 carbon atoms, and $R^{26}$ represents an alkoxy group having 1 to 4 carbon atoms.

Such compounds can be used in any combination; in view of desired properties such as resistance to resolution at low temperature, transition temperature, electric reliability, and birefringence, it is preferred that one to three of the compounds be used.

The amount of the compound represented by General Formula (II-3-1) is preferably adjusted on the basis of predetermined properties such as resistance to resolution at low temperature, transition temperature, electric reliability, and birefringence; the amount is preferably in the range of 1 mass % to 24 mass %, also preferably 4 mass % to 18 mass %, and also preferably 6 mass % to 14 mass %.

The compound represented by General Formula (II-3-1) is, for instance, preferably at least one compound selected from the group consisting of compounds represented by Formulae (13.1) to (13.4), and especially preferably the compound represented by Formula (13.3).

[Chem. 104]

(13.1)

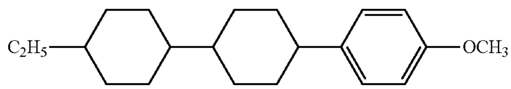

(13.2)

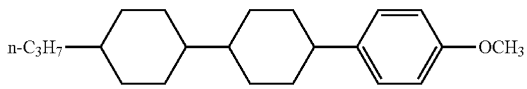

(13.3)

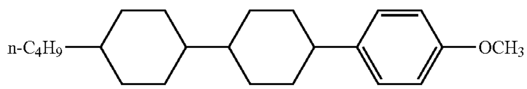

(13.4)

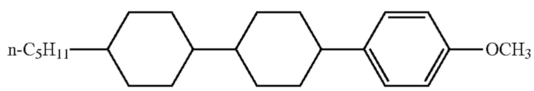

Alternatively or additionally, the compound represented by General Formula (II) is, for example, preferably at least one compound selected from the group consisting of compounds represented by General Formula (II-4).

[Chem. 105]

(II-4)

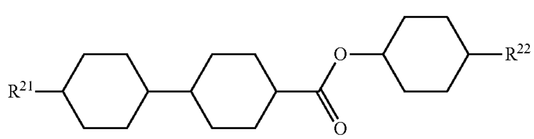

In General Formula (II-4), $R^{21}$ and $R^{22}$ each independently represent an alkenyl group having 2 to 5 carbon atoms, an alkyl group having 1 to 5 carbon atoms, or an alkoxy group having 1 to 4 carbon atoms.

Such compounds may be used alone or in combination, and it is preferred that a proper combination thereof be determined on the basis of desired properties. The compounds can be used in any combination; in view of predetermined properties such as resistance to resolution at low temperature, transition temperature, electric reliability, and birefringence, one or two of the compounds are preferably used, and one to three of the compounds are more preferably used.

The amount of the compound represented by General Formula (II-4) is preferably in the range of 1 mass % to 15 mass %, also preferably 2 mass % to 15 mass %, also preferably 3 mass % to 15 mass %, also preferably 4 mass % to 12 mass %, and also preferably 5 mass % to 7 mass % relative to the total mass of the liquid crystal composition of the present invention.

The compound represented by General Formula (II-4) is, for instance, preferably at least one compound selected from the group consisting of compounds represented by Formulae (14.1) to (14.5), and especially preferably the compound represented by Formula (14.2) and/or the compound represented by Formula (14.5).

[Chem. 106]

(14.1)

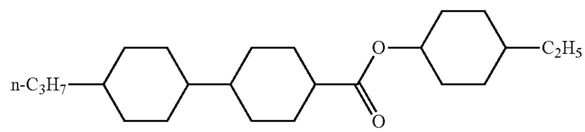

(14.2)

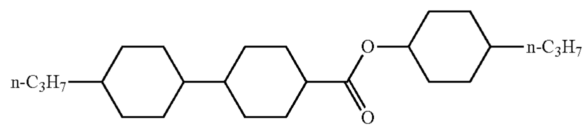

(14.3)

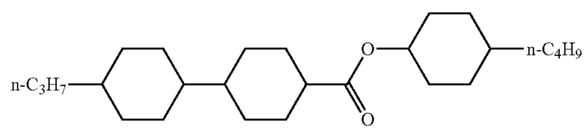

(14.4)

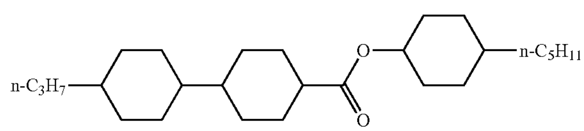

(14.5)

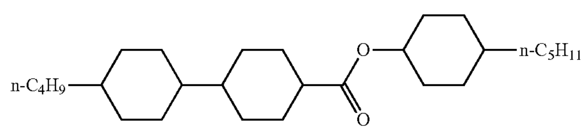

Alternatively or additionally, the compound represented by General Formula (L) is preferably at least one compound selected from the group consisting of compounds represented by General Formula (III).

[Chem. 107]

(III)

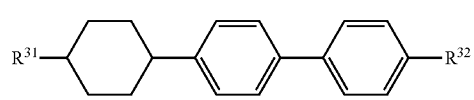

In General Formula (III), $R^{31}$ and $R^{32}$ each independently represent an alkenyl group having 2 to 5 carbon atoms, an alkyl group having 1 to 5 carbon atoms, or an alkoxy group having 1 to 4 carbon atoms.

In view of desired properties such as birefringence and resistance to resolution, the amount of the compound represented by General Formula (III) is preferably in the range of 1 mass % to 25 mass %, also preferably 2 mass % to 20 mass %, and also preferably 2 mass % to 15 mass % relative to the total mass of the liquid crystal composition of the present invention.

The compound represented by General Formula (III) is, for instance, preferably a compound represented by Formula (15.1) and/or a compound represented by Formula (15.2), and especially preferably the compound represented by Formula (15.1). The amount of the compound represented by Formula (15.1) is preferably in the range of 5 mass % to 10 mass %, and also preferably 7 mass % to 9 mass %.

It is preferred that the compound represented by Formula (15.1) be used in combination with the compound represented by Formula (45.2).

[Chem. 108]

(15.1)

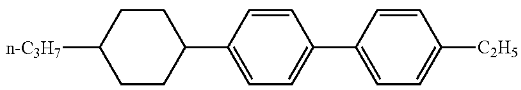

(15.2)

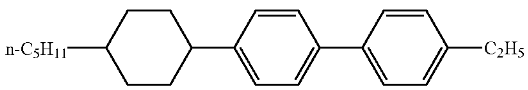

The compound represented by General Formula (III) is preferably at least one compound selected from the group consisting of compounds represented by General Formula (III-1).

[Chem. 109]

(III-1)

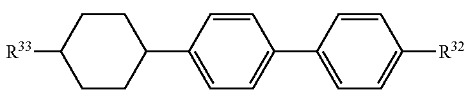

In General Formula (III-1), $R^{33}$ represents an alkenyl group having 2 to 5 carbon atoms, and $R^{32}$ represents an alkyl group having 1 to 5 carbon atoms or an alkoxy group having 1 to 4 carbon atoms.

The amount of the compound represented by General Formula (III-1) is preferably adjusted on the basis of desired properties such as resistance to resolution at low temperature, transition temperature, electric reliability, and birefringence; the amount is preferably in the range of 4 mass % to 23 mass %, also preferably 6 mass % to 18 mass %, and also preferably 10 mass % to 13 mass % relative to the total mass of the liquid crystal composition of the present invention.

The compound represented by General Formula (III-1) is, for example, preferably a compound represented by Formula (16.1) and/or a compound represented by Formula (16.2).

[Chem. 110]

(16.1)

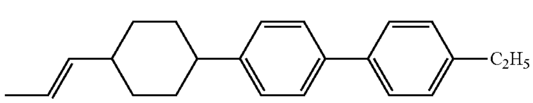

(16.2)

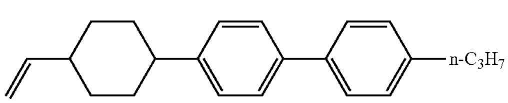

Alternatively or additionally, the compound represented by General Formula (III) is preferably at least one compound selected from the group consisting of compounds represented by General Formula (III-2).

[Chem. 111]

(III-2)

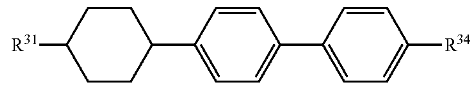

In General Formula (III-2), $R^{31}$ represents an alkyl group having 1 to 5 carbon atoms, and $R^{34}$ represents an alkoxy group having 1 to 4 carbon atoms.

The amount of the compound represented by General Formula (III-2) is preferably adjusted on the basis of desired properties such as resistance to resolution at low temperature, transition temperature, electric reliability, and birefringence; the amount is preferably in the range of 4 mass % to 23 mass %, also preferably 6 mass % to 18 mass %, and also preferably 10 mass % to 13 mass % relative to the total mass of the liquid crystal composition of the present invention.

The compound represented by General Formula (III-2) is, for instance, preferably at least one compound selected from the group consisting of compounds represented by Formulae (17.1) to (17.3), and especially preferably the compound represented by Formula (17.3).

[Chem. 112]

(17.1)

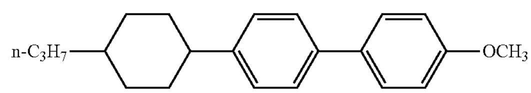

(17.2)

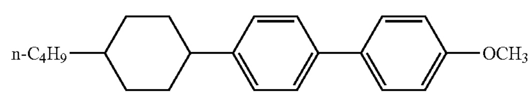

(17.3)

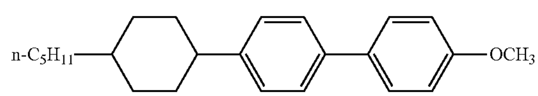

Alternatively or additionally, the compound represented by General Formula (L) is preferably at least one compound selected from the group consisting of compounds represented by General Formula (IV).

[Chem. 113]

(IV)

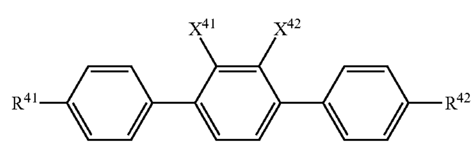

In General Formula (IV), $R^{41}$ and $R^{42}$ each independently represent an alkyl group having 1 to 5 carbon atoms or an alkenyl group having 2 to 5 carbon atoms, and $X^{41}$ and $X^{42}$ each independently represent a hydrogen atom or a fluorine atom.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

The compound represented by General Formula (IV) is, for instance, preferably at least one compound selected from the group consisting of compounds represented by General Formula (IV-1).

[Chem. 114]

(IV-1)

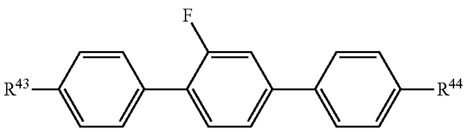

In General Formula (IV-1), $R^{43}$ and $R^{44}$ each independently represent an alkyl group having 1 to 5 carbon atoms.

The amount of the compound represented by General Formula (IV-1) needs to be appropriately adjusted on the basis of desired properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (IV-1) is in the range of 1 to 30 mass % in an embodiment of the present invention; in another embodiment of the present invention, the amount is from 3 to 30 mass; in another embodiment of the present invention, the amount is from 4 to 30 mass %; in another embodiment of the present invention, the amount is from 6 to 30 mass %; in another embodiment of the present invention, the amount is from 11 to 30 mass %; and in another embodiment of the present invention, the amount is from 20 to 30 mass %.

Furthermore, relative to the total mass of the liquid crystal composition of the present invention, for instance, the amount of the compound represented by General Formula (IV-1) is in the range of 1 to 26 mass % in an embodiment of the present invention; in another embodiment of the present invention, the amount is from 1 to 20 mass %; in another embodiment of the present invention, the amount is from 1 to 16 mass %; in another embodiment of the present invention, the amount is from 1 to 6 mass %; and in another embodiment of the present invention, the amount is from 1 to 5 mass %.

The compound represented by General Formula (IV-1) is, for instance, preferably at least one compound selected from the group consisting of compounds represented by Formulae (18.1) to (18.9).

[Chem. 115]

(18.1)

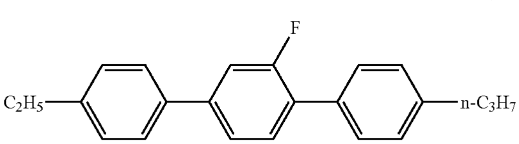

-continued (18.2)

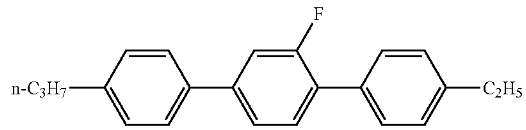

(18.3)

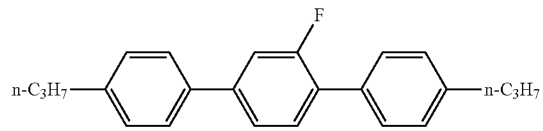

(18.4)

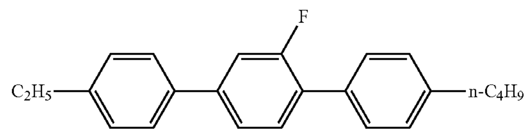

(18.5)

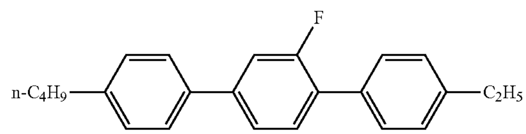

(18.6)

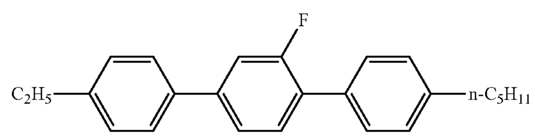

(18.7)

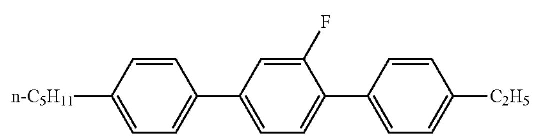

(18.8)

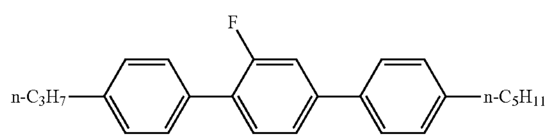

(18.9)

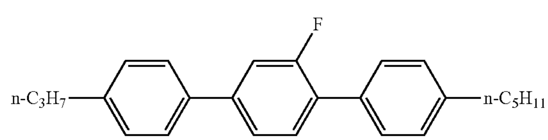

Such compounds can be used in any combination; one to three of the compounds are preferably used, and one to four of the compounds are more preferably used. Use of a compound having a broad molecular weight distribution is also effective for resistance to resolution; hence, a preferred example of use of these compounds is as follows: one compound is selected from the compounds represented by Formulae (18.1) and (18.2), one compound is selected from the compounds represented by Formulae (18.4) and (18.5), one compound is selected from the compounds represented by Formulae (18.6) and (18.7), and a proper combination of the selected compounds is determined. In particular, it is preferred that the compound represented by Formula (18.1), the compound represented by Formula (18.3), the compound represented by Formula (18.4), the compound represented by Formula (18.6), and the compound represented by Formula (18.9) be used.

In the case where only one compound is selected therefrom, the compound represented by Formula (18.4) is preferably employed; in the case where two compounds are selected therefrom, the compounds represented by Formulae (18.1) and (18.6) are preferably employed; and in the case where three compounds are selected therefrom, the compounds represented by Formulae (18.1), (18.4), and (18.6) are preferably employed.

Alternatively or additionally, the compound represented by General Formula (IV) is, for example, preferably at least one compound selected from the group consisting of compounds represented by General Formula (IV-2).

[Chem. 116]

(IV-2)

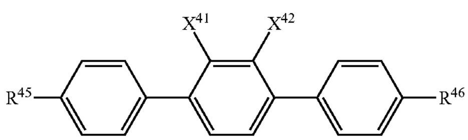

In General Formula (IV-2), $R^{45}$ and $R^{46}$ each independently represent an alkyl group having 1 to 5 carbon atoms or an alkenyl group having 2 to 5 carbon atoms, and at least one of them represents an alkenyl group having 2 to 5 carbon atoms; and $X^{41}$ and $X^{42}$ each independently represent a hydrogen atom or a fluorine atom.

Such compounds can be used in any combination; a combination of the compounds is properly determined on the basis of desired properties such as resistance to resolution at low temperature, transition temperature, electric reliability, and birefringence.

The amount of the compound represented by General Formula (IV-2) needs to be appropriately adjusted on the basis of predetermined properties such as resistance to resolution at low temperature, transition temperature, electric reliability, birefringence, process adaptability, resistance to droplet stains and screen burn-in, and dielectric anisotropy. The amount of the compound represented by General Formula (IV-2) is, for example, preferably in the range of 1 to 20 mass % relative to the total mass of the liquid crystal composition of the present invention. Examples of the more preferred amount thereof are as follows: from 1 to 15 mass %, from 2 to 15 mass %, from 5 to 15 mass %, from 8 to 15 mass %, from 2 to 15 mass %, from 5 to 15 mass %, from 8 to 15 mass %, from 1 to 4 mass %, from 3 to 7 mass %, and from 7 to 13 mass %.

The compound represented by General Formula (IV-2) is, for instance, preferably at least one compound selected from the group consisting of compounds represented by Formulae (19.1) to (19.8), and more preferably the compound represented by Formula (19.2).

[Chem. 117]

(19.1)

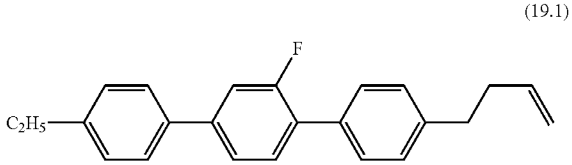

-continued (19.2)

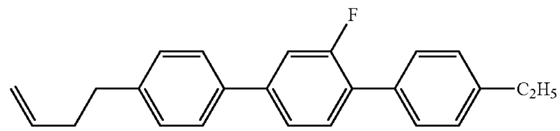

(19.3)

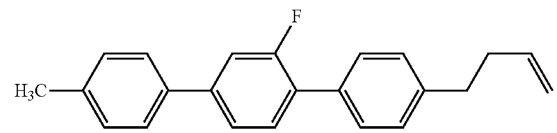

(19.31)

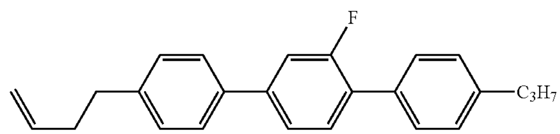

(19.32)

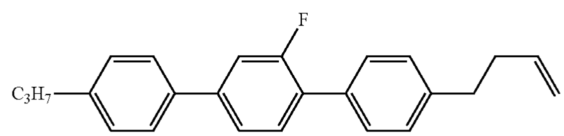

(19.4)

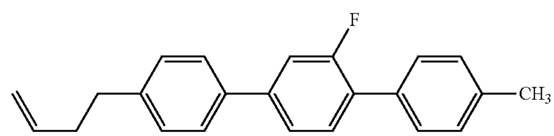

(19.5)

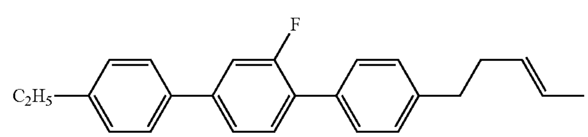

(19.6)

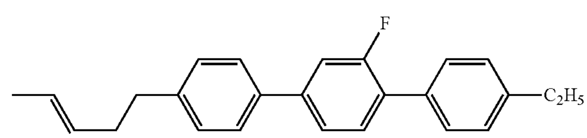

(19.7)

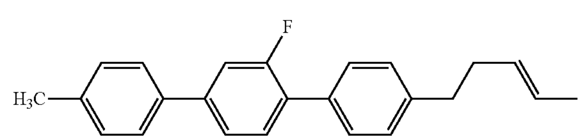

(19.8)

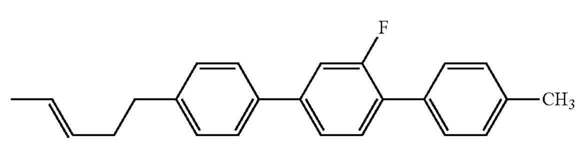

Use of a compound having a broad molecular weight distribution as a component of the liquid crystal composition is also effective for resistance to resolution; hence, in terms of an improvement in the resistance of the liquid crystal composition to resolution thereof, a preferred example of use of these compounds is as follows: one compound is selected from the compounds represented by Formulae (19.1) and (19.2), one compound is selected from the compounds represented by Formulae (19.3) and (19.4), one compound is selected from the compounds represented by Formulae (19.5) and (19.6), one compound is selected from the compounds represented by Formulae (19.7) and (19.8), and a proper combination of these selected compounds is determined.

In the liquid crystal composition of the present invention, the amount of the compound represented by Formula (19.4) or (19.3) is preferably in the range of 3 mass % to 25 mass %, also preferably 5 mass % to 20 mass %, also preferably 5 mass % to 15 mass %, and also preferably 7 mass % to 10 mass % relative to the total mass of the liquid crystal composition of the present invention in view of resistance to resolution at low temperature, transition temperature, electric reliability, and another property.

In the case where the liquid crystal composition contains two compounds represented by General Formula (i), the amount of the compound represented by Formula (19.4) or (19.3) is preferably in the range of 10 to 15%.

The compound represented by General Formula (L) is preferably at least one compound selected from the group consisting of compounds represented by General Formula (V).

[Chem. 118]

(V)

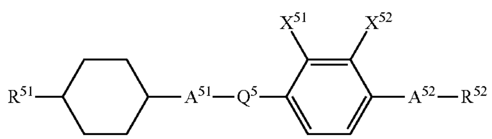

In General Formula (V), $R^{51}$ and $R^{52}$ each independently represent an alkyl group having 1 to 5 carbon atoms, an alkenyl group having 2 to 5 carbon atoms, or an alkoxy group having 1 to 4 carbon atoms; $A^{51}$ and $A^{52}$ each independently represent a 1,4-cyclohexylene group or a 1,4-phenylene group; $Q^5$ represents a single bond or —COO—; and $X^{51}$ and $X^{52}$ each independently represent a fluorine atom or a hydrogen atom.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used.

Relative to the total mass of the liquid crystal composition of the present invention, for example, the amount of the compound represented by General Formula (V) is in the range of 2 to 40 mass % in an embodiment of the present invention; in another embodiment of the present invention, the amount is from 4 to 40 mass %; in another embodiment of the present invention, the amount is from 7 to 40 mass %; in another embodiment of the present invention, the amount is from 10 to 40 mass %; in another embodiment of the present invention, the amount is from 12 to 40 mass %; in another embodiment of the present invention, the amount is from 15 to 40 mass %; in another embodiment of the present invention, the amount is from 17 to 40 mass %; in another embodiment of the present invention, the amount is from 18 to 40 mass %; in another embodiment of the present invention, the amount is from 20 to 40 mass %; and in another embodiment of the present invention, the amount is from 22 to 40 mass %.

Furthermore, relative to the total mass of the liquid crystal composition of the present invention, for example, the amount of such a compound is in the range of 2 to 30 mass % in an embodiment of the present invention; in another embodiment of the present invention, the amount of the compound is from 2 to 25 mass %; in another embodiment of the present invention, the amount of the compound is from 2 to 20 mass %; in another embodiment of the present invention, the amount of the compound is from 2 to 15 mass %; in another embodiment of the present invention, the amount of the compound is from 2 to 10 mass %; in another embodiment of the present invention, the amount of the compound is from 2 to 5 mass %; and in another embodiment of the present invention, the amount of the compound is from 2 to 4 mass %.

The compound represented by General Formula (V) is preferably a compound represented by General Formula (V-1).

[Chem. 119]

(V-1)

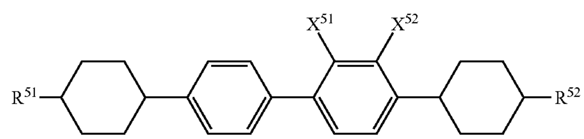

In General Formula (V-1), $R^{51}$ and $R^{52}$ each independently represent an alkyl group having 1 to 5 carbon atoms, an alkenyl group having 2 to 5 carbon atoms, or an alkoxy group having 1 to 4 carbon atoms; and $X^{51}$ and $X^{52}$ each independently represent a fluorine atom or a hydrogen atom.

The compound represented by General Formula (V-1) is preferably a compound represented by General Formula (V-1-1).

[Chem. 120]

(V-1-1)

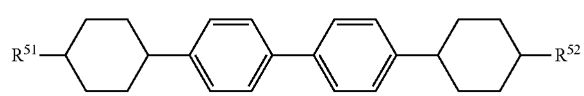

In General Formula (V-1-1), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-1-1) is preferably in the range of 1 mass % to 15 mass %, more preferably 2 mass % to 10 mass %, further preferably 3 mass % to 10 mass %, and especially preferably 3 mass % to 7 mass % relative to the total mass of the liquid crystal composition of the present invention.

The compound represented by General Formula (V-1-1) is preferably at least one compound selected from the group consisting of compounds represented by Formulae (20.1) to (20.4), and more preferably the compound represented by Formula (20.2).

[Chem. 121]

(20.1)

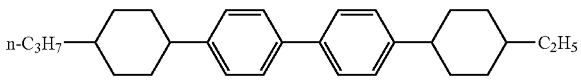

(20.2)

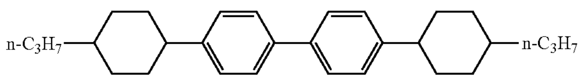

(20.3)

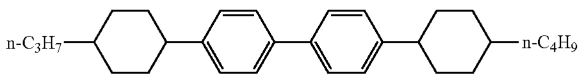

(20.4)

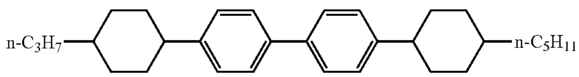

Alternatively or additionally, the compound represented by General Formula (V-1) is preferably a compound represented by General Formula (V-1-2).

[Chem. 122]

(V-1-2)

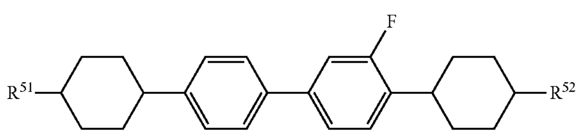

In General Formula (V-1-2), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-1-2) is preferably in the range of 1 mass % to 15 mass %, also preferably 1 mass % to 10 mass %, also preferably 1 mass % to 7 mass %, and also preferably 1 mass % to 5 mass % relative to the total mass of the liquid crystal composition of the present invention.

The compound represented by General Formula (V-1-2) is preferably at least one compound selected from the group consisting of compounds represented by Formulae (21.1) to (21.3), and more preferably the compound represented by Formula (21.1).

[Chem. 123]

(21.1)

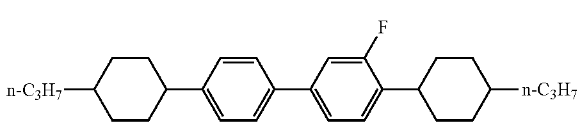

(21.2)

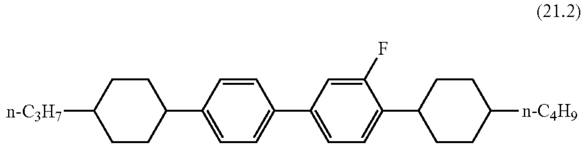

-continued (21.3)

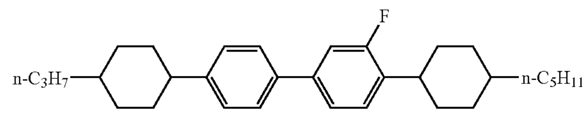

Alternatively or additionally, the compound represented by General Formula (V-1) is preferably a compound represented by General Formula (V-1-3).

[Chem. 124]

(V-1-3)

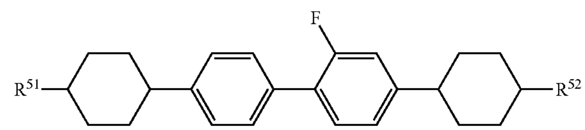

In General Formula (V-1-3), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-1-3) is preferably in the range of 1 mass % to 15 mass %, also preferably 2 mass % to 15 mass %, also preferably 3 mass % to 10 mass %, and also preferably 4 mass % to 8 mass % relative to the total mass of the liquid crystal composition of the present invention.

The compound represented by General Formula (V-1-3) is preferably at least one compound selected from the group consisting of compounds represented by Formulae (22.1) to (22.3), and more preferably the compound represented by Formula (22.1).

[Chem. 125]

(22.1)

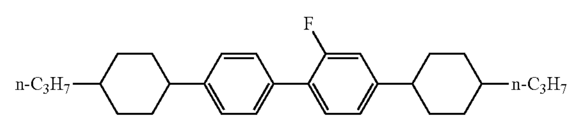

(22.2)

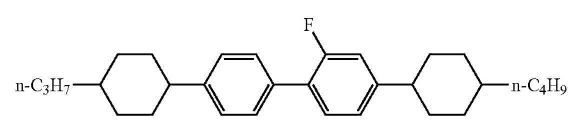

(22.3)

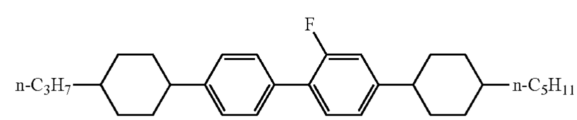

Alternatively or additionally, the compound represented by General Formula (V) is preferably any of compounds represented by General Formula (V-2).

[Chem. 126]

(V-2)

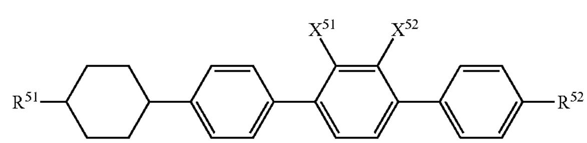

In General Formula (V-2), $R^{51}$ and $R^{52}$ each independently represent an alkyl group having 1 to 5 carbon atoms, an alkenyl group having 2 to 5 carbon atoms, or an alkoxy group having 1 to 4 carbon atoms; and $X^{51}$ and $X^{52}$ each independently represent a fluorine atom or a hydrogen atom.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two or more of the compounds are used.

Relative to the total mass of the liquid crystal composition of the present invention, for instance, the amount of the compound represented by General Formula (V-2) is in the range of 2 to 40 mass % in an embodiment; in another embodiment of the present invention, the amount of the compound is from 4 to 40 mass %; in another embodiment of the present invention, the amount of the compound is from 7 to 40 mass %; in another embodiment of the present invention, the amount of the compound is from 10 to 40 mass %; in another embodiment of the present invention, the amount of the compound is from 12 to 40 mass %; in another embodiment of the present invention, the amount of the compound is from 15 to 40 mass %; in another embodiment of the present invention, the amount of the compound is from 17 to 40 mass %; in another embodiment of the present invention, the amount of the compound is from 18 to 40 mass %; in another embodiment of the present invention, the amount of the compound is from 20 to 40 mass %; and in another embodiment of the present invention, the amount of the compound is from 22 to 40 mass %.

Furthermore, relative to the total mass of the liquid crystal composition of the present invention, for instance, the amount of the compound represented by General Formula (V-2) is in the range of 2 to 30 mass % in an embodiment of the present invention; in another embodiment of the present invention, the amount of the compound is from 2 to 25 mass %; in another embodiment of the present invention, the amount of the compound is from 2 to 20 mass %; in another embodiment of the present invention, the amount of the compound is from 2 to 15 mass %; in another embodiment of the present invention, the amount of the compound is from 2 to 10 mass %; in another embodiment of the present invention, the amount of the compound is from 2 to 5 mass %; and in another embodiment of the present invention, the amount of the compound is from 2 to 4 mass %.

In an embodiment in which the liquid crystal composition of the present invention needs to have a high Tni, the amount of the compound represented by Formula (V-2) is preferably adjusted to be larger; in an embodiment in which the liquid crystal composition needs to have a low viscosity, the amount thereof is preferably adjusted to be smaller.

The compound represented by General Formula (V-2) is preferably a compound represented by General Formula (V-2-1).

[Chem. 127]

(V-2-1)

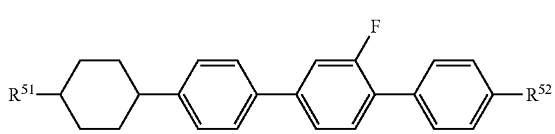

In General Formula (V-2-1), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The compound represented by General Formula (V-2-1) is preferably at least one compound selected from the group consisting of compounds represented by Formulae (23.1) to (23.4), and more preferably the compound represented by Formula (23.1) and/or the compound represented by Formula (23.2).

[Chem. 128]

(23.1)

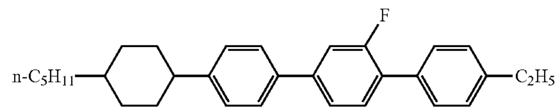

(23.2)

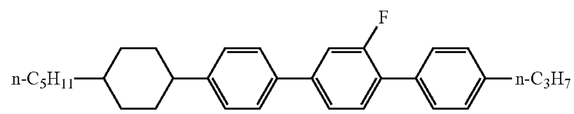

(23.3)

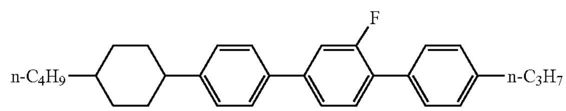

(23.4)

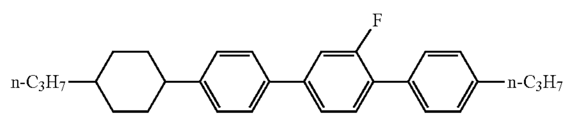

Alternatively or additionally, the compound represented by General Formula (V-2) is preferably a compound represented by General Formula (V-2-2).

[Chem. 129]

(V-2-2)

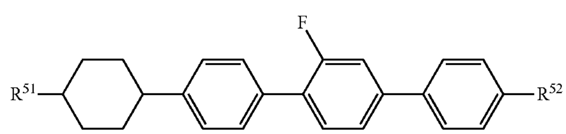

In General Formula (V-2-2), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-2-2) is preferably in the range of 2 mass % to 16 mass %, also preferably 3 mass % to 13 mass %, and also preferably 4 mass % to 10 mass % relative to the total mass of the liquid crystal composition of the present invention.

The compound represented by General Formula (V-2-2) is preferably at least one compound selected from the group consisting of compounds represented by Formulae (24.1) to (24.4), and more preferably the compound represented by Formula (24.1) and/or the compound represented by Formula (24.2).

[Chem. 130]

(24.1)

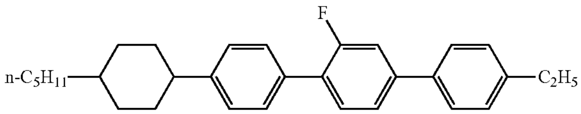

(24.2)

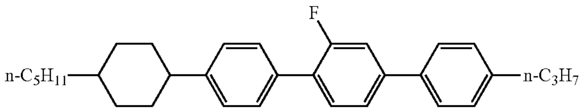

(24.3)

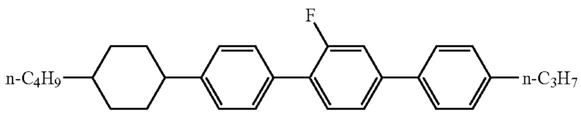

(24.4)

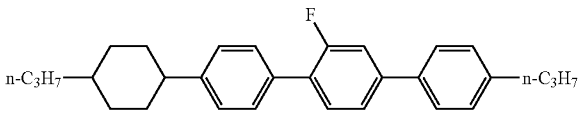

Alternatively or additionally, the compound represented by General Formula (V) is preferably any of compounds represented by General Formula (V-3).

[Chem. 131]

(V-3)

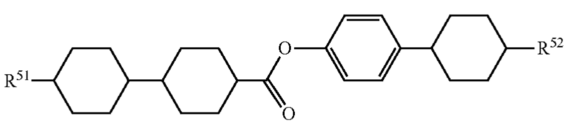

In General Formula (V-3), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (V-3) is preferably in the range of 2 mass % to 16 mass %, also preferably 4 mass % to 16 mass %, also preferably 7 mass % to 13 mass %, and also preferably 8 mass % to 11 mass % relative to the total mass of the liquid crystal composition of the present invention.

The compound represented by General Formula (V-3) is preferably at least one compound selected from the group consisting of compounds represented by Formulae (25.1) to (25.3).

[Chem. 132]

(25.1)

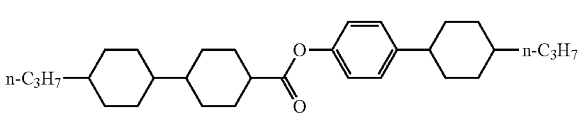

-continued (25.2)

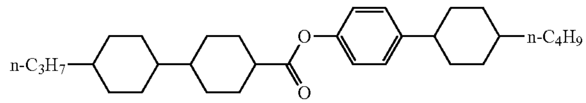

(25.3)

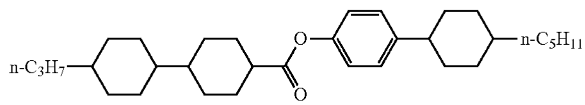

Alternatively or additionally, the compound represented by General Formula (V), which is used in the liquid crystal composition of the present invention, is preferably a compound represented by General Formula (V-4).

[Chem. 133]

(V-4)

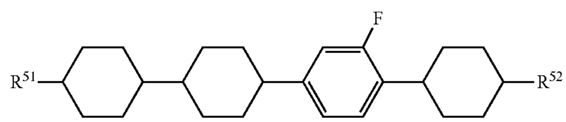

In General Formula (V-4), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-4) is preferably in the range of 1 mass % to 15 mass %, also preferably 2 mass % to 15 mass %, also preferably 3 mass % to 10 mass %, and also preferably 4 mass % to 8 mass % relative to the total mass of the liquid crystal composition of the present invention.

The compound represented by General Formula (V-4) is preferably at least one compound selected from the group consisting of compounds represented by Formulae (25.11) to (25.13), and more preferably the compound represented by Formula (25.13).

[Chem. 134]

(25.11)

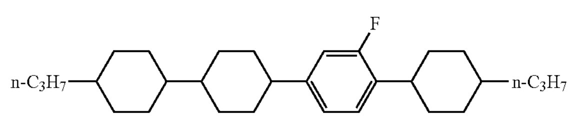

(25.12)

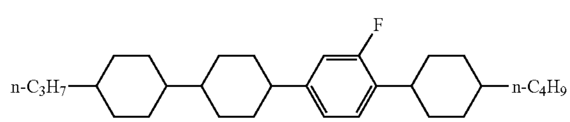

(25.13)

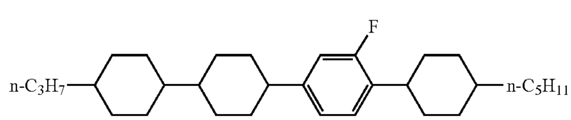

Alternatively or additionally, the compound represented by General Formula (L), which is used in the liquid crystal composition of the present invention, is preferably a compound represented by General Formula (V'-5).

[Chem. 135]

(V'-5)

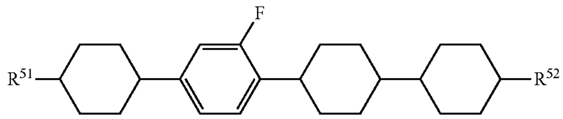

In General Formula (V'-5), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V'-5) is preferably in the range of 1 mass % to 15 mass %, also preferably 2 mass % to 15 mass %, and also preferably 2 mass % to 13 mass % relative to the total mass of the liquid crystal composition of the present invention.

The compound represented by General Formula (V'-5) is preferably at least one compound selected from the group consisting of compounds represented by Formulae (25.21) to (25.24), and more preferably the compound represented by Formula (25.21) and/or the compound represented by Formula (25.23).

[Chem. 136]

(25.21)

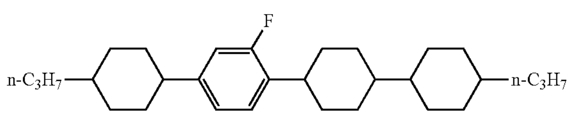

(25.22)

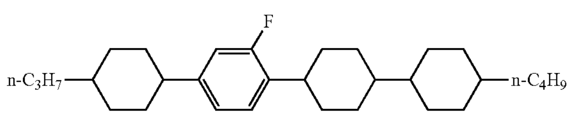

(25.23)

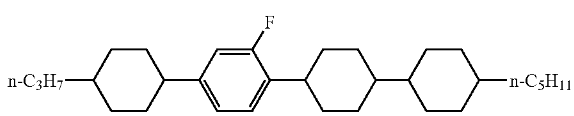

(25.24)

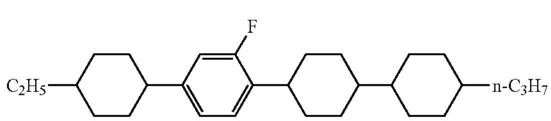

The liquid crystal composition of the present invention can further contain at least one of compounds represented by General Formula (VI).

[Chem. 137]

(VI)

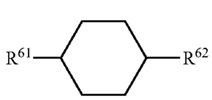

In General Formula (VI), $R^{61}$ and $R^{62}$ each independently represent a linear alkyl group having 1 to 10 carbon atoms, a linear alkoxy group having 1 to 10 carbon atoms, or a linear alkenyl group having 2 to 10 carbon atoms.

Such compounds can be used in any combination; on the basis of desired properties such as resistance to resolution at low temperature, transition temperature, electric reliability, and birefringence, one to three of such compounds are preferably used, one to four of the compounds are more preferably used, and one to five or more of the compounds are especially preferably used.

The amount of the compound represented by General Formula (VI) is preferably in the range of 0 to 35 mass %, also preferably 0 to 25 mass %, and also preferably 0 to 15 mass % relative to the total mass of the liquid crystal composition of the present invention.

In particular, preferred examples of the compound represented by General Formula (VI) include the following compounds.

[Chem. 138]

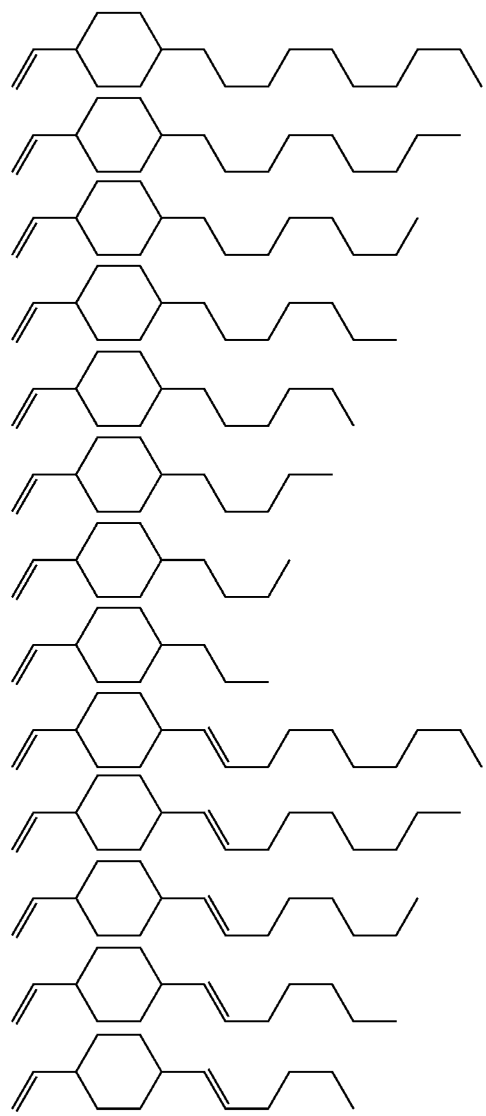

-continued
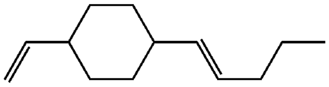
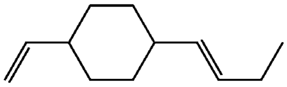
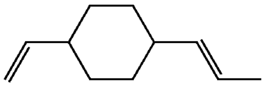
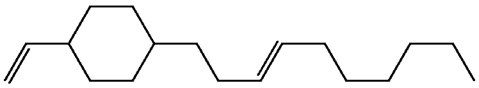
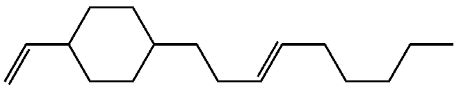
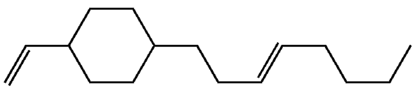
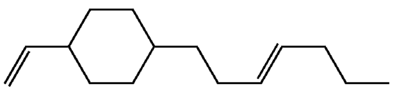
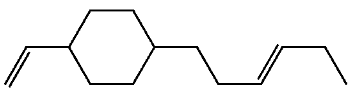
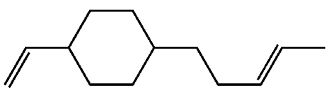
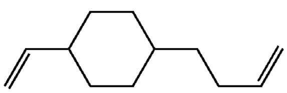
[Chem. 139]
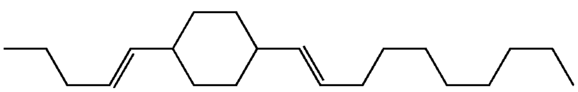
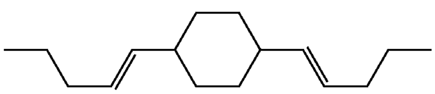
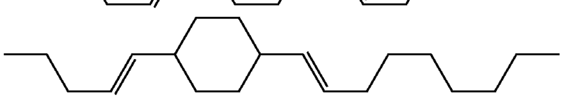
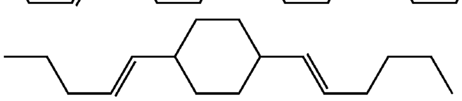
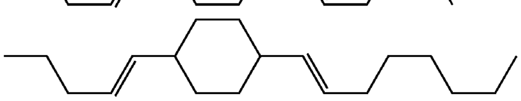
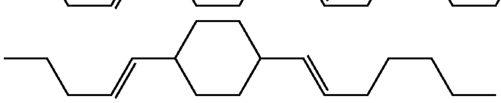
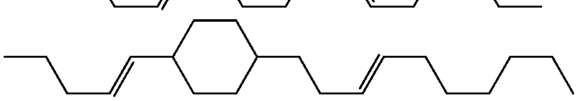
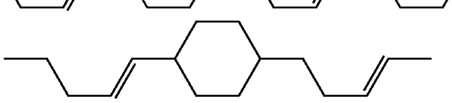
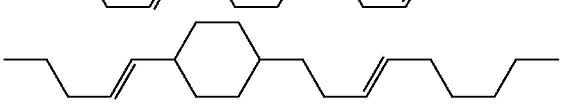
-continued
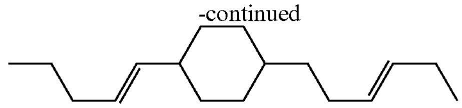
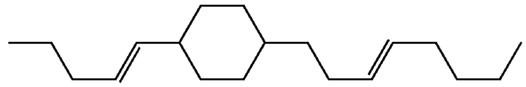
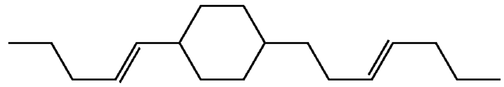
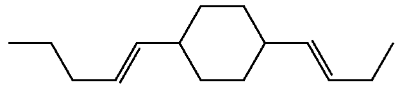
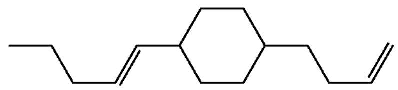
[Chem. 140]
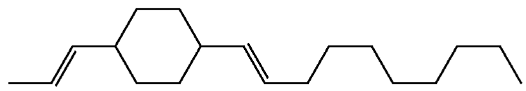
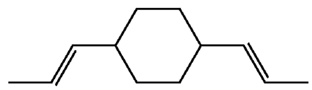
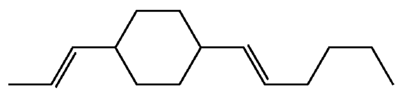
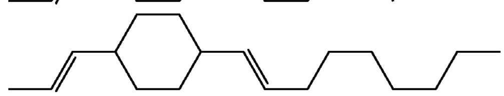
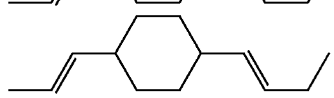
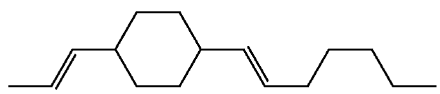
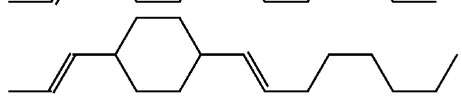
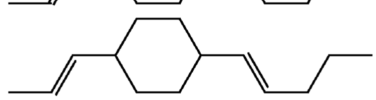
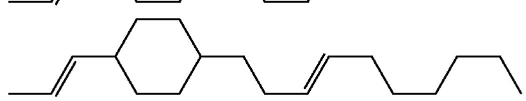
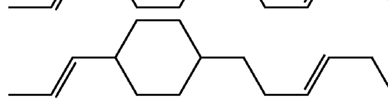
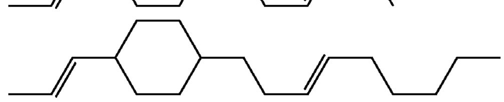
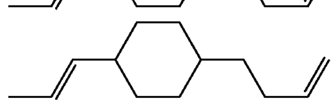
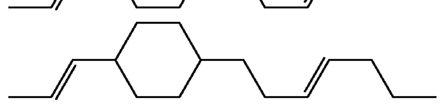
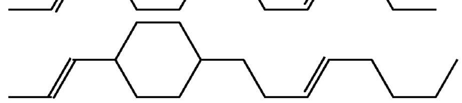

-continued

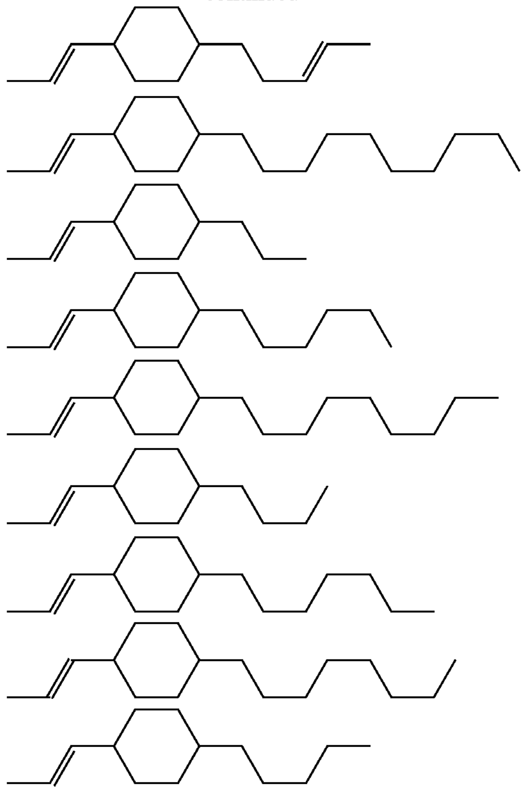

[Chem. 141]

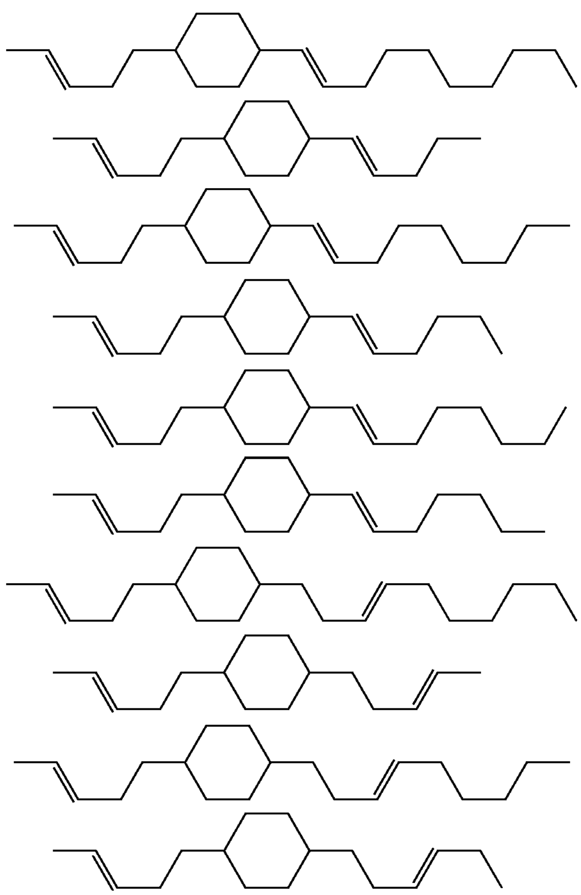

-continued

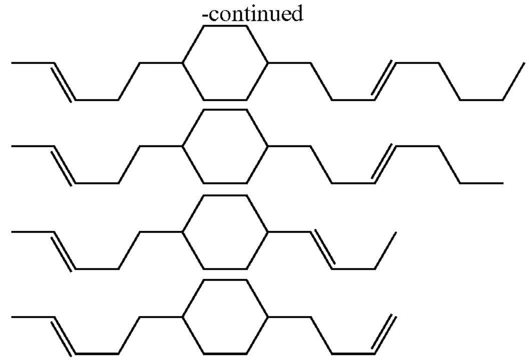

The liquid crystal composition of the present invention can further contain at least one of compounds represented by General Formula (VII).

Chem. 142

(VII)

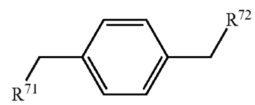

In General Formula (VII), $R^{71}$ and $R^{72}$ each independently represent a linear alkyl group having 1 to 10 carbon atoms, a linear alkoxy group having 1 to 10 carbon atoms, or a linear alkenyl group having 4 to 10 carbon atoms.

Such compounds can be used in any combination; a proper use thereof is determined on the basis of desired properties such as resistance to resolution at low temperature, transition temperature, electric reliability, and birefringence. One to three of such compounds are preferably used, one to four of the compounds are more preferably used, and one to five or more of the compounds are especially preferably used.

The amount of the compound represented by General Formula (VII) is preferably in the range of 0 to 35 mass %, more preferably 0 to 25 mass %, and further preferably 0 to 15 mass % relative to the total mass of the liquid crystal composition of the present invention.

In particular, preferred examples of the compound represented by General Formula (VII) include the following compounds.

[Chem. 143]

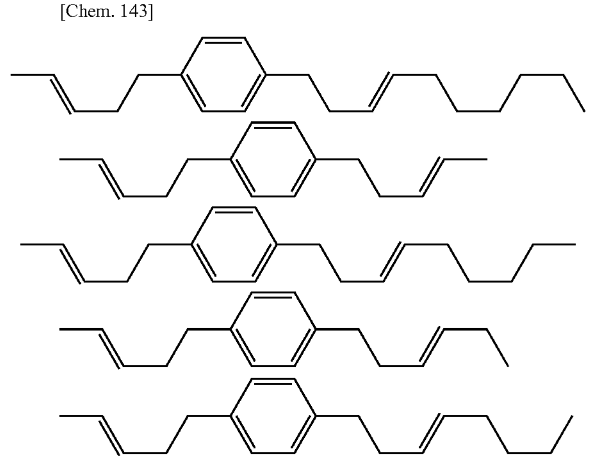

-continued

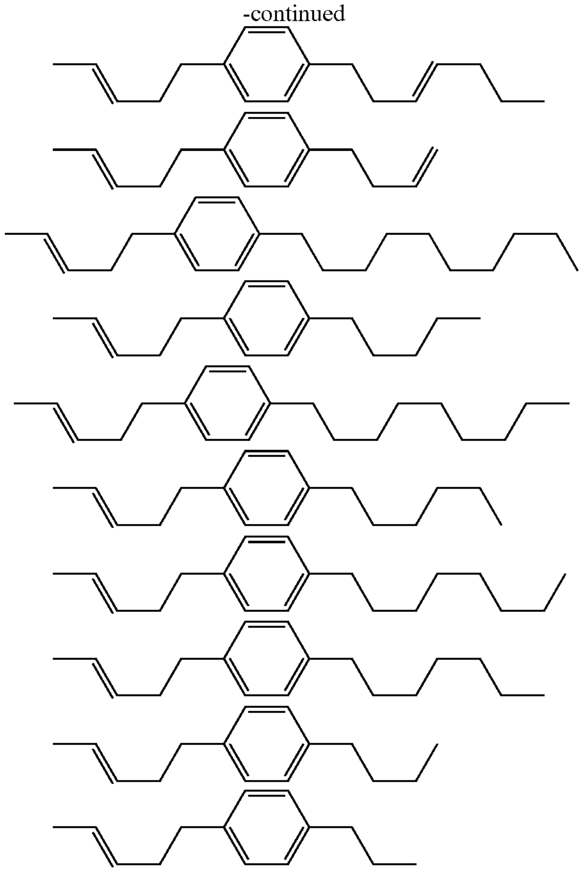

Moreover, it is preferred that the liquid crystal composition of the present invention further contain at least one of compounds represented by General Formula (M).

[Chem. 144]

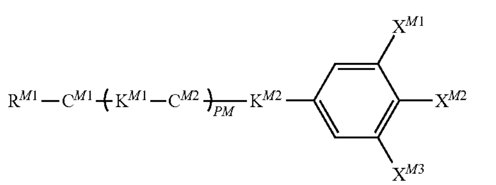

(M)

In General Formula (M), $R^{M1}$ represents an alkyl group having 1 to 8 carbon atoms, and one —$CH_2$— moiety or two or more —$CH_2$— moieties not adjoining each other in the alkyl group are each independently optionally substituted with —CH═CH—, —C≡C—, —O—, —CO—, —COO—, or —OCO—;

PM represents 0, 1, 2, 3, or 4;

$C^{M1}$ and $C^{M2}$ each independently represent a group selected from the group consisting of (d) a 1,4-cyclohexylene group (of which one —$CH_2$— moiety or two or more —$CH_2$— moieties not adjoining each other are optionally substituted with —O— or —S—) and (e) a 1,4-phenylene group (of which one —CH═ moiety or two or more —CH═ moieties not adjoining each other are optionally substituted with —N═), and the groups (d) and (e) are each independently optionally substituted with a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

in the case where PM is 2, 3, or 4 and where $K^{M1}$ is multiple, the $K^{M1}$ moieties are the same as or different from each other; in the case where PM is 2, 3, or 4 and where $C^{M2}$ is multiple, the $C^{M2}$ moieties are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by General Formula (i).

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven or more of the compounds are used.

In the liquid crystal composition of the present invention, the amount of the compound represented by General Formula (M) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (M) is in the range of 1 to 95 mass % in an embodiment of the present invention; in another embodiment of the present invention, the amount of the compound is from 10 to 95 mass %; in another embodiment of the present invention, the amount of the compound is from 20 to 95 mass %; in another embodiment of the present invention, the amount of the compound is from 30 to 95 mass %; in another embodiment of the present invention, the amount of the compound is from 40 to 95 mass %; in another embodiment of the present invention, the amount of the compound is from 45 to 95 mass %; in another embodiment of the present invention, the amount of the compound is from 50 to 95 mass %; in another embodiment of the present invention, the amount of the compound is from 55 to 95 mass %; in another embodiment of the present invention, the amount of the compound is from 60 to 95 mass %; in another embodiment of the present invention, the amount of the compound is from 65 to 95 mass %; in another embodiment of the present invention, the amount of the compound is from 70 to 95 mass %; in another embodiment of the present invention, the amount of the compound is from 75 to 95 mass %; and in another embodiment of the present invention, the amount of the compound is from 80 to 95 mass %.

Furthermore, relative to the total mass of the liquid crystal composition of the present invention, for example, the amount of the compound represented by General Formula (M) is in the range of 1 to 85 mass % in an embodiment of the present invention; in another embodiment of the present invention, the amount of the compound is from 1 to 75 mass %; in another embodiment of the present invention, the amount of the compound is from 1 to 65 mass %; in another embodiment of the present invention, the amount of the compound is from 1 to 55 mass %; in another embodiment of the present invention, the amount of the compound is from 1 to 45 mass %; in another embodiment of the present invention, the amount of the compound is from 1 to 35 mass %; and in another embodiment of the present invention, the amount of the compound is from 1 to 25 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the Tni of the liquid crystal composition of the present invention needs to be kept at a high level to allow the liquid crystal composition to have a high temperature stability, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

In the case where the ring structure bonded to $R^{M1}$ is a phenyl group (aromatic), $R^{M1}$ is preferably a linear alkyl group having 1 to 5 carbon atoms, a linear alkoxy group having 1 to 4 carbon atoms, or an alkenyl group having 4 or 5 carbon atoms; in the case where the ring structure bonded to $R^{M1}$ is a saturated ring such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

In the case where the liquid crystal composition needs to be chemically stable, it is preferred that the molecules of the compound represented by General Formula (14) be free from a chlorine atom. The amount of a chlorine-atom-containing compound in the liquid crystal composition is preferably in the range of 0 to 5 mass %, also preferably 0 to 3 mass %, also preferably 0 to 1 mass %, and also preferably 0 to 0.5 mass % relative to the total mass of the liquid crystal composition of the present invention; and it is also preferred that the liquid crystal composition be substantially free from a chlorine-atom-containing compound. The term "substantially free from a chlorine-atom-containing compound" refers to that only a compound unavoidably containing a chlorine atom, such as a compound generated as an impurity in production of another compound, is contained in the liquid crystal composition.

The compound represented by General Formula (M) is, for instance, preferably at least one compound selected from the group consisting of compounds represented by General Formula (VIII).

[Chem. 145]

(VIII)

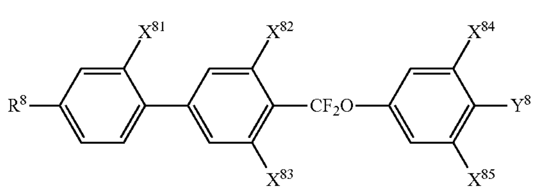

In General Formula (VIII), $R^8$ represents an alkyl group having 1 to 5 carbon atoms, an alkenyl group having 2 to 5 carbon atoms, or an alkoxy group having 1 to 4 carbon atoms; $X^{81}$ to $X^{85}$ each independently represent a hydrogen atom or a fluorine atom; and $Y^8$ represents a fluorine atom or —$OCF_3$.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

In the liquid crystal composition of the present invention, the amount of the compound represented by General Formula (VIII) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (VIII) is in the range of 2 to 40 mass % in an embodiment of the present invention; in another embodiment of the present invention, the amount of the compound is from 4 to 40 mass %; in another embodiment of the present invention, the amount of the compound is from 5 to 40 mass %; in another embodiment of the present invention, the amount of the compound is from 6 to 40 mass %; in another embodiment of the present invention, the amount of the compound is from 7 to 40 mass %; in another embodiment of the present invention, the amount of the compound is from 8 to 40 mass %; in another embodiment of the present invention, the amount of the compound is from 9 to 40 mass %; in another embodiment of the present invention, the amount of the compound is from 10 to 40 mass %; in another embodiment of the present invention, the amount of the compound is from 11 to 40 mass %; in another embodiment of the present invention, the amount of the compound is from 12 to 40 mass %; in another embodiment of the present invention, the amount of the compound is from 14 to 40 mass %; in another embodiment of the present invention, the amount of the compound is from 15 to 40 mass %; in another embodiment of the present invention, the amount of the compound is from 21 to 40 mass %; and in another embodiment of the present invention, the amount of the compound is from 23 to 40 mass %.

Furthermore, relative to the total mass of the liquid crystal composition of the present invention, for example, the amount of such a compound is in the range of 2 to 30 mass % in an embodiment of the present invention; in another embodiment of the present invention, the amount of the compound is from 2 to 25 mass %; in another embodiment of the present invention, the amount of the compound is from 2 to 21 mass %; in another embodiment of the present invention, the amount of the compound is from 2 to 16 mass %; in another embodiment of the present invention, the amount of the compound is from 2 to 12 mass %; in another embodiment of the present invention, the amount of the compound is from 2 to 8 mass %; and in another embodiment of the present invention, the amount of the compound is from 2 to 5 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the Tni of the liquid crystal composition of the present invention needs to be kept at a high level to allow the liquid crystal composition to have a high temperature stability, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

The compound represented by General Formula (VIII) is preferably any of compounds represented by General Formula (VIII-1).

[Chem. 146]

(VIII-1)

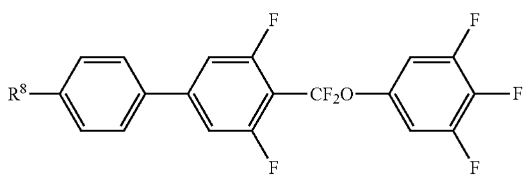

In General Formula (VIII-1), $R^8$ represents an alkyl group having 1 to 5 carbon atoms, an alkenyl group having 2 to 5 carbon atoms, or an alkoxy group having 1 to 4 carbon atoms.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two or more of the compounds are used.

In particular, the compound represented by General Formula (VIII-1) is preferably at least one compound selected from the group consisting of compounds represented by Formulae (26.1) to (26.4), more preferably the compound represented by Formula (26.1) and/or the compound represented by Formula (26.2), and further preferably the compound represented by Formula (26.2).

[Chem. 147]

(26.1)

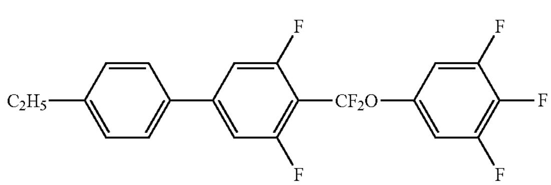

(26.2)

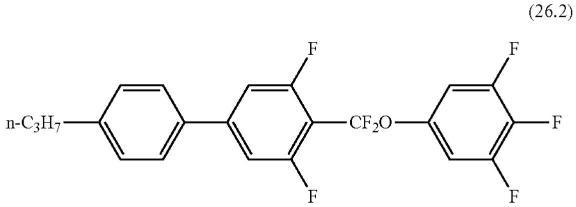

-continued (26.3)

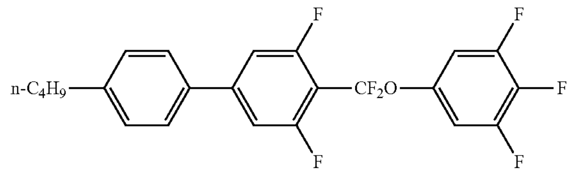

(26.4)

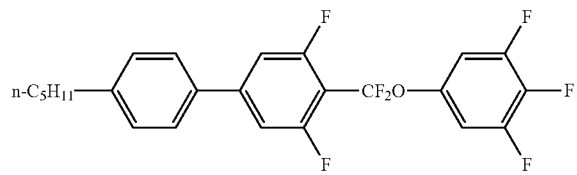

The amount of the compound represented by Formula (26.1) is preferably in the range of 1 mass % to 20 mass %, more preferably 1 mass % to 15 mass %, further preferably 1 mass % to 10 mass %, and especially preferably 1 mass % to 7 mass % relative to the total mass of the liquid crystal composition of the present invention in view of resistance to resolution at low temperature, transition temperature, electric reliability, birefringence, and another property. Examples of the especially preferred range are as follows: from 1 mass % to 6 mass %, from 1 mass % to 5 mass %, from 1 mass % to 3 mass %, from 3 mass % to 7 mass %, and from 3 mass % to 6 mass %.

The compound represented by Formula (26.1) is particularly preferably used in the case where the liquid crystal composition contains one compound represented by General Formula (i). In such a case, the amount thereof is preferably in the range of 3 to 14%, more preferably 4 to 10%, and further preferably 5 to 7%.

The amount of the compound represented by Formula (26.2) is preferably in the range of 1 mass % to 30 mass %, more preferably 1 mass % to 25 mass %, further preferably 1 mass % to 20 mass %, and especially preferably 1 mass % to 18 mass % relative to the total mass of the liquid crystal composition of the present invention in view of resistance to resolution at low temperature, transition temperature, electric reliability, birefringence, and another property. Examples of the especially preferred range are as follows: from 1 mass % to 2 mass %, from 3 mass % to 12 mass %, from 4 mass % to 12 mass %, from 4 mass % to 10 mass %, from 6 mass % to 12 mass %, from 6 mass % to 9 mass %, from 6 mass % to 8 mass %, from 7 mass % to 12 mass %, from 8 mass % to 11 mass %, from 3 mass % to 7 mass %, from 5 mass % to 10 mass %, and from 12 mass % to 18 mass %.

In particular, in the case where the liquid crystal composition contains three compounds represented by General Formula (1), the amount of the compound represented by Formula (26.2) is preferably in the range of 1 to 14%, more preferably 1 to 10%, and further preferably 2 to 8%.

The total amount of the compounds represented by Formulae (26.1) and (26.2) is preferably in the range of 1 to 30 mass %, more preferably 1 to 25 mass %, and further preferably 1 to 20 mass % relative to the total mass of the liquid crystal composition of the present invention. Examples of the further preferred range are as follows: from 1 mass % to 18 mass %, from 1 mass % to 14 mass %, from 1 mass % to 10 mass %, from 1 mass % to 9 mass %, from 1 mass % to 8 mass %, from 1 mass % to 2 mass %, from 5 mass % to 10 mass %, from 6 mass % to 10 mass %, from 6 mass % to 9 mass %, from 6 mass % to 8 mass %, from 8 mass % to 12 mass %, from 7 mass % to 12 mass %, from 9 mass % to 14 mass %, and from 12 mass % to 18 mass %.

Alternatively or additionally, the compound represented by General Formula (VIII) is preferably any of compounds represented by General Formula (VIII-2).

[Chem. 148]

(VIII-2)

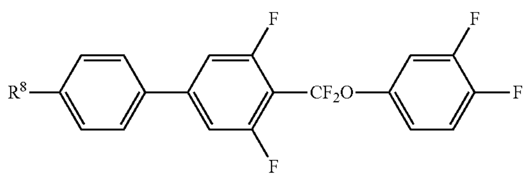

In General Formula (VIII-2), $R^8$ represents an alkyl group having 1 to 5 carbon atoms, an alkenyl group having 2 to 5 carbon atoms, or an alkoxy group having 1 to 4 carbon atoms.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (VIII-2) is preferably in the range of 2.5 mass % to 25 mass %, also preferably 8 mass % to 25 mass %, also preferably 10 mass % to 20 mass %, and also preferably 12 mass % to 15 mass % relative to the total mass of the liquid crystal composition of the present invention in view of resistance to resolution at low temperature, transition temperature, electric reliability, and birefringence.

The compound represented by General Formula (VIII-2) is preferably at least one compound selected from the group consisting of compounds represented by Formulae (27.1) to (27.4), and more preferably the compound represented by Formula (27.2).

[Chem. 149]

(27.1)

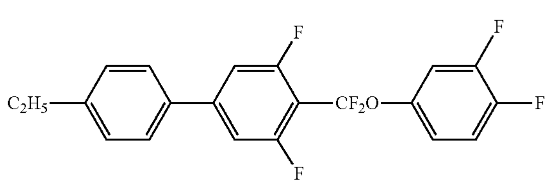

(27.2)

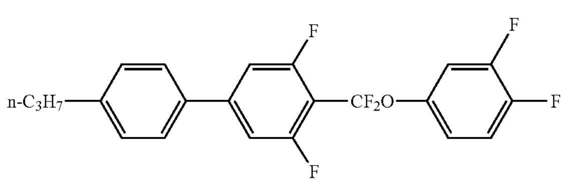

-continued (27.3)

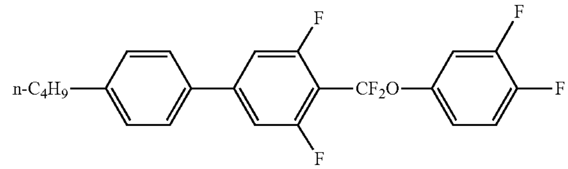

(27.4)

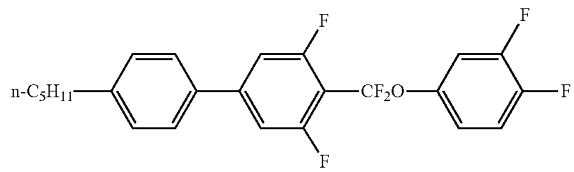

Alternatively or additionally, the compound represented by General Formula (VIII) is preferably any of compounds represented by General Formula (VIII-3).

[Chem. 150]

(VIII-3)

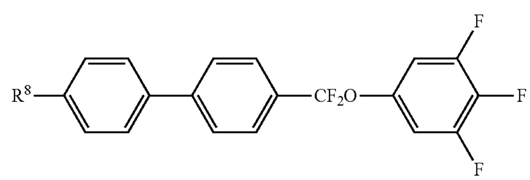

In General Formula (VIII-3), $R^8$ represents an alkyl group having 1 to 5 carbon atoms, an alkenyl group having 2 to 5 carbon atoms, or an alkoxy group having 1 to 4 carbon atoms.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two or more of the compounds are used.

In particular, the compound represented by General Formula (VIII-3) is preferably at least one compound selected from the group consisting of compounds represented by Formulae (26.11) to (26.14), more preferably the compound represented by Formula (26.11) and/or the compound represented by Formula (26.12), and further preferably the compound represented by Formula (26.12).

[Chem. 151]

(26.11)

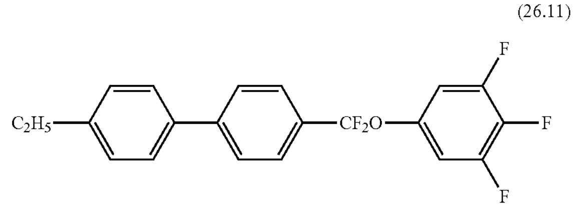

-continued (26.12)

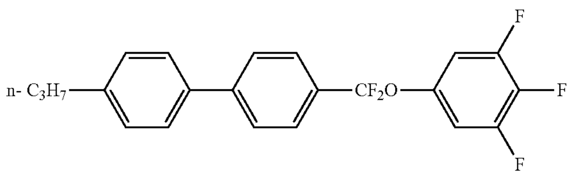

(26.13)

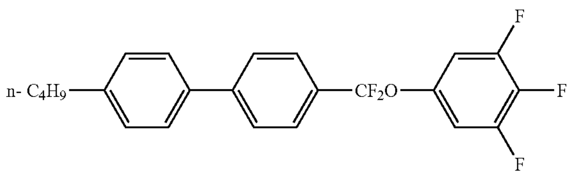

(26.14)

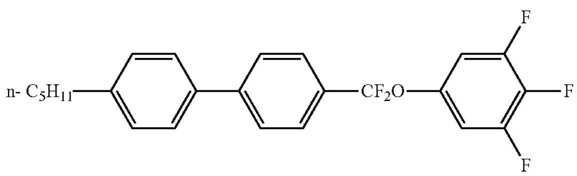

Alternatively or additionally, the compound represented by General Formula (VIII) is preferably any of compounds represented by General Formula (VIII-4).

[Chem. 152]

(VIII-4)

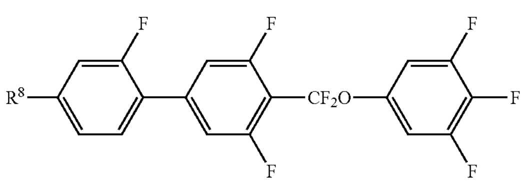

In General Formula (VIII-4), $R^8$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (VIII-4) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (VIII-4) is in the range of 1 to 25 mass % in an embodiment of the present invention; in another embodiment, the amount of the compound is from 2 to 25 mass %; in another embodiment, the amount of the compound is from 3 to 20 mass %; in another embodiment, the amount of the compound is from 3 to 13 mass %; in another embodiment, the amount of the compound is from 3 to 10 mass %; and in another embodiment, the amount of the compound is from 1 to 5 mass %.

In particular, the compound represented by General Formula (VIII-4), which is used in the liquid crystal composition of the present invention, is preferably at least one compound selected from the group consisting of compounds represented by Formulae (26.21) to (26.24), and more preferably the compound represented by Formula (26.24).

[Chem. 153]

(26.21)

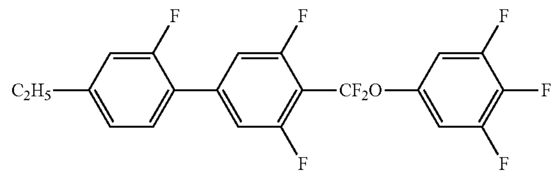

(26.22)

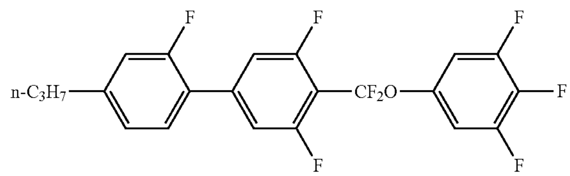

(26.23)

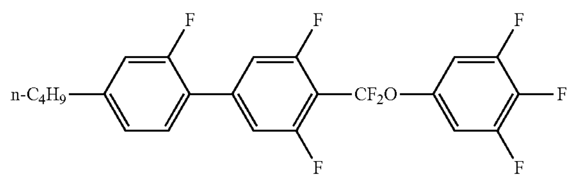

(26.24)

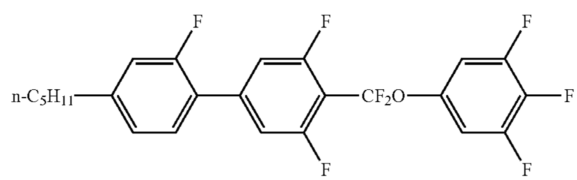

The compound represented by General Formula (M) is, for instance, preferably at least one compound selected from the group consisting of compounds represented by General Formula (IX).

[Chem. 154]

(IX)

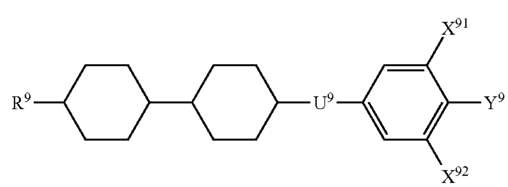

In General Formula (IX), $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; $Y^9$ represents a fluorine atom, a chlorine atom, or —$OCF_3$; and $U^9$ represents a single bond, —COO—, or —$CF_2O$—.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

In the liquid crystal composition of the present invention, the amount of the compound represented by General Formula (IX) needs to be appropriately adjusted on the basis of predetermined properties such as resistance to resolution at low temperature, transition temperature, electric reliability, birefringence, process adaptability, resistance to droplet stains and screen burn-in, and dielectric anisotropy.

Relative to the total mass of the liquid crystal composition of the present invention, for example, the amount of the compound represented by General Formula (IX) is in the range of 2 to 70 mass % in an embodiment of the present invention; in another embodiment of the present invention, the amount of the compound is from 5 to 70 mass %; in another embodiment of the present invention, the amount of the compound is from 8 to 70 mass %; in another embodiment of the present invention, the amount of the compound is from 10 to 70 mass %; in another embodiment of the present invention, the amount of the compound is from 12 to 70 mass %; in another embodiment of the present invention, the amount of the compound is from 15 to 70 mass %; in another embodiment of the present invention, the amount of the compound is from 17 to 70 mass %; in another embodiment of the present invention, the amount of the compound is from 20 to 70 mass %; in another embodiment of the present invention, the amount of the compound is from 24 to 70 mass %; in another embodiment of the present invention, the amount of the compound is from 28 to 70 mass %; in another embodiment of the present invention, the amount of the compound is from 30 to 70 mass %; in another embodiment of the present invention, the amount of the compound is from 34 to 70 mass %; in another embodiment of the present invention, the amount of the compound is from 39 to 70 mass %; in another embodiment of the present invention, the amount of the compound is from 40 to 70 mass %; in another embodiment of the present invention, the amount of the compound is from 42 to 70 mass %; and in another embodiment of the present invention, the amount of the compound is from 45 to 70 mass %.

Furthermore, relative to the total mass of the liquid crystal composition of the present invention, for example, the amount of such a compound is in the range of 3 to 60 mass % in an embodiment of the present invention; in another embodiment of the present invention, the amount of the compound is from 3 to 55 mass %; in another embodiment of the present invention, the amount of the compound is from 3 to 50 mass %; in another embodiment of the present invention, the amount of the compound is from 3 to 45 mass %; in another embodiment of the present invention, the amount of the compound is from 3 to 40 mass %; in another embodiment of the present invention, the amount of the compound is from 3 to 35 mass %; in another embodiment of the present invention, the amount of the compound is from 3 to 30 mass %; in another embodiment of the present invention, the amount of the compound is 25 mass %; in another embodiment of the present invention, the amount of the compound is from 3 to 20 mass %; in another embodiment of the present invention, the amount of the compound is from 3 to 15 mass %; and in another embodiment of the present invention, the amount of the compound is from 3 to 10 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the Tni of the liquid crystal composition of the present invention needs to be kept at a high level for allowing the liquid crystal composition to serve for a reduction in screen burn-in, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

The compound represented by General Formula (IX) is preferably any of compounds represented by General Formula (IX-1).

[Chem. 155]

(IX-1)

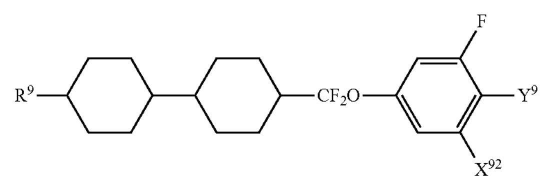

In General Formula (IX-1), $R^9$ represents an alkyl group having 1 to 5 carbon atoms, an alkenyl group having 2 to 5 carbon atoms, or an alkoxy group having 1 to 4 carbon atoms; $X^{92}$ represents a hydrogen atom or a fluorine atom; and $Y^9$ represents a fluorine atom or —$OCF_3$.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four or more of the compounds are used.

The compound represented by General Formula (IX-1) is preferably any of compounds represented by General Formula (IX-1-1).

[Chem. 156]

(IX-1-1)

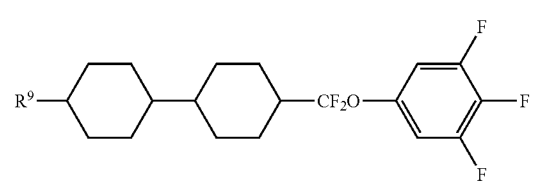

In General Formula (IX-1-1), $R^9$ represents an alkyl group having 1 to 5 carbon atoms, an alkenyl group having 2 to 5 carbon atoms, or an alkoxy group having 1 to 4 carbon atoms.

Such compounds can be used in any combination; a combination of the compounds is properly determined on the basis of desired properties such as resistance to resolution at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (IX-1-1) is adjusted to be appropriate for an embodiment in view of resistance to resolution at low temperature, transition temperature, electric reliability, birefringence, and another property.

Relative to the total mass of the liquid crystal composition of the present invention, for example, the amount of the compound represented by General Formula (IX-1-1) is in the range of 1 to 15 mass % in an embodiment of the present invention; in another embodiment of the present invention, the amount of the compound is from 1 to 10 mass %; in another embodiment of the present invention, the amount of the compound is from 1 to 9 mass %; in another embodiment of the present invention, the amount of the compound is from 1 to 8 mass; and in another embodiment of the present invention, the amount of the compound is from 1 to 3 mass %.

Moreover, relative to the total mass of the liquid crystal composition of the present invention, for example, the amount of the compound represented by General Formula (IX-1-1) is in the range of 2 to 17 mass % in an embodiment of the present invention; in another embodiment of the present invention, the amount of the compound is from 3 to 10 mass %; in another embodiment of the present invention, the amount of the compound is from 5 to 10 mass %; in another embodiment of the present invention, the amount of the compound is from 6 to 10 mass %; in another embodiment of the present invention, the amount of the compound is from 7 to 10 mass %; in another embodiment of the present invention, the amount of the compound is from 3 to 8 mass %; in another embodiment of the present invention, the amount of the compound is from 5 to 8 mass %; and in another embodiment of the present invention, the amount of the compound is from 6 to 9 mass %.

The compound represented by General Formula (IX-1-1) is preferably at least one compound selected from the group consisting of compounds represented by Formulae (28.1) to (28.5), and more preferably the compound represented by Formula (28.5).

[Chem. 157]

(28.1)

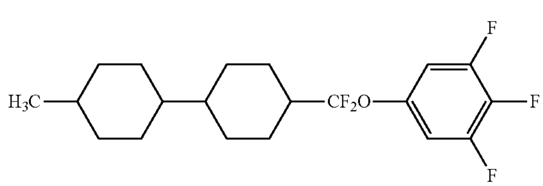

-continued (28.2)

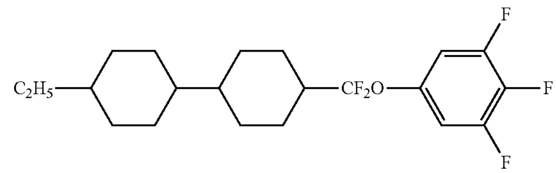

(28.3)

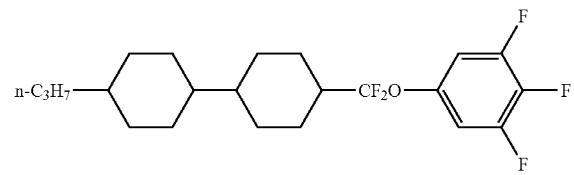

(28.4)

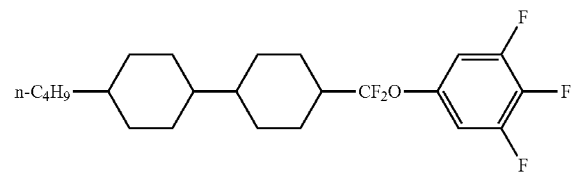

(28.5)

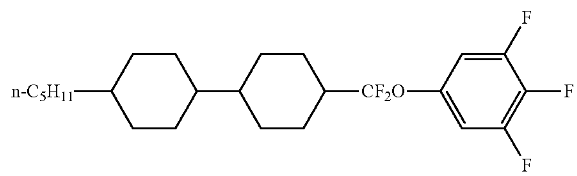

The amount of the compound represented by Formula (28.3) in the liquid crystal composition is not particularly limited. The amount thereof is preferably not less than 1 mass %, also preferably not less than 3 mass %, also preferably not less than 5 mass %, also preferably not less than 7 mass %, also preferably not less than 10 mass %, also preferably not less than 14 mass %, and also preferably not less than 16 mass % relative to the total mass of the liquid crystal composition. The amount of the compound represented by Formula (i) in the liquid crystal composition is also preferably not more than 30 mass %, also preferably not more than 25 mass %, also preferably not more than 22 mass %, also preferably not more than 20 mass %, also preferably not more than 19 mass %, also preferably not more than 15 mass %, also preferably not more than 12 mass %, also preferably not more than 10 mass %, also preferably not more than 8 mass %, and also preferably less than 5 mass % relative to the total mass of the liquid crystal composition in view of resistance to resolution at low temperature, nematic phase-isotropic liquid phase transition temperature, electric reliability, and another property. In particular, the amount of the compound represented by Formula (28.3) in the liquid crystal composition is preferably in the range of 1 to 30 mass %, also preferably 1 to 25 mass %, also preferably 1 to 19 mass %, also preferably 1 to 8 mass %, also preferably 2 to 6 mass %, also preferably 3 to 8 mass %, also preferably 5 to 15 mass %, also preferably 5 to 11 mass %, also preferably 7 to 12 mass %, also preferably 7 to 20 mass %, also preferably 7 to 18 mass %, and also preferably 11 to 16 mass % relative to the total mass of the liquid crystal composition of the present invention.

The compound represented by Formula (28.3) is preferably used in the case where the liquid crystal composition contains three compounds represented by General Formula (i), and the amount thereof is preferably from 15 to 25%, more preferably 15 to 20%, and further preferably 15 to 18%.

In the liquid crystal composition of the present invention, the amount of the compound represented by Formula (28.5) is preferably in the range of 1 mass % to 25 mass %, more preferably 1 mass % to 20 mass %, further preferably 1 mass % to 15 mass %, and especially preferably 1 mass % to 10 mass % relative to the total mass of the liquid crystal composition of the present invention in view of resistance to resolution at low temperature, transition temperature, electric reliability, and another property. Among these, particularly preferred ranges are as follows: from 2 mass % to 10 mass %, from 3 mass % to 10 mass %, from 5 mass % to 10 mass %, from 6 mass % to 10 mass %, from 7 mass % to 10 mass %, from 1 mass % to 10 mass %, from 1 mass % to 10 mass %, from 1 mass % to 9 mass %, from 1 mass % to 8 mass %, from 1 mass % to 3 mass %, from 3 mass % to 8 mass %, from 5 mass % to 8 mass %, and from 6 mass % to 9 mass %.

The compound represented by Formula (28.5) is particularly preferably used in the case where the liquid crystal composition contains one compound represented by General Formula (i), and the amount thereof is preferably in the range of 1 to 20%, more preferably 1 to 15%, further preferably 1 to 10%, and especially preferably 2 to 5%.

Alternatively or additionally, the compound represented by General Formula (IX-1) is preferably any of compounds represented by General Formula (IX-1-2).

[Chem. 158]

(IX-1-2)

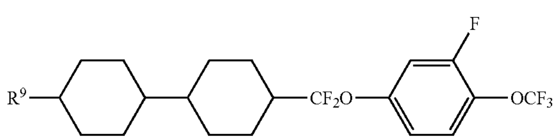

In General Formula (IX-1-2), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, one to three of the compounds are preferably used, and one to four of the compounds are more preferably used.

The amount of the compound represented by General Formula (IX-1-2) is preferably in the range of 1 mass % to 30 mass %, also preferably 5 mass % to 30 mass %, also preferably 8 mass % to 30 mass %, also preferably 10 mass % to 25 mass %, also preferably 14 mass % to 22 mass %, and also preferably 16 mass % to 20 mass % relative to the total mass of the liquid crystal composition of the present invention in view of resistance to resolution at low temperature, transition temperature, electric reliability, and another property.

The compound represented by General Formula (IX-1-2) is preferably at least one compound selected from the group consisting of compounds represented by Formulae (29.1) to (29.4), and more preferably the compound represented by Formula (29.2) and/or the compound represented by Formula (29.4).

[Chem. 159]

(29.1)

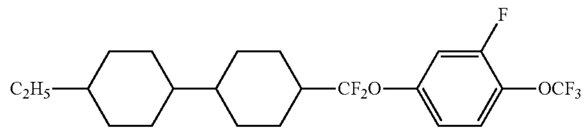

(29.2)

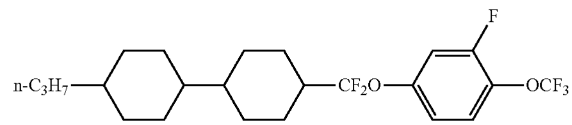

(29.3)

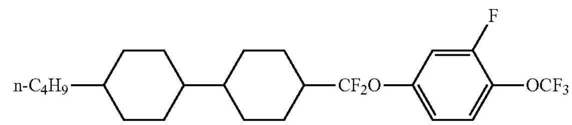

(29.4)

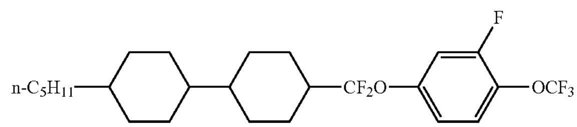

Alternatively or additionally, the compound represented by General Formula (IX) is preferably any of compounds represented by General Formula (IX-2).

[Chem. 160]

(IX-2)

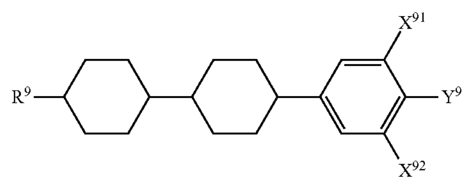

In General Formula (IX-2), $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; and $Y^9$ represents a fluorine atom, a chlorine atom, or —$OCF_3$.

Such compounds can be used in any combination; a proper combination of the compounds for an embodiment is determined in view of resistance to resolution at low temperature, transition temperature, electric reliability, birefringence, and another property. For example, one of such compounds is used in an embodiment of the present invention; two of the compounds are used in another embodiment, three of the compounds are used in another embodiment, four of the compounds are used in another embodiment, five of the compounds are used in another embodiment, and six or more of the compounds are used in another embodiment.

The compound represented by General Formula (IX-2) is preferably any of compounds represented by General Formula (IX-2-1).

[Chem. 161]

(IX-2-1)

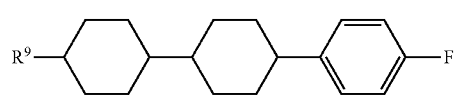

In General Formula (IX-2-1), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, one to three of the compounds are preferably used.

The amount of the compound represented by General Formula (IX-2-1) is appropriately adjusted on the basis of properties such as resistance to resolution at low temperature, transition temperature, electric reliability, and birefringence.

Relative to the total mass of the liquid crystal composition of the present invention, for instance, the amount of the compound represented by General Formula (IX-2-1) is in the range of 1 to 40 mass % in an embodiment of the present invention; in another embodiment, the amount of the compound is from 2 to 40 mass %; in another embodiment, the amount of the compound is from 4 to 40 mass %; in another embodiment, the amount of the compound is from 10 to 40 mass %; in another embodiment, the amount of the compound is from 14 to 40 mass %; in another embodiment, the amount of the compound is from 16 to 40 mass %; and in another embodiment, the amount of the compound is from 21 to 40 mass %.

Furthermore, relative to the total mass of the liquid crystal composition of the present invention, for instance, the amount of the compound represented by General Formula (IX-2-1) is in the range of 1 to 30 mass % in an embodiment of the present invention; in another embodiment, the amount is from 1 to 25 mass %; in another embodiment, the amount is from 1 to 22 mass %; in another embodiment, the amount is from 1 to 20 mass %; in another embodiment, the amount is from 1 to 10 mass %; in another embodiment, the amount is from 1 to 7 mass %; and in another embodiment, the amount is from 1 to 5 mass %.

The compound represented by General Formula (IX-2-1) is preferably at least one compound selected from the group consisting of compounds represented by Formulae (30.1) to (30.4), and more preferably the compound represented by Formula (30.1) and/or the compound represented by Formula (30.2).

[Chem. 162]

(30.1)

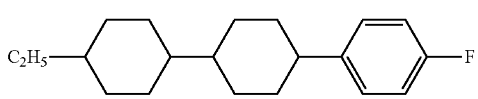

(30.2)

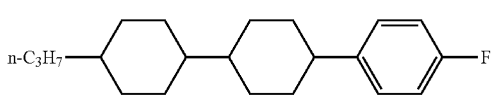

(30.3)

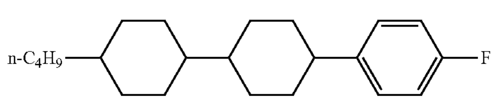

(30.4)

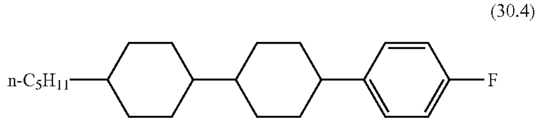

Alternatively or additionally, the compound represented by General Formula (IX-2) is preferably any of compounds represented by General Formula (IX-2-2).

[Chem. 163]

(IX-2-2)

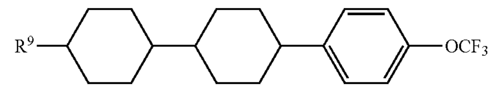

In General Formula (IX-2-2), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, one to three of the compounds are preferably used, and one to four of the compounds are more preferably used.

The amount of the compound represented by General Formula (IX-2-2) is adjusted to be appropriate for an embodiment in view of properties such as resistance to resolution at low temperature, transition temperature, electric reliability, and birefringence.

Relative to the total mass of the liquid crystal composition of the present invention, for example, the amount of the compound represented by General Formula (IX-2-2) is in the range of 1 to 30 mass % in an embodiment of the present invention; in another embodiment, the amount is from 1 to 25 mass %; in another embodiment, the amount is from 1 to 20 mass %; in another embodiment, the amount is from 1 to 15 mass %; in another embodiment, the amount is from 1 to 11 mass %; in another embodiment, the amount is from 1 to 10 mass %; in another embodiment, the amount is from 1 to 9 mass %; in another embodiment, the amount is from 1 to 8 mass %; in another embodiment, the amount is from 2 to 9 mass %; in another embodiment, the amount is from 7 to 10 mass %; in another embodiment, the amount is from 5 to 8 mass %; in another embodiment, the amount is from 8 to 11 mass %; and in another embodiment, the amount is from 3 to 12 mass %.

The compound represented by General Formula (IX-2-2) is preferably at least one compound selected from the group consisting of compounds represented by Formulae (31.1) to (31.4), more preferably at least one compound selected from the group consisting of the compounds represented by Formulae (31.2) to (31.4), and further preferably the compound represented by Formula (31.2).

[Chem. 164]

(31.1)

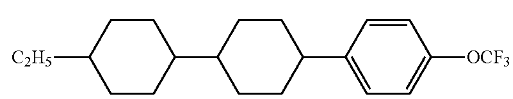

(31.2)

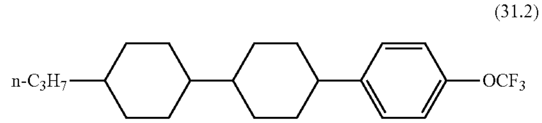

-continued (31.3)

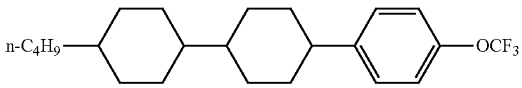

(31.4)

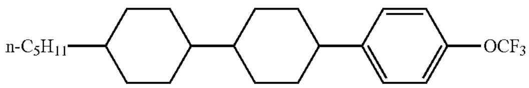

In the liquid crystal composition of the present invention, the amount of the compound represented by Formula (31.2) is preferably in the range of 1 mass % to 30 mass %, also preferably 1 mass % to 25 mass %, also preferably 1 mass % to 20 mass %, and also preferably 1 mass % to 15 mass % relative to the total mass of the liquid crystal composition of the present invention. In particular, examples of the preferred range are as follows: from 1 mass % to 14 mass %, from 2 mass % to 9 mass %, from 4 mass % to 10 mass %, from 5 mass % to 8 mass %, and from 8 mass % to 11 mass %.

In the liquid crystal composition of the present invention, the amount of the compound represented by Formula (31.4) is preferably in the range of 1 mass % to 20 mass %, also preferably 1 mass % to 15 mass %, also preferably 1 mass % to 5 mass %, and also preferably 2 mass % to 5 mass % relative to the total mass of the liquid crystal composition of the present invention.

The compound represented by Formula (31.4) is preferably used in the case where the liquid crystal composition contains two compounds represented by General Formula (1), and the amount thereof is preferably in the range of 1 to 10%, and more preferably 1 to 5%.

Both the compound represented by Formula (31.2) and the compound represented by Formula (31.4) are preferably used in the case where the liquid crystal composition contains three compounds represented by General Formula (i), and the total amount thereof is preferably in the range of 1 to 15%, and more preferably 3 to 10%.

Alternatively or additionally, the compound represented by General Formula (IX-2) is preferably any of compounds represented by General Formula (IX-2-3).

[Chem. 165]

(IX-2-3)

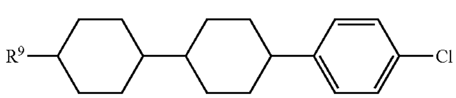

In General Formula (IX-2-3), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, one or two of the compounds are preferably used.

The amount of the compound represented by General Formula (IX-2-3) is preferably in the range of 1 mass % to 30 mass %, more preferably 3 mass % to 20 mass %, further preferably 6 mass % to 15 mass %, and further preferably 8 mass % to 10 mass % relative to the total mass of the liquid crystal composition of the present invention in view of resistance to resolution at low temperature, transition temperature, electric reliability, and another property.

The compound represented by General Formula (IX-2-3) is preferably at least one compound selected from the group consisting of compounds represented by Formulae (32.1) to (32.4), and more preferably the compound represented by Formula (32.2) and/or the compound represented by Formula (32.4).

[Chem. 166]

(32.1)

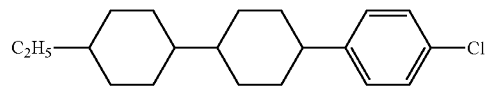

(32.2)

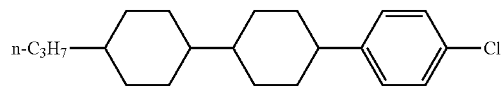

(32.3)

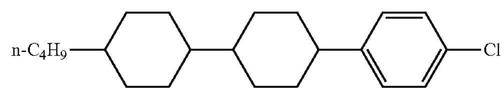

(32.4)

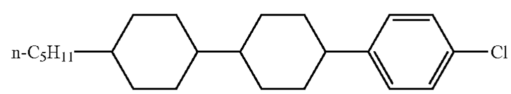

Alternatively or additionally, the compound represented by General Formula (IX-2) is preferably a compound represented by General Formula (IX-2-4).

[Chem. 167]

(IX-2-4)

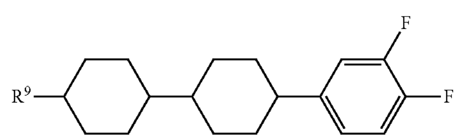

In General Formula (IX-2-4), $R^9$ represents an alkyl group having 1 to 5 carbon atoms, an alkenyl group having 2 to 5 carbon atoms, or an alkoxy group having 1 to 4 carbon atoms.

The amount of the compound represented by General Formula (IX-2-4) is preferably in the range of 1 mass % to 30 mass %, more preferably 3 mass % to 20 mass %, further preferably 6 mass % to 15 mass %, and especially preferably 8 mass % to 10 mass % relative to the total mass of the liquid crystal composition of the present invention in view of resistance to resolution at low temperature, transition temperature, electric reliability, and another property.

The compound represented by General Formula (IX-2-4) is preferably at least one compound selected from the group consisting of compounds represented by Formulae (33.1) to (33.6), and more preferably the compound represented by Formula (33.1) and/or the compound represented by Formula (33.3).

[Chem. 168]

(33.1)

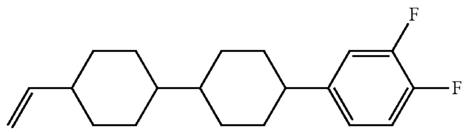

(33.2)

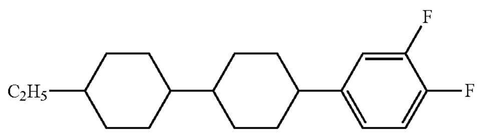

(33.3)

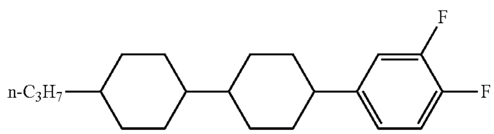

(33.4)

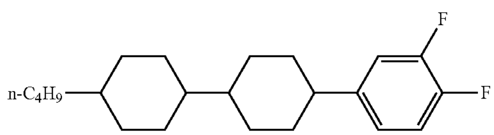

(33.5)

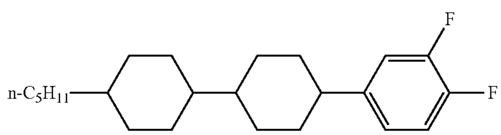

(33.6)

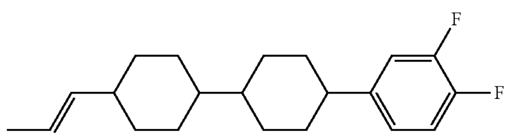

Alternatively or additionally, the compound represented by General Formula (IX-2) is preferably any of compounds represented by General Formula (IX-2-5).

[Chem. 169]

(IX-2-5)

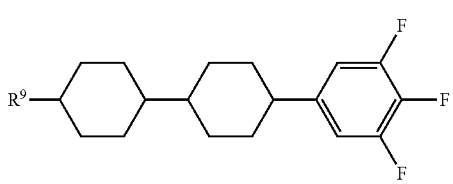

In General Formula (IX-2-5), $R^9$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment is determined in view of resistance to resolution at low temperature, transition temperature, electric reliability, birefringence, and another property. For example, one of such compounds is used in an embodiment of the present invention, two of the compounds are used in another embodiment, three of the compounds are used in another embodiment, and four or more of the compounds are used in another embodiment.

The amount of the compound represented by General Formula (IX-2-5) is adjusted to be appropriate for an embodiment in view of properties such as resistance to resolution at low temperature, transition temperature, electric reliability, and birefringence.

Relative to the total mass of the liquid crystal composition of the present invention, for example, the amount of the compound represented by General Formula (IX-2-5) is in the range of 1 to 30 mass % in an embodiment of the present invention; in another embodiment, the amount is from 2 to 25 mass %; in another embodiment, the amount is from 5 to 25 mass %; in another embodiment, the amount is from 5 to 20 mass; in another embodiment, the amount is from 5 to 8 mass %; in another embodiment, the amount is from 8 to 20 mass %; in another embodiment, the amount is from 1 to 10 mass %; and in another embodiment, the amount is from 1 to 4 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the Tni of the liquid crystal composition of the present invention needs to be kept at a high level for allowing the liquid crystal composition to serve for a reduction in screen-burn in, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

The compound represented by General Formula (IX-2-5) is preferably at least one compound selected from the group consisting of compounds represented by Formulae (34.1) to (34.7); and more preferably the compound represented by Formula (34.1), the compound represented by Formula (34.2), the compound represented by Formula (34.3), and/or the compound represented by Formula (34.5).

[Chem. 170]

(34.1)

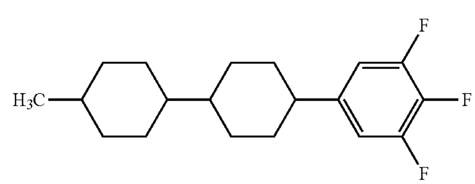

(34.2)

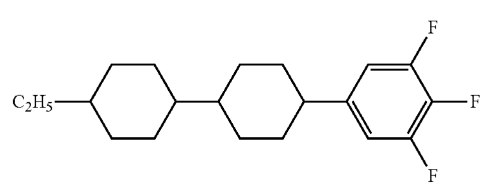

-continued (34.3)

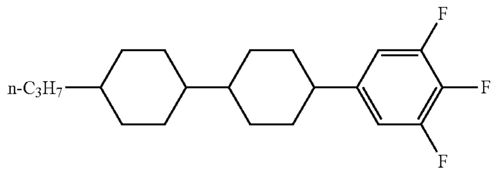

(34.4)

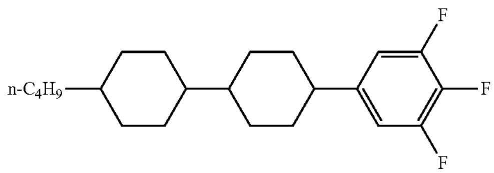

(34.5)

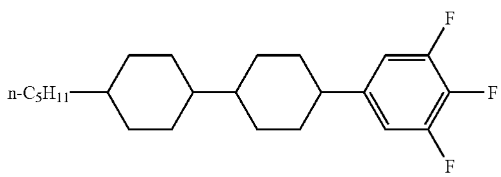

(34.6)

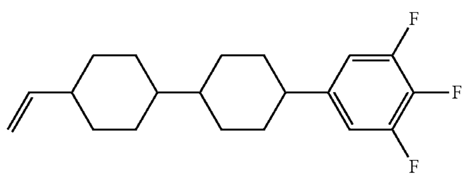

(34.7)

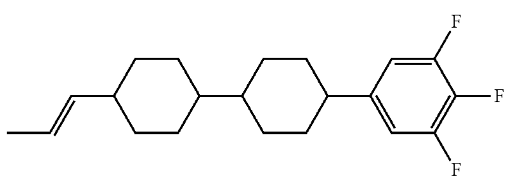

Alternatively or additionally, the compound represented by General Formula (IX) is preferably a compound represented by General Formula (IX-3).

[Chem. 171]

(IX-3)

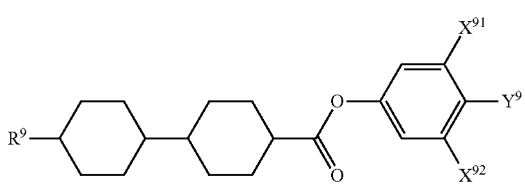

In General Formula (IX-3), $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; and $Y^9$ represents a fluorine atom, a chlorine atom, or —$OCF_3$.

The compound represented by General Formula (IX-3) is preferably any of compounds represented by General Formula (IX-3-1).

[Chem. 172]

(IX-3-1)

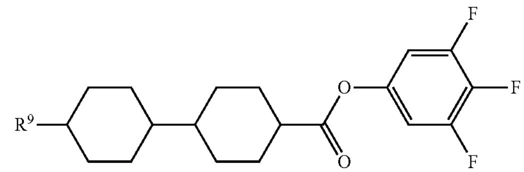

In General Formula (IX-3-1), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, one or two of the compounds are preferably used.

The amount of the compound represented by General Formula (IX-3-1) is preferably in the range of 3 mass % to 30 mass %, also preferably 7 mass % to 30 mass %, also preferably 13 mass % to 20 mass %, and also preferably 15 mass % to 18 mass % relative to the total mass of the liquid crystal composition of the present invention in view of resistance to resolution at low temperature, transition temperature, electric reliability, and another property.

The compound represented by General Formula (IX-3-1) is preferably at least one compound selected from the group consisting of compounds represented by Formulae (35.1) to (35.4), and more preferably the compound represented by Formula (35.1) and/or the compound represented by Formula (35.2).

[Chem. 173]

(35.1)

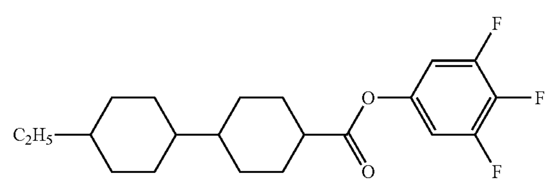

(35.2)

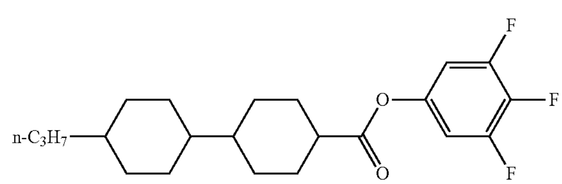

(35.3)

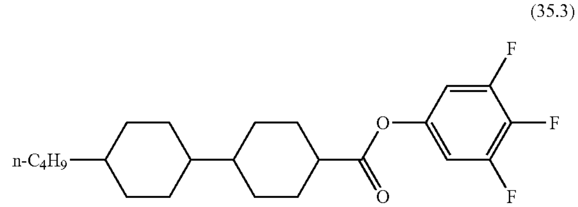

-continued (35.4)

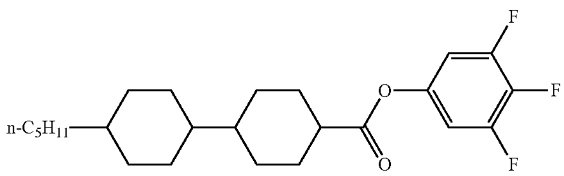

Alternatively or additionally, the compound represented by General Formula (IX) is preferably a compound represented by General Formula (IX-4).

[Chem. 174]

(IX-4)

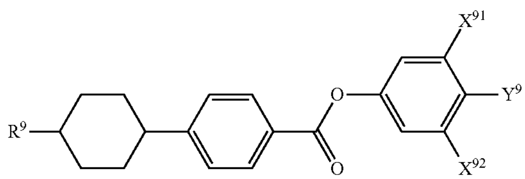

In General Formula (IX-4), $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; and $Y^9$ represents a fluorine atom, a chlorine atom, or —$OCF_3$.

The compound represented by General Formula (IX-4) is preferably any of compounds represented by General Formula

[Chem. 175]

(IX-4-1)

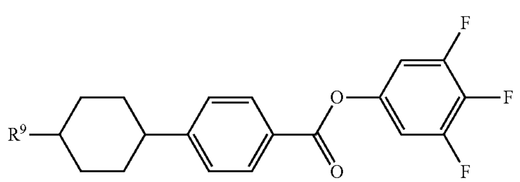

In General Formula (IX-4-1), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, one or two of the compounds are preferably used.

The amount of the compound represented by General Formula (IX-4-1) is preferably in the range of 1 mass % to 16 mass %, also preferably 2 mass % to 13 mass %, and also preferably 3 mass % to 10 mass % relative to the total mass of the liquid crystal composition of the present invention in view of resistance to resolution at low temperature, transition temperature, electric reliability, and another property.

The compound represented by General Formula (IX-4-1) is preferably at least one compound selected from the group consisting of compounds represented by Formulae (35.11) to (35.14), and more preferably the compound represented by Formula (35.11) and/or the compound represented by Formula (35.12).

[Chem. 176]

(35.11)

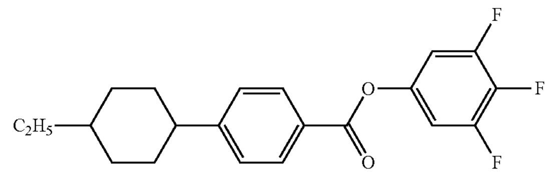

(35.12)

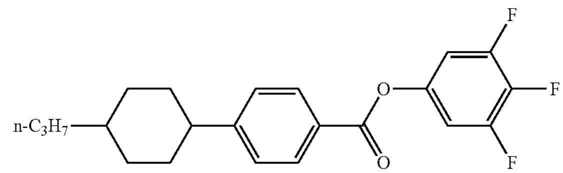

(35.13)

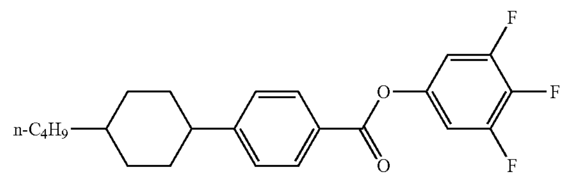

(35.14)

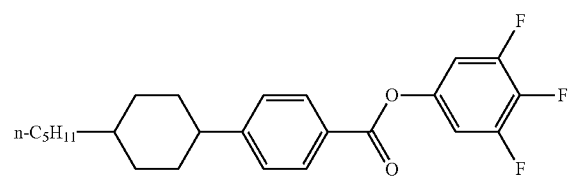

Alternatively or additionally, the compound represented by General Formula (M) is preferably any of compounds represented by General Formula (X).

[Chem. 177]

(X)

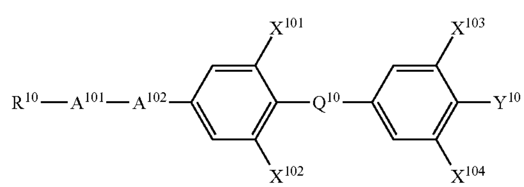

In General Formula (X), $X^{101}$ to $X^{104}$ each independently represent a fluorine atom or a hydrogen atom; $Y^{10}$ represents a fluorine atom, a chlorine atom, or —$OCF_3$; $Q^{10}$ represents a single bond or —$CF_2O$—; $R^{10}$ represents an alkyl group having 1 to 5 carbon atoms, an alkenyl group having 2 to 5 carbon atoms, or an alkoxy group having 1 to 4 carbon atoms; and $A^{101}$ and $A^{102}$ each independently represent a 1,4-cyclohexylene group, a 1,4-phenylene group, or any one of groups represented by the following formulae, and a hydrogen atom of the 1,4-phenylene group is optionally substituted with a fluorine atom.

[Chem. 178]

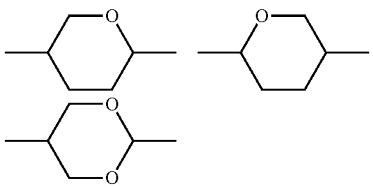

Such compounds can be used in any combination; a combination of the compounds is properly determined in view of resistance to resolution at low temperature, transition temperature, electric reliability, birefringence, and another property. For instance, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The amount of the compound represented by General Formula (X) is adjusted to be appropriate for an embodiment in view of properties such as resistance to resolution at low temperature, transition temperature, electric reliability, and birefringence. Relative to the total mass of the liquid crystal composition of the present invention, for example, the amount of the compound represented by General Formula (X) is in the range of 2 to 45 mass % in an embodiment of the present invention; in another embodiment, the amount is from 3 to 45 mass %; in another embodiment, the amount is from 6 to 45 mass %; in another embodiment, the amount is from 8 to 45 mass %; in another embodiment, the amount is from 9 to 45 mass %; in another embodiment, the amount is from 11 to 45 mass %; in another embodiment, the amount is from 12 to 45 mass %; in another embodiment, the amount is from 18 to 45 mass %; in another embodiment, the amount is from 19 to 45 mass %; in another embodiment, the amount is from 23 to 45 mass %; and in another embodiment, the amount is from 25 to 45.

Furthermore, relative to the total mass of the liquid crystal composition of the present invention, for example, the amount of the compound represented by General Formula (X) is in the range of 2 to 35 mass % in an embodiment of the present invention; in another embodiment, the amount is from 2 to 30 mass %; in another embodiment, the amount is from 2 to 25 mass %; in another embodiment, the amount is from 2 to 20 mass; in another embodiment, the amount is from 2 to 13 mass %; in another embodiment, the amount is from 2 to 9 mass %; in another embodiment, the amount is from 2 to 6 mass %; and in another embodiment, the amount is from 2 to 3 mass %.

In the case where the viscosity of the liquid crystal composition of the present invention needs to be kept at a low level for allowing the liquid crystal composition to contribute to a high response speed, it is preferred that the lower limit of the above-mentioned range be low and that the upper limit thereof be low. In the case where the liquid crystal composition needs to serve for a reduction in screen burn-in, it is preferred that the lower limit of the above-mentioned range be low and that the upper limit thereof be low. In order to increase dielectric anisotropy for keeping driving voltage at a low level, it is preferred that the lower limit of the above-mentioned range be high and that the upper limit thereof be high.

The compound represented by General Formula (X), which is used in the liquid crystal composition of the present invention, is preferably any of compounds represented by General Formula (X-1).

[Chem. 179]

(X-1)

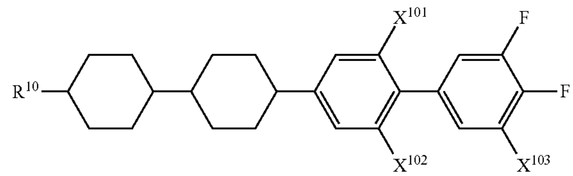

In General Formula (X-1), $X^{101}$ to $X^{103}$ each independently represent a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment is determined in view of resistance to resolution at low temperature, transition temperature, electric reliability, birefringence, and another property. For example, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The amount of the compound represented by General Formula (X-1) is appropriately adjusted in consideration of properties such as resistance to resolution at low temperature, transition temperature, electric reliability, and birefringence.

Relative to the total mass of the liquid crystal composition of the present invention, for example, the amount of the compound represented by General Formula (X-1) is in the range of 2 to 40 mass % in an embodiment of the present invention; in another embodiment, the amount is from 3 to 40 mass %; in another embodiment, the amount is from 5 to 40 mass %; in another embodiment, the amount is from 6 to 40 mass %; in another embodiment, the amount is from 7 to 40 mass %; in another embodiment, the amount is from 8 to 40 mass %; in another embodiment, the amount is from 9 to 40 mass %; in another embodiment, the amount is from 13 to 40 mass %; in another embodiment, the amount is from 18 to 40 mass %; and in another embodiment, the amount is from 23 to 40 mass %.

Furthermore, relative to the total mass of the liquid crystal composition of the present invention, for example, the amount of the compound represented by General Formula (X-1) is in the range of 2 to 30 mass % in an embodiment of the present invention; in another embodiment, the amount is from 2 to 25 mass %; in another embodiment, the amount is from 2 to 20 mass %; in another embodiment, the amount is from 2 to 15 mass %; in another embodiment, the amount is from 2 to 10 mass %; in another embodiment, the amount is from 2 to 6 mass %; and in another embodiment, the amount is from 2 to 4 mass %.

The compound represented by General Formula (X-1), which is used in the liquid crystal composition of the present invention, is preferably any of compounds represented by General Formula (X-1-1).

[Chem. 180]

(X-1-1)

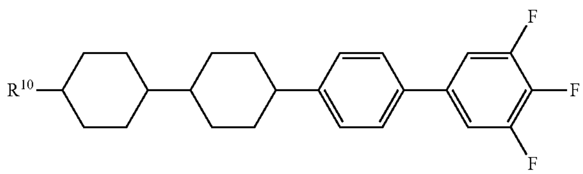

In General Formula (X-1-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; a combination of the compounds is properly determined in view of resistance to resolution at low temperature, transition temperature, electric reliability, birefringence, and another property. For instance, one of such compounds is used in an embodiment of the present invention, two of the compounds are used in another embodiment of the present invention, three of the compounds are used in another embodiment, and four or more of the compounds are used in another embodiment.

The amount of the compound represented by General Formula (X-1-1) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (X-1-1) is in the range of 3 to 30 mass % in an embodiment of the present invention; in another embodiment, the amount is from 4 to 30 mass %; in another embodiment, the amount is from 6 to 30 mass %; in another embodiment, the amount is from 9 to 30 mass %; in another embodiment, the amount is from 12 to 30 mass %; in another embodiment, the amount is from 15 to 30 mass %; in another embodiment, the amount is from 18 to 30 mass %; and in another embodiment, the amount is from 21 to 30 mass %.

Moreover, relative to the total mass of the liquid crystal composition of the present invention, for example, the amount of the compound represented by General Formula (X-1-1) is in the range of 3 to 20 mass % in an embodiment of the present invention; in another embodiment, the amount is from 3 to 13 mass %; in another embodiment, the amount is from 3 to 10 mass %; and in another embodiment, the amount is from 3 to 7 mass %.

In particular, the compound represented by General Formula (X-1-1), which is used in the liquid crystal composition of the present invention, is preferably at least one compound selected from the group consisting of compounds represented by Formulae (36.1) to (36.4), and more preferably the compound represented by Formula (36.1) and/or the compound represented by Formula (36.2).

[Chem. 181]

(36.1)

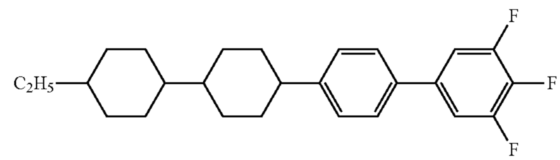

(36.2)

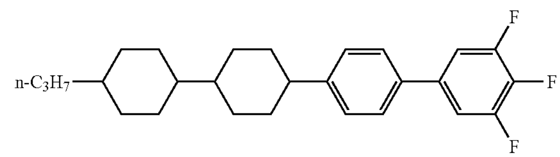

(36.3)

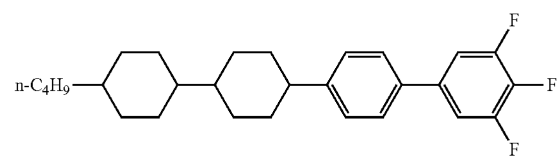

(36.4)

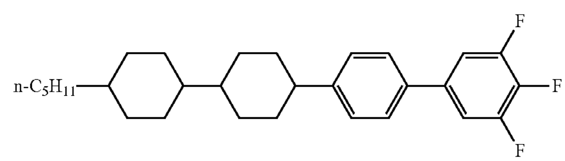

Alternatively or additionally, the compound represented by General Formula (X-1), which is used in the liquid crystal composition of the present invention, is preferably a compound represented by General Formula (X-1-2).

[Chem. 182]

(X-1-2)

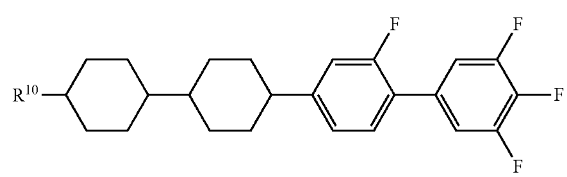

In General Formula (X-1-2), $R^{10}$ represents an alkyl group having 1 to 5 carbon atoms, an alkenyl group having 2 to 5 carbon atoms, or an alkoxy group having 1 to 4 carbon atoms.

The amount of the compound represented by General Formula (X-1-2) is appropriately adjusted on the basis of resistance to resolution at low temperature, transition temperature, electric reliability, and another property.

Relative to the total mass of the liquid crystal composition of the present invention, for example, the amount of the compound represented by General Formula (X-1-2) is in the range of 1 to 20 mass % in an embodiment of the present invention; in another embodiment, the amount is from 1 to 15 mass %; in another embodiment, the amount is from 1 to 10 mass %; in another embodiment, the amount is from 1 to 6 mass %; in another embodiment, the amount is from 1 to 4 mass %; and in another embodiment, the amount is from 1 to 3 mass %.

Furthermore, relative to the total mass of the liquid crystal composition of the present invention, for instance, the amount of the compound represented by General Formula (X-1-2) is in the range of 3 to 10 mass % in an embodiment of the present invention; in another embodiment, the amount is from 4 to 10 mass %; and in another embodiment, the amount is from 6 to 10 mass %.

In particular, the compound represented by General Formula (X-1-2), which is used in the liquid crystal composition of the present invention, is preferably at least one compound selected from the group consisting of compounds represented by Formulae (37.1) to (37.4), and more preferably the compound represented by Formula (37.2).

[Chem. 183]

(37.1)

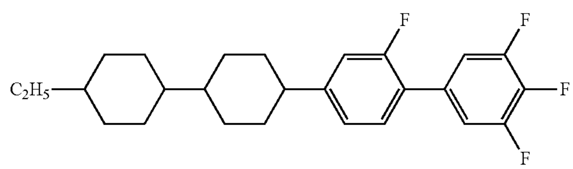

(37.2)

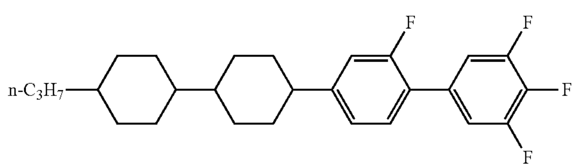

(37.3)

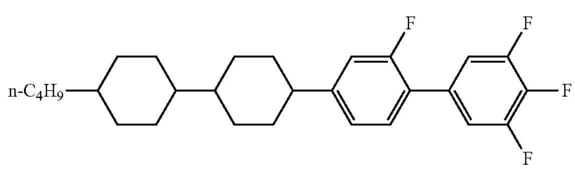

(37.4)

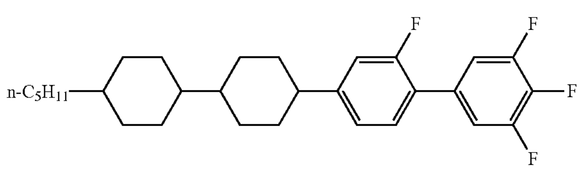

Alternatively or additionally, the compound represented by General Formula (X-1), which is used in the liquid crystal composition of the present invention, is preferably any of compounds represented by General Formula (X-1-3).

[Chem. 184]

(X-1-3)

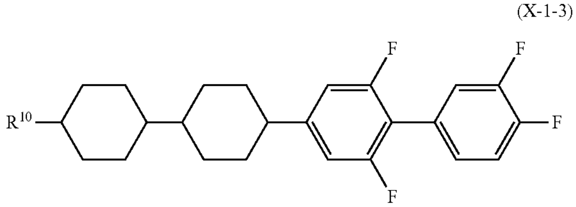

In General Formula (X-1-3), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (X-1-3) is appropriately adjusted in consideration of resistance to resolution at low temperature, transition temperature, electric reliability, and another property.

Relative to the total mass of the liquid crystal composition of the present invention, for example, the amount of the compound represented by General Formula (X-1-3) is in the range of 1 to 20 mass % in an embodiment of the present invention; in another embodiment, the amount is from 1 to 15 mass %; in another embodiment, the amount is from 1 to 10 mass %; in another embodiment, the amount is from 1 to 8 mass %; and in another embodiment, the amount is from 1 to 5 mass %.

Moreover, relative to the total mass of the liquid crystal composition of the present invention, for instance, the amount of the compound represented by General Formula (X-1-3) is in the range of 3 to 20 mass % in an embodiment of the present invention; in another embodiment, the amount is from 5 to 20 mass %; and in another embodiment, the amount is from 5 to 15 mass %.

In particular, the compound represented by General Formula (X-1-3), which is used in the liquid crystal composition of the present invention, is preferably at least one compound selected from the group consisting of compounds represented by Formulae (38.1) to (38.4), and more preferably the compound represented by Formula (38.2).

[Chem. 185]

(38.1)

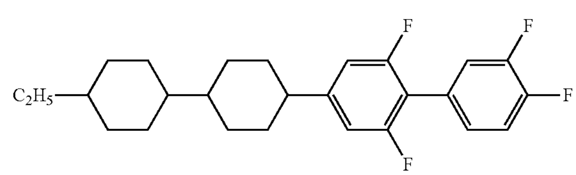

(38.2)

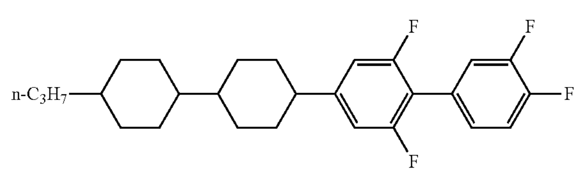

(38.3)

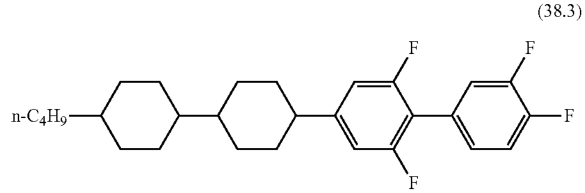

-continued (38.4)

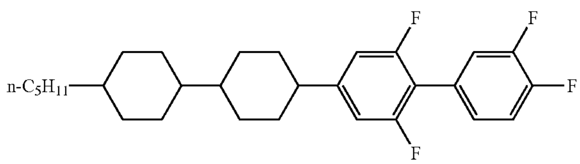

In the liquid crystal composition of the present invention, the amount of the compound represented by Formula (38.2) is preferably in the range of 1 mass % to 20 mass %, also preferably 1 mass % to 15 mass %, also preferably 1 mass % to 10 mass %, also preferably 1 mass % to 8 mass %, also preferably 3 mass % to 6 mass %, and also preferably 4 mass % to 6 mass % relative to the total mass of the liquid crystal composition of the present invention.

The compound represented by Formula (38.2) is preferably used in the case where the liquid crystal composition contains one compound represented by General Formula (i).

Alternatively or additionally, the compound represented by General Formula (X), which is used in the liquid crystal composition of the present invention, is preferably any of compounds represented by General Formula (X-2).

[Chem. 186]

(X-2)

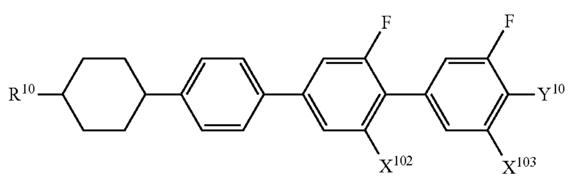

In General Formula (X-2), $X^{102}$ and $X^{103}$ each independently represent a fluorine atom or a hydrogen atom; $Y^{10}$ represents a fluorine atom, a chlorine atom, or —$OCF_3$; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The compound represented by General Formula (X-2), which is used in the liquid crystal composition of the present invention, is preferably any of compounds represented by General Formula (X-2-1).

[Chem. 187]

(X-2-1)

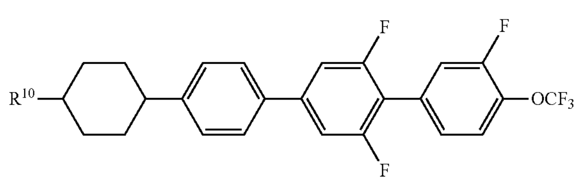

In General Formula (X-2-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination. In view of resistance to resolution at low temperature, transition temperature, electric reliability, birefringence, and another property, at least one of the compounds is preferably used, and three or more of the compounds are more preferably used.

The amount of the compound represented by General Formula (X-2-1) is preferably in the range of 1 mass % to 20 mass %, also preferably 1 mass % to 16 mass %, also preferably 1 mass % to 12 mass %, and also preferably 1 mass % to 10 mass % relative to the total mass of the liquid crystal composition of the present invention in view of resistance to resolution at low temperature, transition temperature, electric reliability, and another property. In particular, the amount of the compound represented by General Formula (X-2-1) is preferably from 1 to 5 mass %, also preferably 1 to 3 mass %, also preferably 5 to 10 mass %, and also preferably 6 to 9 mass % relative to the total mass of the liquid crystal composition of the present invention.

In particular, the compound represented by General Formula (X-2-1), which is used in the liquid crystal composition of the present invention, is preferably at least one compound selected from the group consisting of compounds represented by Formulae (39.1) to (39.4), and more preferably the compound represented by Formula (39.2).

[Chem. 188]

(39.1)

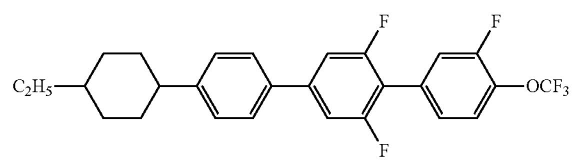

(39.2)

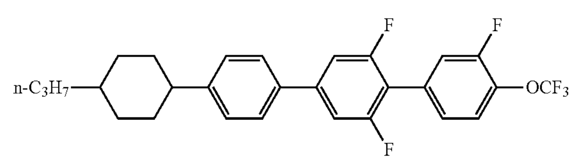

(39.3)

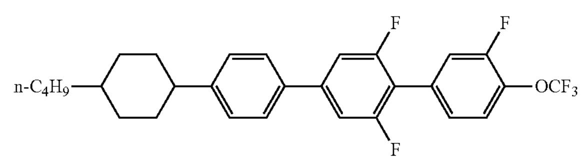

(39.4)

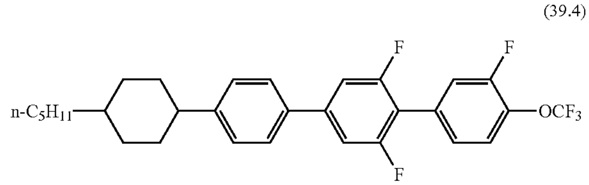

In the liquid crystal composition of the present invention, the amount of the compound represented by Formula (39.2) is preferably in the range of 1 mass % to 20 mass %, also preferably 1 mass % to 16 mass %, also preferably 1 mass % to 12 mass %, and also preferably 3 mass % to 10 mass % relative to the total mass of the liquid crystal composition of the present invention. In particular, the amount of the compound represented by Formula (39.2) is preferably from 1 to 5 mass %, also preferably 1 to 3 mass %, also preferably 5 to 10 mass %, and also preferably 5 to 8 mass % relative to the total mass of the liquid crystal composition of the present invention.

The compound represented by Formula (39.2) is preferably used in the case where the liquid crystal composition contains one compound represented by General Formula (i).

Alternatively or additionally, the compound represented by General Formula (X-2), which is used in the liquid crystal composition of the present invention, is preferably any of compounds represented by General Formula (X-2-2).

[Chem. 189]

(X-2-2)

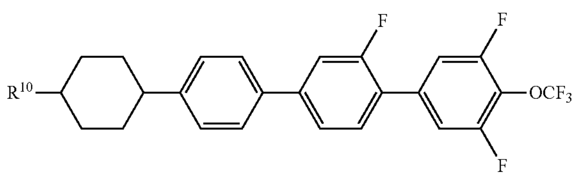

In General Formula (X-2-2), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (X-2-2) is preferably in the range of 3 mass % to 20 mass %, also preferably 6 mass % to 16 mass %, also preferably 9 mass % to 12 mass %, and also preferably 9 mass % to 10 mass % relative to the total mass of the liquid crystal composition of the present invention in view of resistance to resolution at low temperature, transition temperature, electric reliability, and another property.

In particular, the compound represented by General Formula (X-2-2), which is used in the liquid crystal composition of the present invention, is preferably at least one compound selected from the group consisting of compounds represented by Formulae (40.1) to (40.4), and more preferably the compound represented by Formula (40.2).

[Chem. 190]

(40.1)

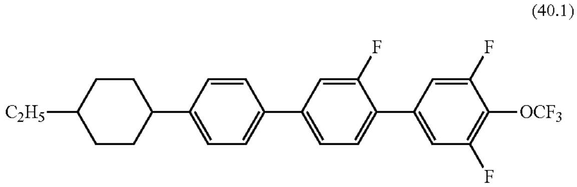

-continued (40.2)

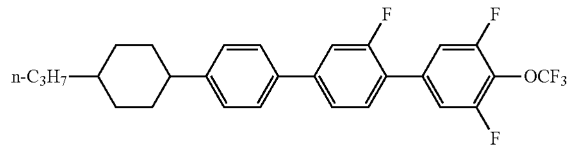

(40.3)

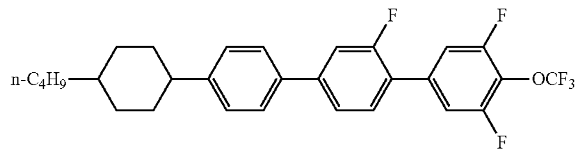

(40.4)

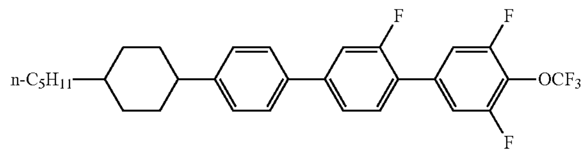

Alternatively or additionally, the compound represented by General Formula (X) is preferably any of compounds represented by General Formula (X-3).

[Chem. 191]

(X-3)

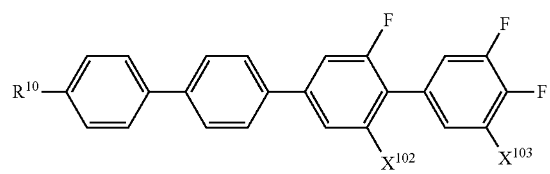

In General Formula (X-3), $X^{102}$ and $X^{103}$ each independently represent a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination. In view of resistance to resolution at low temperature, transition temperature, electric reliability, birefringence, and another property, the compounds are preferably used alone or in combination.

The compound represented by General Formula (X-3), which is used in the liquid crystal composition of the present invention, is preferably any of compounds represented by General Formula (X-3-1).

[Chem. 192]

(X-3-1)

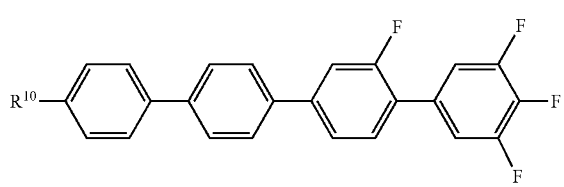

In General Formula (X-3-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (X-3-1) is appropriately adjusted on the basis of resistance to resolution at low temperature, transition temperature, electric reliability, and another property.

Relative to the total mass of the liquid crystal composition of the present invention, for example, the amount of the compound represented by General Formula (X-3-1) is in the range of 0.5 to 10 mass % in an embodiment of the present invention; in another embodiment, the amount is from 0.5 to 8 mass %; in another embodiment, the amount is from 0.5 to 6 mass %; in another embodiment, the amount is from 0.5 to 4 mass %; and in another embodiment, the amount is from 0.5 to 2 mass %.

In particular, the compound represented by General Formula (X-3-1), which is used in the liquid crystal composition of the present invention, is preferably at least one compound selected from the group consisting of compounds represented by Formulae (41.1) to (41.4), and more preferably the compound represented by Formula (41.2).

The compound represented by Formula (41.2) is particularly preferably used in the case where the liquid crystal composition contains one compound represented by General Formula (i), and the amount thereof is preferably from 0.5 to 1%.

[Chem. 193]

(41.1)

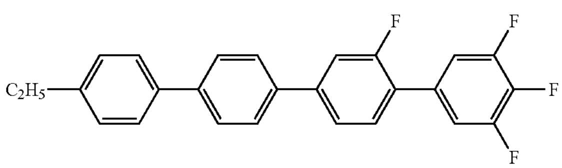

(41.2)

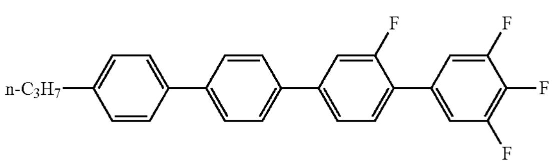

(41.3)

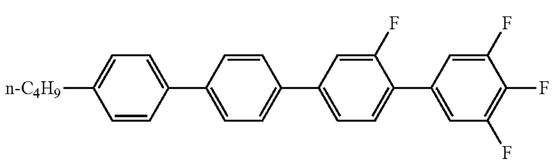

(41.4)

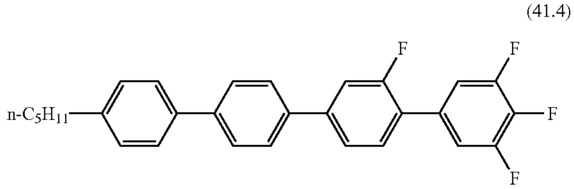

Alternatively or additionally, the compound represented by General Formula (X) is preferably any of compounds represented by General Formula (X-4).

[Chem. 194]

(X-4)

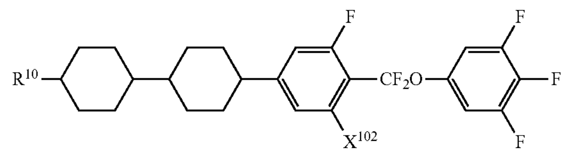

In General Formula (X-4), $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, at least one of the compounds is preferably used, and three or more of the compounds are more preferably used.

The compound represented by General Formula (X-4), which is used in the liquid crystal composition of the present invention, is preferably any of compounds represented by General Formula (X-4-1).

[Chem. 195]

(X-4-1)

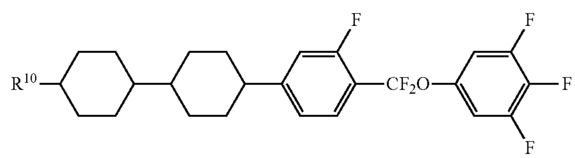

In General Formula (X-4-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, at least one of the compounds is preferably used, and three or more of the compounds are more preferably used.

The amount of the compound represented by General Formula (X-4-1) is appropriately adjusted on the basis of resistance to resolution at low temperature, transition temperature, electric reliability, and another property.

The amount of the compound represented by General Formula (X-4-1) is preferably in the range of 2 mass % to 20 mass %, also preferably 5 mass % to 17 mass %, also preferably 10 mass % to 15 mass %, and also preferably 10 mass % to 13 mass % relative to the total mass of the liquid crystal composition of the present invention.

In particular, the compound represented by General Formula (X-4-1), which is used in the liquid crystal composition of the present invention, is preferably at least one compound selected from the group consisting of compounds represented by Formulae (42.1) to (42.4), and more preferably the compound represented by Formula (42.3).

The compound represented by Formula (42.3) is preferably used in the case where the liquid crystal composition contains one compound represented by General Formula (i), and the amount thereof is preferably in the range of 1 to 10%, more preferably 1 to 5%.

[Chem. 196]

(42.1)

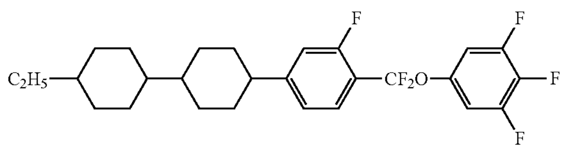

(42.2)

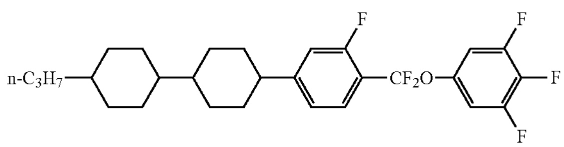

(42.3)

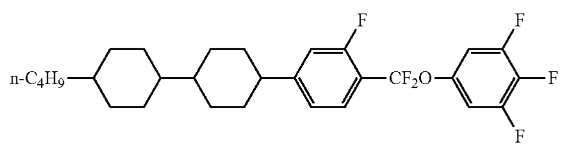

(42.4)

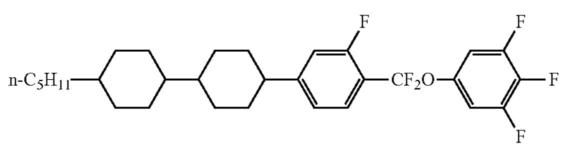

Alternatively or additionally, the compound represented by General Formula (X), which is used in the liquid crystal composition of the present invention, is preferably any of compounds represented by General Formula (X-4-2).

[Chem. 197]

(X-4-2)

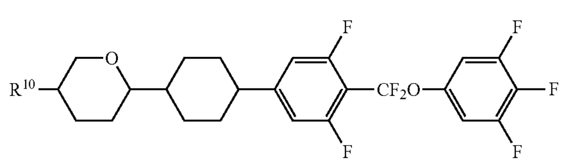

In General Formula (X-4-2), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, at least one of the compounds is preferably used, and three or more of the compounds are more preferably used.

The amount of the compound represented by General Formula (X-4-2) is preferably in the range of 2 mass % to 20 mass %, also preferably 5 mass % to 17 mass %, also preferably 10 mass % to 15 mass %, and also preferably 10 mass % to 13 mass % relative to the total mass of the liquid crystal composition of the present invention in view of resistance to resolution at low temperature, transition temperature, electric reliability, and another property.

In particular, the compound represented by General Formula (X-4-2), which is used in the liquid crystal composition of the present invention, is preferably at least one compound selected from the group consisting of compounds represented by Formulae (42.11) to (42.14), and more preferably the compound represented by Formula (42.13) and/or the compound represented by Formula (42.14).

[Chem. 198]

(42.11)

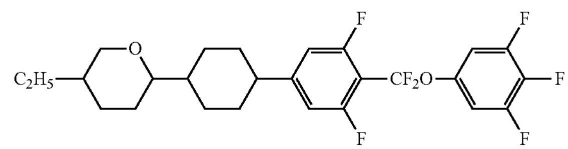

(42.12)

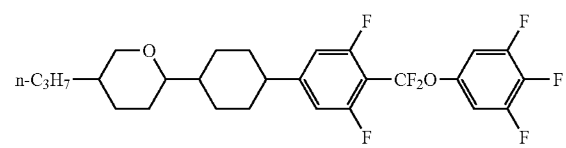

(42.13)

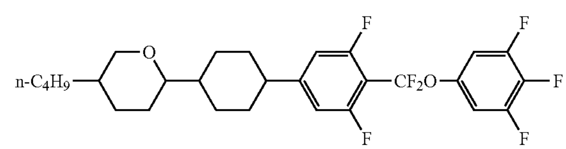

(42.14)

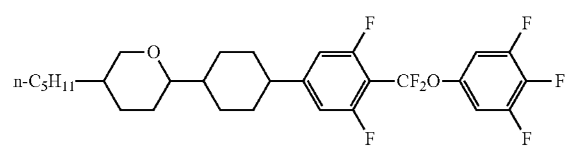

Alternatively or additionally, the compound represented by General Formula (X), which is used in the liquid crystal composition of the present invention, is preferably any of compounds represented by General Formula (X-4-3).

[Chem. 199]

(X-4-3)

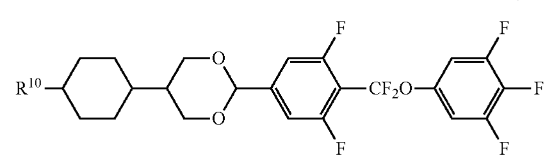

In General Formula (X-4-3), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, at least one of the compounds is preferably used, and three or more of the compounds are more preferably used.

The amount of the compound represented by General Formula (X-4-3) is preferably in the range of 2 mass % to 20 mass %, also preferably 5 mass % to 17 mass %, also preferably 10 mass % to 15 mass %, and also preferably 10 mass % to 13 mass % relative to the total mass of the liquid crystal composition of the present invention in view of resistance to resolution at low temperature, transition temperature, electric reliability, and another property.

In particular, the compound represented by General Formula (X-4-3), which is used in the liquid crystal composition of the present invention, is preferably at least one compound selected from the group consisting of compounds represented by Formulae (42.21) to (42.24), and more preferably the compound represented by Formula (42.22).

[Chem. 200]

(42.21)

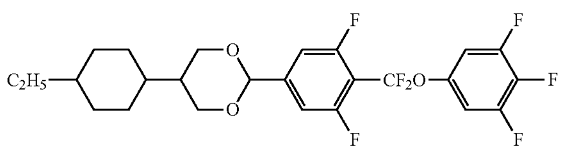

(42.22)

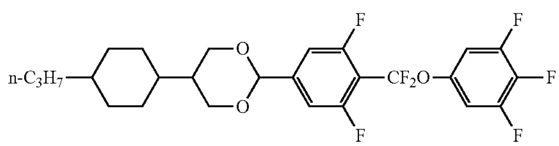

(42.23)

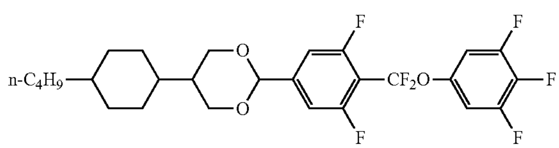

(42.24)

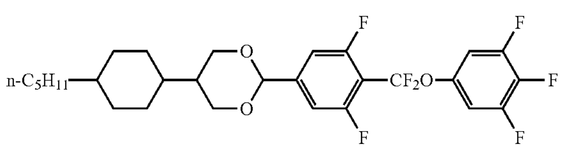

Alternatively or additionally, the compound represented by General Formula (X) is preferably any of compounds represented by General Formula (X-5).

[Chem. 201]

(X-5)

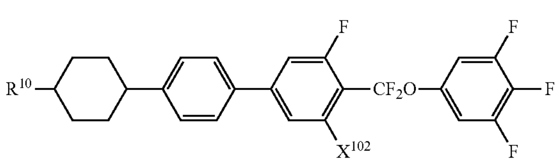

In General Formula (X-5), $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, at least one of the compounds is preferably used, and three or more of the compounds are more preferably used.

The compound represented by General Formula (X-5) is preferably any of compounds represented by General Formula (X-5-1).

[Chem. 202]

(X-5-1)

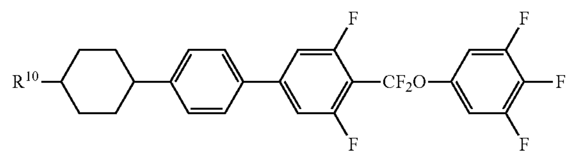

In General Formula (X-5-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, at least one of the compounds is preferably used, and three or more of the compounds are more preferably used.

In particular, the compound represented by General Formula (X-5-1) is preferably at least one compound selected from the group consisting of compounds represented by Formulae (43.1) to (43.4), and more preferably the compound represented by Formula (43.2).

[Chem. 203]

(43.1)

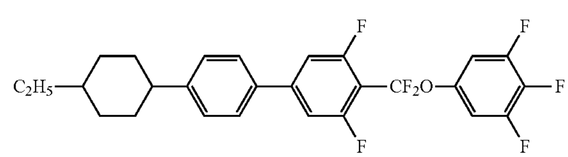

(43.2)

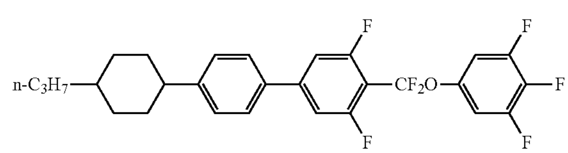

(43.3)

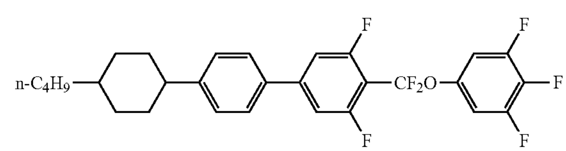

-continued (43.4)

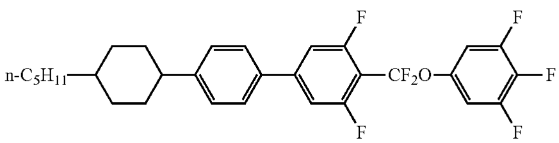

Alternatively or additionally, the compound represented by General Formula (X) is preferably any of compounds represented by General Formula (X-6).

[Chem. 204]

(X-6)

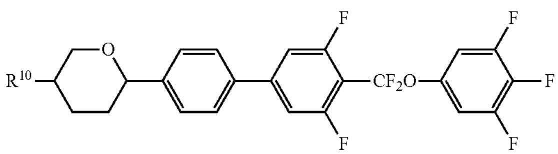

In General Formula (X-6), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (X-6) is appropriately adjusted in consideration of properties such as resistance to resolution at low temperature, transition temperature, electric reliability, and birefringence.

Relative to the total mass of the liquid crystal composition of the present invention, for example, the amount of the compound represented by General Formula (X-6) is in the range of 1 to 30 mass % in an embodiment of the present invention; in another embodiment, the amount is from 1 to 25 mass %; in another embodiment, the amount is from 1 to 20 mass %; in another embodiment, the amount is from 1 to 15 mass %; in another embodiment, the amount is from 2 to 14 mass %; in another embodiment, the amount is from 2 to 12 mass %; in another embodiment, the amount is from 2 to 9 mass %; in another embodiment, the amount is from 2 to 8 mass %; in another embodiment, the amount is from 2 to 6 mass %; in another embodiment, the amount is from 2 to 5 mass %; in another embodiment, the amount is from 3 to 14 mass %; in another embodiment, the amount is from 5 to 14 mass %; in another embodiment, the amount is from 7 to 14 mass %; in another embodiment, the amount is from 8 to 14 mass %; in another embodiment, the amount is from 9 to 14 mass %; in another embodiment, the amount is from 9 to 12 mass %; in another embodiment, the amount is from 3 to 8 mass %; in another embodiment, the amount is from 3 to 6 mass %; in another embodiment, the amount is from 4 to 7 mass %; in another embodiment, the amount is from 4 to 5 mass %; in another embodiment, the amount is from 5 to 8 mass %; in another embodiment, the amount is from 5 to 6 mass %; in another embodiment, the amount is from 7 to 8 mass %; and in another embodiment, the amount is from 8 to 9 mass %.

In particular, the compound represented by General Formula (X-6) is Preferably at Least One Compound Selected from the group consisting of compounds represented by Formulae (44.1) to (44.4), and more preferably the compound represented by Formula (44.1) and/or the compound represented by Formula (44.2).

The compound represented by Formula (44.1) and the compound represented by Formula (44.2) are preferably used in combination in the case where the liquid crystal composition contains two or three compounds represented by General Formula (i).

In the case where the liquid crystal composition contains two compounds represented by General Formula (i), the total amount of the compound represented by Formula (44.1) and the compound represented by Formula (44.2) is preferably from 5 to 15%, and more preferably 6 to 12%.

In the case where the liquid crystal composition contains three compounds represented by General Formula (i), the total amount of the compound represented by Formula (44.1) and the compound represented by Formula (44.2) is preferably from 8 to 16%, more preferably 10 to 14%, and especially preferably 12 to 14%.

[Chem. 205]

(44.1)

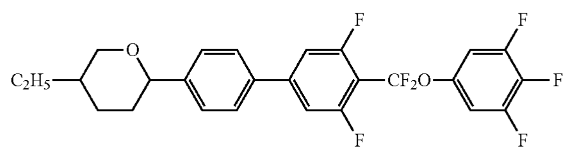

(44.2)

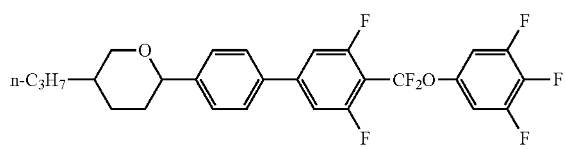

(44.3)

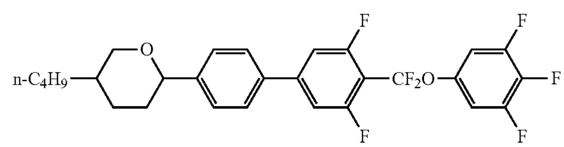

(44.4)

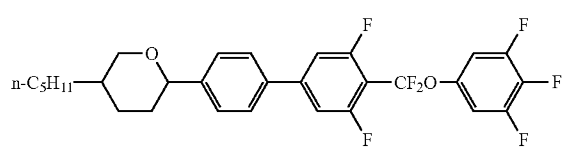

The compound represented by General Formula (M), which can be contained in the liquid crystal composition of the present invention, may be any of compounds which are represented by General Formula (X'-7) and which are analogous to the compound represented by General Formula (X).

[Chem. 206]

(X'-7)

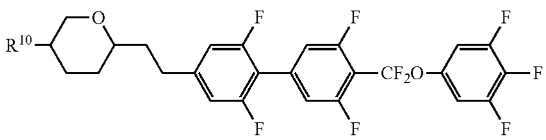

In General Formula (X'-7), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

30 mass %; in another embodiment, the amount is from 11 to 30 mass %; in another embodiment, the amount is from 14 to 30 mass %; and in another embodiment, the amount is from 18 to 30 mass %.

Moreover, relative to the total mass of the liquid crystal composition of the present invention, for example, the amount of the compound represented by General Formula (X'-7) is in the range of 4 to 20 mass % in an embodiment of the present invention; in another embodiment, the amount of the compound is from 4 to 13 mass %; in another embodiment, the amount of the compound is from 4 to 10 mass %; and in another embodiment, the amount of the compound is from 4 to 7 mass %.

In particular, the compound represented by General Formula (X'-7), which is used in the liquid crystal composition of the present invention, is preferably at least one compound selected from the group consisting of compounds represented by Formulae (44.11) to (44.14), and more preferably the compound represented by Formula (44.13).

[Chem. 207]

(44.11)

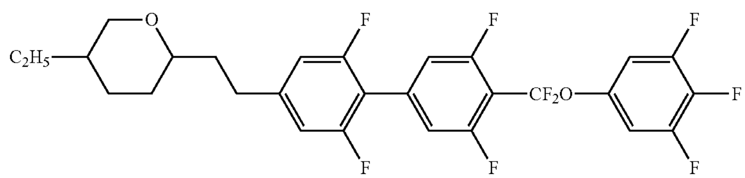

(44.12)

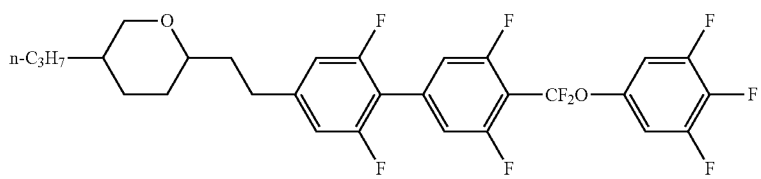

(44.13)

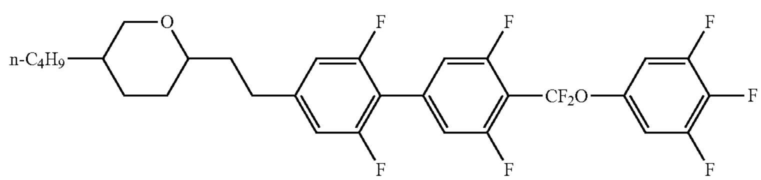

(44.14)

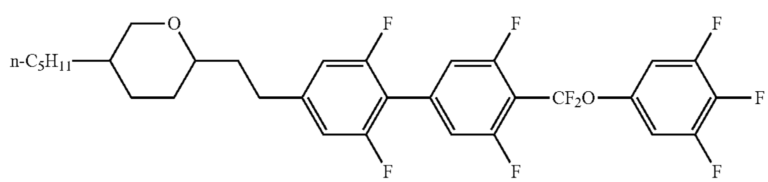

The amount of the compound represented by General Formula (X'-7) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (X'-7) is in the range of 4 to 30 mass % in an embodiment of the present invention; in another embodiment, the amount is from 5 to 30 mass %; in another embodiment, the amount is from 6 to 30 mass %; in another embodiment, the amount is from 8 to 30 mass %; in another embodiment, the amount is from 9 to Alternatively or additionally, the compound represented by General Formula (X) is preferably any of compounds represented by General Formula (X-8).

[Chem. 208]

(X-8)

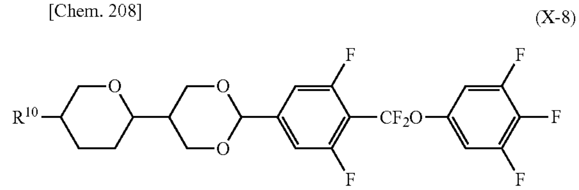

In General Formula (X-8), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (X-8) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (X-8) is in the range of 1 to 25 mass % in an embodiment of the present invention; in another embodiment, the amount is from 1 to 20 mass %; in another embodiment, the amount is from 1 to 15 mass %; in another embodiment, the amount is from 1 to 10 mass %; in another embodiment, the amount is from 1 to 5 mass %; and in another embodiment, the amount is from 1 to 3 mass %.

In particular, the compound represented by General Formula (X-8) is preferably at least one compound selected from the group consisting of compounds represented by Formulae (44.21) to (44.24), and more preferably the compound represented by Formula (44.22).

[Chem. 209]

(44.21)

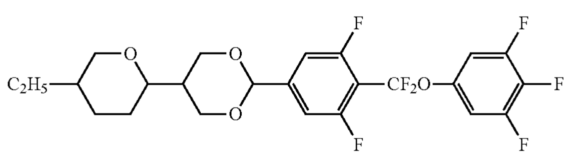

(44.22)

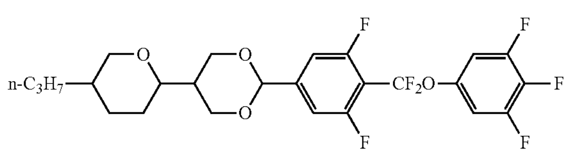

(44.23)

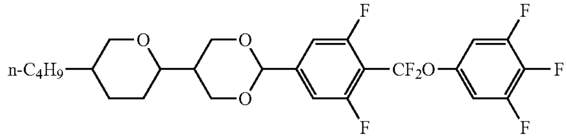

(44.24)

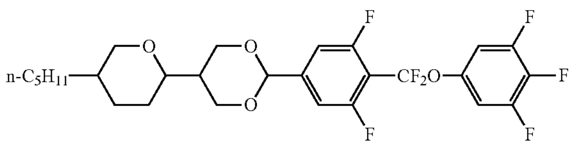

Alternatively or additionally, the compound represented by General Formula (X) is preferably any of compounds represented by General Formula (X-9).

[Chem. 210]

(X-9)

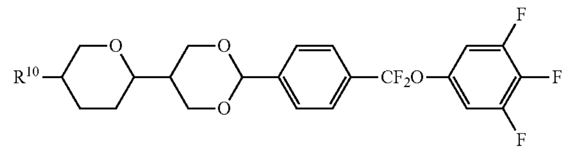

In General Formula (X-9), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, at least one of the compounds is preferably used.

The amount of the compound represented by General Formula (X-9) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (X-9) is in the range of 1 to 25 mass % in an embodiment of the present invention; in another embodiment, the amount is from 1 to 20 mass %; in another embodiment, the amount is from 1 to 15 mass %; in another embodiment, the amount is from 1 to 10 mass %; in another embodiment, the amount is from 1 to 5 mass %; and in another embodiment, the amount is from 1 to 3 mass %.

In particular, the compound represented by General Formula (X-9) is preferably at least one compound selected from the group consisting of compounds represented by Formulae (44.31) to (44.34), and more preferably the compound represented by Formula (44.33) or the compound represented by Formula (44.34).

[Chem. 211]

(44.31)

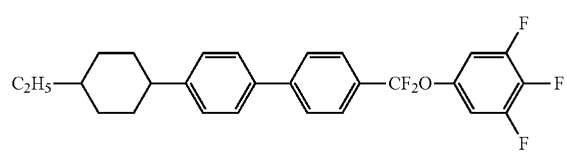

(44.32)

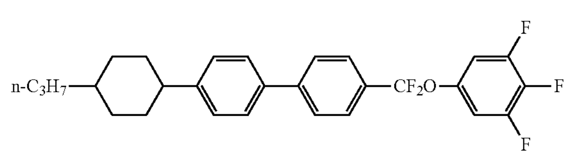

(44.33)

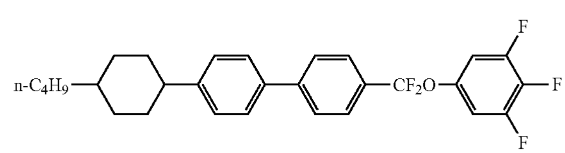

-continued (44.34)

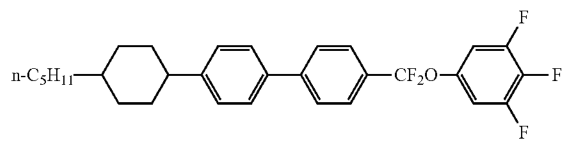

Alternatively or additionally, the compound represented by General Formula (X) is preferably at least one compound selected from the group consisting of compounds represented by General Formula (XI); however, the compound represented by General Formula (i) is excluded.

[Chem. 212]

(XI)

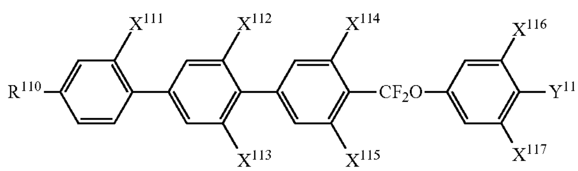

In General Formula (XI), $X^{111}$ to $X^{117}$ each independently represent a fluorine atom or a hydrogen atom, and at least one of $X^{111}$ to $X^{117}$ represents a fluorine atom; $R^{110}$ represents an alkyl group having 1 to 5 carbon atoms, an alkenyl group having 2 to 5 carbon atoms, or an alkoxy group having 1 to 4 carbon atoms; and $Y^{11}$ represents a fluorine atom or —$OCF_3$.

Such compounds can be used in any combination; for example, in view of resistance to resolution at low temperature, transition temperature, electric reliability, birefringence, and another property, one of the compounds is preferably used in an embodiment of the present invention, two of the compounds are preferably used in another embodiment, and three or more of the compounds are preferably used in another embodiment.

The amount of the compound represented by General Formula (XI) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (XI) is in the range of 2 to 30 mass % in an embodiment of the present invention; in another embodiment, the amount is from 4 to 30 mass %; in another embodiment, the amount is from 5 to 30 mass %; in another embodiment, the amount is from 7 to 30 mass %; in another embodiment, the amount is from 9 to 30 mass %; in another embodiment, the amount is from 10 to 30 mass %; in another embodiment, the amount is from 12 to 30 mass %; in another embodiment, the amount is from 13 to 30 mass %; in another embodiment, the amount is from 15 to 30 mass %; and in another embodiment, the amount is from 18 to 30 mass %.

Furthermore, relative to the total mass of the liquid crystal composition of the present invention, for example, the amount of the compound represented by General Formula (XI) is in the range of 2 to 25 mass % in an embodiment of the present invention; in another embodiment, the amount is from 2 to 20 mass %; in another embodiment, the amount is from 2 to 15 mass %; in another embodiment, the amount is from 2 to 10 mass %; and in another embodiment, the amount is from 2 to 5 mass %.

In the case where the liquid crystal composition of the present invention is used in a liquid crystal display device having a small cell gap, the appropriate amount of the compound represented by General Formula (XI) is at a higher level. In the case where the liquid crystal composition of the present invention is used in a liquid crystal display device which is driven at a small driving voltage, the appropriate amount of the compound represented by General Formula (XI) is at a higher level. In the case where the liquid crystal composition of the present invention is used in a liquid crystal display device which is used in a low-temperature environment, the appropriate amount of the compound represented by General Formula (XI) is at a lower level. In the case where the liquid crystal composition is used in a liquid crystal display device which quickly responds, the appropriate amount of the compound represented by General Formula (XI) is at a lower level.

Alternatively or additionally, the compound represented by General Formula (XI), which is used in the liquid crystal composition of the present invention, is preferably any of compounds represented by General Formula (XI-2).

[Chem. 213]

(XI-2)

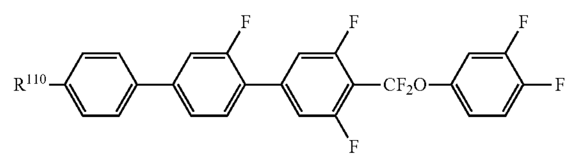

In General Formula (XI-2), $R^{110}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment is determined in view of resistance to resolution at low temperature, transition temperature, electric reliability, birefringence, and another property. For example, one of the compounds is used in an embodiment of the present invention, two of the compounds are used in another embodiment, and three or more of the compounds are used in another embodiment.

The amount of the compound represented by General Formula (XI-2) is preferably in the range of 1 mass % to 20 mass %, also preferably 3 mass % to 20 mass %, also preferably 4 mass % to 20 mass %, also preferably 6 mass % to 15 mass %, and also preferably 9 mass % to 12 mass % relative to the total mass of the liquid crystal composition of the present invention in view of resistance to resolution at low temperature, transition temperature, electric reliability, and another property.

In particular, the compound represented by General Formula (XI-2), which is used in the liquid crystal composition of the present invention, is preferably at least one compound selected from the group consisting of compounds represented by Formulae (45.11) to (45.14), more preferably at least one compound selected from the group consisting of the compounds represented by Formulae (45.12) to (45.14), and further preferably the compound represented by Formula (45.12).

[Chem. 214]

(45.11)

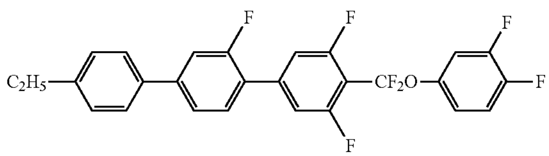

(45.12)

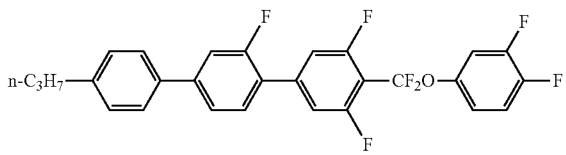

(45.13)

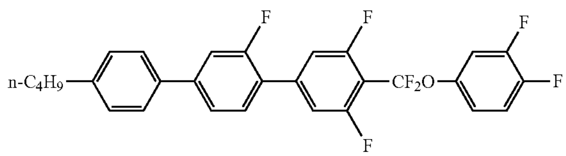

(45.14)

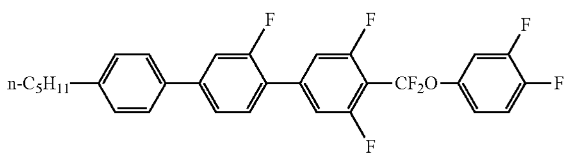

Alternatively or additionally, the compound represented by General Formula (X) is preferably at least one compound selected from the group consisting of compounds represented by General Formula (XII).

[Chem. 215]

(XII)

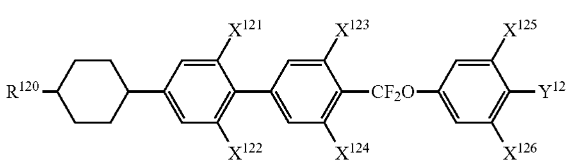

In General Formula (XII), $X^{121}$ to $X^{126}$ each independently represent a fluorine atom or a hydrogen atom; $R^{120}$ represents an alkyl group having 1 to 5 carbon atoms, an alkenyl group having 2 to 5 carbon atoms, or an alkoxy group having 1 to 4 carbon atoms; and $Y^{12}$ represents a fluorine atom or —$OCF_3$.

Such compounds can be used in any combination; in view of resistance to resolution at low temperature, transition temperature, electric reliability, birefringence, and another property, it is preferred that one to three or more of the compounds be appropriately used, and it is more preferred that one to four or more of the compounds be appropriately used.

The compound represented by General Formula (XII), which is used in the liquid crystal composition of the present invention, is preferably any of compounds represented by General Formula (XII-1).

[Chem. 216]

(XII-1)

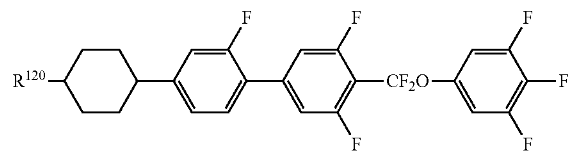

In General Formula (XII-1), R' an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, it is preferred that one or two or more of the compounds be appropriately used, and it is more preferred that one to three or more of the compounds be appropriately used.

The amount of the compound represented by General Formula (XII-1) is preferably in the range of 1 mass % to 15 mass %, also preferably 2 mass % to 10 mass %, also preferably 3 mass % to 8 mass %, and also preferably 4 mass % to 6 mass % relative to the total mass of the liquid crystal composition of the present invention in view of resistance to resolution at low temperature, transition temperature, electric reliability, and another property.

In particular, the compound represented by General Formula (XII-1), which is used in the liquid crystal composition of the present invention, is preferably at least one compound selected from the group consisting of compounds represented by Formulae (46.1) to (46.4), and more preferably at least one compound selected from the group consisting of the compounds represented by Formulae (46.2) to (46.4).

[Chem. 217]

(46.1)

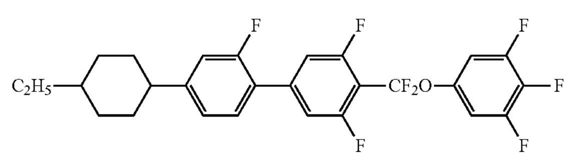

(46.2)

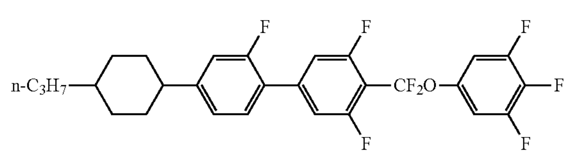

(46.3)

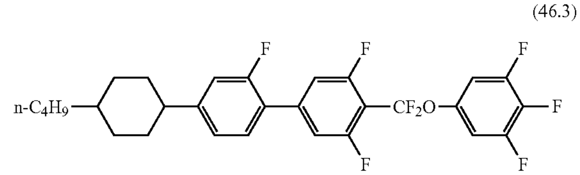

(46.4)

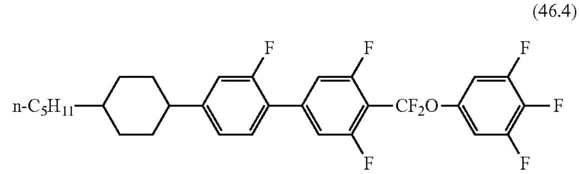

Alternatively or additionally, the compound represented by General Formula (XII) is preferably any of compounds represented by General Formula (XII-2).

[Chem. 218]

(XII-2)

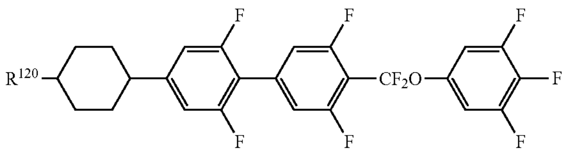

In General Formula (XII-2), $R^{120}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, it is preferred that one or two or more of the compounds be appropriately used, and it is more preferred that one to three or more of the compounds be appropriately used.

The amount of the compound represented by General Formula (XII-2) is preferably in the range of 1 mass % to 20 mass %, also preferably 3 mass % to 20 mass %, also preferably 4 mass % to 17 mass %, also preferably 6 mass % to 15 mass %, and also preferably 9 mass % to 13 mass % relative to the total mass of the liquid crystal composition of the present invention in view of resistance to resolution at low temperature, transition temperature, electric reliability, and another property.

In particular, the compound represented by General Formula (XII-2), which is used in the liquid crystal composition of the present invention, is preferably at least one compound selected from the group consisting of compounds represented by Formulae (47.1) to (47.4), and more preferably at least one compound selected from the group consisting of the compounds represented by Formulae (47.2) to (47.4).

[Chem. 219]

(47.1)

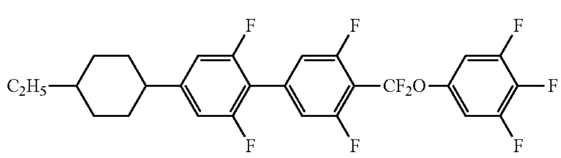

(47.2)

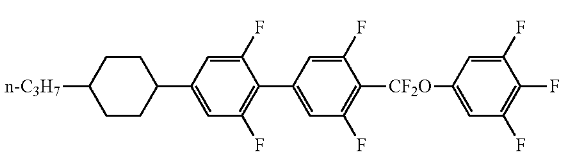

(47.3)

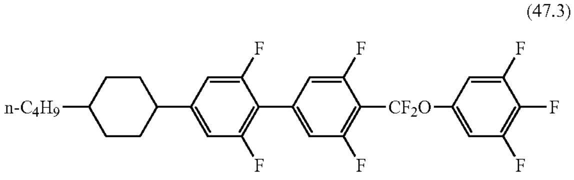

-continued (47.4)

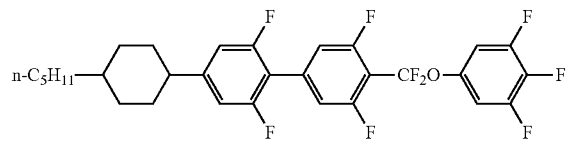

Alternatively or additionally, the compound represented by General Formula (M) is preferably at least one compound selected from the group consisting of compounds represented by General Formula (XIII).

[Chem. 220]

(XIII)

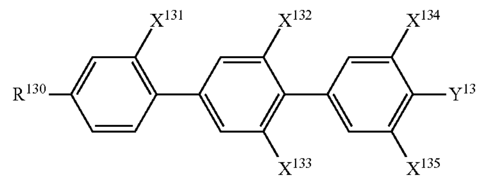

In General Formula (XIII), $X^{131}$ to $X^{135}$ each independently represent a fluorine atom or a hydrogen atom; $R^{130}$ represents an alkyl group having 1 to 5 carbon atoms, an alkenyl group having 2 to 5 carbon atoms, or an alkoxy group having 1 to 4 carbon atoms; and $Y^{13}$ represents a fluorine atom or —$OCF_3$.

Such compounds can be used in any combination; one or two of the compounds are preferably used, one to three of the compounds are more preferably used, and one to four of the compounds are further preferably used.

The amount of the compound represented by General Formula (XIII) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (XIII) is in the range of 2 to 30 mass % in an embodiment of the present invention; in another embodiment, the amount is from 4 to 30 mass %; in another embodiment, the amount is from 5 to 30 mass %; in another embodiment, the amount is from 7 to 30 mass %; in another embodiment, the amount is from 9 to 30 mass %; in another embodiment, the amount is from 11 to 30 mass %; in another embodiment, the amount is from 13 to 30 mass %; in another embodiment, the amount is from 14 to 30 mass %; in another embodiment, the amount is from 16 to 30 mass %; and in another embodiment, the amount is from 20 to 30 mass %.

Moreover, relative to the total mass of the liquid crystal composition of the present invention, for instance, the amount of the compound represented by General Formula (XIII) is in the range of 2 to 25 mass % in an embodiment of the present invention; in another embodiment, the amount of the compound is from 2 to 20 mass %; in another embodiment, the amount of the compound is from 2 to 15 mass %; in another embodiment, the amount of the compound is from 2 to 10 mass %; and in another embodiment, the amount of the compound is from 2 to 5 mass %.

In the case where the liquid crystal composition of the present invention is used in a liquid crystal display device having a small cell gap, the appropriate amount of the compound represented by General Formula (XIII) is at a higher level. In the case where the liquid crystal composition of the present invention is used in a liquid crystal display device which is driven at a small driving voltage, the appropriate amount of the compound represented by General Formula (XIII) is at a higher level. In the case where the liquid crystal composition of the present invention is used in a liquid crystal display device which is used in a low-temperature environment, the appropriate amount of the compound represented by General Formula (XIII) is at a lower level. In the case where the liquid crystal composition is used in a liquid crystal display device which quickly responds, the appropriate amount of the compound represented by General Formula (XIII) is at a lower level.

The compound represented by General Formula (XIII) is preferably a compound represented by General Formula (XIII-1).

[Chem. 221]

(XIII-1)

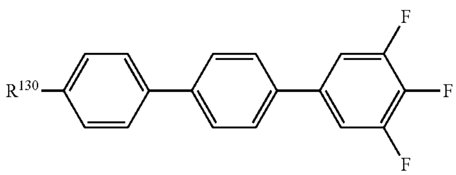

In General Formula (XIII-1), $R^{130}$ represents an alkyl group having 1 to 5 carbon atoms, an alkenyl group having 2 to 5 carbon atoms, or an alkoxy group having 1 to 4 carbon atoms.

The amount of the compound represented by General Formula (XIII-1) is preferably in the range of 1 mass % to 25 mass %, also preferably 3 mass % to 25 mass %, also preferably 5 mass % to 20 mass %, and also preferably 10 mass % to 15 mass % relative to the total mass of the liquid crystal composition of the present invention.

The compound represented by General Formula (XIII-1) is preferably at least one compound selected from the group consisting of compounds represented by Formulae (48.1) to (48.4), and more preferably the compound represented by Formula (48.2).

[Chem. 222]

(48.1)

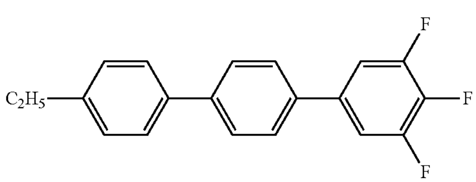

(48.2)

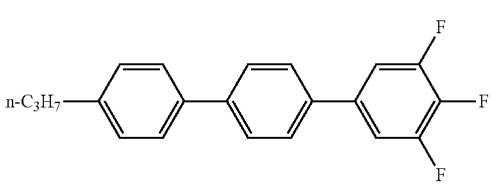

(48.3)

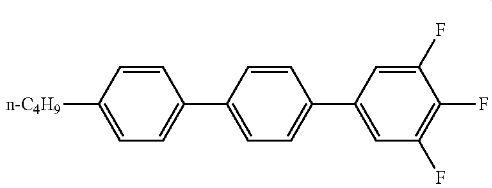

-continued (48.4)

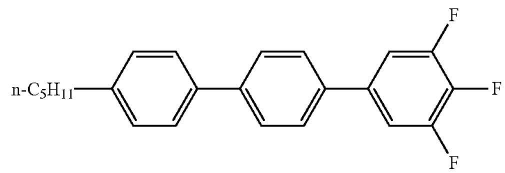

Alternatively or additionally, the compound represented by General Formula (XIII) is preferably any of compounds represented by General Formula (XIII-2).

[Chem. 223]

(XIII-2)

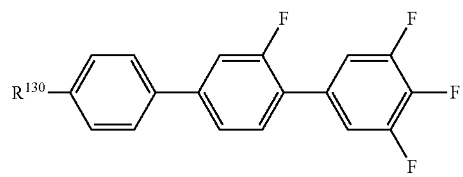

In General Formula (XIII-2), $R^{130}$ represents an alkyl group having 1 to 5 carbon atoms, an alkenyl group having 2 to 5 carbon atoms, or an alkoxy group having 1 to 4 carbon atoms.

Such compounds can be used in any combination; at least one of the compounds is preferably used.

The amount of the compound represented by General Formula (XIII-2) is preferably in the range of 1 mass % to 25 mass %, also preferably 1 mass % to 20 mass %, also preferably 1 mass % to 15 mass %, and also preferably 3 mass % to 14 mass % relative to the total mass of the liquid crystal composition of the present invention. In particular, the amount of the compound represented by General Formula (XIII-2) is preferably in the range of 3 mass % to 10 mass %, also preferably 3 mass % to 6 mass %, also preferably 6 mass % to 14 mass %, and also preferably 10 mass % to 14 mass % relative to the total mass of the liquid crystal composition of the present invention.

The compound represented by General Formula (XIII-2) is preferably at least one compound selected from the group consisting of compounds represented by Formulae (49.1) to (49.4), and more preferably the compound represented by Formula (49.1) and/or the compound represented by Formula (49.2).

[Chem. 224]

(49.1)

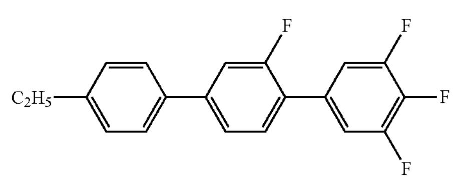

(49.2)

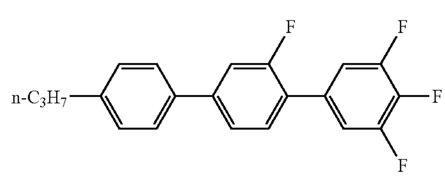

-continued (49.3)

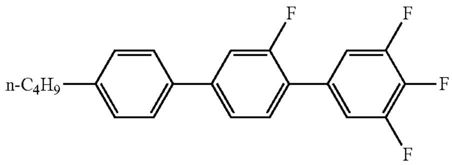

(49.4)

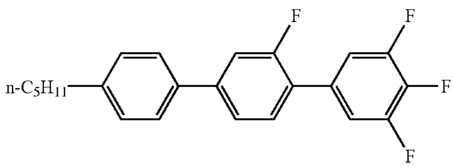

Alternatively or additionally, the compound represented by General Formula (XIII) is preferably any of compounds represented by General Formula (XIII-3).

[Chem. 225]

(XIII-3)

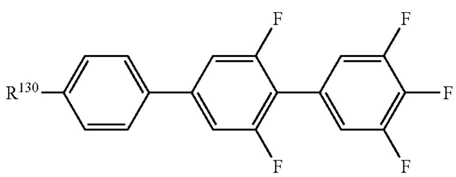

In General Formula (XIII-3), $R^{130}$ represents an alkyl group having 1 to 5 carbon atoms, an alkenyl group having 2 to 5 carbon atoms, or an alkoxy group having 1 to 4 carbon atoms.

Such compounds can be used in any combination; one or two of the compounds are preferably used.

The amount of the compound represented by General Formula (XIII-3) is preferably in the range of 2 mass % to 20 mass %, also preferably 4 mass % to 20 mass %, also preferably 9 mass % to 17 mass %, and also preferably 11 mass % to 14 mass % relative to the total mass of the liquid crystal composition of the present invention.

The compound represented by General Formula (XIII-3) is preferably at least one compound selected from the group consisting of compounds represented by Formulae (50.1) to (50.4), and more preferably the compound represented by Formula (50.1) and/or the compound represented by Formula (50.2).

[Chem. 226]

(50.1)

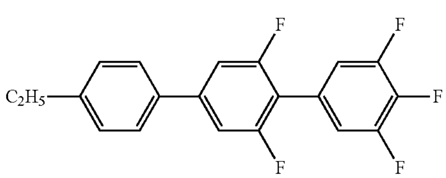

(50.2)

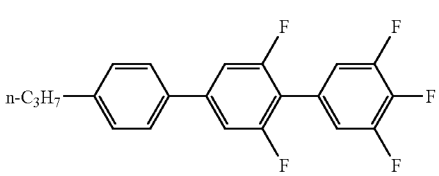

-continued (50.3)

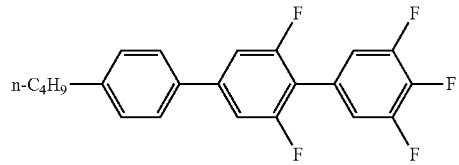

(50.4)

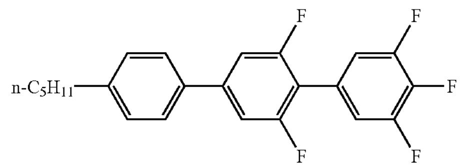

Alternatively or additionally, the compound represented by General Formula (N) is preferably at least one compound selected from the group consisting of compounds represented by General Formula (XIV).

[Chem. 227]

(XIV)

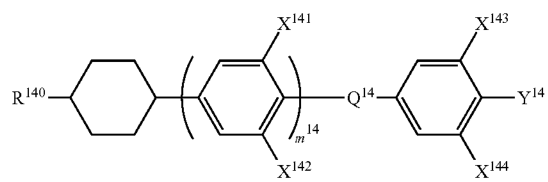

In General Formula (XIV), $R^{140}$ represents an alkyl group having 1 to 7 carbon atoms, an alkenyl group having 2 to 7 carbon atoms, or an alkoxy group having 1 to 7 carbon atoms; $X^{141}$ to $X^{144}$ each independently represent a fluorine atom or a hydrogen atom; $Y^{14}$ represents a fluorine atom, a chlorine atom, or $OCF_3$; $Q^{14}$ represents a single bond, —COO—, or —$CF_2O$—; and $m^{14}$ represents 0 or 1.

Such compounds can be used in any combination; a proper combination of the compounds for an embodiment is determined in view of resistance to resolution at low temperature, transition temperature, electric reliability, birefringence, and another property. For example, one of such compounds is used in an embodiment of the present invention, two of the compounds are used in another embodiment of the present invention, three of the compounds are used in another embodiment of the present invention, four of the compounds are used in another embodiment of the present invention, five of the compounds are used in another embodiment of the present invention, and six or more of the compounds are used in another embodiment of the present invention.

The amount of the compound represented by General Formula (XIV) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (XIV) is in the range of 3 to 40 mass % in an embodiment of the present invention; in another embodiment, the amount is from 7 to 40 mass %; in another embodiment, the amount is from 8 to 40 mass %; in another embodiment, the amount is from 11 to 40 mass %; in another embodiment, the amount is from 12 to 40 mass %; in another embodiment, the amount is from 16 to 40 mass %; in another embodiment, the amount is from 18 to 40 mass %; in another embodiment, the amount is from 19 to 40 mass %; in another embodiment, the amount is from 22 to 40 mass %; and in another embodiment, the amount is from 25 to 40 mass %.

Furthermore, relative to the total mass of the liquid crystal composition of the present invention, for example, the amount of the compound represented by General Formula (XIV) is in the range of 3 to 35 mass % in an embodiment of the present invention; in another embodiment, the amount is from 3 to 30 mass %; in another embodiment, the amount is from 3 to 25 mass %; in another embodiment, the amount is from 3 to 20 mass %; and in another embodiment, the amount is from 3 to 15 mass %.

In the case where the liquid crystal composition of the present invention is used in a liquid crystal display device which is driven at a small driving voltage, the appropriate amount of the compound represented by General Formula (XIV) is at a higher level. In the case where the liquid crystal composition is used in a liquid crystal display device which quickly responds, the appropriate amount of the compound represented by General Formula (XIV) is at a lower level.

The compound represented by General Formula (XIV) is preferably any of compounds represented by General Formula (XIV-1).

[Chem. 228]

(XIV-1)

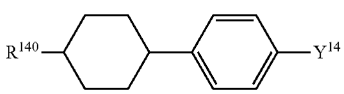

In General Formula (XIV-1), $R^{140}$ represents an alkyl group having 1 to 7 carbon atoms, an alkenyl group having 2 to 7 carbon atoms, or an alkoxy group having 1 to 7 carbon atoms; and $Y^{14}$ represents a fluorine atom, a chlorine atom, or —$OCF_3$.

Such compounds can be used in any combination; in view of resistance to resolution at low temperature, transition temperature, electric reliability, birefringence, and another property, one to three of the compounds are preferably used.

The compound represented by General Formula (XIV-1) is preferably a compound represented by General Formula (XIV-1-1).

[Chem. 229]

(XIV-1-1)

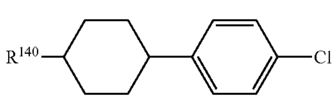

In General Formula (XIV-1-1), $R^{140}$ represents an alkyl group having 1 to 7 carbon atoms, an alkenyl group having 2 to 7 carbon atoms, or an alkoxy group having 1 to 7 carbon atoms.

The amount of the compound represented by General Formula (XIV-1) is appropriately adjusted on the basis of resistance to resolution at low temperature, transition temperature, electric reliability, and another property.

Relative to the total mass of the liquid crystal composition of the present invention, for example, the amount of the compound represented by General Formula (XIV-1) is in the range of 2 mass % to 30 mass % in an embodiment of the present invention; in another embodiment, the amount is from 4 mass % to 30 mass %; in another embodiment, the amount is from 7 mass % to 30 mass %; in another embodiment, the amount is from 10 mass % to 30 mass %; and in another embodiment, the amount is from 18 mass % to 30 mass %.

Moreover, relative to the total mass of the liquid crystal composition of the present invention, for example, the amount of the compound represented by General Formula (XIV-1) is in the range of 2 mass % to 27 mass % in an embodiment of the present invention; in another embodiment, the amount is from 2 mass % to 24 mass %; and in another embodiment, the amount is 2 mass % or more and less than 21 mass %.

In particular, the compound represented by General Formula (XIV-1-1) is preferably at least one compound selected from the group consisting of compounds represented by Formulae (51.1) to (51.4), and more preferably the compound represented by Formula (51.1).

[Chem. 230]

(51.1)

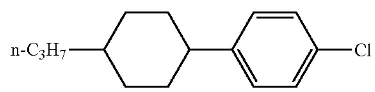

(51.2)

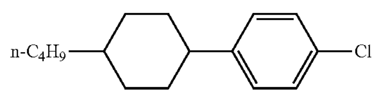

(51.3)

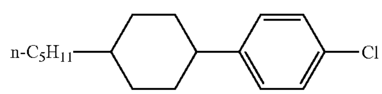

(51.4)

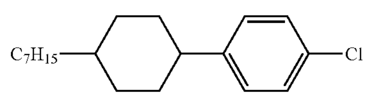

Alternatively or additionally, the compound represented by General Formula (XIV-1) is preferably a compound represented by General Formula (XIV-1-2).

[Chem. 231]

(XIV-1-2)

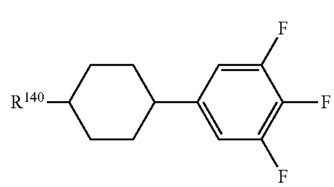

In General Formula (XIV-1-2), $R^{140}$ represents an alkyl group having 1 to 7 carbon atoms, an alkenyl group having 2 to 7 carbon atoms, or an alkoxy group having 1 to 7 carbon atoms.

The amount of the compound represented by General Formula (XIV-1-2) is preferably in the range of 1 mass % to 15 mass %, also preferably 3 mass % to 13 mass %, also preferably 5 mass % to 11 mass %, and also preferably 7 mass % to 9 mass % relative to the total mass of the liquid crystal composition of the present invention in view of resistance to resolution at low temperature, transition temperature, electric reliability, and another property.

In particular, the compound represented by General Formula (XIV-1-2) is preferably at least one compound selected from the group consisting of compounds represented by Formulae (52.1) to (52.4), and more preferably the compound represented by Formula (52.4).

[Chem. 232]

(52.1)

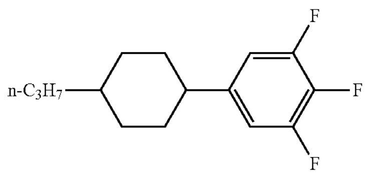

(52.2)

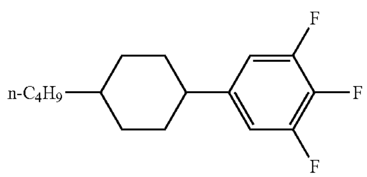

(52.3)

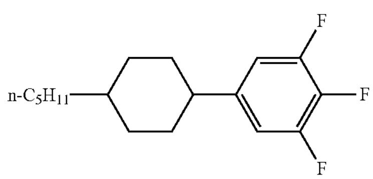

(52.4)

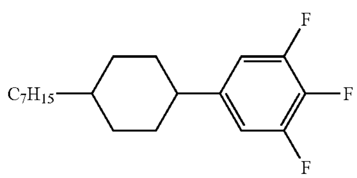

Alternatively or additionally, the compound represented by General Formula (XIV) is preferably any of compounds represented by General Formula (XIV-2).

[Chem. 233]

(XIV-2)

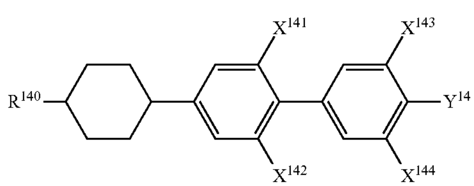

In General Formula (XIV-2), $R^{140}$ represents an alkyl group having 1 to 5 carbon atoms, an alkenyl group having 2 to 5 carbon atoms, or an alkoxy group having 1 to 4 carbon atoms; $X^{141}$ to $X^{144}$ each independently represent a fluorine atom or a hydrogen atom; and $Y^{14}$ represents a fluorine atom, a chlorine atom, or —$OCF_3$.

Such compounds can be used in any combination; a proper combination of the compounds for an embodiment is determined in view of resistance to resolution at low temperature, transition temperature, electric reliability, birefringence, and another property. For example, one of such compounds is used in an embodiment of the present invention, two of the compounds are used in another embodiment of the present invention, three of the compounds are used in another embodiment of the present invention, four of the compounds are used in another embodiment of the present invention, and five or more of the compounds are used in another embodiment of the present invention.

The amount of the compound represented by General Formula (XIV-2) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (XIV-2) is in the range of 3 to 40 mass % in an embodiment of the present invention; in another embodiment, the amount is from 7 to 40 mass %; in another embodiment, the amount is from 8 to 40 mass %; in another embodiment, the amount is from 10 to 40 mass %; in another embodiment, the amount is from 11 to 40 mass %; in another embodiment, the amount is from 12 to 40 mass %; in another embodiment, the amount is from 18 to 40 mass %; in another embodiment, the amount is from 19 to 40 mass %; in another embodiment, the amount is from 21 to 40 mass %; and in another embodiment, the amount is from 22 to 40 mass %.

Moreover, relative to the total mass of the liquid crystal composition of the present invention, for example, the amount of the compound represented by General Formula (XIV-2) is in the range of 3 to 35 mass % in an embodiment of the present invention; in another embodiment, the amount is from 3 to 25 mass %; in another embodiment, the amount is from 3 to 20 mass %; in another embodiment, the amount is from 3 to 15 mass %; and in another embodiment, the amount is from 3 to 10 mass %.

In the case where the liquid crystal composition of the present invention is used in a liquid crystal display device which is driven at a small driving voltage, the appropriate amount of the compound represented by General Formula (XIV-2) is at a higher level. In the case where the liquid crystal composition is used in a liquid crystal display device which quickly responds, the appropriate amount of the compound represented by General Formula (XIV-2) is at a lower level.

The compound represented by General Formula (XIV-2) is preferably a compound represented by General Formula (XIV-2-1).

[Chem. 234]

(XIV-2-1)

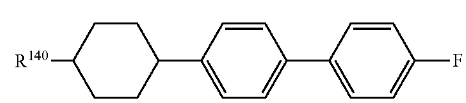

In General Formula (XIV-2-1), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-1) is preferably in the range of 1 mass % to 15 mass %, also preferably 3 mass % to 13 mass %, also preferably 5 mass % to 11 mass %, and also preferably 7 mass % to 9 mass % relative to the total mass of the liquid crystal composition of the present invention in view of resistance to resolution at low temperature, transition temperature, electric reliability, and another property.

In particular, the compound represented by General Formula (XIV-2-1) is preferably at least one compound selected from the group consisting of compounds represented by Formulae (53.1) to (53.4), and more preferably the compound represented by Formula (53.4).

[Chem. 235]

(53.1)

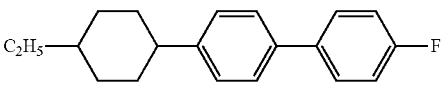

(53.2)

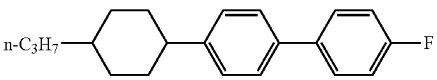

(53.3)

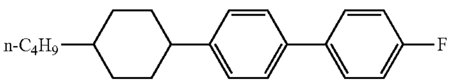

(53.4)

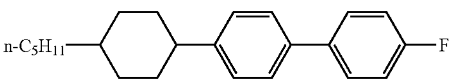

Alternatively or additionally, the compound represented by General Formula (XIV-2) is preferably a compound represented by General Formula (XIV-2-2).

[Chem. 236]

(XIV-2-2)

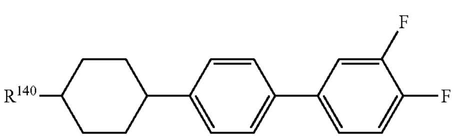

In General Formula (XIV-2-2), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-2) is preferably in the range of 3 mass % to 20 mass %, also preferably 5 mass % to 17 mass %, also preferably 5 mass % to 15 mass %, and also preferably 5 mass % to 9 mass % relative to the total mass of the liquid crystal composition of the present invention in view of resistance to resolution at low temperature, transition temperature, electric reliability, and another property.

In the case where the liquid crystal composition contains one compound represented by General Formula (i), two compounds represented by General Formula (XIV-2-2) are preferably used. The amount thereof is preferably in the range of 10 to 20%, and more preferably 12 to 17%.

In particular, the compound represented by General Formula (XIV-2-2) is preferably at least one compound selected from the group consisting of compounds represented by Formulae (54.1) to (54.4), and more preferably the compound represented by Formula (54.2) and/or the compound represented by Formula (54.4).

In the case where two compounds represented by General Formula (XIV-2-2) are used, the compound represented by Formula (54.4) and the compound represented by Formula (54.2) are preferably used in combination, and the compound represented by Formula (54.1) and the compound represented by Formula (54.2) are also preferably used in combination.

[Chem. 237]

(54.1)

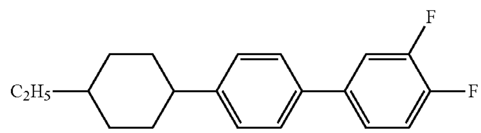

(54.2)

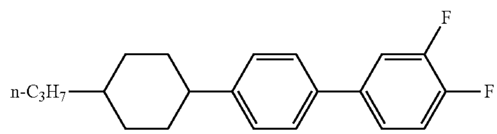

(54.3)

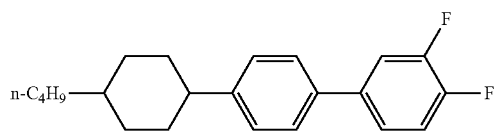

(54.4)

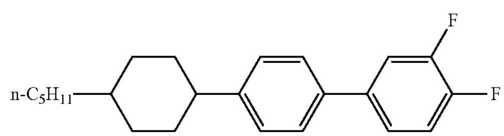

In the liquid crystal composition of the present invention, the amount of the compound represented by Formula (54.2) is preferably in the range of 5 mass % to 35 mass %, also preferably 5 mass % to 25 mass %, also preferably 5 mass % to 22 mass %, also preferably 6 mass % to 20 mass %, also preferably 6 mass % to 15 mass %, and also preferably 6 mass % to 9 mass % relative to the total mass of the liquid crystal composition of the present invention.

Alternatively or additionally, the compound represented by General Formula (XIV-2) is preferably a compound represented by General Formula (XIV-2-3).

[Chem. 238]

(XIV-2-3)

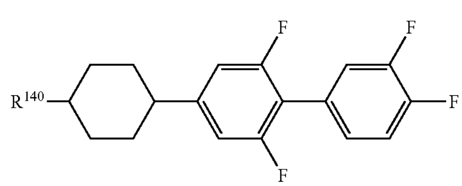

In General Formula (XIV-2-3), $R^{140}$ an alkyl group having 1 to 5 carbon atoms, an alkenyl group having 2 to 5 carbon atoms, or an alkoxy group having 1 to 4 carbon atoms.

The amount of the compound represented by General Formula (XIV-2-3) is preferably in the range of 5 mass % to 30 mass %, also preferably 9 mass % to 27 mass %, also preferably 12 mass % to 24 mass %, and also preferably 12 mass % to 20 mass % relative to the total mass of the liquid crystal composition of the present invention in view of resistance to resolution at low temperature, transition temperature, electric reliability, and another property.

In particular, the compound represented by General Formula (XIV-2-3) is preferably at least one compound selected from the group consisting of compounds represented by Formulae (55.1) to (55.4), and more preferably the compound represented by Formula (55.2) and/or the compound represented by Formula (55.4).

[Chem. 239]

(55.1)

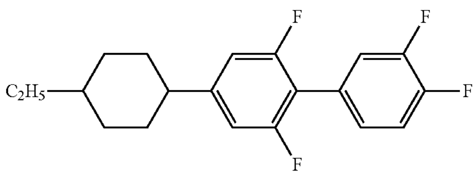

(55.2)

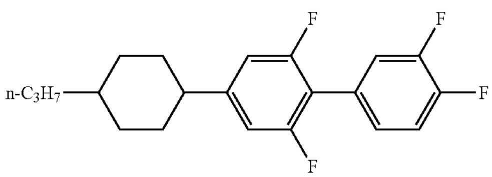

(55.3)

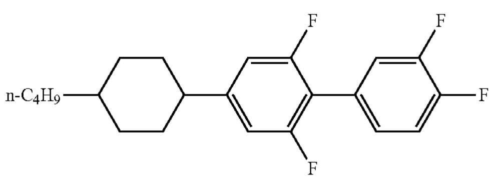

(55.4)

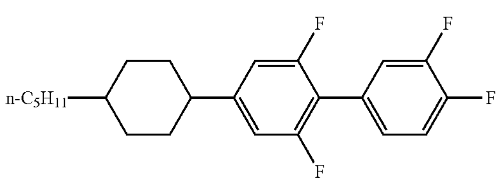

Alternatively or additionally, the compound represented by General Formula (XIV-2) is preferably any of compounds represented by General Formula (XIV-2-4).

[Chem. 240]

(XIV-2-4)

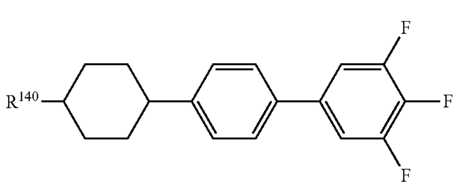

In General Formula (XIV-2-4), $R^{140}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment is determined in view of resistance to resolution at low temperature, transition temperature, electric reliability, birefringence, and another property. For example, one of such compounds is used in an embodiment of the present invention, two of the compounds are used in another embodiment of the present invention, and three or more of the compounds are used in another embodiment of the present invention.

The amount of the compound represented by General Formula (XIV-2-4) is adjusted to be appropriate for an embodiment on the basis of properties such as resistance to resolution at low temperature, transition temperature, electric reliability, and birefringence.

Relative to the total mass of the liquid crystal composition of the present invention, for example, the amount of the compound represented by General Formula (XIV-2-4) is in the range of 1 to 20 mass % in an embodiment of the present invention; in another embodiment, the amount is from 1 to 15 mass %; in another embodiment, the amount is from 1 to 10 mass %; in another embodiment, the amount is from 1 to 9 mass %; in another embodiment, the amount is from 1 to 3 mass %; and in another embodiment, the amount is from 6 to 9 mass %.

In the case where the liquid crystal composition of the present invention is used in a liquid crystal display device which is driven at a small driving voltage, the appropriate amount of the compound represented by General Formula (XIV-2-4) is at a higher level. In the case where the liquid crystal composition is used in a liquid crystal display device which quickly responds, the appropriate amount of the compound represented by General Formula (XIV-2-4) is at a lower level.

In particular, the compound represented by General Formula (XIV-2-4) is preferably at least one compound selected from the group consisting of compounds represented by Formulae (56.1) to (56.4), and more preferably the compound represented by Formula (56.1), the compound represented by Formula (56.2), and/or the compound represented by Formula (56.4).

[Chem. 241]

(56.1)

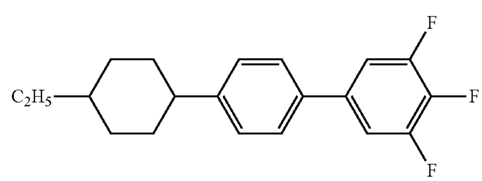

(56.2)

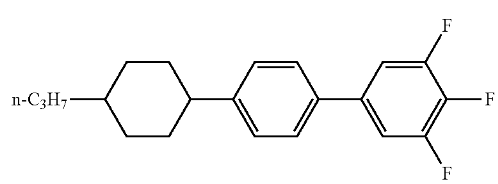

(56.3)

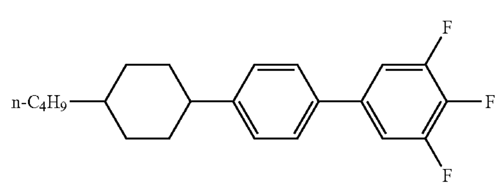

-continued (56.4)

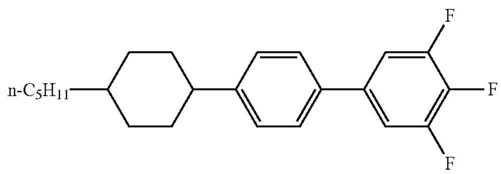

Alternatively or additionally, the compound represented by General Formula (XIV-2) is preferably a compound represented by General Formula (XIV-2-5).

[Chem. 242]

(XIV-2-5)

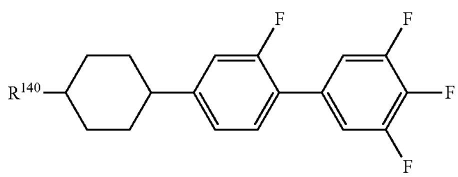

In General Formula (XIV-2-5), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-5) is preferably in the range of 5 mass % to 25 mass %, also preferably 10 mass % to 22 mass %, also preferably 13 mass % to 18 mass %, and also preferably 13 mass % to 15 mass % relative to the total mass of the liquid crystal composition of the present invention in view of resistance to resolution at low temperature, transition temperature, electric reliability, and another property.

In particular, the compound represented by General Formula (XIV-2-5) is at least one compound selected from the group consisting of compounds represented by Formulae (57.1) to (57.4). Among these, the compound represented by Formula (57.1) is preferably employed.

[Chem. 243]

(57.1)

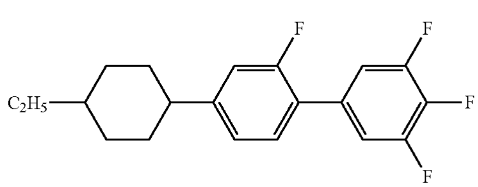

(57.2)

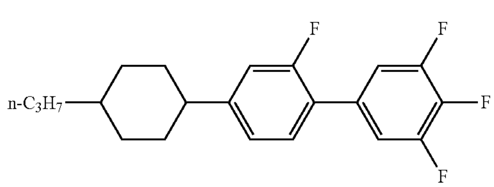

-continued (57.3)

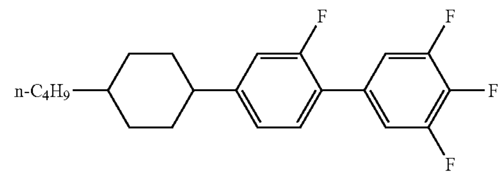

(57.4)

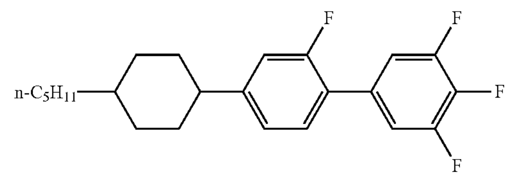

Alternatively or additionally, the compound represented by General Formula (XIV-2) is preferably a compound represented by General Formula (XIV-2-6).

[Chem. 244]

(XIV-2-6)

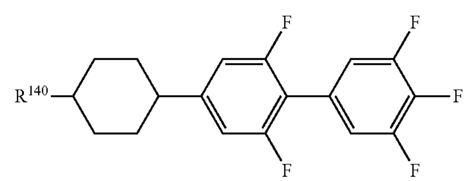

In General Formula (XIV-2-6), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-6) is preferably in the range of 5 mass % to 25 mass %, also preferably 10 mass % to 22 mass %, also preferably 15 mass % to 20 mass %, and also preferably 15 mass % to 17 mass % relative to the total mass of the liquid crystal composition of the present invention in view of resistance to resolution at low temperature, transition temperature, electric reliability, and another property.

In particular, the compound represented by General Formula (XIV-2-6) is preferably at least one compound selected from the group consisting of compounds represented by Formulae (58.1) to (58.4), and more preferably the compound represented by Formula (58.2).

[Chem. 245]

(58.1)

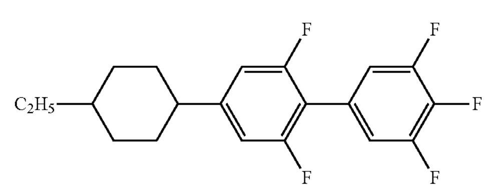

-continued (58.2)

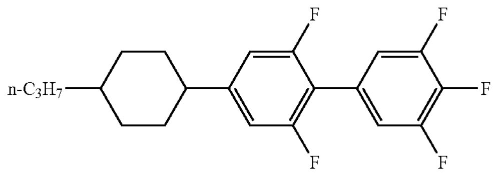

(58.3)

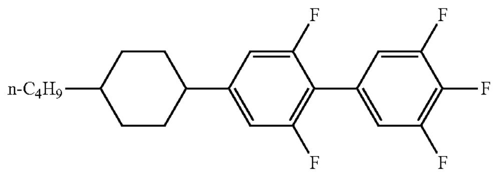

(58.4)

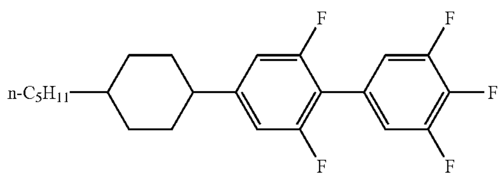

Alternatively or additionally, the compound represented by General Formula (XIV) is preferably any of compounds represented by General Formula (XIV-3).

[Chem. 246]

(XIV-3)

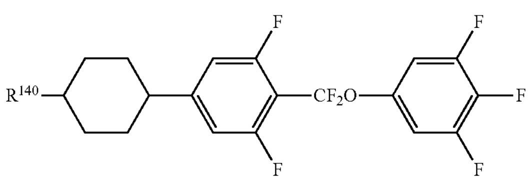

In General Formula (XIV-3), $R^{140}$ represents an alkyl group having 1 to 5 carbon atoms, an alkenyl group having 2 to 5 carbon atoms, or an alkoxy group having 1 to 4 carbon atoms.

Such compounds can be used in any combination; a combination of the compounds is properly determined on the basis of desired properties such as resistance to resolution at low temperature, transition temperature, electric reliability, and birefringence. For example, one of such compounds is used in an embodiment of the present invention, and two or more of the compounds are used in another embodiment of the present invention.

The amount of the compound represented by General Formula (XIV-3) is preferably in the range of 2.5 mass % to 25 mass %, also preferably 3 mass % to 15 mass %, and also preferably 3 mass % to 10 mass % relative to the total mass of the liquid crystal composition of the present invention in view of resistance to resolution at low temperature, transition temperature, electric reliability, birefringence, and another property.

In particular, the compound represented by General Formula (XIV-3) is preferably at least one compound selected from the group consisting of compounds represented by Formulae (61.1) to (61.4), and more preferably the compound represented by Formula (61.1) and/or the compound represented by Formula (61.2).

[Chem. 247]

(61.1)

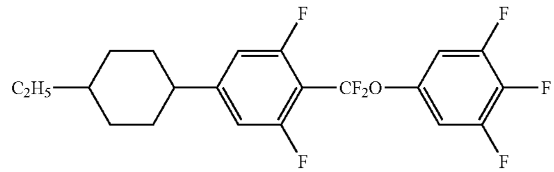

(61.2)

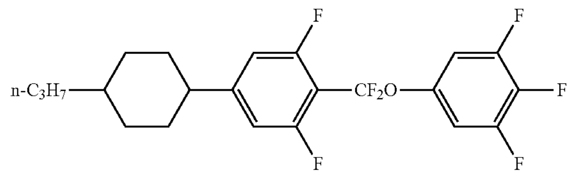

(61.3)

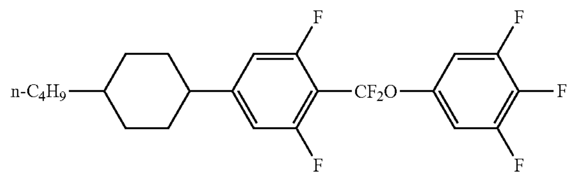

(61.4)

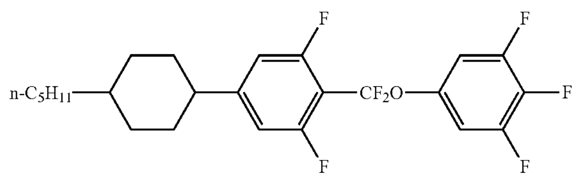

Alternatively or additionally, the compound represented by General Formula (M) is preferably any of compounds represented by General Formula (XV).

[Chem. 248]

(XV)

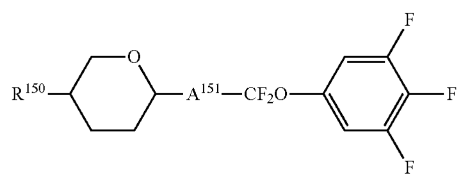

In General Formula (XV), $R^{150}$ represents an alkyl group having 1 to 5 carbon atoms, an alkenyl group having 2 to 5 carbon atoms, or an alkoxy group having 1 to 4 carbon atoms; and $A^{151}$ represents a 1,4-cyclohexylene group, a 1,4-phenylene group, or any one of groups represented by the following formulae, and a hydrogen atom of the 1,4-phenylene group is optionally substituted with a fluorine atom.

[Chem. 249]

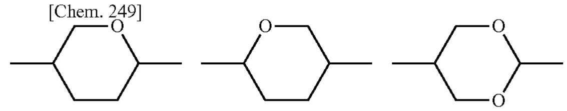

Such compounds can be used in any combination; a combination of the compounds is properly determined in view of resistance to resolution at low temperature, transition temperature, electric reliability, birefringence, and another property. For instance, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The amount of the compound represented by General Formula (XV) is adjusted to be appropriate for an embodiment on the basis of properties such as resistance to resolution at low temperature, transition temperature, electric reliability, and birefringence. Relative to the total mass of the liquid crystal composition of the present invention, for example, the amount of the compound represented by General Formula (XV) is in the range of 0.5 to 30 mass % in an embodiment of the present invention; in another embodiment, the amount is from 1 to 30 mass %; in another embodiment, the amount is from 3 to 30 mass %; in another embodiment, the amount is from 6 to 30 mass %; in another embodiment, the amount is from 9 to 30 mass %; in another embodiment, the amount is from 11 to 30 mass %; in another embodiment, the amount is from 12 to 30 mass %; in another embodiment, the amount is from 18 to 30 mass %; in another embodiment, the amount is from 19 to 30 mass %; in another embodiment, the amount is from 23 to 30 mass %; and in another embodiment, the amount is from 25 to 30 mass %.

Furthermore, relative to the total mass of the liquid crystal composition of the present invention, for example, the amount of the compound represented by General Formula (XV) is in the range of 0.5 to 25 mass % in an embodiment of the present invention; in another embodiment, the amount is from 0.5 to 20 mass %; in another embodiment, the amount is from 0.5 to 13 mass %; in another embodiment, the amount is from 0.5 to 9 mass %; and in another embodiment, the amount is from 1 to 6 mass %.

The compound represented by General Formula (XV), which is used in the liquid crystal composition of the present invention, is preferably any of compounds represented by General Formula (XV-1).

[Chem. 250]

(XV-1)

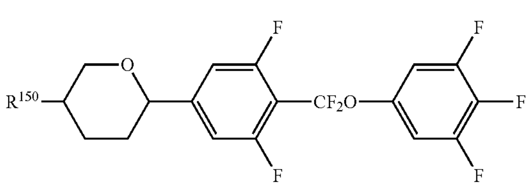

In General Formula (XV-1), $R^{150}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (XV-1) is appropriately adjusted on the basis of properties such as resistance to resolution at low temperature, transition temperature, electric reliability, and birefringence.

Relative to the total mass of the liquid crystal composition of the present invention, for example, the amount of the compound represented by General Formula (XV-1) is in the range of 1 to 25 mass % in an embodiment of the present invention; in another embodiment, the amount is from 1 to 20 mass %; in another embodiment, the amount is from 1 to 10 mass %; in another embodiment, the amount is from 3 to 10 mass; in another embodiment, the amount is from 4 to 7 mass %; in another embodiment, the amount is from 1 to 5 mass %; and in another embodiment, the amount is from 5 to 10 mass %.

In particular, the compound represented by General Formula (XV-1), which is used in the liquid crystal composition of the present invention, is preferably at least one compound selected from the group consisting of compounds represented by Formulae (59.1) to (59.4), and more preferably the compound represented by Formula (59.2).

[Chem. 251]

(59.1)

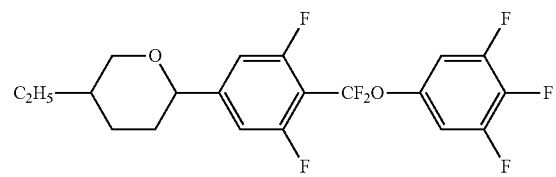

(59.2)

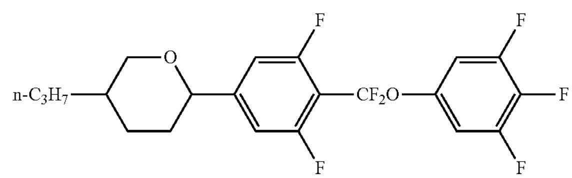

(59.3)

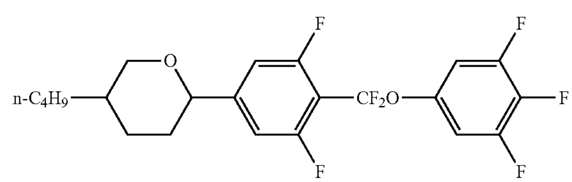

(59.4)

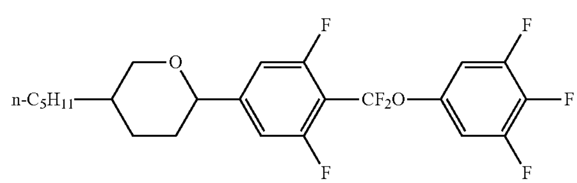

Alternatively or additionally, the compound represented by General Formula (XV) is preferably any of compounds represented by General Formula (XV-2).

[Chem. 252]

(XV-2)

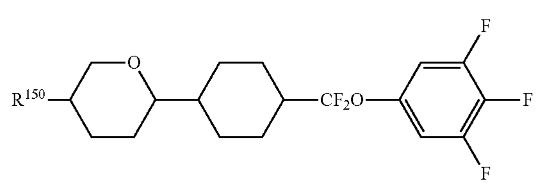

In General Formula (XV-2), $R^{150}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (XV-2) is appropriately adjusted on the basis of properties such as resistance to resolution at low temperature, transition temperature, electric reliability, and birefringence.

The amount of the compound represented by General Formula (XV-2) is, for instance, preferably in the range of 0.5 mass % to 20 mass %, also preferably 1 mass % to 15 mass %, also preferably 1 mass % to 10 mass %, and also preferably 1 mass % to 4 mass % relative to the total mass of the liquid crystal composition of the present invention in view of resistance to resolution at low temperature, transition temperature, electric reliability, birefringence, and another property.

In particular, the compound represented by General Formula (XV-2), which is used in the liquid crystal composition of the present invention, is preferably at least one compound selected from the group consisting of compounds represented by Formulae (60.1) to (60.4), and more preferably the compound represented by Formula (60.2).

[Chem. 253]

(60.1)

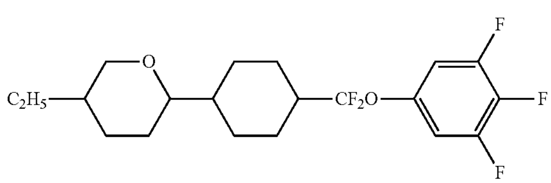

(60.2)

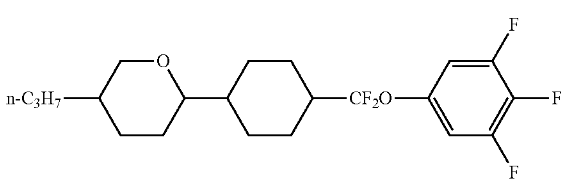

(60.3)

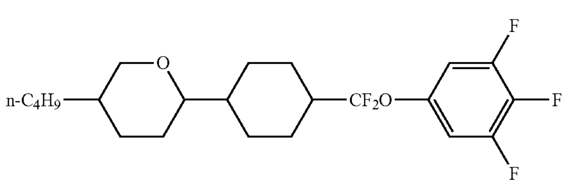

(60.4)

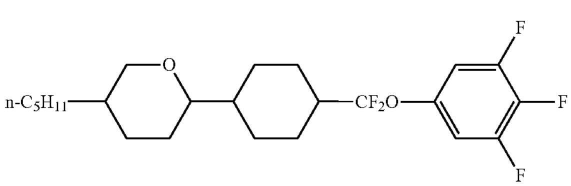

Alternatively or additionally, the compound represented by General Formula (XV) is preferably any of compounds represented by General Formula (XV-3).

[Chem. 254]

(XV-3)

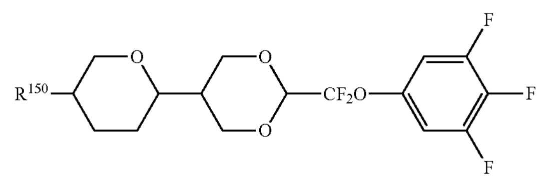

In General Formula (XV-3), $R^{150}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (XV-3) is appropriately adjusted on the basis of properties such as resistance to resolution at low temperature, transition temperature, electric reliability, and birefringence.

The amount of the compound represented by General Formula (XV-3) is, for instance, preferably in the range of 0.5 mass % to 20 mass %, also preferably 1 mass % to 15 mass %, also preferably 1 mass % to 10 mass %, and also preferably 1 mass % to 5 mass % relative to the total mass of the liquid crystal composition of the present invention in view of resistance to resolution at low temperature, transition temperature, electric reliability, birefringence, and another property.

In particular, the compound represented by General Formula (XV-3), which is used in the liquid crystal composition of the present invention, is preferably at least one compound selected from the group consisting of compounds represented by Formulae (64.1) to (64.4), and more preferably the compound represented by Formula (64.1) or the compound represented by Formula (64.2).

[Chem. 255]

(64.1)

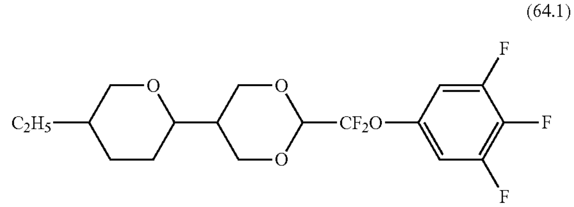

(64.2)

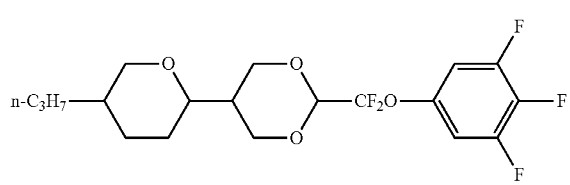

-continued (64.3)

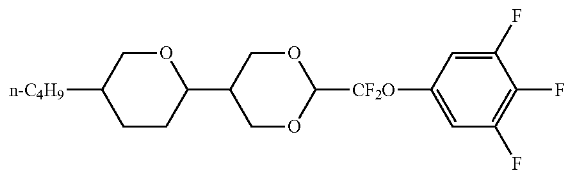

(64.4)

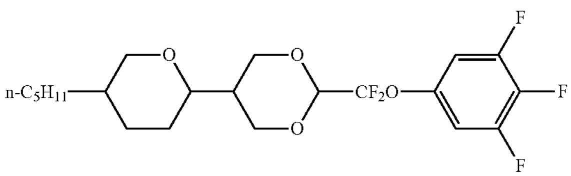

Alternatively or additionally, the compound represented by General Formula (N) is preferably any of compounds represented by General Formula (XV').

(XV')

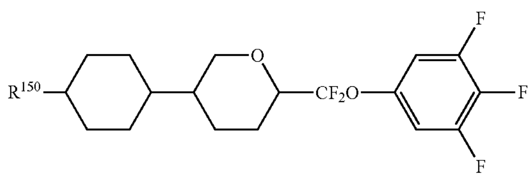

lp;-1pIn General Formula (XV'), $R^{150}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (XV') is appropriately adjusted on the basis of properties such as resistance to resolution at low temperature, transition temperature, electric reliability, and birefringence.

The amount of the compound represented by General Formula (XV') is, for instance, preferably in the range of 0.5 mass % to 20 mass %, also preferably 1 mass % to 15 mass %, also preferably 1 mass % to 10 mass %, and also preferably 1 mass % to 4 mass % relative to the total mass of the liquid crystal composition of the present invention in view of resistance to resolution at low temperature, transition temperature, electric reliability, birefringence, and another property.

In particular, the compound represented by General Formula (XV'), which is used in the liquid crystal composition of the present invention, is preferably at least one compound selected from the group consisting of compounds represented by Formulae (65.1) to (65.4), and more preferably the compound represented by Formula (65.2).

[Chem. 256]

(65.1)

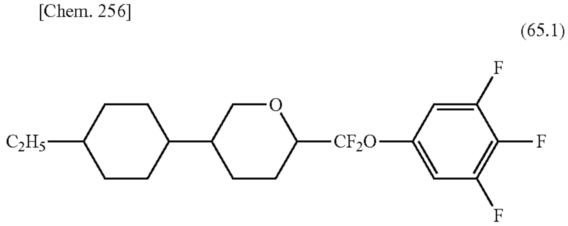

-continued (65.2)

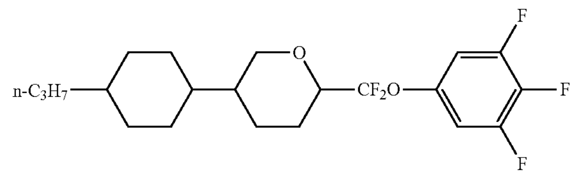

(65.3)

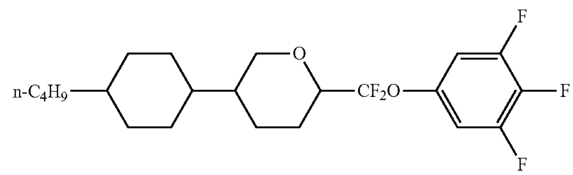

(65.4)

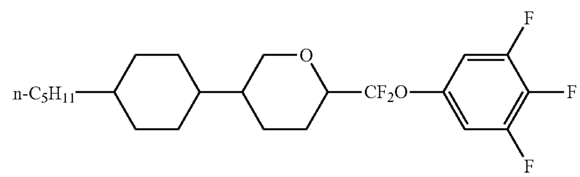

Alternatively or additionally, the compound represented by General Formula (M) is preferably any of compounds represented by General Formula (XVI).

(XVI)

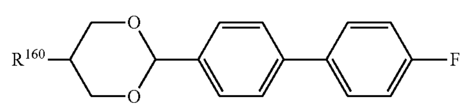

In General Formula (XVI), $R^{160}$ represents an alkyl group having 1 to 5 carbon atoms, an alkenyl group having 2 to 5 carbon atoms, or an alkoxy group having 1 to 4 carbon atoms.

Such compounds can be used in any combination; in view of resistance to resolution at low temperature, transition temperature, electric reliability, birefringence, and another property, the compounds are preferably used alone or in combination.

The amount of the compound represented by General Formula (XVI) is appropriately adjusted on the basis of properties such as resistance to resolution at low temperature, transition temperature, electric reliability, and birefringence.

The amount of the compound represented by General Formula (XVI) is, for instance, preferably in the range of 0.5 mass % to 20 mass %, also preferably 1 mass % to 15 mass %, also preferably 1 mass % to 10 mass %, and also preferably 1 mass % to 4 mass % relative to the total mass of the liquid crystal composition of the present invention in view of resistance to resolution at low temperature, transition temperature, electric reliability, birefringence, and another property.

In particular, the compound represented by General Formula (XVI), which is used in the liquid crystal composition of the present invention, is preferably at least one compound selected from the group consisting of compounds represented by Formulae (66.1) to (66.4), and more preferably the compound represented by Formula (66.2).

[Chem. 257]

(66.1)

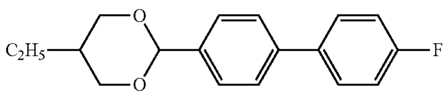

(66.2)

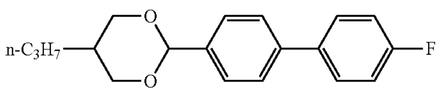

(66.3)

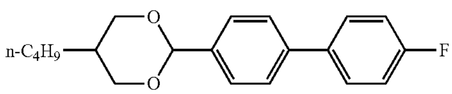

(66.4)

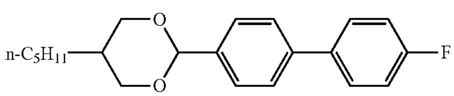

The liquid crystal composition of the present invention is preferably free from a compound having a molecular structure in which oxygen atoms are bonded to each other, such as the structure of a peroxy acid (—CO—OO—).

In terms of the reliability and long-term stability of the liquid crystal composition, the amount of a compound having a carbonyl group is preferably not more than 5 mass %, more preferably not more than 3 mass %, and further preferably not more than 1 mass % relative to the total mass of the composition. It is most preferred that the composition be substantially free from such a compound.

In terms of stability to irradiation with UV, the amount of a compound substituted with a chlorine atom is preferably not more than 15 mass %, more preferably not more than 10 mass %, and further preferably not more than 5 mass % relative to the total mass of the composition. It is most preferred that the composition be substantially free from such a compound.

10 mass %, and more preferably not more than 5 mass % relative to the total mass of the composition. It is further preferred that the liquid crystal composition be substantially free from such a compound.

In terms of improvements in viscosity and Tni, the amount of a compound of which the molecules each contain a 2-methylbenzene-1,4-diyl group in which a hydrogen atom is optionally substituted with a halogen is preferably reduced. The amount of the compound of which the molecules each contain such a 2-methylbenzene-1,4-diyl group is preferably not more than 10 mass %, and more preferably not more than 5 mass % relative to the total mass of the composition. It is further preferred that the composition be substantially free from such a compound.

In the case where a compound contained in the composition of the first embodiment of the present invention has a side chain that is an alkenyl group, the alkenyl group preferably has 2 to 5 carbon atoms if the alkenyl group is bonded to cyclohexane, or the alkenyl group preferably has 4 or 5 carbon atoms if the alkenyl group is bonded to benzene. The unsaturated bond of the alkenyl group is preferably not directly connected to the benzene.

The liquid crystal composition of the present invention can contain a polymerizable compound to produce a liquid crystal display device of a PS mode, PSA mode involving use of a horizontal electric field, or PSVA mode involving use of a horizontal electric field. Examples of a usable polymerizable compound include photopolymerizable monomers which are polymerized by being irradiated with energy rays such as light; in particular, examples of the polymerizable compound include polymerizable compounds having a structure with a liquid crystal molecular framework in which six-membered rings are bonded to each other, such as biphenyl derivatives and terphenyl derivatives. Specifically, the polymerizable compound is preferably a difunctional monomer represented by General Formula (XX).

[Chem. 258]

(XX)

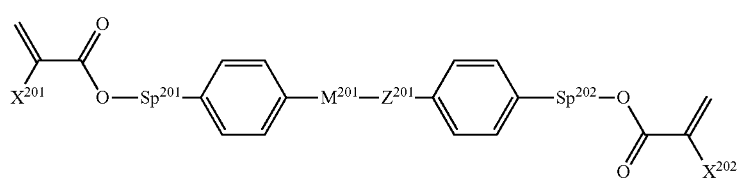

The amount of compounds having molecules in which all of the ring structures are six-membered rings is preferably adjusted to be large. The amount of such compounds having molecules in which all of the ring structures are six-membered rings is preferably not less than 80 mass %, more preferably not less than 90 mass %, and further preferably not less than 95 mass % relative to the total mass of the composition. It is most preferred that the liquid crystal composition be substantially composed of only the compounds having molecules in which all of the ring structures are six-membered rings.

In order to suppress degradation of the liquid crystal composition due to oxidation thereof, the amount of a compound having a cyclohexenylene group that is a ring structure is preferably reduced. The amount of a compound having a cyclohexenylene group is preferably not more than In General Formula (XX), $X^{201}$ and $X^{202}$ each independently represent a hydrogen atom or a methyl group;

$Sp^{201}$ and $Sp^{202}$ each independently represent a single bond, an alkylene group having 1 to 8 carbon atoms, or —O—$(CH_2)_s$— (where s represents an integer from 2 to 7, and the oxygen atom is bonded to an aromatic ring);

$Z^{201}$ represents —$OCH_2$—, —$CH_2O$—, —COO—, —OCO—, —$CF_2O$—, —$OCF_2$—, —$CH_2CH_2$—, —$CF_2CF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$═$CY^2$—(where $Y^1$ and $Y^2$ each independently represent a fluorine atom or a hydrogen atom), —C≡C—, or a single bond; and $M^{201}$ represents a 1,4-phenylene group, a trans-1,4-cyclohexylene group, or a single bond, and in each 1,4-phenylene group in the formula, any hydrogen atom is optionally substituted with a fluorine atom.

Diacrylate derivatives in which $X^{201}$ and $X^{202}$ each represent a hydrogen atom and dimethacrylate derivatives in which $X^{201}$ and $X^{202}$ are each a methyl group are preferred, and compounds in which one of $X^{201}$ and $X^{202}$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^{201}$ and $Sp^{202}$ each independently represent a single bond, an alkylene group having 1 to 8 carbon atoms, or —O—$(CH_2)_s$—; in an application to PSA display devices, at least one of $Sp^{201}$ and $Sp^{202}$ is preferably a single bond, and compounds in which $Sp^{201}$ and $Sp^{202}$ each represent a single bond and compounds in which one of $Sp^{201}$ and $Sp^{202}$ is a single bond and in which the other one thereof represents an alkylene group having 1 to 8 carbon atoms or —O—$(CH_2)_3$— are preferred. In this case, an alkyl group having 1 to 4 carbon atoms is preferably employed, and s preferably ranges from 1 to 4.

$Z^{201}$ is preferably —$OCH_2$—, —$CH_2O$—, —COO—, —OCO—, —$CF_2O$—, —$OCF_2$—, —$CH_2CH_2$—, —$CF_2CF_2$—, or a single bond; more preferably —COO—, —OCO—, or a single bond; and especially preferably a single bond.

$M^{201}$ represents a 1,4-phenylene group in which any hydrogen atom is optionally substituted with a fluorine atom, a trans-1,4-cyclohexylene group, or a single bond; and a 1,4-phenylene group and a single bond are preferred. In the case where $M^{201}$ does not represent a single bond but represents a ring structure, $Z^{201}$ preferably does not represent a single bond but represents a linking group; in the case where $M^{201}$ represents a single bond, $Z^{201}$ is preferably a single bond.

From these viewpoints, a preferred ring structure between $Sp^{201}$ and $Sp^{202}$ in General Formula (XX) is particularly as follows.

In General Formula (XX), in the case where $M^{201}$ represents a single bond and where the ring structure consists of two rings, the ring structure is preferably represented by any of Formulae (XXa-1) to (XXa-5), more preferably Formulae (XXa-1) to (XXa-3), and especially preferably Formula (XXa-1).

[Chem. 259]

(XXa-1)

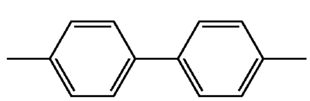

(XXa-2)

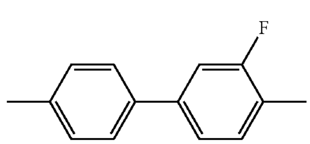

-continued (XXa-3)

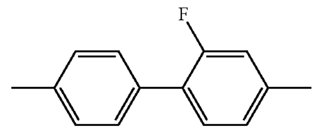

(XXa-4)

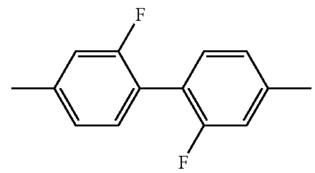

(XXa-5)

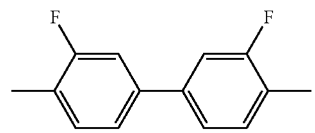

In Formulae (XXa-1) to (XXa-5), the two ends of each structure are connected to $Sp^{201}$ and $Sp^{202}$ respectively.

Polymerizable compounds having such skeletons enable uneven display to be reduced or eliminated in PSA liquid crystal display devices because such polymerizable compounds have optimum alignment regulating force after being polymerized and thus produce a good alignment state.

Accordingly, the polymerizable monomer is preferably at least one compound selected from the group consisting of compounds represented by General Formulae (XX-1) to (XX-4), and more preferably the compound represented by General Formula (XX-2).

[Chem. 260]

(XX-1)

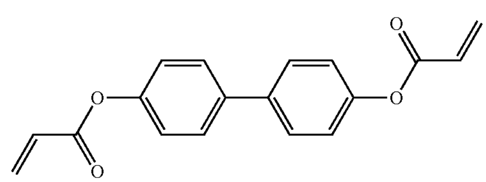

(XX-2)

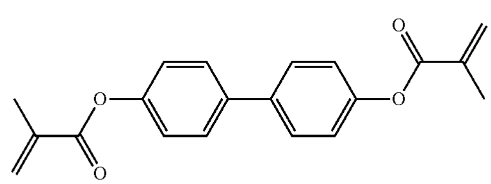

(XX-3)

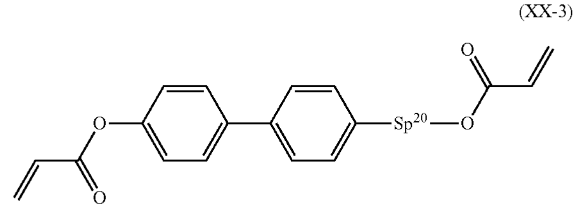

-continued (XX-4)

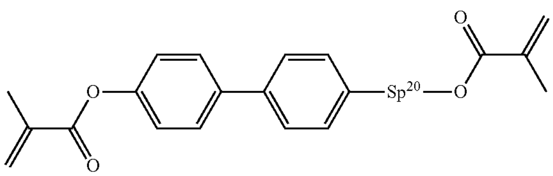

In General Formulae (XX-3) and (XX-4), $Sp^{20}$ represents an alkylene group having 2 to 5 carbon atoms.

In the case where the monomer is added to the liquid crystal composition of the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides.

The liquid crystal composition of the present invention can further contain a compound represented by General Formula (Q).

[Chem. 261]

(Q)

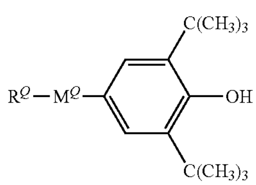

In General Formula (Q), $R^Q$ represents a linear or branched alkyl group having 1 to 22 carbon atoms; at least one $CH_2$ moiety contained in the alkyl group is optionally substituted with —O—, —CH═CH—, —CO—, —OCO—, —COO—, —C≡C—, —$CF_2$O—, or —O$CF_2$— such that oxygen atoms do not adjoin each other; and $M^Q$ represents a trans-1,4-cyclohexylene group, a 1,4-phenylene group, or a single bond.

$R^Q$ represents a linear or branched alkyl group having 1 to 22 carbon atoms, and at least one $CH_2$ moiety contained in the alkyl group is optionally substituted with —O—, —CH═CH—, —CO—, —OCO—, —COO—, —C≡C—, —$CF_2$O—, or —O$CF_2$— such that oxygen atoms do not adjoin each other. $R^Q$ is preferably a linear alkyl group, a linear alkoxy group, a linear alkyl group of which one $CH_2$ moiety is substituted with —OCO— or —COO—, a branched alkyl group, a branched alkoxy group, or a branched alkyl group of which one $CH_2$ moiety is substituted with —OCO— or —COO—, each group having 1 to 20 carbon atoms; and more preferably a linear alkyl group, a linear alkyl group of which one $CH_2$ moiety is substituted with —OCO— or —COO—, a branched alkyl group, a branched alkoxy group, or a branched alkyl group of which one $CH_2$ moiety is substituted with —OCO— or —COO—, each group having 1 to 10 carbon atoms.

$M^Q$ represents a trans-1,4-cyclohexylene group, a 1,4-phenylene group, or a single bond and is preferably a trans-1,4-cyclohexylene group or a 1,4-phenylene group.

The compound represented by General Formula (Q) is preferably at least one compound selected from the group consisting of compounds represented by General Formulae (Q-a) to (Q-d), and more preferably the compound represented by General Formula (Q-c) and/or the compound represented by General Formula (Q-d).

[Chem. 262]

(Q-a)

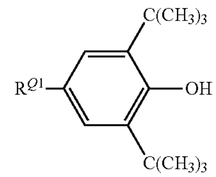

(Q-b)

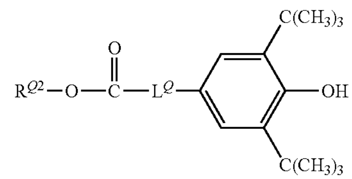

(Q-c)

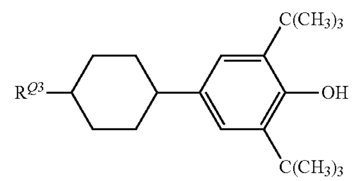

(Q-d)

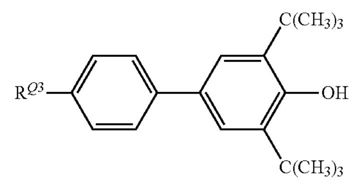

In these formulae, $R^{Q1}$ is preferably a linear or branched alkyl group having 1 to 10 carbon atoms, $R^{Q2}$ is preferably a linear or branched alkyl group having 1 to 20 carbon atoms, $R^{Q3}$ is preferably a linear or branched alkyl or alkoxy group having 1 to 8 carbon atoms, and $L^Q$ is preferably a linear or branched alkylene group having 1 to 8 carbon atoms.

The liquid crystal composition of the present invention preferably contains one or two compounds represented by General Formula (Q), and more preferably one to five; the amount thereof is preferably in the range of 0.001 to 1 mass %, also preferably 0.001 to 0.1 mass %, and also preferably 0.001 to 0.05 mass % relative to the total mass of the liquid crystal composition of the present invention.

<Liquid Crystal Display Device>

The liquid crystal composition of the present invention, to which a polymerizable compound has been added, is irradiated with ultraviolet to polymerize the polymerizable compound with the result that liquid crystal molecules can be aligned; thus, such a liquid crystal composition is used in liquid crystal display devices in which the birefringence of the liquid crystal composition is utilized to control the amount of light that is to be transmitted. Such a liquid crystal composition is useful for liquid crystal display devices, such as an ECB-LCD, a VA-LCD, an FFS-LCD, an AM-LCD (active-matrix liquid crystal display device), a TN (nematic liquid crystal display device), an STN-LCD (super twisted nematic liquid crystal display device), an OCB-LCD, and an IPS-LCD (in-plane switching liquid crystal display device), particularly useful for an AM-LCD, and can be used in transmissive or reflective liquid crystal display devices.

Two substrates used in a liquid crystal cell included in a liquid crystal display device can be made of a transparent material having flexibility, such as glass or a plastic material, and one of these substrates may be made of a non-transparent material such as silicon. In order to form a transparent electrode layer on a transparent substrate such as a glass plate, for example, indium tin oxide (ITO) is sputtered on the transparent substrate.

Color filters can be produced by, for instance, a pigment dispersion technique, a printing technique, an electrodeposition technique, or a staining technique. In production of the color filters by, for example, a pigment dispersion technique, a curable colored composition for a color filter is applied onto the transparent substrate, subjected to patterning, and then cured by being heated or irradiated with light. This process is carried out for each of three colors of red, green, and blue, thereby being able to produce the pixels of the color filters. Active elements such as a TFT or a thin-film diode may be provided on the resulting substrate to form pixel electrodes.

The substrates are arranged so as to face each other with the transparent electrode layer interposed therebetween. In the arrangement of the substrates, a spacer may be present between the substrates to adjust the distance therebetween. In this case, the distance between the substrates is adjusted so that the thickness of a light modulating layer to be formed is preferably in the range of 1 to 100 μm, and more preferably 1.5 to 10 μm. In the case where a polarizing plate is used, the product of the refractive index anisotropy Δn of liquid crystal and a cell thickness d is preferably adjusted to achieve the maximum contrast. In the case where two polarizing plates are used, the polarization axis of each polarizing plate may be adjusted to give a good viewing angle or contrast. Furthermore, a retardation film may be also used to increase a viewing angle. Examples of the spacer include columnar spacers made of, for instance, glass particles, plastic particles, alumina particles, and photoresist materials. A sealing material such as a thermosetting epoxy composition is subsequently applied to the substrates by screen printing in a state in which a liquid crystal inlet has been formed, the substrates are attached to each other, and then the sealing material is heated to be thermally cured.

The polymerizable-compound-containing liquid crystal composition can be put into the space between the two substrates by a vacuum injection technique or ODF technique which is generally employed. A vacuum injection technique, however, has a problem in which traces of the injection remain while droplet stains do not remain. The present invention can be more suitably applied to display devices manufactured by an ODF technique. In a process for manufacturing a liquid crystal display device by an ODF technique, an optically and thermally curable epoxy-based sealing material is applied to any one of a backplane and a frontplane with a dispenser in the form of a closed loop that serves as a wall, a certain amount of the liquid crystal composition is dropped onto part of the substrate surrounded by the applied sealing material in a degassed atmosphere, and then the frontplane and the backplane are bonded to each other, thereby manufacturing a liquid crystal display device. The liquid crystal composition of the present invention can be stably dropped in an ODF process and can be therefore desirably used.

Since a proper polymerization rate is desired to enable liquid crystal molecules to be aligned in a good manner, the polymerizable compound is preferably polymerized by being irradiated with one of active energy rays, such as an ultraviolet ray and an electron beam, or by being irradiated with such active energy rays used in combination or in sequence. In the use of an ultraviolet ray, a polarized light source or a non-polarized light source may be used. In the case where the polymerizable-compound-containing liquid crystal composition is polymerized in a state in which the composition has been disposed between the two substrates, at least the substrate on the side from which active energy rays are emitted needs to have transparency suitable for the active energy rays. Another technique may be used, in which only the intended part is polymerized by being irradiated with light with a mask, the alignment state of the non-polymerized part is subsequently changed by adjusting conditions such as an electric field, a magnetic field, or temperature, and then polymerization is further carried out through irradiation with active energy rays. In particular, it is preferred that exposure to ultraviolet radiation be carried out while an alternating current electric field is applied to the polymerizable-compound-containing liquid crystal composition. The alternating current electric field to be applied preferably has a frequency ranging from 10 Hz to 10 kHz, and more preferably 60 Hz to 10 kHz; and the voltage is determined on the basis of a predetermined pretilt angle in a liquid crystal display device. In other words, the pretilt angle in a liquid crystal display device can be controlled by adjusting voltage that is to be applied. In MVA-mode liquid crystal display devices which involve use of a horizontal electric field, a pretilt angle is preferably controlled to be from 80 degrees to 89.9 degrees in view of alignment stability and contrast.

The temperature in the irradiation procedure is preferably within a temperature range in which the liquid crystal state of the liquid crystal composition of the present invention can be maintained. Polymerization is preferably carried out at a temperature close to room temperature, i.e., typically from 15 to 35° C. Preferred examples of a lamp usable for emitting an ultraviolet ray include a metal halide lamp, a high-pressure mercury lamp, and an ultrahigh-pressure mercury lamp. In addition, an ultraviolet ray to be emitted preferably has a wavelength that is in a wavelength region different from the wavelength region of light absorbed by the liquid crystal composition; it is preferred that an ultraviolet ray in a particular wavelength range be cut off as needed. The intensity of an ultraviolet ray to be emitted is preferably from 0.1 $mW/cm^2$ to 100 $W/cm^2$, and more preferably 2 $mW/cm^2$ to 50 $W/cm^2$. The energy of an ultraviolet ray to be emitted can be appropriately adjusted: preferably from 10 $mJ/cm^2$ to 500 $J/cm^2$, and more preferably 100 $mJ/cm^2$ to 200 $J/cm^2$. The intensity may be changed in the exposure to ultraviolet radiation. The time of the exposure to ultraviolet radiation is appropriately determined on the basis of the intensity of an ultraviolet ray to be emitted: preferably from 10 seconds to 3600 seconds, and more preferably 10 seconds to 600 seconds.

Liquid crystal display devices using the liquid crystal composition of the present invention are practical because they quickly respond and are less likely to suffer from defective display at the same time; in particular, the liquid crystal composition is useful to active-matrix liquid crystal display devices and can be applied to liquid crystal display devices of a VA mode, PSVA mode, PSA mode, IPS (in-plane switching) mode, FSS (fringe-field switching) mode, and ECB mode.

A liquid crystal display according to a preferred embodiment of the present invention will now be described in detail with reference to the drawings.

FIG. 1 is a cross-sectional view illustrating a liquid crystal display device which includes two substrates facing each other, a sealing material disposed between the substrates, and liquid crystal confined in a sealed region surrounded by the sealing material.

In particular, FIG. 1 illustrates a specific embodiment of a liquid crystal display device including a backplane, a frontplane, a sealing material 301 disposed between these substrates, and a liquid crystal layer 303 confined in a sealed region surrounded by the sealing material. The backplane includes a first substrate 100, TFT layers 102 and pixel electrodes 103 each formed so as to overlie the first substrate 100, and a passivation film 104 and first alignment film 105 each formed so as to cover these components. The frontplane faces the backplane and includes a second substrate 200; a black matrix 202, color filters 203, planarization film (overcoat layer) 201, and transparent electrode 204 each formed so as to overlie the second substrate 200; and a second alignment film 205 formed so as to cover these components. In addition, protrusions (columnar spacers) 302 and 304 are extending from a surface to which the sealing material 301 has been applied.

Any substantially transparent material can be used for the first substrate or the second substrate; for instance, glass, ceramic materials, and plastic materials can be used. Examples of materials used for the plastic substrate include cellulose derivatives such as cellulose, triacetyl cellulose, and diacetyl cellulose; polyesters such as polycycloolefin derivatives, polyethylene terephthalate, and polyethylene naphthalate; polyolefins such as polypropylene and polyethylene; polycarbonate; polyvinyl alcohol; polyvinyl chloride; polyvinylidene chloride; polyamide; polyimide; polyimideamide; polystyrene; polyacrylate; polymethyl methacrylate; polyethersulfone; polyarylate; and inorganic-organic composite materials such as glass fiber-epoxy resin and glass fiber-acrylic resin.

In the case where the plastic substrate is used, a barrier film is preferably formed. The barrier film serves to reduce the moisture permeability of the plastic substrate, which enhances the reliability of the electrical properties of the liquid crystal display device. Any barrier film having high transparency and low water vapor permeability can be used; in general, a thin film formed of an inorganic material, such as silicon oxide, by vapor deposition, sputtering, or a chemical vapor deposition method (CVD method) can be used.

In the present invention, the first and second substrates may be formed of materials the same as or different from each other without limitation. A glass substrate is preferably employed because using the glass substrate enables manufacturing of a liquid crystal display device exhibiting excellent thermal resistance and dimensional stability. A plastic substrate is also preferably employed because it is suitable for manufacturing by a roll-to-roll process and appropriately enables weight reduction and an enhancement in flexibility. In terms of imparting flatness and thermal resistance to the substrate, a combination of a plastic substrate and a glass substrate can give a good result.

In Examples which will be described later, a substrate is used as a material of the first substrate 100 or the second substrate 200.

In the backplane, the TFT layers 102 and the pixel electrodes 103 are disposed so as to overlie the first substrate 100. These components are formed through an arraying process which is generally used. The passivation film 104 and the first alignment film 105 are formed so as to cover these components, thereby completing the formation of the backplane.

The passivation film 104 (also referred to as an inorganic protective film) is a film used for protecting the TFT layers; in general, a nitride film (SiNx), an oxide film (SiOx), or another film is formed by, for example, a chemical vapor deposition (CVD) method.

The first alignment film 105 is a film which serves to align liquid crystal molecules; in general, a polymeric material, such as polyimide, is used in many cases. An alignment agent solution containing a polymeric material and a solvent is used as a coating liquid. The alignment film may reduce adhesion to the sealing material and is therefore applied in patterns in a sealed region. The alignment agent solution is applied by a printing technique, such as flexography, or a droplet ejection technique, such as an ink jet technique. The alignment agent solution which has been applied is temporarily dried to evaporate the solvent and then baked to be cross-linked and cured. Then, the cured product is subjected to an alignment treatment to develop an alignment function.

In general, a rubbing process is employed for the alignment treatment. The polymeric film produced as described above is unidirectionally rubbed with a rubbing cloth formed of a fibrous material such as rayon, which develops a function of aligning liquid crystal molecules.

A photo-alignment technique may be used. In the photo-alignment technique, an alignment function is developed by emitting polarized light onto an alignment film containing a photosensitive organic material, so that damage of a substrate and generation of dusts which are each caused by a rubbing process are eliminated. Examples of the organic materials used in the photo-alignment technique include materials containing dichroic dyes. A material usable as the dichroic dye has a group which induces an optical reaction resulting in development of a function of aligning liquid crystal molecules (hereinafter referred to as photo-alignment group): induction of molecular alignment or isomerization reaction (e.g., azobenzene group) caused by the Weigert effect based on photodichroism, a dimerization reaction (e.g., cinnamoyl group), a photo-cross-linking reaction (e.g., benzophenone group), or a photodegradation reaction (e.g., polyimide group). After the applied alignment agent solution is temporarily dried to evaporate the solvent, the product is irradiated with light having a predetermined polarization (polarized light), thereby being able to produce an alignment film which enables alignment in the intended direction.

In the frontplane, the black matrix 202, the color filters 203, the planarization film 201, the transparent electrode 204, and the second alignment film 205 are disposed so as to overlie the second substrate 200.

The black matrix 202 is formed by, for example, a pigment dispersion technique. In particular, a color resin liquid in which a black colorant has been uniformly dispersed for formation of the black matrix is applied onto the second substrate 200 on which the barrier film 201 has been formed, thereby forming a colored layer. The colored layer is subsequently cured by being baked. A photoresist is applied onto the cured layer and then pre-baked. The photoresist is exposed to light through a mask pattern, and then development is carried out to pattern the colored layer. Then, the photoresist layer is removed, and the colored layer is baked to complete the black matrix 202.

Alternatively, a photoresist-type pigment dispersion liquid may be used. In this case, the photoresist-type pigment dispersion liquid is applied, pre-baked, and exposed to light through a mask pattern; and then development is carried out to pattern the colored layer. Then, the photoresist layer is removed, and the colored layer is baked to complete the black matrix 202.

The color filters 203 are formed by a pigment dispersion technique, an electrodeposition technique, a printing technique, or a staining technique. In a pigment dispersion technique, for example, a color resin liquid in which a pigment (e.g., red) has been uniformly dispersed is applied onto the second substrate 200 and then cured by being baked, and a photoresist is applied onto the cured product and pre-baked. The photoresist is exposed to light through a mask pattern, and then development is carried out to form a pattern. The photoresist layer is subsequently removed, and baking is carried out again, thereby completing a (red) color filter 203. The color filters may be formed in any order of colors. A green color filter 203 and a blue color filter 203 are similarly formed.

The transparent electrode 204 is formed so as to overlie the color filters 203 (the overcoat layer (201) is optionally formed on the color filters 203 to flatten the surfaces). The transparent electrode 204 preferably has a high light transmittance and low electric resistance. In the formation of the transparent electrode 204, an oxide film of, for example, ITO is formed by sputtering.

In order to protect the transparent electrode 204, a passivation film is formed on the transparent electrode 204 in some cases.

The second alignment film 205 is the same as the above-mentioned first alignment film 105.

Although a specific embodiment of the backplane and frontplane used in the present invention has been described, the present invention is not limited to this specific embodiment and can be freely modified to provide a desired liquid crystal display device.

The columnar spacers may have any shape, and the horizontal section thereof may have any shape such as a circular, square, or polygonal shape; in particular, the horizontal section preferably has a circular shape or a regular polygonal shape in view of a margin for misalignment in the formation process. Furthermore, such protrusions preferably have the shape of a circular truncated cone or truncated pyramid.

Any material which is insoluble in the sealing material, an organic solvent used in the sealing material, and the liquid crystal can be used for the columnar spacers; a synthetic resin (curable resin) is preferably employed in terms of processability and weight reduction. The protrusions can be formed above the surface of the first substrate by photolithography or a droplet ejection technique, the surface being subjected to application of the sealing material. For such a reason, a photocurable resin suitable for photolithography and a droplet ejection technique is preferably employed.

Figure 2:
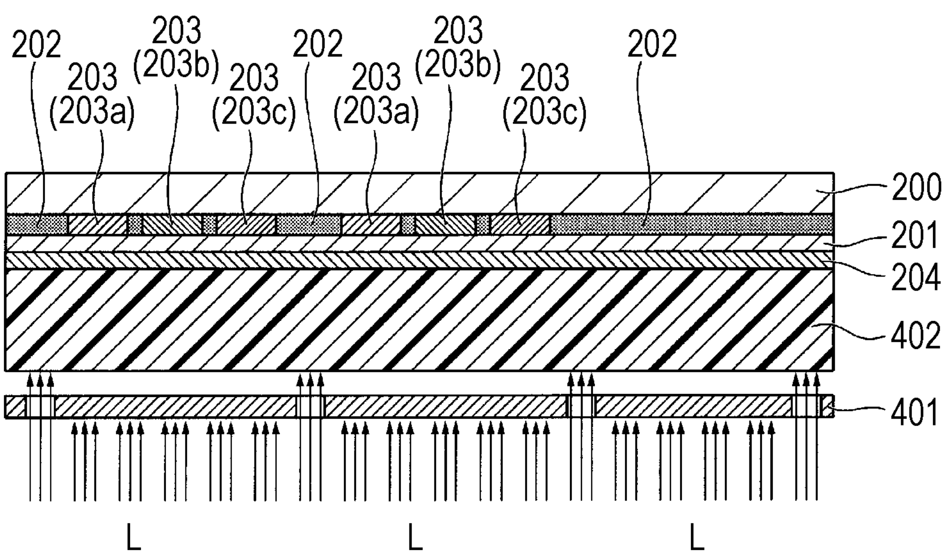
FIG. 2 illustrates an exposure process in which a pattern used for forming columnar spacers above a black matrix is employed as the pattern of a photomask.

An illustrative case in which the columnar spacers are formed by photolithography will now be described. FIG. 2 illustrates an exposure process in which a pattern for forming the columnar spacers above the black matrix is employed as the pattern of a photomask.

A resin solution (not containing a colorant) used for forming the columnar spacers is applied onto the transparent electrode 204 of the frontplane. Then, the resulting resin layer 402 is cured by being baked. A photoresist is applied onto the cured layer and then pre-baked. The photoresist is exposed to light through a mask pattern 401, and then development is carried out to pattern the resin layer. The photo resist layer is subsequently removed, and then the resin layer is baked to complete the columnar spacers (corresponding to 302 and 304 in FIG. 1).

Positions at which the columnar spacers are to be formed can be appropriately determined on the basis of the mask pattern. Accordingly, both the inside of the sealed region and the outside thereof (part to which the sealing material is to be applied) can be simultaneously formed in the liquid crystal display device. The columnar spacers are preferably formed above the black matrix to avoid degrading the quality of the sealed region. The columnar spacers formed by photolithography as described above are also referred to as column spacers or photo spacers.

The material used for forming the spacers is a mixture containing, for example, a negative water-soluble resin, such as a PVA-stilbazo photosensitive resin; a polyfunctional acrylic monomer; an acrylic acid copolymer; and a triazole-based initiator. In another technique, a color rein in which a colorant has been dispersed in a polyimide resin is used. In the present invention, any technique can be employed, and existing materials suitable for liquid crystal and sealing material, which are to be used, can be used to form the spacers.

After the columnar spacers are formed on part of the surface of the frontplane, which serves as the sealed region, in this manner, the sealing material (corresponding to 301 in FIG. 1) is applied to the intended part of the surface of the backplane.

Any material can be used as the sealing material, and a curable resin composition prepared by adding a polymerization initiator to an epoxy-based or acrylic resin which is photocurable, thermosetting, or optically and thermally curable is used. Fillers containing inorganic or organic materials are added in some cases to adjust moisture permeability, an elastic modulus, viscosity, and another property. Such fillers may have any shape such as a spherical shape, a fibrous shape, or an amorphous shape. Furthermore, a spherical or fibrous gap material having a single dispersion diameter may be mixed to properly control the cell gap, and a fibrous material which can be easily wound around the protrusions formed above the substrate may be mixed to enhance the adhesion to the plates. The diameter of the fibrous material used in this case is desirably from approximately ⅕ to ⅒ of the cell gap, and the length of the fibrous material is desirably shorter than the width of an applied sealing material.

Any substance can be used as the fibrous material provided that the fibrous material can have a predetermined shape; synthetic fibers, such as cellulose, polyamide, and polyester, and inorganic materials, such as glass and carbon, can be appropriately selected.

The sealing material can be applied by a printing technique or a dispensing technique, and a dispensing technique is desirably employed because the amount of the sealing material to be used in the dispensing technique is small. In general, the sealing material is applied to a position corresponding to the position of the black matrix to avoid adversely affecting the sealed region. In order to form a liquid crystal-dropped region used in the subsequent process (to prevent the liquid crystal from leaking), the sealing material is applied in the form of a closed loop.

Liquid crystal is dropped to the closed-loop structure (sealed region) of the frontplane, the closed-loop structure having been formed by application of the sealing material. In general, a dispenser is used. Since the amount of liquid crystal to be dropped should be equivalent to the capacity of a liquid crystal cell, the amount is basically equal to the volume that is the product of the height of the columnar spacers and the area surrounded by the sealing material. In order to reduce the leakage of liquid crystal in a cell bonding process or to optimize displaying characteristics, the amount of the liquid crystal to be dropped may be appropriately adjusted, or positions to which the liquid crystal are dropped may be dispersed.

Then, the backplane is bonded to the frontplane to which the sealing material has been applied and liquid crystal has been dropped. In particular, the frontplane and the backplane are attached to stages having a mechanism for holding the substrates, such as an electrostatic chuck, and then the frontplane and the backplane are disposed at a position (in a distance) which enables the second alignment film of the frontplane to face the first alignment film of the backplane and which enables the sealing material not to contact the other side. In this state, pressure in the system is reduced. After the reduction in pressure, the positions of the frontplane and backplane are adjusted (alignment process) while parts of the frontplane and backplane which are to be bonded to each other are confirmed. After the adjustment of the positions, the frontplane and the backplane are moved to bring the sealing material on the frontplane into contact with the backplane. In this state, the inside of the system is filled with inert gas, and the vacuum is gradually released into normal pressure. In this process, atmospheric pressure enables the frontplane and the backplane to be bonded to each other, and the height of the columnar spacers defines a cell gap. In this state, the sealing material is irradiated with ultraviolet light to cure the sealing material, thereby forming the liquid crystal cell. Then, a heating process is optionally carried out to promote the curing of the sealing material. The heating process is carried out in many cases to enhance the adhesion of the sealing material and the reliability of electrical properties.

EXAMPLES

Although the present invention will now be described further in detail with reference to Examples, the present invention is not limited to Examples. In compositions which will be described in Examples and Comparative Examples, the term "%" refers to "mass %".

In Examples, the following properties were measured.

Tni: Nematic phase-isotropic liquid phase transition temperature (° C.)

Δn: Refractive index anisotropy at 298 K (also referred to as birefringence)

Δ∈: Dielectric anisotropy at 298 K

η: Viscosity at 293 K (mPa·s)

γ1: Rotational viscosity at 298 K (mPa·s)

VHR: Voltage holding ratio (%) at 333 K under the conditions including a frequency of 60 Hz and an applied voltage of 5 V VHR after Thermal Test: a TEG (test element group) in which a sample of a liquid crystal composition had been confined and which was used for evaluating electrooptical properties was held in a constant bath at 130° C. for an hour, and then the measurement was carried out under the same conditions as the above-mentioned measurement of VHR.

Screen Burn-In:

In order to evaluate screen burn-in in a liquid crystal display device, a certain fixed pattern was continuously displayed in a display area for a predetermined test time, and then an image was displayed evenly on the whole of the screen. In this procedure, test time taken for the afterimage of the fixed pattern to reach an unacceptable level was measured.

(1) The term "test time" herein refers to time over which the fixed pattern was displayed. The longer the test time in result of the measurement was, the more the occurrence of the after image was reduced; the longer test time shows that the liquid crystal display device had a high performance.

(2) The unacceptable level of the after image refers to a level at which the degree of the observed after image was determined as being unacceptable in judgment of acceptance.

Droplet Stains:

In order to evaluate droplet stains in a liquid crystal display apparatus, white droplet stains which emerged in an entirely-black display mode were visually observed. Result of the observation was evaluated on the basis of the following five criteria.

5: No droplet stain observed (excellent)

4: Slight droplet stains observed, but acceptable (good)

3: Some droplet stains observed, the borderline in judgment of acceptance (acceptable with some conditions)

2: Afterimage observed, unacceptable (bad)

1: Afterimage observed, quite inadequate (poor)

Process Adaptability:

In an ODF process, 50 μL of liquid crystal was dropped 100 times with a constant volume metering pump, and this 100-times dropping was repeated such as "0 to 100, 101 to 200, 201 to 300 . . . ". The mass of the liquid crystal dropped 100 times was measured in each cycle to obtain the number of times of the dropping at which a variation in mass reached the degree that was unsuitable for the ODF process. Process adaptability was evaluated on the basis of this obtained number of times of the dropping.

The larger the obtained number of times of the dropping was, the more liquid crystal was able to be stably dropped for a long time; the larger number of times of the dropping shows that the liquid crystal had high process adaptability.

Resistance to Resolution at Low Temperature:

In order to evaluate resistance to resolution at low temperature, a liquid crystal composition was prepared and then weighted to 1 g in a 2-mL sample bottle, and the sample bottle was subjected to a continuous temperature change in a temperature controlled chamber in a cycle of the following operation: −20° C. (retained for an hour)→heating (0.1° C./min)→0° C. (retained for an hour)→heating (0.1° C./min)→20° C. (retained for an hour)→cooling (−0.1° C./min)→0° C. (retained for an hour)→cooling (−0.1° C./min)→−20° C. Then, precipitate generated in the liquid crystal composition was visually observed, and the test time at which the precipitate had been observed was measured.

The longer the test time was, the more the liquid crystal phase was stably maintained for a long time; the longer test time shows that the liquid crystal composition had a good resistance to resolution at low temperature.

Volatility/Contamination of Manufacturing Equipment:

In order to evaluate the volatility of a liquid crystal material, operation of a vacuum defoaming mixer was observed with a stroboscope for visual surveillance of foaming of the liquid crystal material. In particular, 0.8 kg of a liquid crystal composition was put into the 2.0-L container dedicated to the vacuum defoaming mixer, the vacuum defoaming mixer was operated under a vacuum of 4 kPa at an orbital speed of 15 $S^{-1}$ and a rotating velocity of 7.5 $S^{-1}$, and the time taken for the liquid crystal composition to start foaming was measured.

The longer the time taken for the liquid crystal composition to start foaming was, the less the liquid crystal composition was volatilized. Since a less volatile liquid crystal composition hardly contaminates manufacturing equipment, a longer time taken for the liquid crystal composition to start foaming shows that the liquid crystal composition had a high quality.

Examples 1 and 2 and Comparative Example 1

The following compounds were used to prepare compositions shown in Table 1, and IPS liquid crystal display apparatuses having the structure illustrated in FIGS. 1 and 2 were produced. Table 2 shows results of the evaluations of the compositions and liquid crystal display apparatuses.
[Chem. 263]
(i) (45.2)
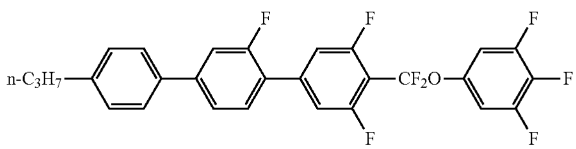
(i) (45.3)
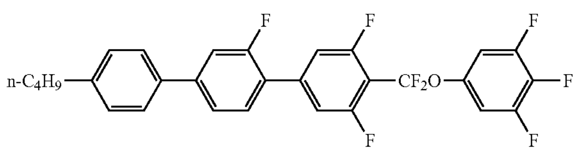
(i) (45.4)
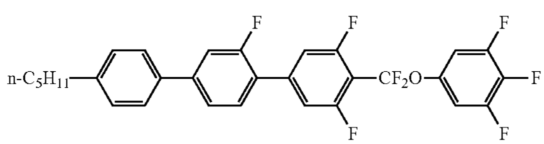
(ii)
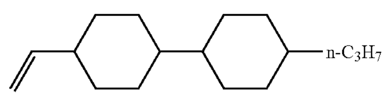
(2.4)
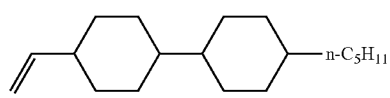
(1.3)
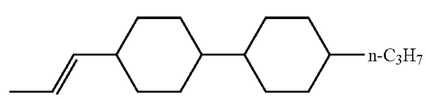
(28.3)
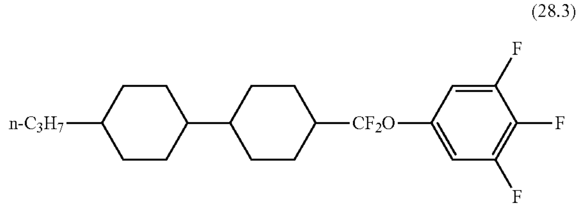
(26.2)
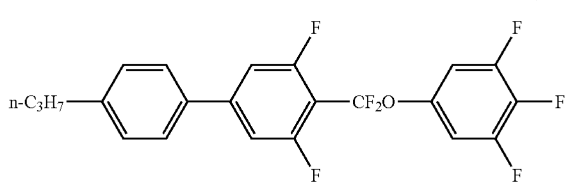
(35.1)
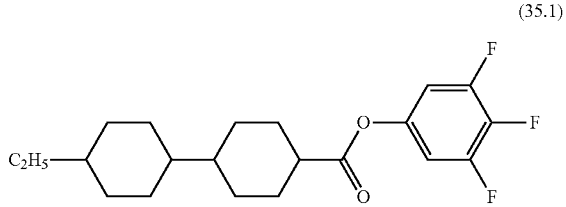
-continued
(35.2)
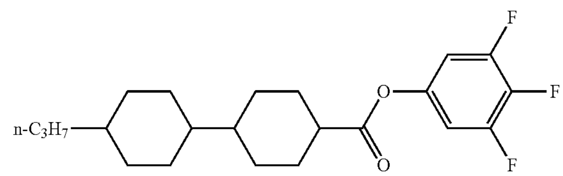
(18.1)
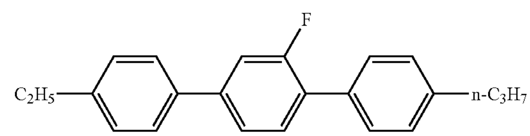
(46.2)
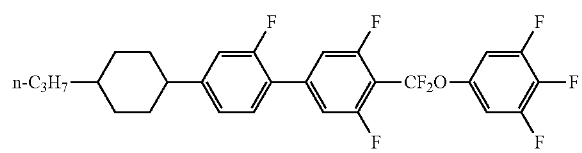
(28.1)
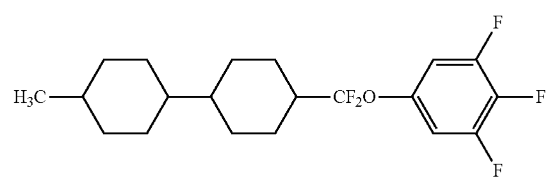
(44.33)
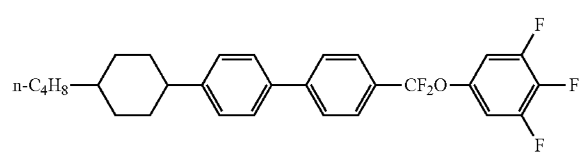
(44.34)
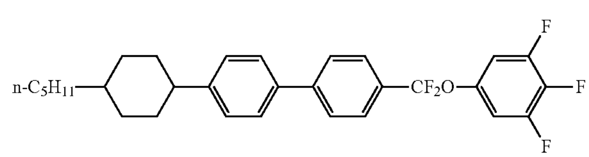
(35.11)
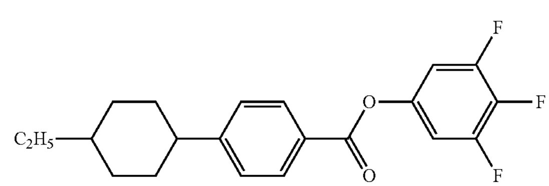
(35.12)
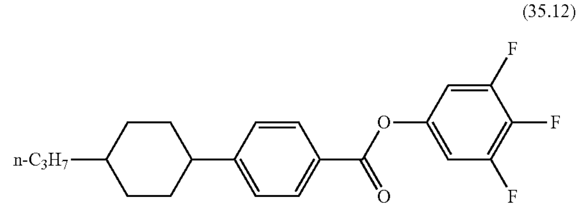

-continued (35.13)

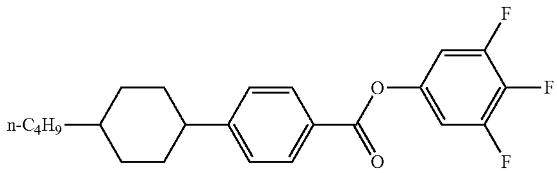

(66.2)

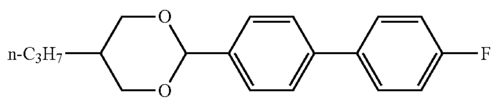

TABLE 1

| | Component Ratio (Mass %) | | |
|---|---|---|---|
| Formula | Comparative Example 1 | Example 1 | Example 1 |
| (i) (45.2) | 3 | 3 | 3 |
| (i) (45.3) | 5 | 5 | 5 |
| (i) (45.4) | 5 | 5 | 5 |
| (ii) | | 10 | 20 |
| (2.4) | 15 | 5 | |
| (1.3) | 5 | 5 | |
| (28.3) | 5 | 5 | 5 |
| (26.2) | 14 | 14 | 14 |
| (35.1) | 3 | 3 | 3 |
| (35.2) | 7 | 7 | 7 |
| (18.1) | 2 | 2 | 2 |
| (46.2) | 8 | 8 | 8 |
| (28.1) | 4 | 4 | 4 |
| (44.33) | 5 | 5 | 5 |
| (44.34) | 5 | 5 | 5 |
| (35.11) | 3 | 3 | 3 |
| (35.12) | 3 | 3 | 3 |
| (35.13) | 3 | 3 | 3 |
| (66.2) | 5 | 5 | 5 |

TABLE 2

| | Comparative Example 1 | Example 1 | Example 2 |
|---|---|---|---|
| $T_{ni}$/° C. | 88.2 | 86.9 | 84.5 |
| Δn | 0.128 | 0.125 | 0.122 |
| Δϵ | 17.9 | 18.2 | 18.5 |
| η/mPa · s | 33 | 29 | 27 |
| $\gamma_1$/mPa · s | 156 | 138 | 120 |
| Initial Voltage Holding Ratio (%) | 99.4 | 99.4 | 99.6 |
| Voltage Holding Ratio after Thermal Test (%) | 98.7 | 98.8 | 98.9 |
| Screen Burn-in (h) | 210 | 240 | 250 |
| Droplet Stains | 3 | 4 | 5 |
| Contamination of Manufacturing Equipment (s) | 185 | 190 | 185 |
| Process Adaptability (100 Times) | 560 | 610 | 620 |
| Resistance to Resolution at Low Temperature (h) | 530 | 550 | 550 |

Each of the compositions prepared in Examples 1 and 2 had low viscosities (η/mPa·s and $\gamma_1$/mPa·s) and very good resistance to resolution at low temperature as compared with the composition prepared in Comparative Example 1; in addition, these compositions enabled a reduction in screen burn-in.

Examples 3 to 6

The following compounds were used to prepare compositions shown in Table 3, and IPS liquid crystal display apparatuses having the structure illustrated in FIGS. 1 and 2 were produced. Table 4 shows results of the evaluations of the compositions and liquid crystal display apparatuses.

[Chem. 264]

(i) (45.2)

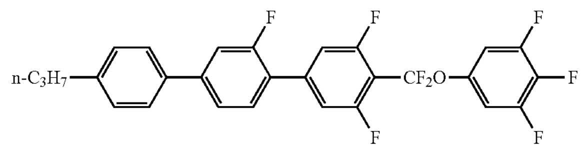

(i) (45.3)

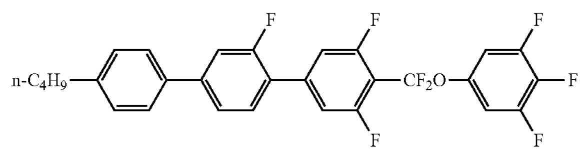

(i) 45.4)

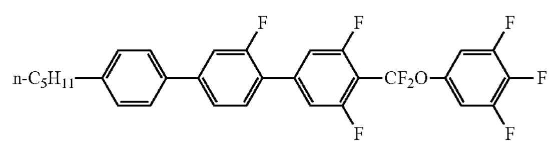

(ii)

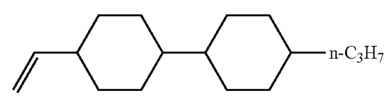

(1.3)

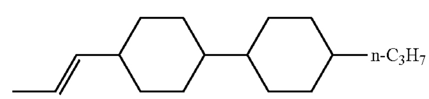

(26.2)

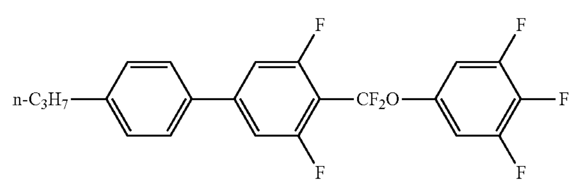

(28.3)

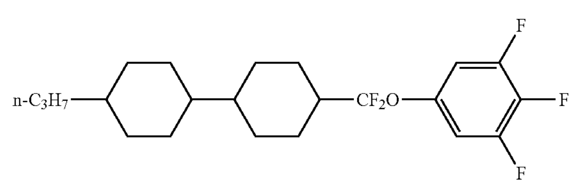

(11.2)

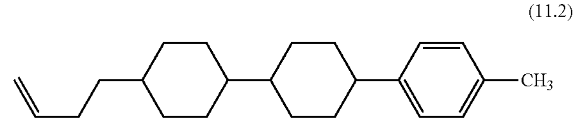

-continued (19.2)

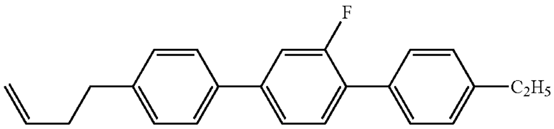

(28.5)

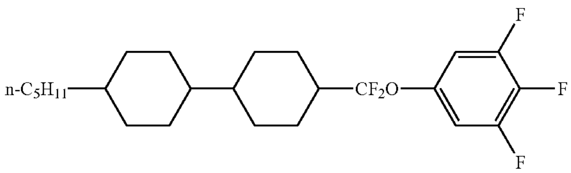

(11.1)

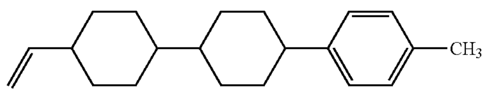

TABLE 3

| | Component Ratio (Mass %) | | | |
|---|---|---|---|---|
| Formula | Example 3 | Example 4 | Example 5 | Example 6 |
| (i) (45.2) | 2 | 4 | 6 | 6 |
| (i) (45.3) | 7 | 6 | 5 | 5 |
| (i) (45.4) | 7 | 6 | 5 | 5 |
| (ii) | 38 | 35 | 40 | 50 |
| (1.3) | 14 | 8 | 11 | |
| (26.2) | 8 | 7 | 6 | 6 |
| (28.3) | 15 | 16 | 11 | 11 |
| (11.2) | 9 | 10 | | |
| (19.2) | | 4 | 5 | |
| (28.5) | | | 5 | 5 |
| (11.1) | | 4 | 6 | 12 |

TABLE 4

| | Example 3 | Example 4 | Example 5 | Example 6 |
|---|---|---|---|---|
| $T_{ni}$/° C. | 81.1 | 88.4 | 81.5 | 79.3 |
| $\Delta n$ | 0.099 | 0.109 | 0.107 | 0.096 |
| $\Delta\epsilon$ | 8.0 | 8.2 | 7.6 | 7.2 |
| $\eta$/mPa · s | 13 | 16 | 14 | 12 |
| $\gamma_1$/mPa · s | 48 | 58 | 50 | 43 |
| Initial Voltage Holding Ratio (%) | 99.6 | 99.3 | 99.3 | 99 |
| Voltage Holding Ratio after Thermal Test (%) | 98.9 | 98.5 | 98.6 | 98.0 |
| Screen Burn-in (h) | 650 | 660 | 610 | 550 |
| Droplet Stains | 5 | 5 | 4 | 3 |
| Contamination of Manufacturing Equipment (s) | 175 | 180 | 150 | 120 |
| Process Adaptability (100 Times) | 1010 | 1033 | 985 | 850 |
| Resistance to Resolution at Low Temperature (h) | 600 | 610 | 585 | 365 |

Examples 7 to 10

The following compounds were used to prepare compositions shown in Table 5, and IPS liquid crystal display apparatuses having the structure illustrated in FIGS. 1 and 2 were produced. Table 6 shows results of the evaluations of the compositions and liquid crystal display apparatuses.

[Chem. 265]

(i) (45.2)

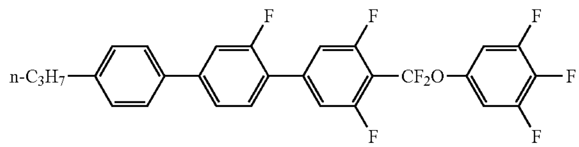

(i) (45.3)

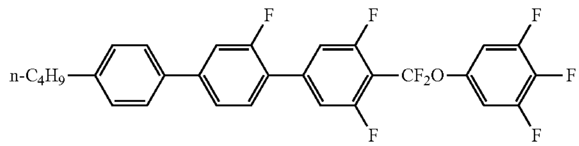

(i) (45.4)

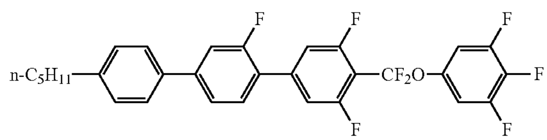

(ii)

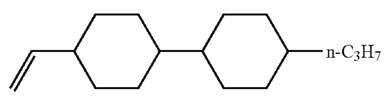

(26.2)

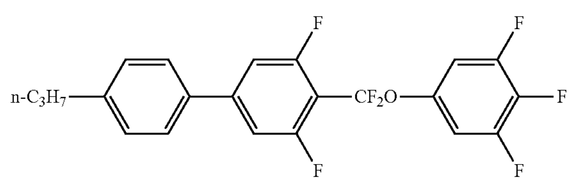

(1.3)

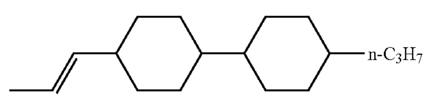

(28.3)

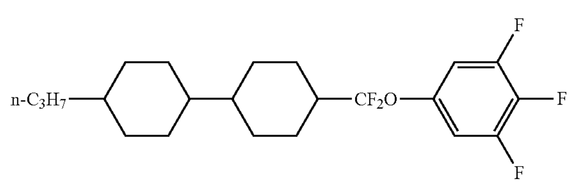

(11.2)

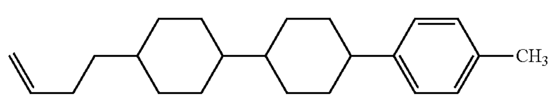

-continued (26.1)

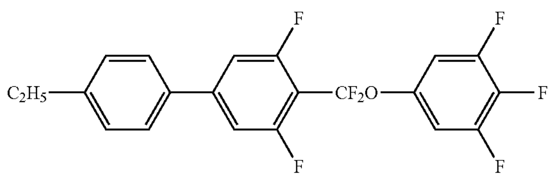

(44.2)

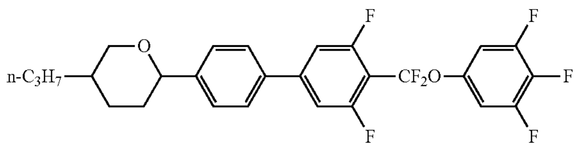

(11.1)

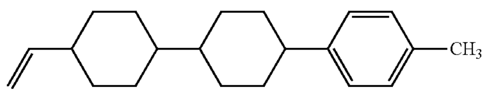

(1.2)

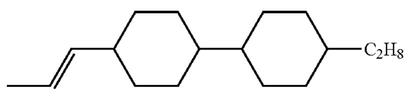

(28.5)

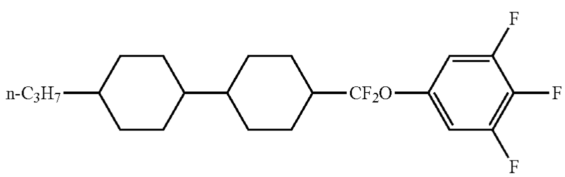

(8.1)

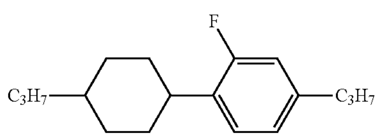

(61.1)

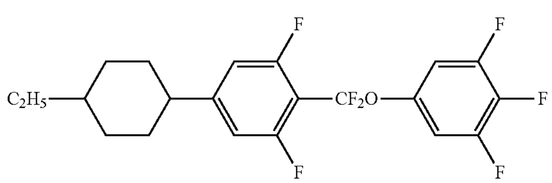

(59.1)

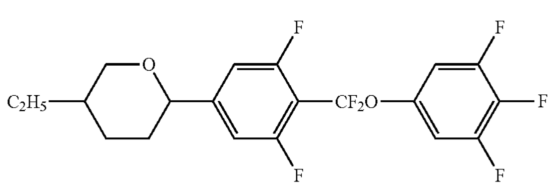

TABLE 5

| | Component Ratio (Mass %) | | | |
|---|---|---|---|---|
| Formula | Example 7 | Example 8 | Example 9 | Example 10 |
| (i) (45.2) | 2 | 4 | 4 | 5 |
| (i) (45.3) | 8 | 5 | 8 | 4 |
| (i) (45.4) | 10 | 7 | 6 | 4 |
| (ii) | 38 | 28 | 20 | 42 |
| (26.2) | 2 | | | |
| (1.3) | 12 | 10 | 14 | 8 |
| (28.3) | 8 | 9 | 11 | 5 |
| (11.2) | 10 | | 5 | 8 |
| (26.1) | | 1 | 1 | |
| (44.2) | | 4 | | 5 |
| (11.1) | | 10 | 5 | 4 |
| (1.2) | | 12 | 16 | |
| (28.5) | | | | 5 |
| (8.1) | 1 | 1 | 1 | 1 |
| (61.1) | 4 | 5 | 5 | 5 |
| (59.1) | 5 | 4 | 4 | 4 |

TABLE 6

| | Example 7 | Example 8 | Example 9 | Example 10 |
|---|---|---|---|---|
| $T_{ni}$/° C. | 87.5 | 88.3 | 89.6 | 91.4 |
| Δn | 0.109 | 0.106 | 0.105 | 0.103 |
| Δε | 11.4 | 10.5 | 10.4 | 9.9 |
| η/mPa · s | 17 | 14 | 14 | 14 |
| $\gamma_1$/mPa · s | 95 | 81 | 77 | 84 |
| Initial VHR (%) | 99.5 | 99.5 | 99.5 | 99.5 |
| VHR after Thermal Test (%) | 98.7 | 98.2 | 98.3 | 98.5 |
| Screen Burn-in (h) | 336 | 340 | 350 | 400 |
| Droplet Stains | 5 | 4 | 4 | 5 |
| Contamination of Manufacturing Equipment (s) | 170 | 200 | 210 | 135 |
| Process Adaptability (100 Times) | 1000 | 1100 | 990 | 840 |
| Resistance to Resolution at Low Temperature (h) | 600 | 610 | 620 | 550 |

Examples 11 to 14

The following compounds were used to prepare compositions shown in Table 7, and IPS liquid crystal display apparatuses having the structure illustrated in FIGS. 1 and 2 were produced. Table 8 shows results of the evaluations of the compositions and liquid crystal display apparatuses.

[Chem. 266]

(i) (45.2)

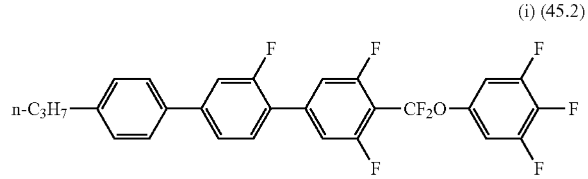

-continued
(i) (45.3)
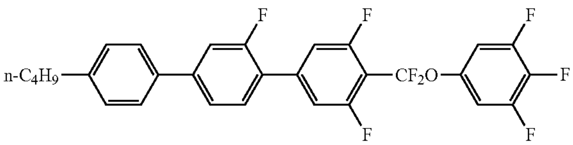
(i) (45.4)
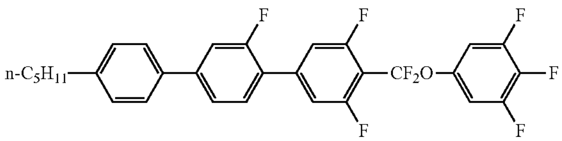
(ii)
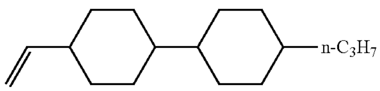
(26.2)
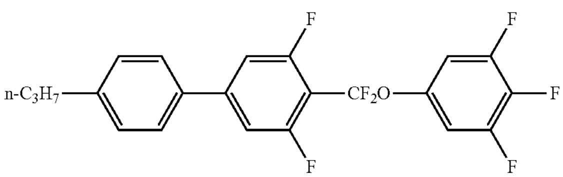
(1.3)
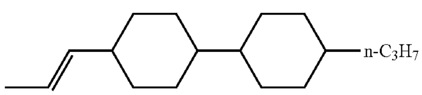
(28.3)
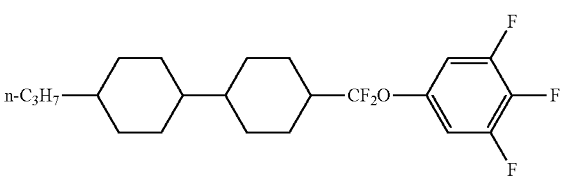
(11.2)
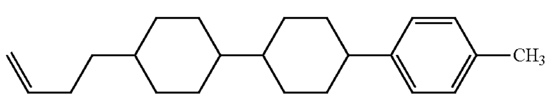
(1.2)
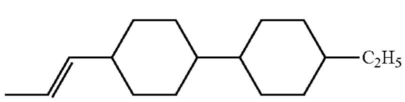
(44.1)
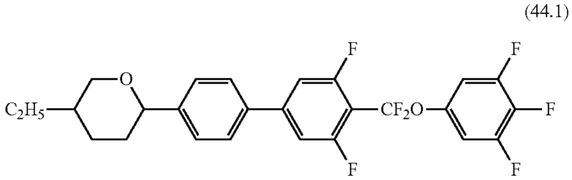
(28.5)
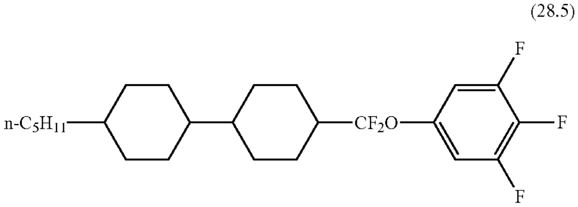
-continued
(19.2)
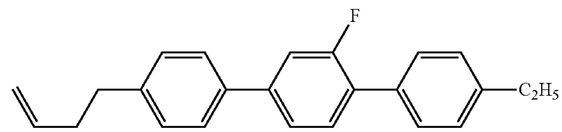
(6.4)
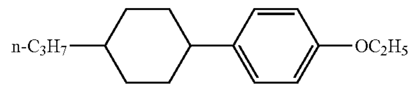
(3.1)
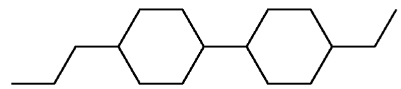
(64.2)
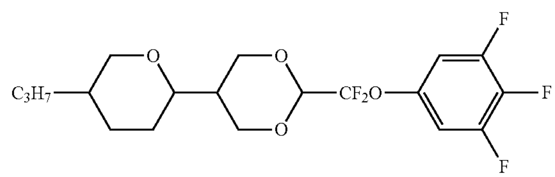
TABLE 7
| | Component Ratio (Mass %) | | | |
|---|---|---|---|---|
| Formula | Example 11 | Example 12 | Example 13 | Example 14 |
| (i) (45.2) | 4 | 9 | 11 | 3 |
| (i) (45.3) | 8 | 6 | 4 | 9 |
| (i) (45.4) | 10 | 7 | 5 | 8 |
| (ii) | 32 | 22 | 18 | 15 |
| (26.2) | 2 | 2 | 2 | 2 |
| (1.3) | 14 | 10 | 18 | 8 |
| (28.3) | 17 | 7 | 18 | 10 |
| (11.2) | 12 | 10 | 8 | 6 |
| (1.2) | | 12 | 8 | |
| (44.1) | | | | 2 |
| (28.5) | | 10 | 2 | 7 |
| (19.2) | | 4 | 2 | 6 |
| (6.4) | | | 4 | |
| (3.1) | | | | 23 |
| (64.2) | 1 | 1 | | 1 |
TABLE 8
| | Example 11 | Example 12 | Example 13 | Example 14 |
|---|---|---|---|---|
| $T_{ni}$/° C. | 91.2 | 92.2 | 88.8 | 84.8 |
| Δn | 0.108 | 0.117 | 0.110 | 0.113 |
| Δϵ | 10.3 | 10.0 | 9.9 | 10.0 |
| η/mPa · s | 19 | 22 | 18 | 22 |
| $\gamma_1$/mPa · s | 98 | 87 | 83 | 102 |
| Initial VHR (%) | 99.5 | 99.5 | 99.5 | 99.5 |
| VHR after Thermal Test (%) | 98.7 | 98.0 | 98.5 | 98.4 |
| Screen Burn-in (h) | 250 | 250 | 245 | 250 |
| Droplet Stains | 5 | 4 | 5 | 5 |
| Contamination of Manufacturing Equipment (s) | 190 | 200 | 210 | 175 |
| Process Adaptability (100 Times) | 990 | 970 | 950 | 900 |

TABLE 8-continued

| | Example 11 | Example 12 | Example 13 | Example 14 |
|---|---|---|---|---|
| Resistance to Resolution at Low Temperature (h) | 620 | 630 | 610 | 450 |

Examples 15 to 18

The following compounds were used to prepare compositions shown in Table 9, and IPS liquid crystal display apparatuses having the structure illustrated in FIGS. 1 and 2 were produced. Table 10 shows results of the evaluations of the compositions and liquid crystal display apparatuses.

[Chem. 267]

(i) (45.2)

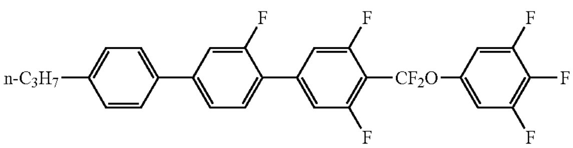

(i) (45.3)

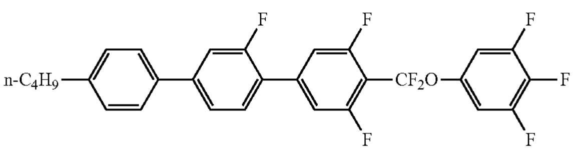

(i) (45.4)

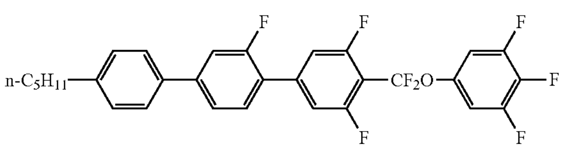

(ii)

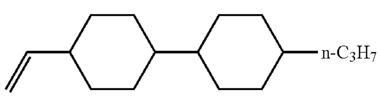

(26.2)

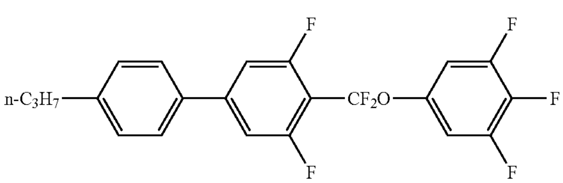

(1.3)

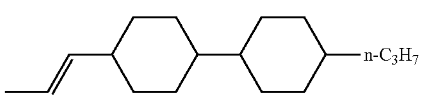

(11.2)

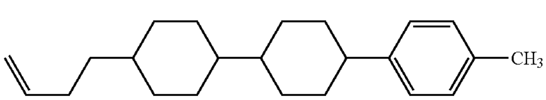

-continued (28.3)

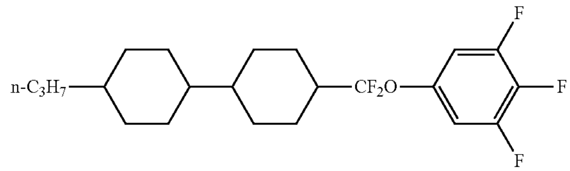

(9.2)

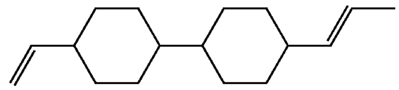

(9.1)

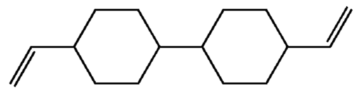

(28.5)

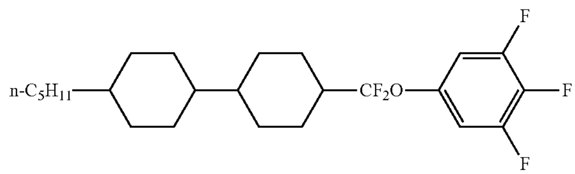

(18.6)

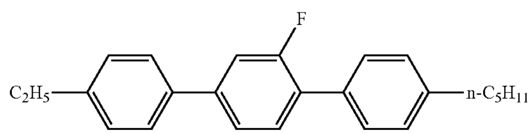

(21.1)

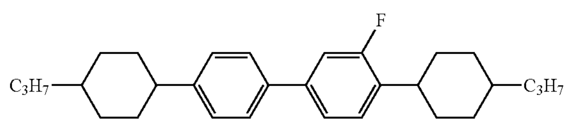

TABLE 9

| | Component Ratio (Mass %) | | | |
|---|---|---|---|---|
| Formula | Example 15 | Example 16 | Example 17 | Example 18 |
| (i) (45.2) | 2 | 4 | 5 | 6 |
| (i) (45.3) | 8 | 5 | 9 | 2 |
| (i) (45.4) | 8 | 9 | 4 | 10 |
| (ii) | 37 | 43 | 22 | 47 |
| (26.2) | 7 | 7 | 9 | 6 |
| (1.3) | 13 | 7 | 9 | 3 |
| (11.2) | 15 | 12 | 14 | 13 |
| (28.3) | 10 | 5 | 8 | 11 |
| (9.2) | | | 9 | |
| (9.1) | | | 9 | |
| (28.5) | | 5 | | |
| (18.6) | | 3 | 2 | |
| (21.1) | | | | 2 |

TABLE 10

| | Example 15 | Example 16 | Example 17 | Example 18 |
|---|---|---|---|---|
| $T_{ni}$/° C. | 81.7 | 77.9 | 73.1 | 80.7 |
| Δn | 0.100 | 0.103 | 0.105 | 0.096 |
| Δε | 8.5 | 8.4 | 9.1 | 8.5 |
| η/mPa · s | 15 | 16 | 16 | 14 |

TABLE 10-continued

| | Example 15 | Example 16 | Example 17 | Example 18 |
|---|---|---|---|---|
| $\gamma_1$/mPa · s | 77 | 74 | 76 | 74 |
| Initial VHR (%) | 99.6 | 99.5 | 99.5 | 99.5 |
| VHR after Thermal Test (%) | 98.7 | 98.4 | 98.5 | 98.4 |
| Screen Burn-in (h) | 450 | 350 | 400 | 300 |
| Droplet Stains | 5 | 4 | 4 | 4 |
| Contamination of Manufacturing Equipment (s) | 170 | 140 | 180 | 120 |
| Process Adaptability (100 Times) | 1030 | 925 | 845 | 840 |
| Resistance to Resolution at Low Temperature (h) | 630 | 420 | 500 | 380 |

Examples 19 to 22

The following compounds were used to prepare compositions shown in Table 11, and IPS liquid crystal display apparatuses having the structure illustrated in FIGS. 1 and 2 were produced. Table 12 shows results of the evaluations of the compositions and liquid crystal display apparatuses.

[Chem. 268]

(i) (45.2)

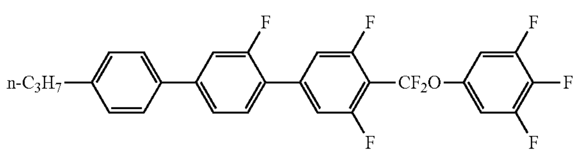

(i) (45.3)

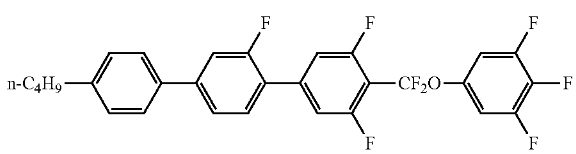

(i) (45.4)

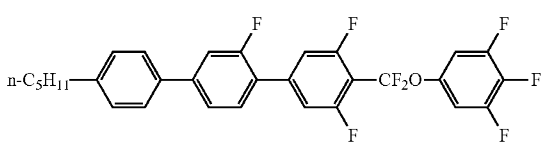

(ii)

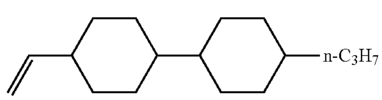

(26.2)

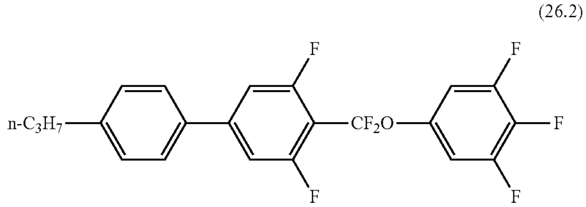

-continued (1.3)

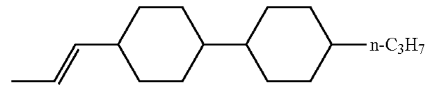

(11.1)

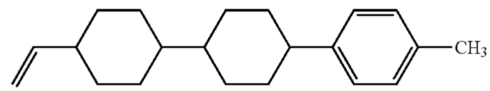

(44.2)

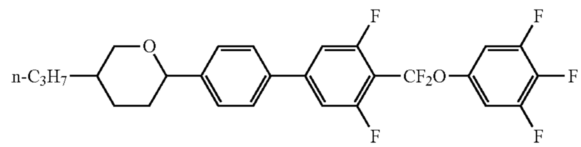

(44.1)

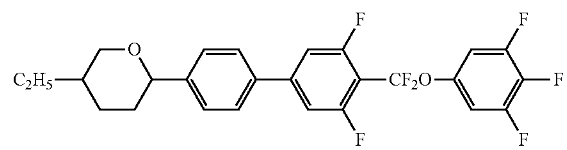

(31.2)

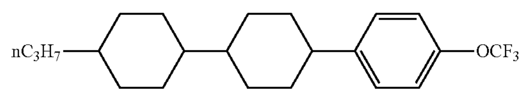

(31.1)

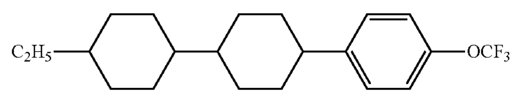

(60.1)

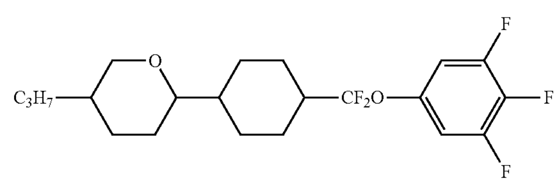

(65.2)

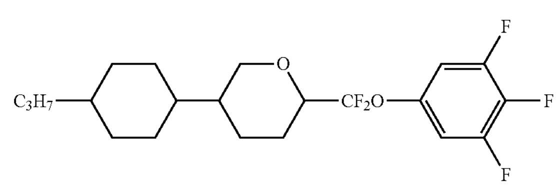

(9.2)

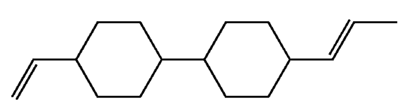

(31.4)

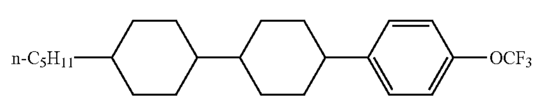

TABLE 11

| | Component Ratio (Mass %) | | | |
|---|---|---|---|---|
| Formula | Example 19 | Example 20 | Example 21 | Example 22 |
| (i) (45.2) | 3 | 4 | 5 | 6 |
| (i) (45.3) | 7 | 6 | 4 | 2 |
| (i) (45.4) | 3 | 3 | 4 | 5 |
| (ii) | 36 | 30 | 25 | 25 |
| (26.2) | 2 | 2 | 2 | 2 |
| (1.3) | 13 | 13 | 13 | 13 |
| (11.1) | 7 | 13 | 13 | 13 |
| (44.2) | 7 | 5 | 3 | 3 |
| (44.1) | 5 | 7 | 6 | 6 |
| (31.2) | 6 | 6 | 3 | |
| (31.1) | | | 3 | 6 |
| (60.1) | 4 | 4 | 4 | 4 |
| (65.2) | 4 | 4 | 4 | 4 |
| (9.2) | | | 8 | 8 |
| (31.4) | 3 | 3 | 3 | 3 |

TABLE 12

| | Example 19 | Example 20 | Example 21 | Example 22 |
|---|---|---|---|---|
| $T_{ni}$/° C. | 92.8 | 98.2 | 95.1 | 94.4 |
| Δn | 0.109 | 0.113 | 0.111 | 0.111 |
| Δε | 12.0 | 11.7 | 9.7 | 9.2 |
| η/mPa · s | 17 | 19 | 16 | 16 |
| $\gamma_1$/mPa · s | 96 | 108 | 100 | 104 |
| Initial VHR (%) | 99.5 | 99.5 | 99.5 | 99.5 |
| VHR after Thermal Test (%) | 98.6 | 98.1 | 98.4 | 98.4 |
| Screen Burn-in (h) | 336 | 325 | 320 | 300 |
| Droplet Stains | 5 | 3 | 4 | 4 |
| Contamination of Manufacturing Equipment (s) | 185 | 180 | 180 | 180 |
| Process Adaptability (100 Times) | 1000 | 900 | 800 | 650 |
| Resistance to Resolution at Low Temperature (h) | 550 | 430 | 420 | 380 |

Examples 23 to 26

The following compounds were used to prepare compositions shown in Table 13, and IPS liquid crystal display apparatuses having the structure illustrated in FIGS. 1 and 2 were produced. Table 14 shows results of the evaluations of the compositions and liquid crystal display apparatuses.

[Chem. 269]

(i) (45.2)

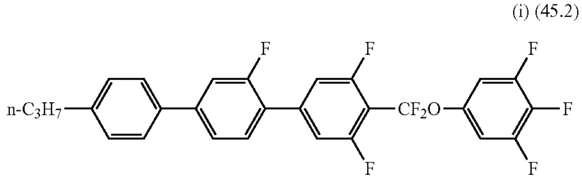

-continued (i) (45.3)

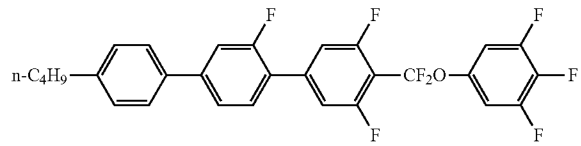

(i) (45.4)

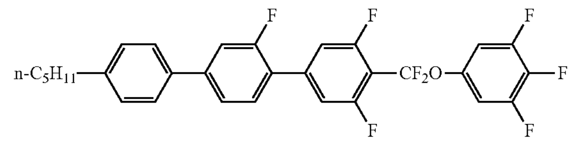

(ii)

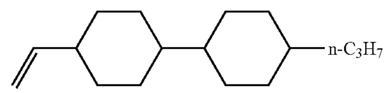

(26.2)

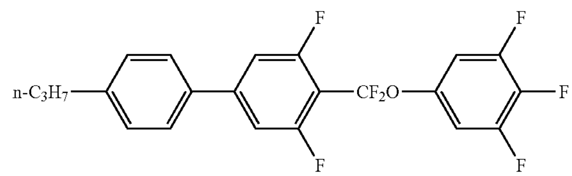

(1.3)

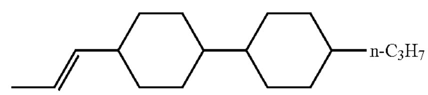

(28.3)

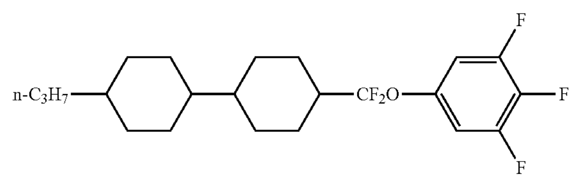

(11.2)

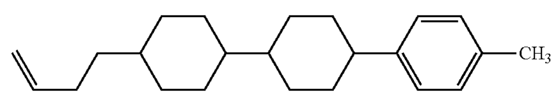

(37.2)

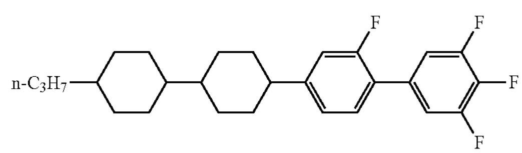

(44.2)

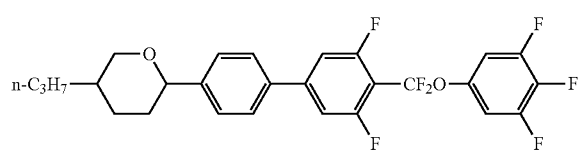

(31.2)

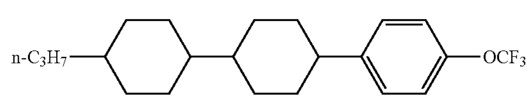

(1.2)

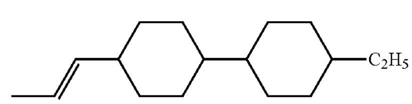

-continued (26.1)

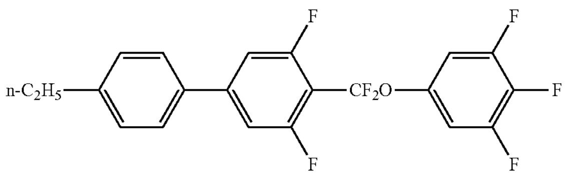

(28.5)

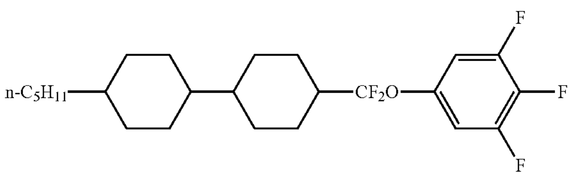

(11.1)

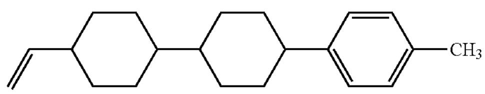

(41.2)

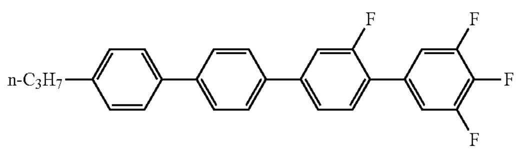

(44.1)

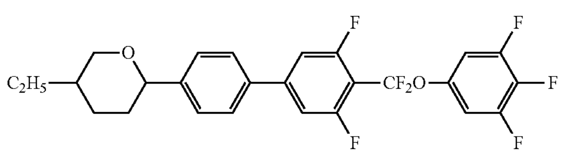

TABLE 13

| | Example 23 | Example 24 | Example 25 | Example 26 |
|---|---|---|---|---|
| (i) (45.2) | | | | 8 |
| (i) (45.3) | 7 | 9 | 4 | 2 |
| (i) (45.4) | 3 | 3 | 6 | |
| (ii) | 29 | 24 | 35 | 20 |
| (26.2) | 7 | 4 | 10 | 9 |
| (1.3) | 16 | 12 | 10 | 6 |
| (28.3) | 7 | 5 | 5 | 8 |
| (11.2) | 12 | 2 | 6 | 13 |
| (37.2) | 2 | | 1 | 3 |
| (44.2) | 6 | | 3 | 5 |
| (31.2) | 11 | 9 | 8 | 10 |
| (1.2) | | 9 | | 10 |
| (26.1) | | 3 | | 6 |
| (28.5) | | | 5 | |
| (11.1) | | 10 | 6 | |
| (41.2) | | 2 | 1 | |
| (44.1) | | 8 | | |

TABLE 14

| | Example 23 | Example 24 | Example 25 | Example 26 |
|---|---|---|---|---|
| $T_{ni}$/° C. | 91.3 | 83.7 | 82.3 | 81.6 |
| Δn | 0.100 | 0.105 | 0.100 | 0.104 |
| Δε | 8.9 | 9.4 | 8.7 | 13.0 |
| η/mPa · s | 16 | 17 | 15 | 19 |
| $\gamma_1$/mPa · s | 91 | 94 | 76 | 80 |
| Initial VHR (%) | 99.5 | 99.5 | 99.5 | 99.5 |
| VHR after Thermal Test (%) | 98.8 | 98.4 | 98.5 | 97.8 |
| Screen Burn-in (h) | 560 | 440 | 500 | 295 |
| Droplet Stains | 5 | 4 | 4 | 3 |
| Contamination of Manufacturing Equipment (s) | 200 | 185 | 176 | 170 |
| Process Adaptability (100 Times) | 1120 | 750 | 685 | 685 |
| Resistance to Resolution at Low Temperature (h) | 610 | 525 | 500 | 440 |

Examples 27 to 30

The following compounds were used to prepare compositions shown in Table 15, and IPS liquid crystal display apparatuses having the structure illustrated in FIGS. 1 and 2 were produced. Table 16 shows results of the evaluations of the compositions and liquid crystal display apparatuses.

[Chem. 270]

(i) (45.2)

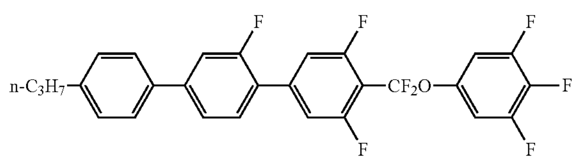

(i) (45.3)

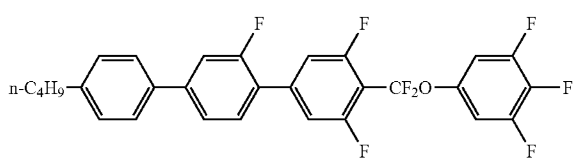

(i) (45.4)

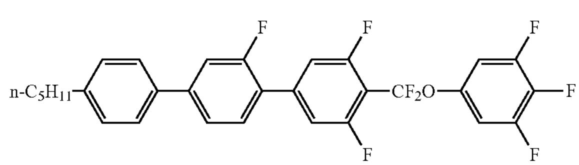

(ii)

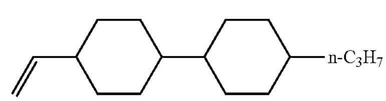

(26.2)

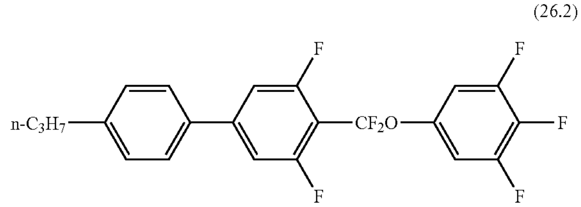

-continued (1.3)

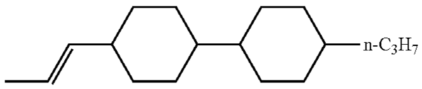

(11.2)

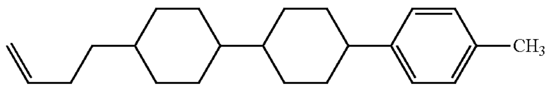

(44.2)

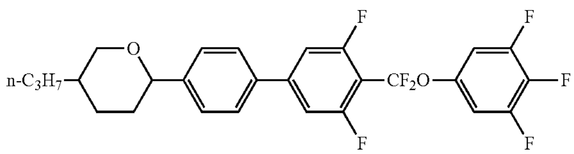

(44.1)

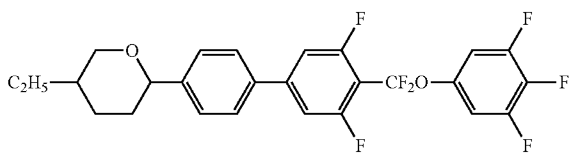

(31.2)

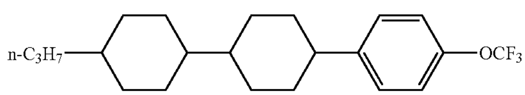

(19.2)

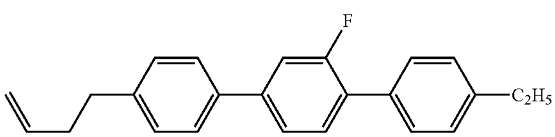

(11.1)

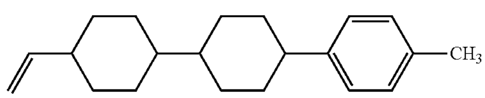

(18.4)

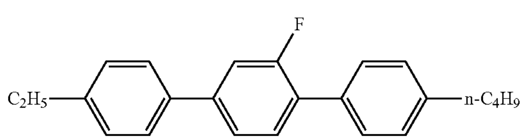

TABLE 15

| | Example 27 | Example 28 | Example 29 | Example 30 |
|---|---|---|---|---|
| (i) (45.2) | | 7 | 7 | |
| (i) (45.3) | 8 | 8 | | 8 |
| (i) (45.4) | 7 | | 8 | 7 |
| (ii) | 34 | 35 | 36 | 34 |
| (26.2) | 4 | 4 | 4 | 4 |
| (1.3) | 13 | 12 | 11 | 13 |
| (11.2) | 16 | 8 | 8 | |
| (44.2) | 7 | 6 | 5 | 7 |
| (44.1) | 4 | 5 | 6 | 4 |
| (31.2) | 6 | 6 | 6 | 6 |
| (19.2) | 1 | 1 | | |
| (11.1) | | 8 | 8 | 9 |
| (18.4) | | | 1 | 8 |

TABLE 16

| | Example 27 | Example 28 | Example 29 | Example 30 |
|---|---|---|---|---|
| $T_{ni}$/° C. | 91.8 | 88.6 | 88.1 | 84.8 |
| Δn | 0.109 | 0.107 | 0.107 | 0.115 |
| Δϵ | 10.3 | 10.3 | 10.1 | 10.4 |
| η/mPa · s | 19 | 17 | 17 | 20 |
| $\gamma_1$/mPa · s | 99 | 93 | 94 | 101 |
| Initial VHR (%) | 99.6 | 99.4 | 99.5 | 99.6 |
| VHR after Thermal Test (%) | 98.6 | 98.2 | 98.3 | 98.5 |
| Screen Burn-in (h) | 650 | 640 | 640 | 645 |
| Droplet Stains | 5 | 4 | 4 | 5 |
| Contamination of Manufacturing Equipment (s) | 205 | 188 | 175 | 200 |
| Process Adaptability (100 Times) | 1001 | 890 | 827 | 999 |
| Resistance to Resolution at Low Temperature (h) | 675 | 525 | 538 | 660 |

Examples 31 to 34

The following compounds were used to prepare compositions shown in Table 17, and IPS liquid crystal display apparatuses having the structure illustrated in FIGS. 1 and 2 were produced. Table 18 shows results of the evaluations of the compositions and liquid crystal display apparatuses.

[Chem. 271]

(i) (45.2)

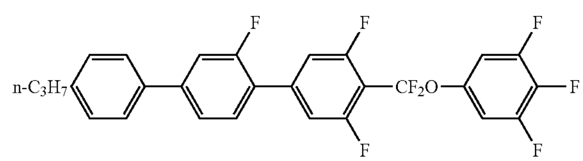

(i) (45.3)

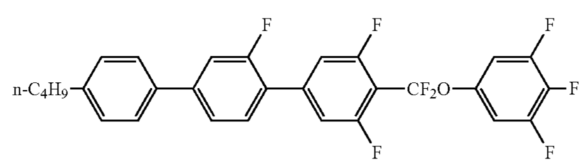

(i) (45.4)

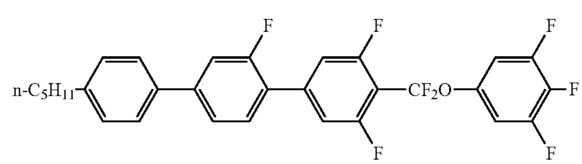

(ii)

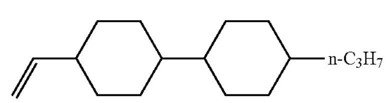

(1.3)

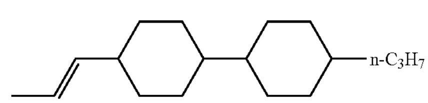

-continued (11.1)

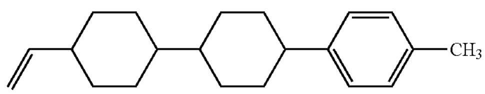

(28.3)

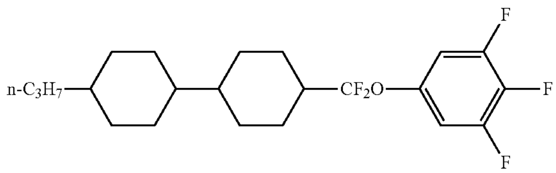

(11.2)

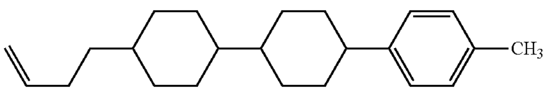

(44.2)

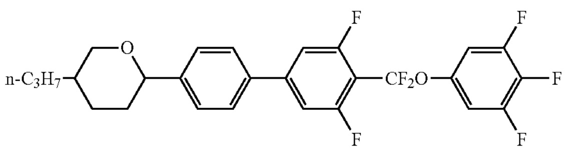

(44.1)

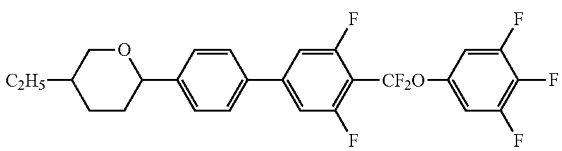

(31.2)

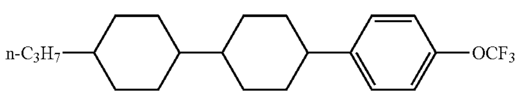

(18.3)

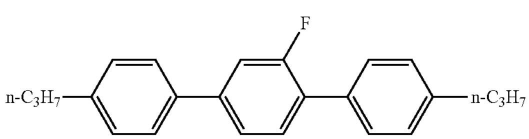

(18.4)

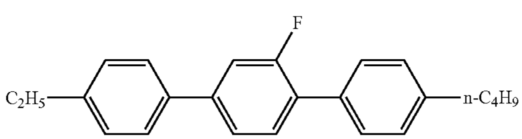

(23.2)

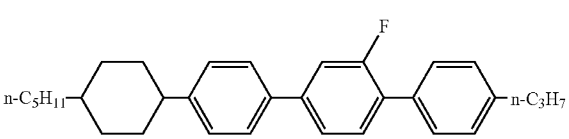

(37.2)

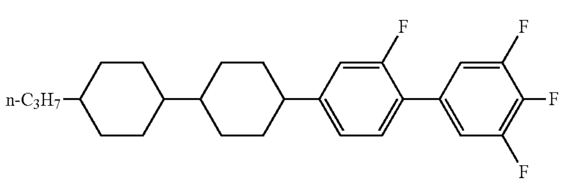

-continued (31.4)

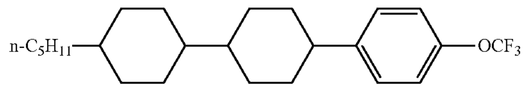

(19.4)

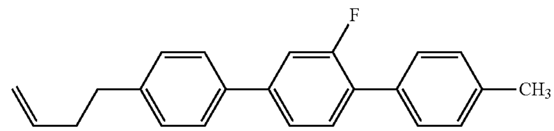

TABLE 17

| | Component Ratio (Mass %) | | | |
|---|---|---|---|---|
| Formula | Example 31 | Example 32 | Example 33 | Example 34 |
| (i) (45.2) | 2 | 3 | 5 | |
| (i) (45.3) | 3 | 2 | | 4 |
| (i) (45.4) | | | | 6 |
| (ii) | 37 | 36 | 41 | 27 |
| (1.3) | 10 | 12 | 7 | 16 |
| (11.1) | 12 | 7 | 9 | 13 |
| (28.3) | 2 | 5 | 4 | 5 |
| (11.2) | 4 | 8 | 6 | 5 |
| (44.2) | 4 | 3 | 5 | 2 |
| (44.1) | 4 | 2 | 1 | 3 |
| (31.2) | 8 | 5 | 10 | 4 |
| (18.3) | | 8 | 8 | |
| (18.4) | | 4 | | |
| (23.2) | | | 4 | |
| (37.2) | | 3 | | |
| (31.4) | 2 | 2 | | 5 |
| (19.4) | 12 | | | 10 |

TABLE 18

| | Example 31 | Example 32 | Example 33 | Example 34 |
|---|---|---|---|---|
| $T_{ni}$/° C. | 95.1 | 94.2 | 97.1 | 99.3 |
| Δn | 0.106 | 0.097 | 0.097 | 0.110 |
| Δϵ | 4.7 | 4.9 | 4.7 | 5.3 |
| η/mPa · s | 14 | 11 | 12 | 17 |
| $\gamma_1$/mPa · s | 60 | 63 | 58 | 78 |
| Initial VHR (%) | 99.6 | 99.5 | 99.5 | 99.5 |
| VHR after Thermal Test (%) | 98.6 | 98.1 | 98.2 | 98.6 |
| Screen Burn-in (h) | 650 | 640 | 640 | 645 |
| Droplet Stains | 5 | 4 | 4 | 5 |
| Contamination of Manufacturing Equipment (s) | 195 | 195 | 180 | 190 |
| Process Adaptability (100 Times) | 1052 | 956 | 800 | 987 |
| Resistance to Resolution at Low Temperature (h) | 610 | 585 | 512 | 600 |

Examples 35 to 38

The following compounds were used to prepare compositions shown in Table 19, and IPS liquid crystal display apparatuses having the structure illustrated in FIGS. 1 and 2 were produced. Table 20 shows results of the evaluations of the compositions and liquid crystal display apparatuses.

[Chem. 272]

(i) (45.2)

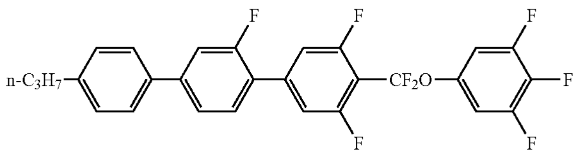

(i) (45.3)

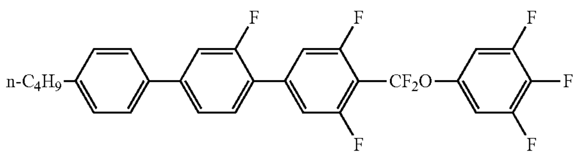

(i) (45.4)

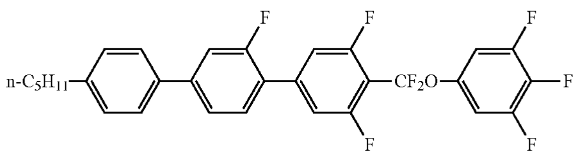

(ii)

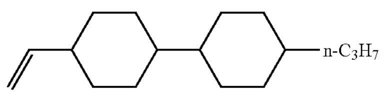

(26.2)

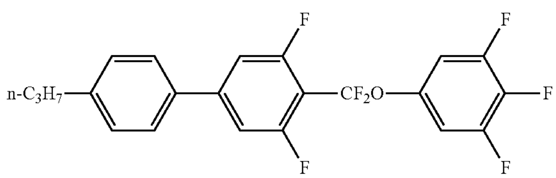

(1.3)

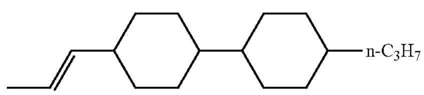

(37.2)

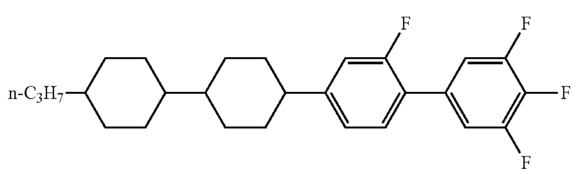

(15.1)

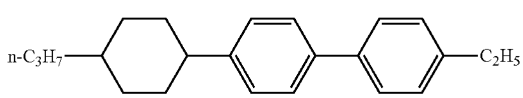

(54.2)

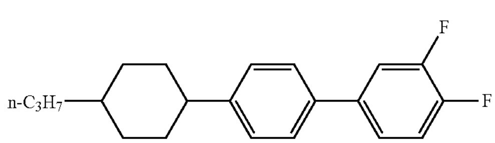

(5.4)

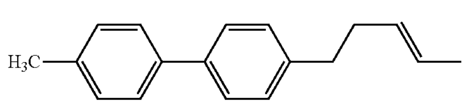

-continued (18.3)

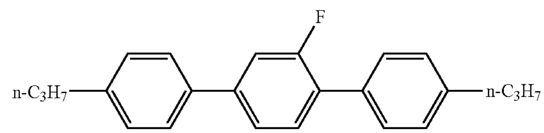

(54.4)

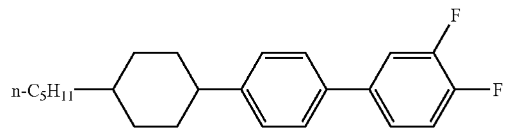

(5.2)

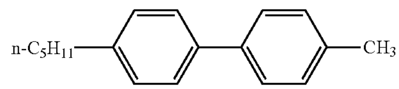

(18.9)

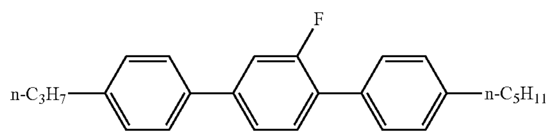

TABLE 19

| Formula | Component Ratio (Mass %) Example 35 | Example 36 | Example 37 | Example 38 |
|---|---|---|---|---|
| (i) (45.2) | 5 | | | 5 |
| (i) (45.3) | | 5 | | |
| (i) (45.4) | | | 5 | |
| (ii) | 43 | 48 | 38 | 34 |
| (26.2) | 6 | 6 | 6 | 6 |
| (1.3) | 5 | | 10 | 14 |
| (37.2) | 6 | 6 | 6 | 6 |
| (15.1) | 9 | 9 | 9 | 9 |
| (54.2) | 7 | 7 | 7 | 5 |
| (5.4) | 6 | 6 | 6 | |
| (18.3) | 8 | 8 | | |
| (54.4) | 5 | 5 | 5 | 7 |
| (5.2) | | | | 6 |
| (18.9) | | | 8 | 8 |

TABLE 20

| | Example 35 | Example 36 | Example 37 | Example 38 |
|---|---|---|---|---|
| $T_{ni}$/° C. | 76.4 | 75.3 | 80.5 | 81.1 |
| Δn | 0.112 | 0.111 | 0.117 | 0.115 |
| Δε | 4.7 | 4.7 | 4.3 | 4.3 |
| η/mPa · s | 12 | 12 | 14 | 14 |
| Initial Voltage Holding Ratio (%) | 100 | 99.3 | 99.5 | 99.5 |
| Voltage Holding Ratio after Thermal Test (%) | 98.8 | 98.4 | 98.9 | 98.8 |
| Screen Burn-in (h) | 700 | 650 | 650 | 690 |
| Droplet Stains | 5 | 4 | 5 | 5 |
| Contamination of Manufacturing Equipment (s) | 185 | 144 | 190 | 180 |
| Process Adaptability (100 Times) | 1010 | 865 | 965 | 1000 |

TABLE 20-continued

| | Example 35 | Example 36 | Example 37 | Example 38 |
|---|---|---|---|---|
| Resistance to Resolution at Low Temperature (h) | 555 | 412 | 540 | 600 |

Examples 39 to 40

The following compounds were used to prepare compositions shown in Table 21, and IPS liquid crystal display apparatuses having the structure illustrated in FIGS. 1 and 2 were produced. Table 22 shows results of the evaluations of the compositions and liquid crystal display apparatuses.

[Chem. 273]

(i) (45.2)

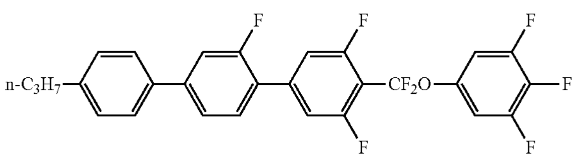

(i) (45.3)

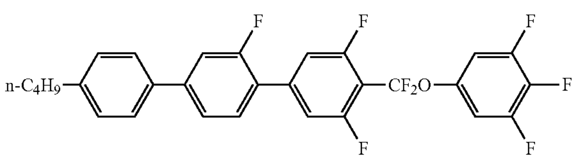

(i) (45.4)

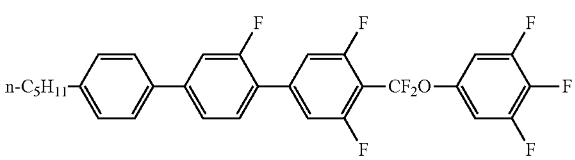

(ii)

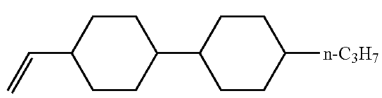

(26.2)

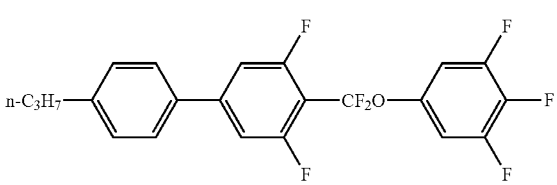

(1.3)

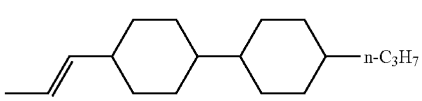

(18.1)

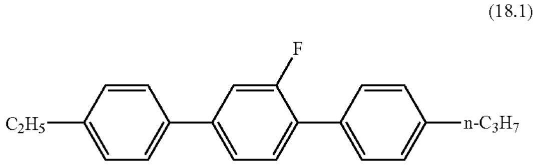

-continued (39.2)

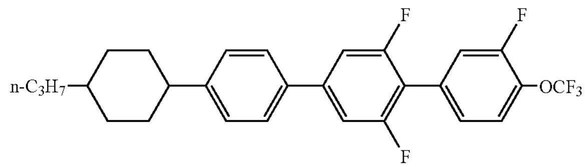

(15.1)

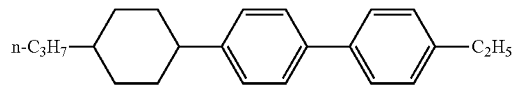

(5.4)

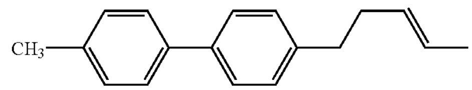

(18.3)

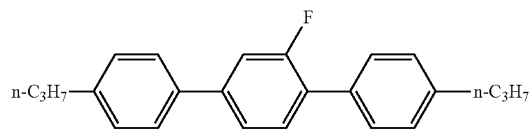

(42.3)

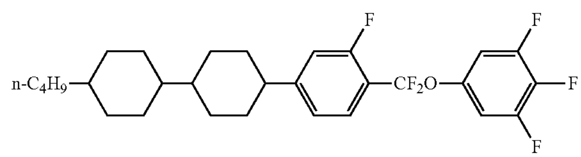

(18.4)

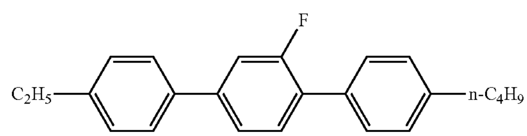

(11.2)

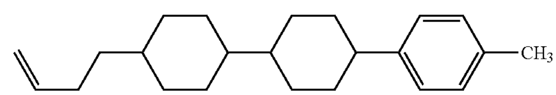

TABLE 21

| | Component Ratio (Mass %) | | | |
|---|---|---|---|---|
| Formula | Example 39 | Example 40 | Example 41 | Example 42 |
| (i) (45.2) | 5 | | | 5 |
| (i) (45.3) | | 5 | | |
| (i) (45.4) | | | 5 | |
| (ii) | 48 | 50 | 46 | 52 |
| (26.2) | 4 | 4 | 4 | 4 |
| (1.3) | 4 | 2 | 6 | 0 |
| (18.1) | 8 | 8 | 8 | |
| (39.2) | 6 | 6 | 6 | 6 |
| (15.1) | 7 | 7 | 7 | |
| (5.4) | 8 | 8 | 8 | 8 |
| (18.3) | 7 | | | 7 |
| (42.3) | 3 | 3 | 3 | 3 |
| (18.4) | | 7 | | 8 |
| (11.2) | | | 7 | 7 |

TABLE 22

| | Example 39 | Example 40 | Example 41 | Example 42 |
|---|---|---|---|---|
| $T_{ni}$/° C. | 75.1 | 74.5 | 81.2 | 74.9 |
| Δn | 0.120 | 0.120 | 0.115 | 0.114 |
| Δε | 4.6 | 4.5 | 4.1 | 4.6 |
| η/mPa · s | 13 | 14 | 14 | 14 |
| $\gamma_1$/mPa · s | 44 | 43 | 43 | 41 |
| Initial Voltage Holding Ratio (%) | 99.4 | 99.6 | 99.6 | 99.4 |
| Voltage Holding Ratio after Thermal Test (%) | 98.8 | 98.9 | 98.9 | 98.8 |
| Screen Burn-in (h) | 700 | 650 | 650 | 690 |
| Droplet Stains | 5 | 4 | 5 | 4 |
| Contamination of Manufacturing Equipment (s) | 145 | 120 | 150 | 75 |
| Process Adaptability (100 Times) | 1000 | 845 | 960 | 622 |
| Resistance to Resolution at Low Temperature (h) | 480 | 360 | 460 | 240 |

Examples 43 to 46

The following compounds were used to prepare compositions shown in Table 23, and IPS liquid crystal display apparatuses having the structure illustrated in FIGS. 1 and 2 were produced. Table 24 shows results of the evaluations of the compositions and liquid crystal display apparatuses.

[Chem. 274]

(i) (45.2)

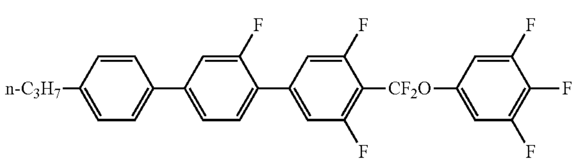

(ii)

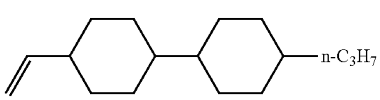

(11.1)

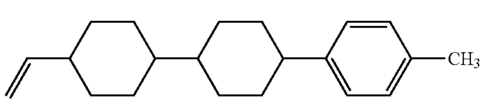

(26.2)

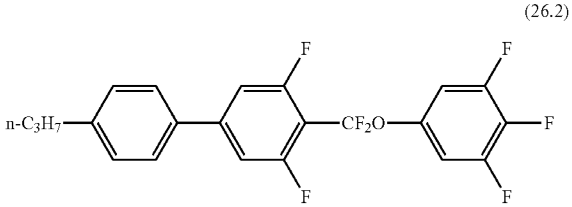

-continued (28.3)

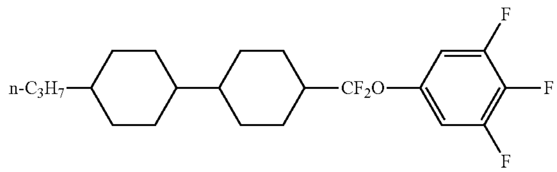

(1.3)

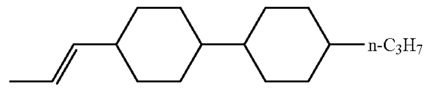

(11.2)

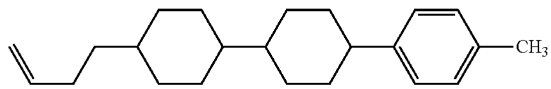

(26.1)

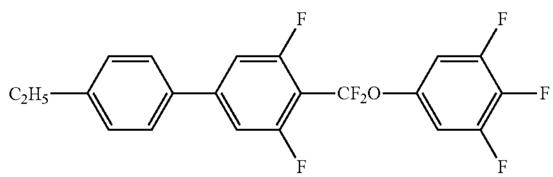

(44.1)

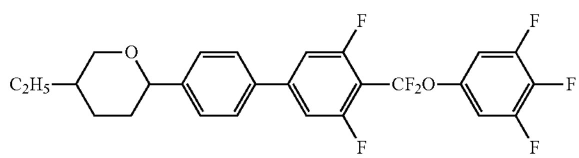

(44.2)

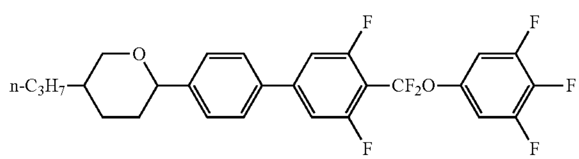

(41.2)

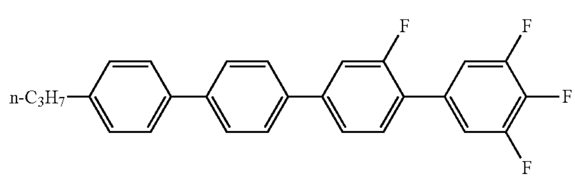

(19.2)

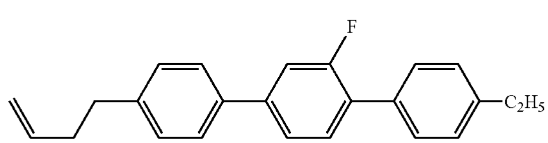

(18.4)

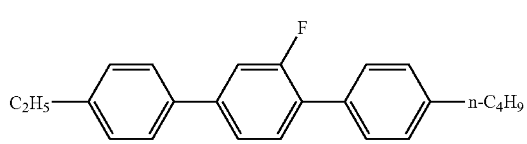

TABLE 23

| | Component Ratio (Mass %) | | | |
|---|---|---|---|---|
| Formula | Example 43 | Example 44 | Example 45 | Example 46 |
| (i) (45.2) | 2 | 2 | 12 | 8 |
| (ii) | 28 | 38 | 28 | 15 |
| (11.1) | 16 | | 14 | |
| (26.2) | 12 | 14 | 11 | 9 |
| (28.3) | 7 | 8 | | 6 |
| (1.3) | 9 | 9 | 15 | 22 |
| (11.2) | 14 | 5 | 10 | 17 |
| (26.1) | 2 | | | |
| (44.1) | 3 | 3 | 2 | 5 |
| (44.2) | 6 | 5 | 7 | 4 |
| (41.2) | 1 | 1 | 1 | 1 |
| (19.2) | | 10 | | 7 |
| (18.4) | | 5 | | 6 |

TABLE 24

| | Example 43 | Example 44 | Example 45 | Example 46 |
|---|---|---|---|---|
| $T_{ni}$/° C. | 90.0 | 74.9 | 86.8 | 95.3 |
| Δn | 0.105 | 0.117 | 0.112 | 0.128 |
| Δε | 7.0 | 8.2 | 8.3 | 8.4 |
| η/mPa · s | 17 | 18 | 21 | 27 |
| $\gamma_1$/mPa · s | 60 | 54 | 85 | 108 |
| Initial Voltage Holding Ratio (%) | 99.7 | 99.4 | 99.6 | 99.4 |
| Voltage Holding Ratio after Thermal Test (%) | 99.0 | 98.5 | 98.9 | 98.5 |
| Screen Burn-in (h) | 630 | 600 | 625 | 620 |
| Droplet Stains | 5 | 4 | 5 | 4 |
| Contamination of Manufacturing Equipment (s) | 199 | 175 | 195 | 196 |
| Process Adaptability (100 Times) | 1110 | 945 | 1011 | 950 |
| Resistance to Resolution at Low Temperature (h) | 585 | 575 | 566 | 385 |

Examples 47 to 50

The following compounds were used to prepare compositions shown in Table 25, and IPS liquid crystal display apparatuses having the structure illustrated in FIGS. 1 and 2 were produced. Table 26 shows results of the evaluations of the compositions and liquid crystal display apparatuses.

[Chem. 275]

(i) (45.2)

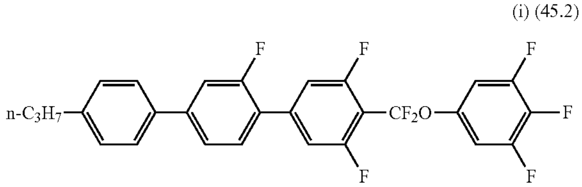

-continued (i) (45.3)

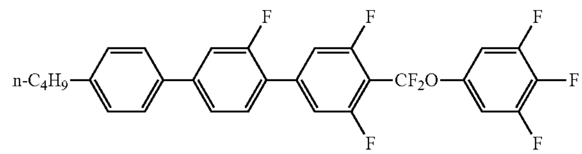

(ii)

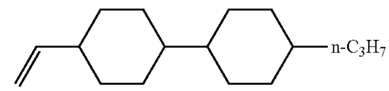

(1.3)

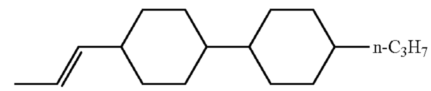

(26.1)

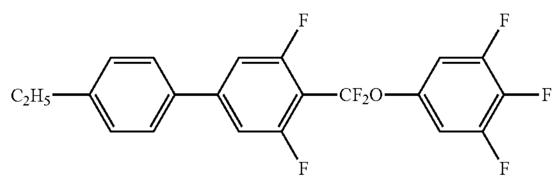

(39.2)

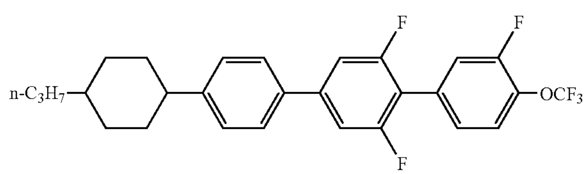

(18.1)

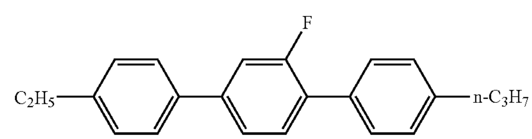

(18.4)

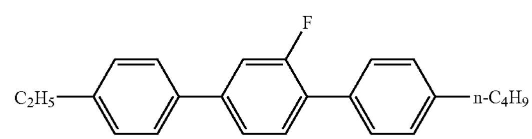

(10.1)

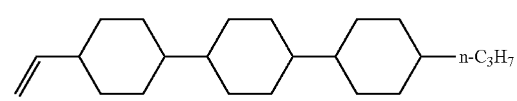

(5.2)

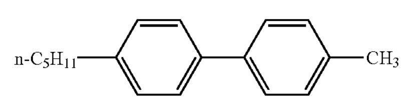

(26.2)

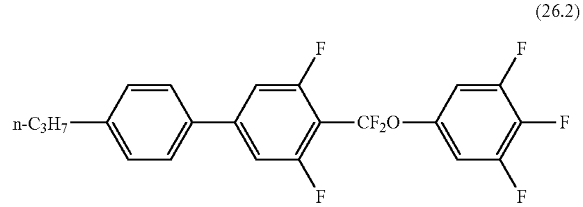

-continued (18.6)

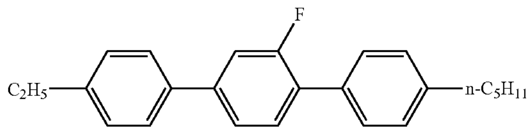

(11.2)

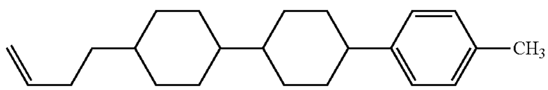

(5.4)

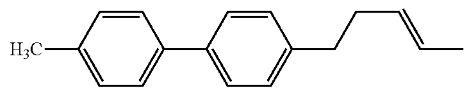

TABLE 25

| | Component Ratio (Mass %) | | | |
|---|---|---|---|---|
| Formula | Example 47 | Example 48 | Example 49 | Example 50 |
| (i) (45.2) | 5 | 5 | 5 | |
| (i) (45.3) | | | | 5 |
| (ii) | 34 | 37 | 37 | 32 |
| (1.3) | 15 | 12 | 12 | 15 |
| (26.1) | 5 | | | 5 |
| (39.2) | 6 | 6 | 6 | 6 |
| (18.1) | 7 | 7 | 7 | |
| (18.4) | 8 | | | 8 |
| (10.1) | 8 | 8 | 4 | 8 |
| (5.2) | 12 | 12 | | 10 |
| (26.2) | | 5 | 5 | |
| (18.6) | | 8 | 8 | 7 |
| (11.2) | | | 4 | |
| (5.4) | | | 12 | 4 |

TABLE 26

| | Example 47 | Example 48 | Example 49 | Example 50 |
|---|---|---|---|---|
| $T_{ni}$/° C. | 75.3 | 76.5 | 75.2 | 76.0 |
| Δn | 0.121 | 0.122 | 0.126 | 0.127 |
| Δε | 3.9 | 3.8 | 3.9 | 3.7 |
| η/mPa · s | 11 | 11 | 12 | 13 |
| $\gamma_1$/mPa · s | 42 | 41 | 42 | 44 |
| Initial Voltage Holding Ratio (%) | 99.4 | 99.4 | 99.6 | 99.4 |
| Voltage Holding Ratio after Thermal Test (%) | 98.8 | 98.8 | 98.9 | 98.5 |
| Screen Burn-in (h) | 721 | 700 | 710 | 625 |
| Droplet Stains | 5 | 5 | 5 | 4 |
| Contamination of Manufacturing Equipment (s) | 200 | 195 | 195 | 190 |
| Process Adaptability (100 Times) | 1250 | 1200 | 1225 | 975 |
| Resistance to Resolution at Low Temperature (h) | 615 | 605 | 610 | 575 |

Examples 51 to 54

The following compounds were used to prepare compositions shown in Table 27, and IPS liquid crystal display apparatuses having the structure illustrated in FIGS. 1 and 2 were produced. Table 28 shows results of the evaluations of the compositions and liquid crystal display apparatuses.

[Chem. 276]

(i) (45.2)

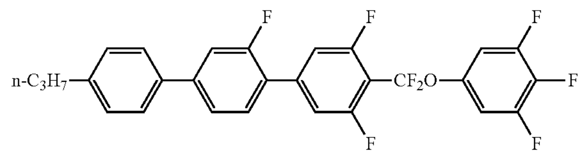

(i) (45.3)

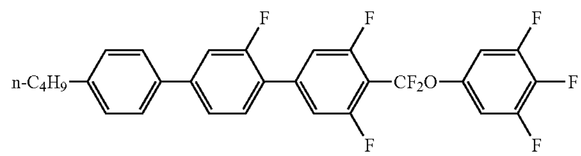

(i) (45.4)

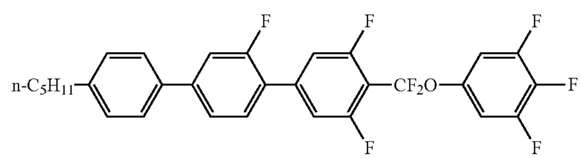

(ii)

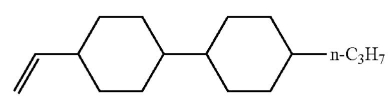

(26.2)

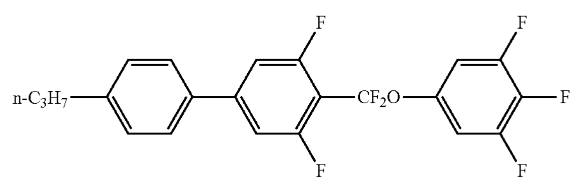

(1.3)

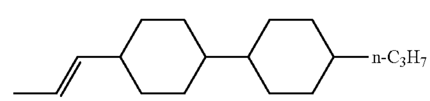

(11.1)

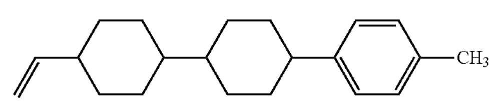

(18.1)

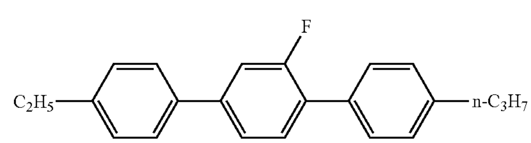

(18.6)

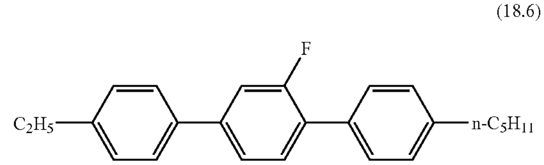

-continued (36.2)

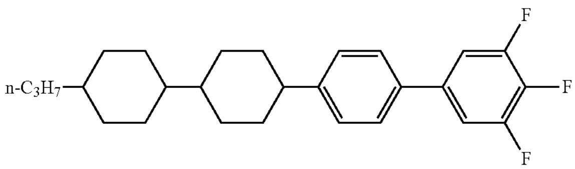

(11.2)

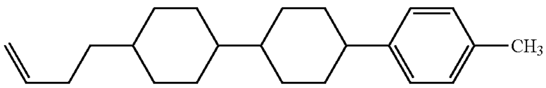

(36.1)

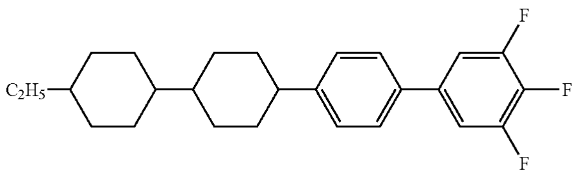

(19.2)

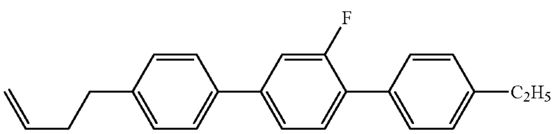

(9.2)

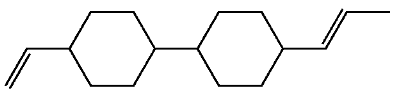

TABLE 27

| | Component Ratio (Mass %) | | | |
|---|---|---|---|---|
| Formula | Example 51 | Example 52 | Example 53 | Example 54 |
| (i) (45.2) | | | | 4 |
| (i) (45.3) | 4 | 4 | | |
| (i) (45.4) | | | 4 | |
| (ii) | 41 | 35 | 44 | 44 |
| (26.2) | 9 | 9 | 9 | 9 |
| (1.3) | 7 | 7 | 4 | |
| (11.1) | 11 | 11 | | 6 |
| (18.1) | 11 | 11 | 11 | |
| (18.6) | 11 | | 11 | 11 |
| (36.2) | 6 | 6 | | |
| (11.2) | | | 11 | 5 |
| (36.1) | | | 6 | 6 |
| (19.2) | | 11 | | 11 |
| (9.2) | | 6 | | 4 |

TABLE 28

| | Example 51 | Example 52 | Example 53 | Example 54 |
|---|---|---|---|---|
| $T_{ni}$/° C. | 80.8 | 84.5 | 79.4 | 82.0 |
| Δn | 0.116 | 0.123 | 0.116 | 0.123 |
| Δε | 4.3 | 4.4 | 4.7 | 4.5 |
| η/mPa · s | 12 | 13 | 12 | 14 |
| $\gamma_1$/mPa · s | 45 | 46 | 46 | 45 |
| Initial Voltage Holding Ratio (%) | 99.4 | 99.4 | 99.6 | 99.4 |
| Voltage Holding Ratio after Thermal Test (%) | 98.8 | 98.4 | 98.5 | 98.4 |
| Screen Burn-in (h) | 603 | 585 | 556 | 555 |
| Droplet Stains | 5 | 4 | 4 | 4 |
| Contamination of Manufacturing Equipment (s) | 180 | 175 | 165 | 140 |
| Process Adaptability (100 Times) | 1000 | 888 | 846 | 754 |
| Resistance to Resolution at Low Temperature (h) | 645 | 635 | 589 | 560 |

Examples 55 to 58

The following compounds were used to prepare compositions shown in Table 29, and IPS liquid crystal display apparatuses having the structure illustrated in FIGS. 1 and 2 were produced. Table 30 shows results of the evaluations of the compositions and liquid crystal display apparatuses.

[Chem. 277]

(i) (45.2)

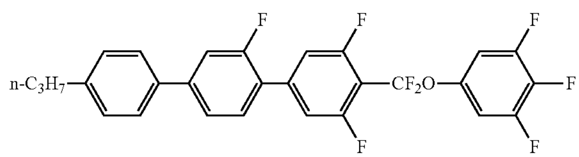

(ii)

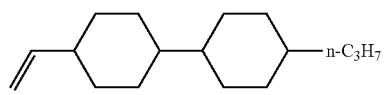

(1.3)

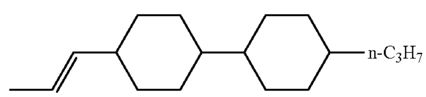

(11.1)

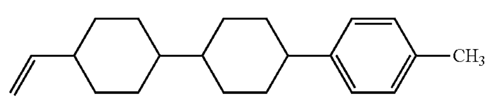

(18.1)

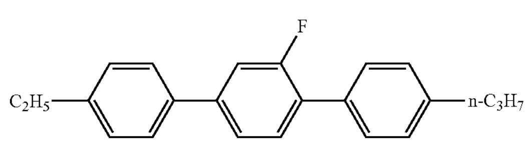

(26.1)

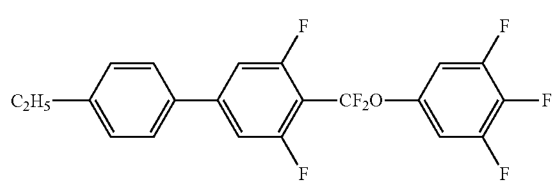

-continued (39.2)

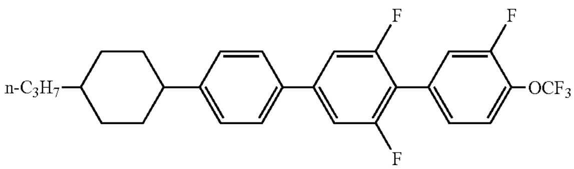

(18.4)

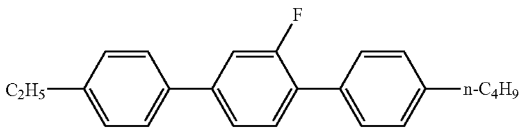

(5.2)

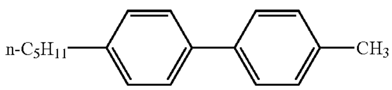

(3.1)

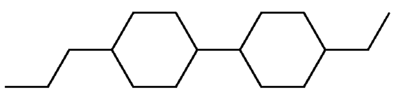

(1.2)

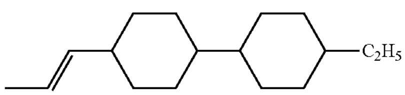

(37.2)

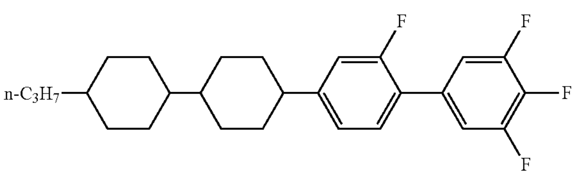

(5.4)

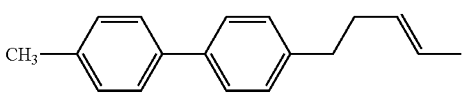

TABLE 29

| | Example 55 | Example 56 | Example 57 | Example 58 |
|---|---|---|---|---|
| (i) (45.2) | 5 | 5 | 5 | 5 |
| (ii) | 34 | 35 | 30 | 30 |
| (1.3) | 15 | 14 | 10 | 10 |
| (11.1) | 8 | 8 | 8 | 8 |
| (18.1) | 8 | 8 | 8 | 8 |
| (26.1) | 5 | 5 | 5 | 5 |
| (39.2) | 5 | | | |
| (18.4) | 10 | 10 | 10 | 10 |
| (5.2) | 10 | 10 | 10 | 5 |
| (3.1) | | | 5 | 5 |
| (1.2) | | | 4 | 4 |
| (37.2) | | 5 | 5 | 5 |
| (5.4) | | | | 5 |

TABLE 30

| Sample Name | Example 55 | Example 56 | Example 57 | Example 58 |
|---|---|---|---|---|
| $T_{ni}$/° C. | 75.3 | 78.1 | 76.2 | 77.3 |
| Δn | 0.121 | 0.119 | 0.117 | 0.109 |
| Δε | 3.9 | 3.8 | 3.8 | 3.7 |
| η/mPa · s | 12 | 11 | 11 | 11 |
| $\gamma_1$/mPa · s | 41 | 39 | 37 | 39 |

TABLE 30-continued

| Sample Name | Example 55 | Example 56 | Example 57 | Example 58 |
|---|---|---|---|---|
| Initial Voltage Holding Ratio (%) | 99.6 | 99.6 | 99.4 | 99.3 |
| Voltage Holding Ratio after Thermal Test (%) | 98.8 | 98.8 | 98.5 | 98.4 |
| Screen Burn-in (h) | 665 | 600 | 575 | 525 |
| Droplet Stains | 5 | 5 | 4 | 4 |
| Contamination of Manufacturing Equipment (s) | 190 | 180 | 180 | 175 |
| Process Adaptability (100 Times) | 1025 | 1010 | 950 | 920 |
| Resistance to Resolution at Low Temperature (h) | 635 | 600 | 575 | 510 |

Examples 59 to 62

The following compounds were used to prepare compositions shown in Table 31, and IPS liquid crystal display apparatuses having the structure illustrated in FIGS. 1 and 2 were produced. Table 32 shows results of the evaluations of the compositions and liquid crystal display apparatuses.

[Chem. 278]

(i) (45.2)

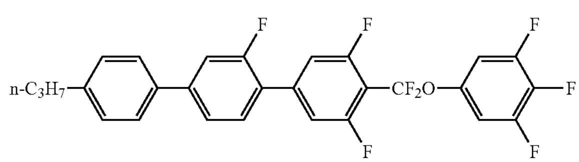

(i) (45.4)

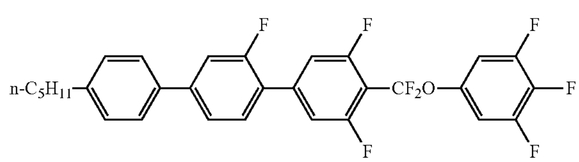

(ii)

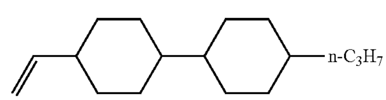

(28.3)

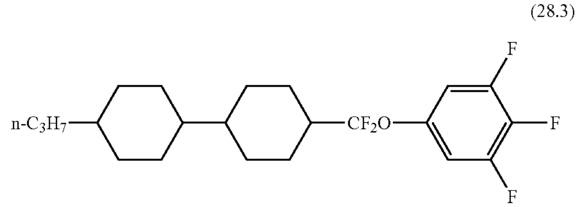

-continued (26.2)

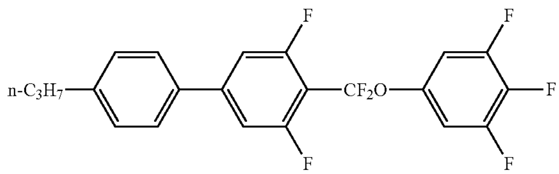

(44.1)

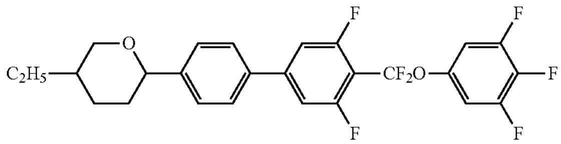

(44.2)

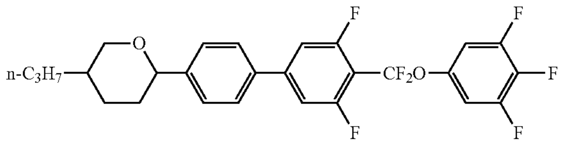

(31.2)

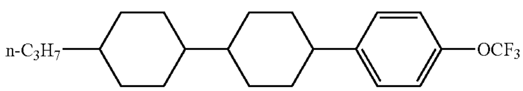

(31.1)

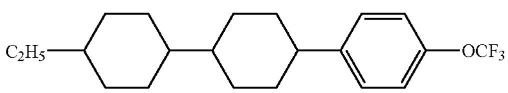

(39.2)

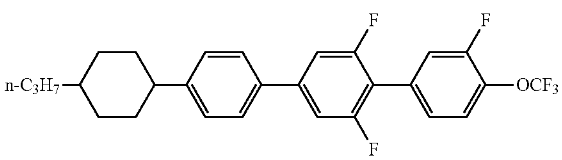

(37.2)

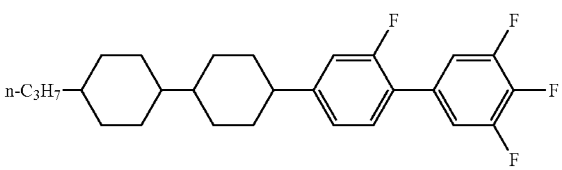

(1.3)

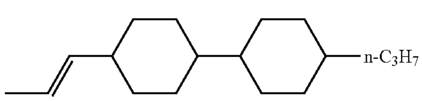

(11.1)

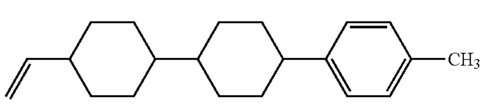

(11.2)

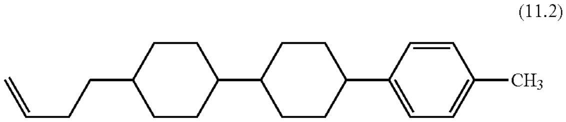

-continued (38.2)

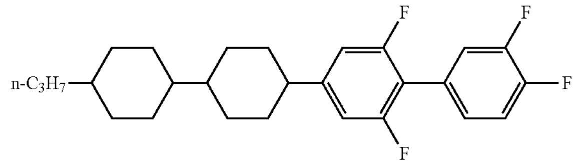

TABLE 31

| | Example 59 | Example 60 | Example 61 | Example 62 |
|---|---|---|---|---|
| (i) (45.2) | 4 | | | 5 |
| (i) (45.4) | | 5 | 4 | |
| (ii) | 39 | 37 | 43 | 40 |
| (28.3) | 2 | 3 | 2 | |
| (26.2) | 8 | 6 | 8 | 10 |
| (44.1) | 4 | 3 | 4 | 3 |
| (44.2) | 4 | 3 | 4 | 5 |
| (31.2) | 6 | 7 | | |
| (31.1) | | | 6 | 5 |
| (39.2) | 6 | 7 | 3 | 4 |
| (37.2) | | | 3 | 4 |
| (1.3) | 17 | 15 | 13 | 14 |
| (11.1) | 5 | | 5 | |
| (11.2) | | 8 | | 4 |
| (38.2) | 5 | 6 | 5 | 6 |

TABLE 32

| | Example 59 | Example 60 | Example 61 | Example 62 |
|---|---|---|---|---|
| $T_{ni}$/° C. | 85.3 | 92.2 | 85.3 | 84.2 |
| Δn | 0.099 | 0.100 | 0.097 | 0.100 |
| Δε | 8.5 | 8.0 | 7.5 | 9.0 |
| η/mPa · s | 15 | 16 | 15 | 16 |
| Initial VHR (%) | 99.5 | 99.5 | 99.5 | 99.5 |
| VHR after Thermal Test (%) | 98.5 | 98.2 | 98.2 | 98.1 |
| Screen Burn-in (h) | 620 | 610 | 615 | 580 |
| Droplet Stains | 5 | 4 | 5 | 4 |
| Contamination of Manufacturing Equipment (s) | 200 | 190 | 165 | 170 |
| Process Adaptability (100 Times) | 1040 | 1000 | 960 | 899 |
| Resistance to Resolution at Low Temperature (h) | 620 | 620 | 480 | 444 |

Examples 63 to 66

The following compounds were used to prepare compositions shown in Table 33, and IPS liquid crystal display apparatuses having the structure illustrated in FIGS. 1 and 2 were produced. Table 34 shows results of the evaluations of the compositions and liquid crystal display apparatuses.

[Chem. 279]
(i) (45.2)
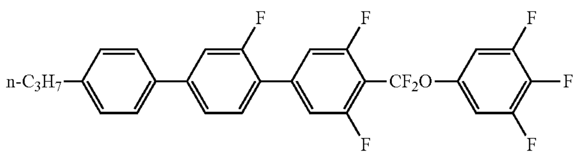
(i) (45.3)
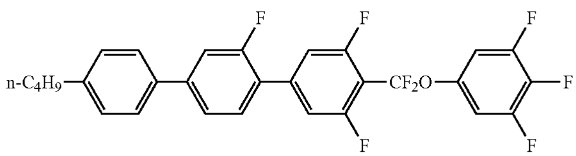
(ii)
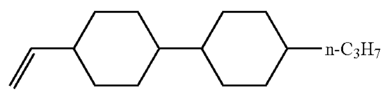
(26.2)
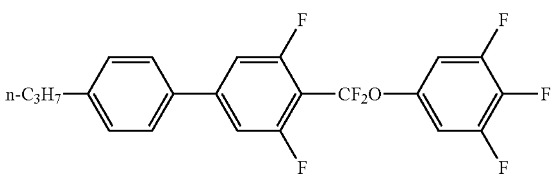
(1.3)
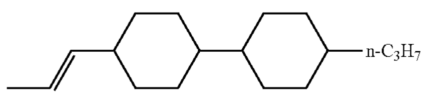
(11.1)
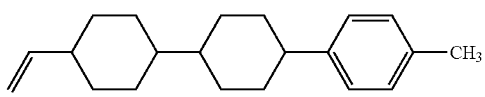
(11.2)
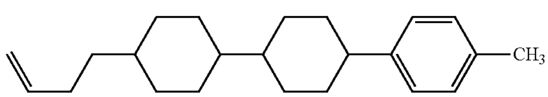
(44.2)
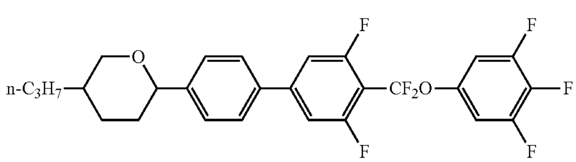
(28.5)
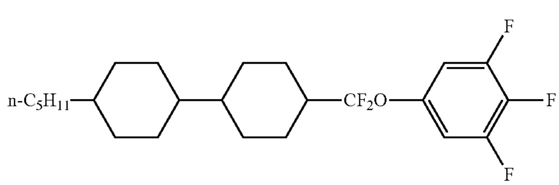
(44.1)
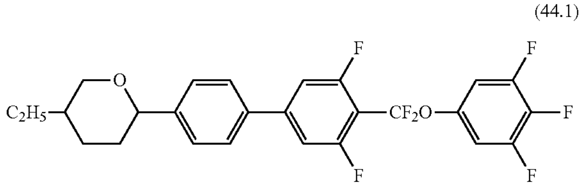
-continued
(54.2)
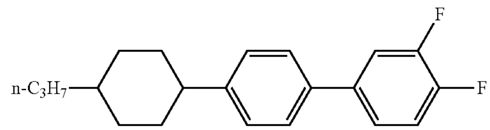
(28.3)
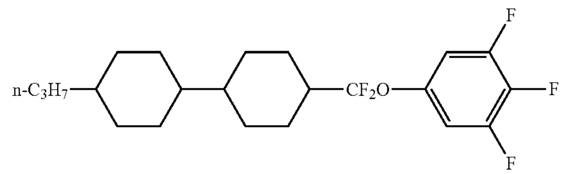
(19.2)
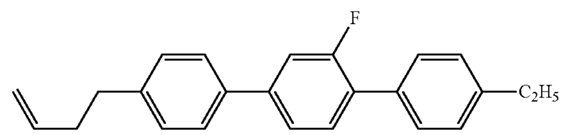
(1.2)
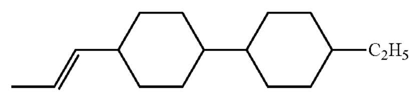
(56.2)
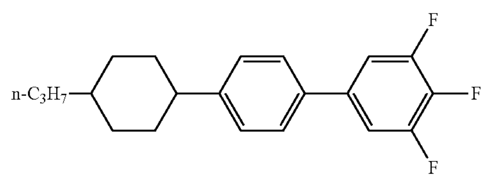
TABLE 33
| | Example 63 | Example 64 | Example 65 | Example 66 |
|---|---|---|---|---|
| (i) (45.2) | 5 | | 5 | |
| (i) (45.3) | | 5 | | 5 |
| (ii) | 25 | 25 | 25 | 20 |
| (26.2) | 12 | 12 | 12 | 12 |
| (1.3) | 7 | 7 | | 12 |
| (11.1) | 16 | 16 | 10 | 16 |
| (11.2) | 8 | | 14 | 8 |
| (44.2) | 5 | 5 | 8 | 5 |
| (28.5) | 4 | 4 | 4 | 4 |
| (44.1) | 3 | 3 | | 3 |
| (54.2) | 5 | 5 | 5 | |
| (28.3) | 10 | 10 | 10 | 10 |
| (19.2) | | 8 | | |
| (1.2) | | | 7 | |
| (56.2) | | | | 5 |
TABLE 34
| Sample Name | Example 63 | Example 64 | Example 65 | Example 66 |
|---|---|---|---|---|
| $T_{ni}$/° C. | 85.3 | 83.4 | 85.0 | 85.9 |
| Δn | 0.105 | 0.118 | 0.103 | 0.105 |
| Δϵ | 9.3 | 9.7 | 9.6 | 9.4 |
| η/mPa · s | 16 | 20 | 15 | 17 |
| $\gamma_1$/mPa · s | 87 | 92 | 77 | 96 |
| Initial VHR (%) | 99.6 | 99.5 | 99.5 | 99.6 |
| VHR after Thermal Test (%) | 98.5 | 98.2 | 98.5 | 98.3 |

TABLE 34-continued

| Sample Name | Example 63 | Example 64 | Example 65 | Example 66 |
|---|---|---|---|---|
| Screen Burn-in (h) | 620 | 585 | 615 | 580 |
| Droplet Stains | 5 | 4 | 5 | 4 |
| Contamination of Manufacturing Equipment (s) | 200 | 180 | 200 | 175 |
| Process Adaptability (100 Times) | 1040 | 895 | 1020 | 860 |
| Resistance to Resolution at Low Temperature (h) | 620 | 590 | 620 | 540 |

Examples 67 to 70

The following compounds were used to prepare compositions shown in Table 35, and IPS liquid crystal display apparatuses having the structure illustrated in FIGS. 1 and 2 were produced. Table 36 shows results of the evaluations of the compositions and liquid crystal display apparatuses.

[Chem. 280]

(i) (45.2)

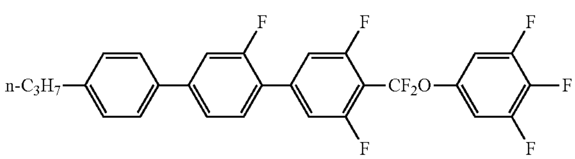

(i) (45.3)

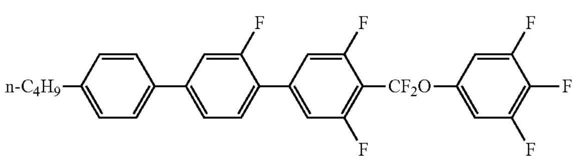

(ii)

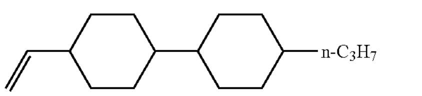

(1.3)

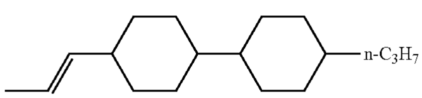

(19.2)

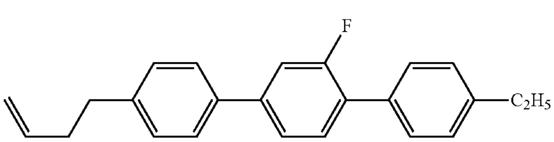

(19.4)

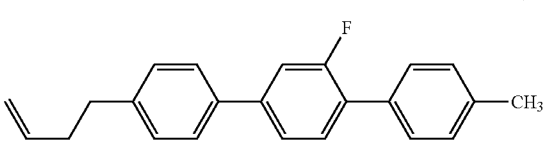

-continued (19.31)

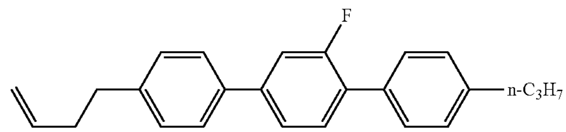

(26.2)

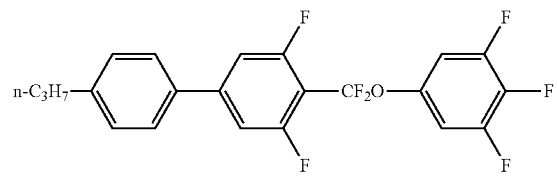

(36.1)

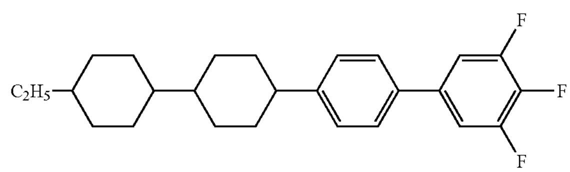

(36.2)

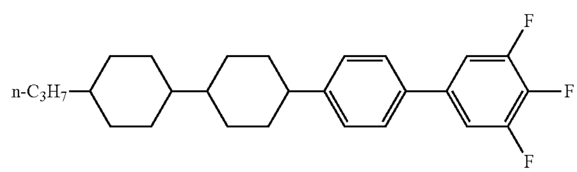

(41.2)

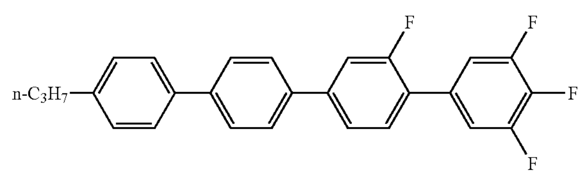

(60.1)

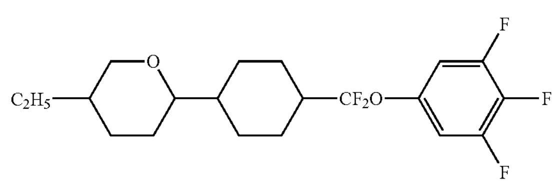

(60.2)

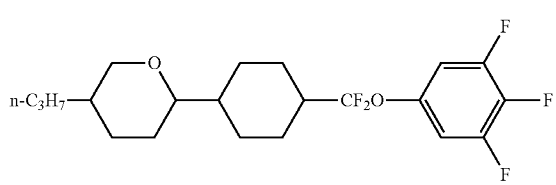

(64.1)

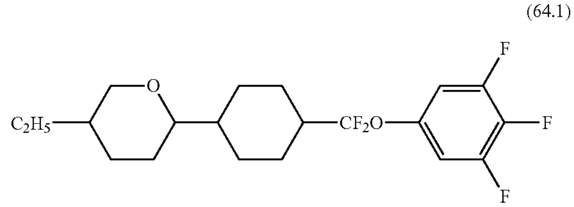

-continued (64.2)

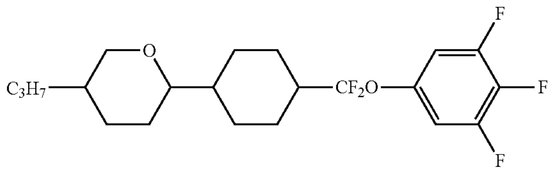

TABLE 35

| | Example 67 | Example 68 | Example 69 | Example 70 |
|---|---|---|---|---|
| (i) (45.2) | | | | 5 |
| (i) (45.3) | 5 | 5 | 5 | |
| (ii) | 49 | 56 | 50 | 49 |
| (1.3) | 7 | | 6 | 7 |
| (19.2) | 5 | 5 | 5 | 5 |
| (19.4) | | 2 | | |
| (19.31) | 2 | | 2 | 2 |
| (26.2) | 8 | 8 | 8 | 8 |
| (36.1) | 3 | 3 | 4 | |
| (36.2) | 4 | 4 | 3 | 4 |
| (41.2) | | | | 3 |
| (60.1) | 4 | 4 | 5 | 4 |
| (60.2) | 5 | 4 | 4 | 5 |
| (64.1) | 4 | 5 | 4 | 4 |
| (64.2) | 4 | 4 | 4 | 4 |

TABLE 36

| | Example 67 | Example 68 | Example 69 | Example 70 |
|---|---|---|---|---|
| $T_{ni}$/° C. | 80.7 | 78.4 | 79.7 | 77.5 |
| Δn | 0.113 | 0.112 | 0.113 | 0.115 |
| Δε | 7.5 | 7.7 | 7.5 | 7.8 |
| η/mPa · s | 11 | 10 | 10 | 11 |
| $\gamma_1$/mPa · s | 61 | 59 | 61 | 62 |
| Initial Voltage Holding Ratio (%) | 99.5 | 99.0 | 99.4 | 99.5 |
| Voltage Holding Ratio after Thermal Test (%) | 98.4 | 97.8 | 98.1 | 98.3 |
| Screen Burn-in (h) | 336 | 240 | 285 | 320 |
| Droplet Stains | 5 | 4 | 4 | 5 |
| Contamination of Manufacturing Equipment (s) | 145 | 66 | 115 | 145 |
| Process Adaptability (100 Times) | 777 | 714 | 720 | 764 |
| Resistance to Resolution at Low Temperature (h) | 450 | 245 | 310 | 425 |

INDUSTRIAL APPLICABILITY

The liquid crystal composition of the present invention with positive dielectric anisotropy has a good resistance to resolution at low temperature, and changes in its specific resistance and voltage holding ratio due to exposure to heat or light are significantly small; hence, products produced therefrom are highly practical, and liquid crystal display devices using such a liquid crystal composition can quickly respond. In addition, since the liquid crystal composition can be continuously and stably dropped in a process for manufacturing liquid crystal display devices, defective display resulting from the manufacturing process can be reduced, and the liquid crystal display devices can be produced in a high yield; thus, such a liquid crystal composition is highly useful.

REFERENCE SIGNS LIST

100 First substrate
102 TFT layer
103 Pixel electrode
104 Passivation film
105 First alignment film
200 Second substrate
201 Planarization film
202 Black matrix
203 Color filter
204 Transparent electrode
205 Second alignment film
301 Sealing material
302 Protrusion (columnar spacer)
303 Liquid crystal layer
304 Protrusion (columnar spacer)
401 Mask pattern
402 Resin layer

The invention claimed is:

1. A liquid crystal composition comprising at least one compound represented by Formula (i) and at least one compound represented by General Formula (ii)

[Chem. 1]

(I)

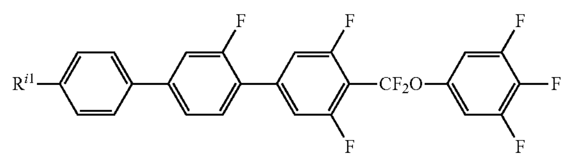

(II)

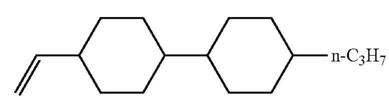

(where $R^{i1}$ represents an alkyl group having 1 to 5 carbon atoms or an alkenyl group having 2 to 5 carbon atoms);

at least one compound represented by General Formula (II-2)

[Chem. 2]

(II-2)

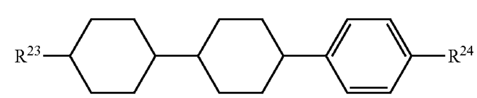

(where $R^{23}$ represents an alkenyl group having 2 to 5 carbon atoms, and $R^{24}$ represents an alkyl group having 1 to 5 carbon atoms or an alkoxy group having 1 to 4 carbon atoms);

at least one compound represented by General Formula (I-1-1)

[Chem. 3]

(I-1-1)

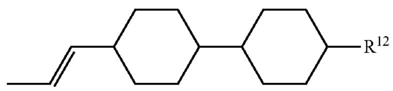

where $R^{12}$ represents an alkyl group having 1 to 5 carbon atoms, an alkenyl group having 2 to 5 carbon atoms, or an alkoxy group having 1 to 4 carbon atoms;

at least one compound represented by General Formula (VIII-1)

[Chem. 4]

(VIII-1)

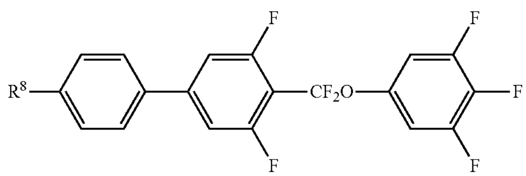

where $R^8$ represents an alkyl group having 1 to 5 carbon atoms, an alkenyl group having 2 to 5 carbon atoms, or an alkoxy group having 1 to 4 carbon atoms;

at least one compound represented by General Formula (IX-1-1)

[Chem. 5]

(IX-1-1)

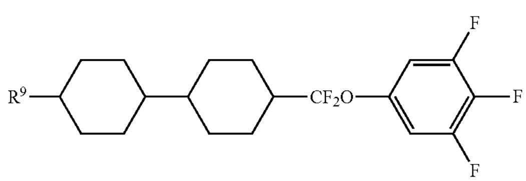

where $R^9$ represents an alkyl group having 1 to 5 carbon atoms, an alkenyl group having 2 to 5 carbon atoms, or an alkoxy group having 1 to 4 carbon atoms, and at least one compound represented by General Formula (XIV-2), (XIV-2)

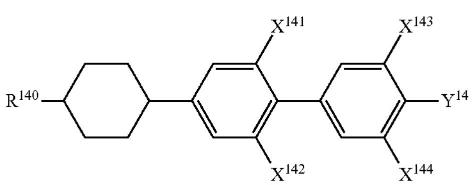

wherein $R^{140}$ represents an alkyl group having 1 to 5 carbon atoms, an alkenyl group having 2 to 5 carbon atoms, or an alkoxy group having 1 to 4 carbon atoms; $X^{141}$ to $X^{144}$ each independently represent a fluorine atom or a hydrogen atom; and $Y^{14}$ represents a fluorine atom, a chlorine atom, or —$OCF_3$, wherein the at least one compound represented by General Formula (XIV-2) comprises at least one compound selected from the group consisting of a compound represented by General Formula (XIV-2-2) and a compound represented by General Formula (XIV-2-4), (XIV-2-2)

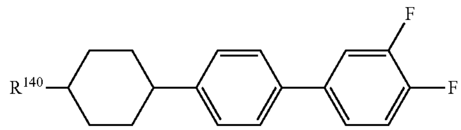

(XIV-2-4)

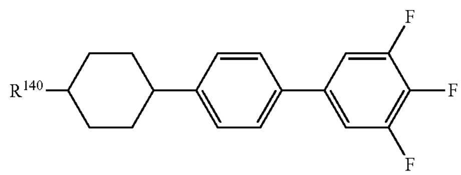

wherein the amount of the at least one compound represented by General Formula (II-2) is in the range of 20 to 35 mass % relative to the total mass of the liquid crystal composition.

2. The liquid crystal composition according to claim 1, further comprising at least one compound represented by General Formula (L)

[Chem. 6]

$$R^{L1}—B^{L1}\text{-}L^{L1}\text{-}B^{L2}\text{-}(L^{L2}\text{-}B^{L3})_{OL}R^{L2} \quad \text{(L)}$$

(where $R^{L1}$ and $R^{L2}$ each independently represent an alkyl group having 1 to 8 carbon atoms, and one —$CH_2$— moiety or at least two —$CH_2$— moieties not adjoining each other in the alkyl group are each independently optionally substituted with —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of (a) a 1,4-cyclohexylene group (of which one —$CH_2$— moiety or at least two —$CH_2$— moieties not adjoining each other are optionally substituted with —O—) and (b) a 1,4-phenylene group (of which one —CH═ moiety or at least two —CH═ moieties not adjoining each other are optionally substituted with —N═), and the groups (a) and (b) are each independently optionally substituted with a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO, —$OCF_2$—, —$CF_2O$—, —CH═N—N═CH—, —CH═CH—, —CF═CF—, or —C≡C—;

in the case where OL is 2 or 3 and where $L^{L2}$ is multiple, the $L^{L2}$ moieties are the same as or different from each other; in the case where OL is 2 or 3 and where $B^{L3}$ is multiple, the $B^{L3}$ moieties are the same as or different from each other; and the compound represented by General Formula (L) excludes the compound represented by Formula (ii)).

3. The liquid crystal composition according to claim 1, further comprising at least one compound represented by General Formula (M)

[Chem. 7]

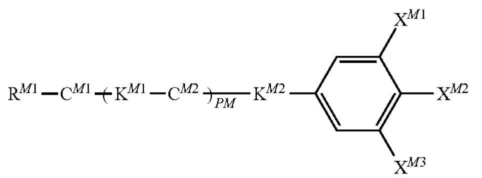

(M)

(where $R^{M1}$ represents an alkyl group having 1 to 8 carbon atoms, and one —$CH_2$— moiety or at least two —$CH_2$— moieties not adjoining each other in the alkyl group are each independently optionally substituted with —CH═CH—, —C≡C—, —O—, —CO—, —COO—, or —OCO—;

PM represents 0, 2, 3, or 4;

$C^{M1}$ and $C^{M2}$ each independently represent a group selected from the group consisting of (d) a 1,4-cyclohexylene group (of which one —$CH_2$— moiety or at least two —$CH_2$— moieties not adjoining each other are optionally substituted with —O— or —S—) and (e) a 1,4-phenylene group (of which one —CH═ moiety or at least two —CH═ moieties not adjoining each other are optionally substituted with —N═), and the groups (d) and (e) are each independently optionally substituted with a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

in the case where PM is 2, 3, or 4 and where $K^{M1}$ is multiple, the $K^{M1}$ moieties are the same as or different from each other; in the case where PM is 2, 3, or 4 and where $C^{M2}$ is multiple, the $C^{M2}$ moieties are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by General Formula (i)).

4. An active-matrix liquid crystal display device comprising the liquid crystal composition according to claim 1.

5. The active-matrix liquid crystal display device according to claim 4, wherein the active-matrix liquid crystal display device is operated in an IPS mode.

6. The active-matrix liquid crystal display device according to claim 4, wherein the active-matrix liquid crystal display device is operated in an FFS mode.

7. The active-matrix liquid crystal display device according to claim 4, wherein the active-matrix liquid crystal display device is operated in a VA-IPS mode.

8. The active-matrix liquid crystal display device according to claim 4, wherein the active-matrix liquid crystal display device is operated in an OCB mode.

9. The active-matrix liquid crystal display device according to claim 4, wherein the active-matrix liquid crystal display device is operated in an ECB mode.

10. A liquid crystal display comprising the active-matrix liquid crystal display device according to claim 4.

* * * * *